US012751553B2

(12) United States Patent
Daub et al.

(10) Patent No.: US 12,751,553 B2
(45) Date of Patent: Oct. 6, 2026

(54) CLIENT DEVICE FOR FACILITATING EXPERIENCES BASED ON PROXIMITY-BASED INTERACTIONS WITH FURNISHING UNITS

(71) Applicant: Wrmth Corp., Coldwater (CA)

(72) Inventors: Sally Jean Daub, Toronto (CA); John W. Pomeroy, Toronto (CA)

(73) Assignee: Wrmth Corp., Coldwater (CA)

( * ) Notice: Subject to any disclaimer, the term of this patent is extended or adjusted under 35 U.S.C. 154(b) by 149 days.

(21) Appl. No.: 18/773,765

(22) Filed: Jul. 16, 2024

(65) Prior Publication Data

US 2024/0365993 A1 Nov. 7, 2024

Related U.S. Application Data

(60) Division of application No. 17/656,111, filed on Mar. 23, 2022, now Pat. No. 12,279,701, which is a (Continued)

(51) Int. Cl.
*A47C 31/00* (2006.01)
*A47B 13/00* (2006.01)
(Continued)

(52) U.S. Cl.
CPC ............ *A47C 31/008* (2013.01); *A47B 13/00* (2013.01); *A47C 7/723* (2018.08); *A47C 7/725* (2013.01);
(Continued)

(58) Field of Classification Search
CPC ....... A47C 31/008; A47C 7/727; A47C 7/723; A47C 7/725; A47C 7/744; A47C 7/748; A47B 13/00
See application file for complete search history.

(56) References Cited

U.S. PATENT DOCUMENTS

| | | | |
|---|---|---|---|
| 7,866,743 | B1 | 1/2011 | Russell |
| 7,963,594 | B2 | 6/2011 | Wolas |

(Continued)

FOREIGN PATENT DOCUMENTS

| | | |
|---|---|---|
| CN | 208954572 | 6/2019 |
| WO | WO2016/023084 A1 | 2/2016 |

OTHER PUBLICATIONS

Canada Intellectual Property Office; Office Action; Application No. 3153861; Feb. 7, 2025; 3 pgs.

(Continued)

*Primary Examiner* — Anthony D Barfield
(74) *Attorney, Agent, or Firm* — Katz Ruby & Carle LLP; Bruce E. Stuckman; Katherine C. Stuckman

(57) ABSTRACT

A furnishing unit includes at least one surface configured support weight of a user of the furnishing unit, an identifier conveyance unit configured to convey furnishing unit identifier data of the furnishing unit; and a furnishing processing system. The furnishing processing system is operable to receive experience selection data generated by a client device associated with the user based on user input by the user to an interactive user interface, where the client device generates the experience selection data based on determining the furnishing unit identifier data for the furnishing unit via an identifier input element when in proximity to the furnishing unit. The furnishing processing system is further operable to configure output of at least one experience facilitation element of a set of experience facilitation elements associated with the furnishing unit based on the experience selection data.

20 Claims, 68 Drawing Sheets

Related U.S. Application Data continuation-in-part of application No. 17/457,098, filed on Dec. 1, 2021, now Pat. No. 11,889,929.

(60) Provisional application No. 63/168,695, filed on Mar. 31, 2021, provisional application No. 63/120,906, filed on Dec. 3, 2020.

(51) Int. Cl.

| | |
|---|---|
| ***A47C 7/72*** | (2006.01) |
| ***A47C 7/74*** | (2006.01) |
| ***G06T 19/00*** | (2011.01) |
| ***G06V 10/60*** | (2022.01) |
| ***G06V 10/62*** | (2022.01) |
| ***G06V 10/74*** | (2022.01) |
| ***G06V 20/00*** | (2022.01) |

(52) U.S. Cl.

CPC .............. *A47C 7/727* (2018.08); *A47C 7/744* (2013.01); *A47C 7/748* (2013.01); *G06T 19/006* (2013.01); *G06V 10/60* (2022.01); *G06V 10/62* (2022.01); *G06V 10/761* (2022.01); *G06V 20/38* (2022.01)

(56) References Cited

U.S. PATENT DOCUMENTS

| | | | | |
|---|---|---|---|---|
| 10,463,148 | B2 | 11/2019 | Gober | |
| 11,363,890 | B2 | 6/2022 | Gober | |
| 2006/0254172 | A1 | 11/2006 | Arnold | |
| 2007/0267399 | A1 | 11/2007 | Flores | |
| 2008/0142494 | A1 | 6/2008 | Blake et al. | |
| 2013/0213950 | A1 | 8/2013 | Bulgajewski | |
| 2018/0271287 | A1 | 9/2018 | Jacobs | |
| 2019/0111813 | A1 | 4/2019 | Hoshi et al. | |
| 2019/0325498 | A1 | 10/2019 | Clark | |
| 2020/0214456 | A1 * | 7/2020 | Jacobs | A47C 31/008 |
| 2022/0400871 | A1 * | 12/2022 | Lee | A47C 31/008 |
| 2023/0080374 | A1 | 3/2023 | Gober | |

OTHER PUBLICATIONS

Canada Intellectual Property Office; Office Action; Application No. 3153861; May 10, 2023; 3 pgs.

Canada Intellectual Property Office; Office Action; CA Application No. 3,141,037; Mar. 1, 2023; 6 pgs.

Canada Intellectual Property Office; Office Action; CA Application No. 3,141,037; Jan. 8, 2024; 5 pgs.

* cited by examiner furnishing experience system 100 furnishing experience system 100 furnishing experience system 100

CLIENT DEVICE FOR FACILITATING EXPERIENCES BASED ON PROXIMITY-BASED INTERACTIONS WITH FURNISHING UNITS

CROSS-REFERENCE TO RELATED APPLICATIONS

The present U.S. Utility patent application claims priority pursuant to 35 U.S.C. § 121 as a divisional of U.S. Utility application Ser. No. 17/656,111, entitled "CONTROLLING ELEMENTS OF FURNISHING UNITS", filed Mar. 23, 2022, which is a continuation-in-part of U.S. Utility application Ser. No. 17/457,098, entitled "HEATING-CAPABLE FURNISHING UNIT", filed Dec. 1, 2021, issued as U.S. Pat. No. 11,889,929 on Feb. 6, 2024, which claims priority pursuant to 35 U.S.C. § 119(e) to U.S. Provisional Application No. 63/120,906, entitled "HEAT-CAPABLE FURNITURE", filed Dec. 3, 2020, each of which are hereby incorporated herein by reference in their entirety and made part of the present U.S. Utility Patent Application for all purposes.

U.S. Utility application Ser. No. 17/656,111 also claims priority pursuant to 35 U.S.C. § 119(e) to U.S. Provisional Application No. 63/168,695, entitled "FACILITATING EXPERIENCES BASED ON PROXIMITY-BASED INTERACTIONS WITH FURNISHING UNITS", filed Mar. 31, 2021, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to furniture, such as chairs, tables, or other furnishings configured for indoor and/or outdoor use. This invention also relates generally to computer systems and computer networking.

BRIEF DESCRIPTION OF THE SEVERAL VIEWS OF THE DRAWING(S)

DETAILED DESCRIPTION OF THE INVENTION

Figure 1A:
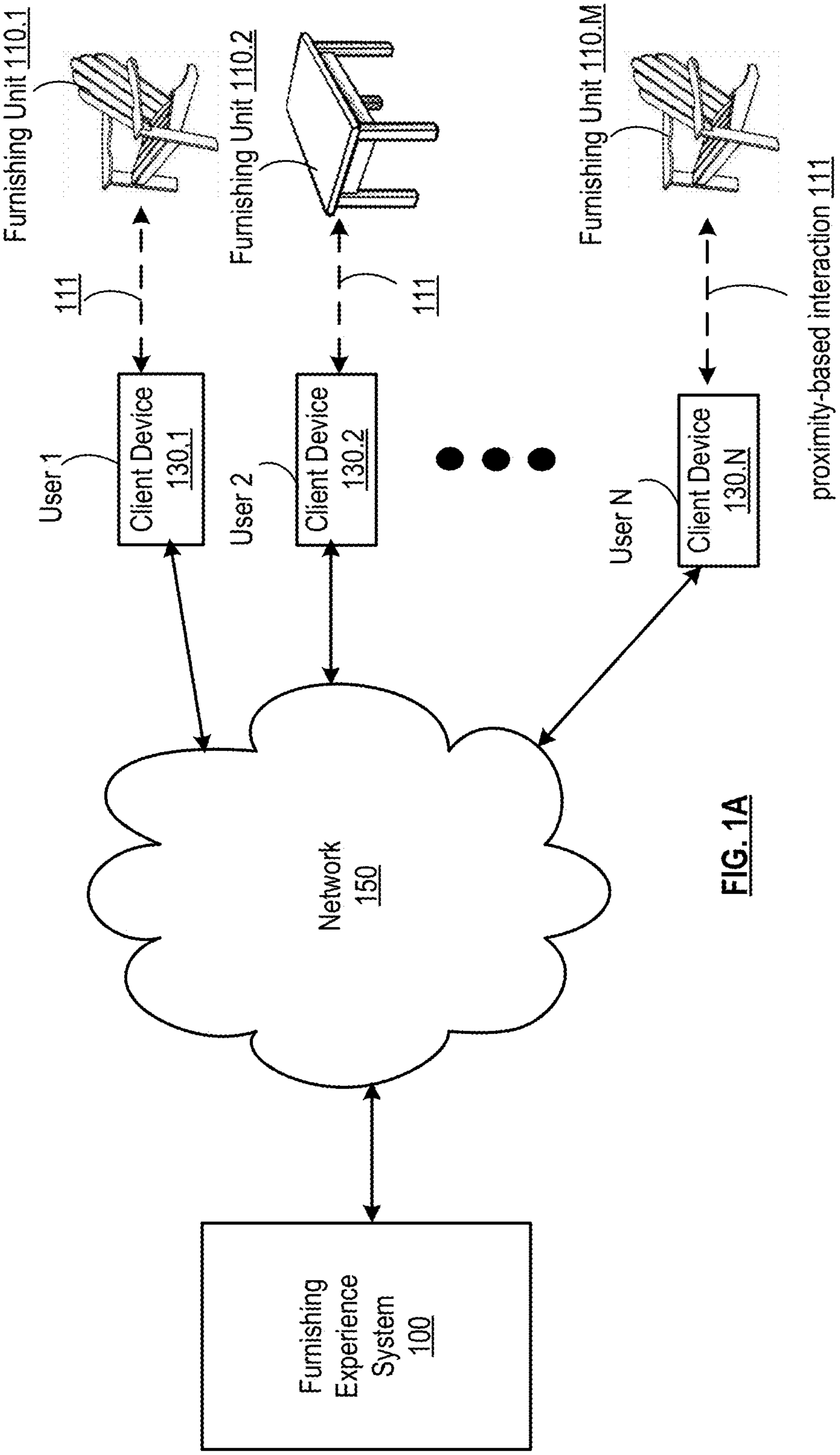
FIG. 1A is a schematic block diagram of an embodiment of a furnishing experience system 100, a plurality of client devices, and a plurality of furnishing units in accordance with various examples.

FIG. 1A is a schematic block diagram of an embodiment of a furnishing experience system 100 that communicates bidirectionally with one or more client devices 130 via a network 150. The network 150 can be implemented via: one or more wireless and/or wired communication systems; one or more non-public intranet systems and/or public internet systems; one or more satellite communication systems; one or more cellular communication systems; one or more fiber optic communication systems; one or more local area networks (LAN); one or more wide area networks (WAN); the Internet; and/or one or more other communication networks. In some embodiments, network 150 corresponds to a local communication network of a given physical location, such as a local network of an establishment such as a restaurant, bar, hotel, or other type of establishment discussed herein.

Some or all communications between client devices 130 and furnishing experience system 100 via network 150 can be based on the client devices 130 and/or the corresponding users engaging in a proximity-based physical interaction 111 with at least one furnishing unit 110 of a plurality of furnishing units 110.1-110.M. For example, a user engages in a proximity-based physical interaction 111 with of a furnishing unit 110 based on: sitting upon the furnishing unit 110, touching the furnishing unit 110, using the furnishing unit 110, configuring settings of the furnishing unit 110, establishing short range communications with the furnishing unit 110, observing the furnishing unit and/or being within visual range of the furnishing unit 110, being within predefined and/or reasonable proximal physical range, such as a range within one meter, ten meters, and/or one-hundred meters, and/or otherwise interacting with the furnishing unit.

As used herein, a furnishing unit 110 can include a functional and/or decorative unit that is utilized in an indoor and/or outdoor environment, such as at a user's home, a commercial establishment, a park or recreational area, or other location. Furnishing units 110 can be permanently installed in a particular location, can be located in a predetermined location within a predefined physical boundary, and/or can move around within predefined physical boundary. The predefined physical boundary can correspond to the physical boundary of a home, commercial establishment, a park or recreational area, or any other location corresponding to an entity that owns and/or utilizes the furnishing unit. A furnishing unit 110 can be owned and/or rented by a user interacting with the furnishing unit. A furnishing unit 110 can be owned and/or rented by another entity, such as an entity that owns an establishment such as a restaurant, bar, winery, hotel, theater, mall, park, museum, and/or other establishment that a user interacting with the furnishing unit is currently visiting and/or located within.

As used herein, one or more furnishing units 110 can correspond to: an article of furniture implemented as seating units for seating and/or laying upon by at least one body part such as a chair, couch, stool, bench, recliner, bed, mattress, bassinette, baby crib, high chair, stroller, car seat, pet bed, toilet, bathtub, and/or any other furniture providing means of sitting and/or laying down by the user, another person, an infant or child cared for by the user, and/or an animal such as a pet of the user; an article of furniture such as a table, bar-top, and/or other furniture providing a surface for dining, placing plates and/or glassware, and/or gathering; one or more furnishings providing lighting such as a lamp and/or light fixture; one or more furnishings providing heating such as an outdoor heating lamp, one or more furnishings providing music and/or other audio such as speakers; one or more furnishings providing decorative storage such as shelving units; window furnishings such as blinds and/or curtains; outdoor furnishings such as patio furniture, landscaping elements, rock features, floral features, plant features, outdoor sculptures and/or art, and/or water features; pools, hot tubs, and/or elements within a pool and/or hot tub, such as benches, rocks, pool sides, a pool bottom, and/or other elements of a pool that are optionally submerged when the pool and/or hot tub is filled with water and optionally operable to heat occupants within the pool and/or hot tub; vehicles such as cars, boats, planes, other road vehicles, other water vehicles, and/or other aerial vehicles; structural elements such as walls, floors, ceilings, pillars, beams, bricks, tiles, stair steps, and/or stones; decorative furnishings such as decorative rugs, pillows, wall art, plants, frames, and/or clocks; dishes, cutlery, glassware, napkins, centerpieces, vases, and/or other units included in one or more table settings and/or upon a bar, table, shelving or counter surface; articles of clothing, bags, accessories, and/or jewelry worn and/or accessorized by other people; pet accessories such as leashes, collars, dog bowls, cages, pet beds, pet toys; baby accessories; entertainment units such as televisions, speakers, computers, monitors, television and/or monitor mounts, and/or gaming systems; appliances such as fridges, ovens, ranges, sinks, toilets, air conditioning units, and/or heating units; configurable elements upon furnishings such as decorative handles, knobs, hooks, and/or faucets; and/or any other articles of furniture, decorative units, functional units, accessories, infrastructure elements, and/or other types of products of a building interior, outdoor patio, and/or any other indoor and/or outdoor space.

The furnishing experience system 100 can facilitate various furnishing experiences to a plurality of users 1-N of the furnishing experience system 100 via communication with some or all of a plurality of corresponding client devices 130.1-130.N. In the examples discussed herein, each user can correspond to any person with a corresponding client device 130 that currently or previously communicated with furnishing experience system 100. As used herein, a user of the furnishing experience system 100 can correspond to any person that requests and/or engages in one or more furnishing experiences provided by the furnishing experience system 100 via interaction with their client device 130, based on their proximity-based interaction 111 with at least one furnishing unit 110 and/or corresponding furnishing unit identification data identifying the at least one furnishing unit 110.

One or more types of furnishing experiences can include at least one furnishing unit configuration experience of the furnishing unit and/or at least one other furnishing units in the proximity. For example, the furnishing experience includes user configuration and/or control of lighting, heating, music, audio volume, display settings, entertainment content, and/or other output of the one furnishing unit itself and/or of a nearby and/or grouped furnishing units identified based on the furnishing unit identification data.

One or more types of furnishing experiences can include at least one shopping and/or purchasing experience. For example, the furnishing experience include facilitating purchase the same product as the furnishing unit, a same product of another furnishing unit in vicinity of the furnishing unit, another product similar to the product of furnishing unit, another product similar to recommended based on the furnishing unit and/or based on learned user characteristics of the user, and/or other products. Purchased products by the user can be shipped to the user's home and/or can be physically delivered to user while at and/or in proximity to the furnishing unit based on the furnishing unit identification data indicating a location of the furnishing unit.

One or more types of furnishing experiences can include at least one service experience at the furnishing unit. For example, the user can order food, drinks, and/or other services and/or goods for delivery to the user's furnishing unit by personnel of a corresponding establishment, based on the furnishing unit identification data indicating a location of the furnishing unit.

One or more types of furnishing experiences can include at least one social experience. For example, the user is connected with other users in the same establishment and/or nearby establishments that are similar to the user and/or in proximity to the user, based on the furnishing unit identification data indicating a location of the furnishing unit and/or based on learned user characteristics of the user.

One or more types of furnishing experience can include at least one augmented reality (AR) experience, at least one virtual reality (VR) experience, and/or at least one mixed reality experience via a combination of AR and VR. For example, a user can receive an augmented reality experience via their client device, AR goggles, and/or specialty AR device while sitting in and/or being in proximity of the furnishing device. The augmented content can be based on characteristics of the user, characteristics of the furnishing device with which the user interacts, and/or characteristics of the establishment in which the furnishing unit is located.

Some or all furnishing experiences are facilitated while a corresponding user has a proximity-based interaction 111 with a corresponding furnishing unit, where a furnishing experience described herein ends when and/or before the proximity-based interaction 111 ends. Alternatively or in addition, some or all furnishing experiences are facilitated even if a corresponding user is not currently engaged in a proximity-based interaction 111 with a corresponding furnishing unit, where any furnishing experience described herein can instead be facilitated remotely, for example, after a user previously engaged in a proximity-based interaction 111 with the corresponding furnishing unit.

Some or all of these furnishing experiences improve the technology of furniture by enhancing the hardware and/or software technology embedded within the furniture and expanding upon the capabilities a piece of furniture can provide to users using and/or in proximity to the furniture. Some or all of these furnishing experiences improve the technology of point of sale computing systems by enhancing the data collected regarding location, length of stay, and/or good or service purchases of users within a corresponding establishment over time to gain insights with regards to atmosphere, ratings, and/or other characteristics of the establishment. Some or all of these furnishing experiences improve the technology of social network computing systems by introducing proximity-based connections that can be automatically determined based on proximity-based interactions with furnishings in a given establishment or across multiple establishments.

Figure 1B:
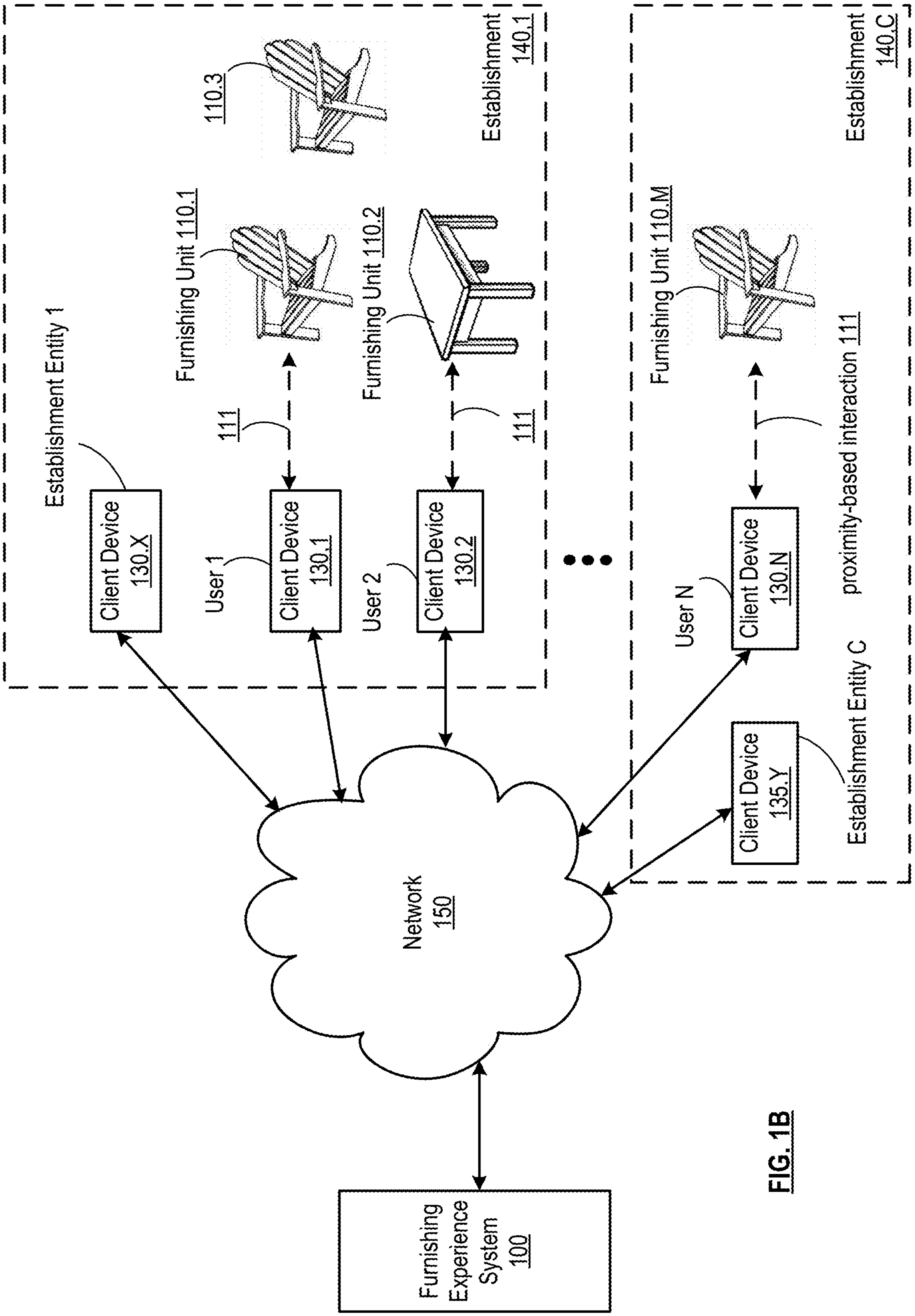
FIG. 1B is a schematic block diagram of an embodiment of a plurality of client devices and a plurality of furnishing units located in a plurality of establishments in accordance with various examples.

As illustrated in FIG. 1B, the furnishing experience system 100 can communicate bidirectionally with one or more client devices 135 of establishment entities corresponding to establishments 140. As illustrated, a plurality of establishments 140.1-140.C can each contain and/or be furnished with their own set of furnishing units 110, for example, that are within a physical boundary corresponding to indoor and/or outdoor space of the establishment. An establishment 140 can correspond to a restaurant, bar, winery, brewery, distillery, hotel, resort, theater, mall, park, pool, museum, zoo, entertainment venue, academic institution, daycare, store, retail establishment, home, apartment, dock, patio, garden, residential property, commercial property, boat, plane, train, commercial vehicle, commuter vehicle, personal vehicle, and/or other location that contains at least one furnishing unit 110 and/or other location that users own, rent, and/or visit to interact with one or more furnishing units 110.

One or more client devices 130 can correspond to one or more users corresponding to these establishments 140. For example, owners and/or employees of the establishment can have client devices 130 that communicate with furnishing experience system 100 to enable configuration of the furnishing experiences within the establishment and/or establish contextual data, such a layout of the establishment indicating locations of furnishing units 110 within the establishment and/or types of furnishing units 110 included in the establishment. For example, these client devices execute different application data and/or execute application data in accordance with different permissions to enhance control and/or configuration of furnishing units 110 of the establishment. The owners, employees, or other establishment entities using these client devices optionally be considered additional users of the furnishing experience system 100 as described herein.

Alternatively, a given furnishing experience system 100 can correspond to exactly one establishment and/or a subset of establishments, such as multiple establishments in a same physical region, in a same franchise, and/or owned by a same entity. For example, a plurality of furnishing experience system 100 can be implemented, where each furnishing experience system 100 manages and/or facilitates furnishing experiences for its own set of furnishing units within the corresponding one or more establishments. As a particular example, a furnishing experience system 100 is implemented as and/or in conjunction with a local system of the corresponding establishment, such as a point of sale (POS) system of the establishment, a seating reservation system of the establishment, an admission system for entry into the establishment, or other computing and/or server system utilized to facilitate operations of the establishment. In some embodiments, user accounts can be shared across a plurality of individual furnishing experience systems 100. In some embodiments, a global furnishing experience system 100 can manage and/or communicate with a plurality of individual furnishing experience systems 100 at individual establishment, for example, to share database information and/or generate aggregate analytical data for furnishing experiences provided across all establishments.

Figure 1C:
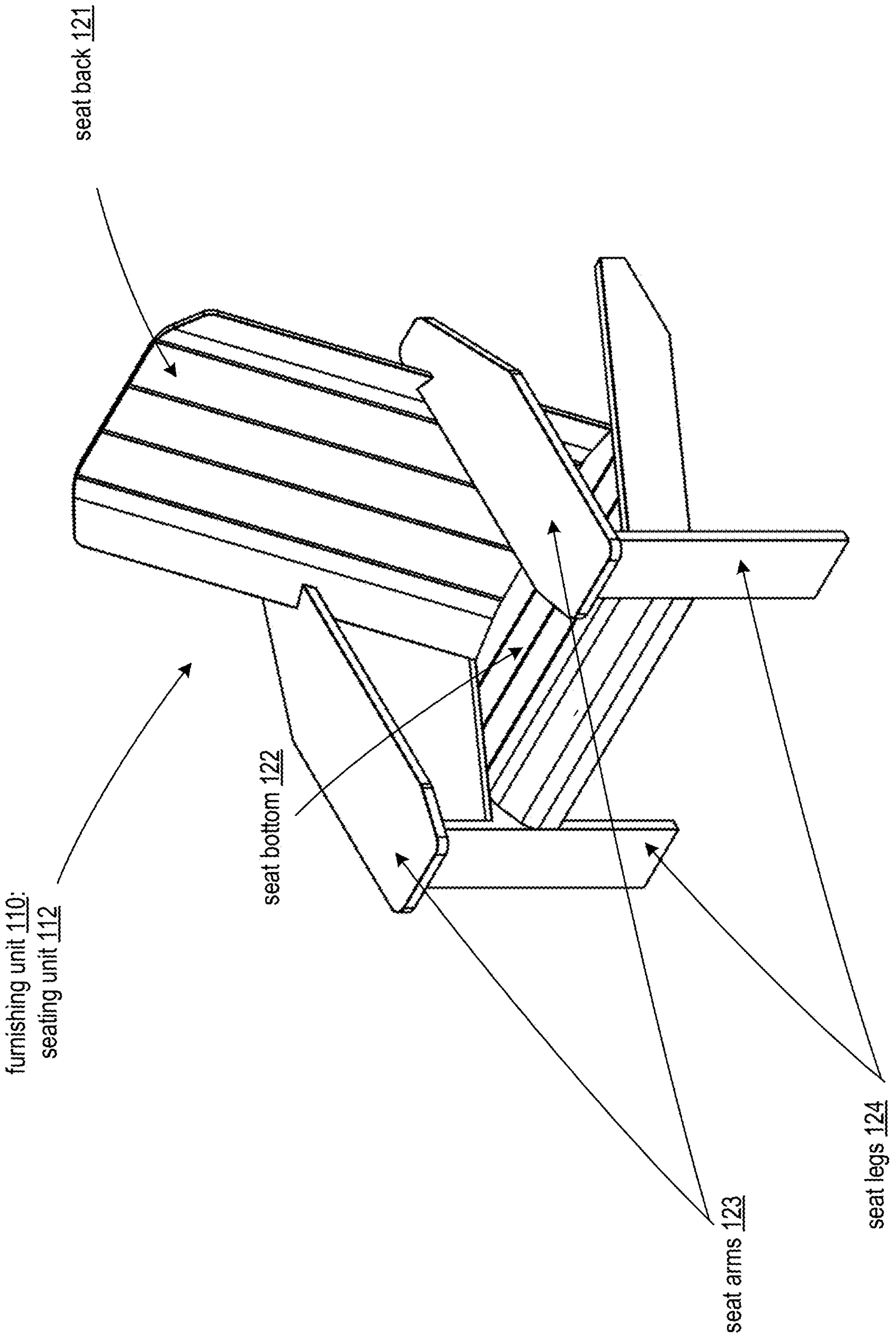
FIG. 1C illustrates an example embodiment of a furnishing unit implemented as a seating unit in accordance with various examples.

FIG. 1C illustrates an example embodiment of a furnishing unit 110 implemented as a seating unit 112 configured to be seated upon by a user of the furnishing unit 110. Some or all features and/or functionality of the furnishing unit 110 of FIG. 1C can be utilized to implement one or more furnishing units of FIG. 1A and/or any embodiment of furnishing unit 110 described herein.

As illustrated in FIG. 1C, a furnishing unit 110 implemented as a seating unit 112 can include a seat back 121; a seat bottom 122; two, or a different number, of seat arms 123; and/or two, or a different number, of seat legs 124. In particular, the seating unit 112 can be configured for one or more users to sit upon the seat bottom 122, with the back of the user optionally against the seat back 121 and/or the arms of the user optionally upon the seat arms 123. The seat bottom 122 and/or seat back 121 can be configured to support the weight of one or more people at a given time, such as users when sitting in the seating unit. The seat bottom 122 and/or seat back 121 can each be implemented via one or more flat and/or curved surfaces. The seat legs 124 can be configured to support the seat bottom 122 and/or seat back 124 when the seating unit is placed upon a planar surface such as the ground or floor.

Some or all furnishing units 110 discussed herein can be implemented via some or all features and/or functionality of the furnishing unit and/or seating unit described in U.S. patent application Ser. No. 17/457,098, entitled "HEATING-CAPABLE FURNISHING UNIT", filed Dec. 1, 2021, which is incorporated herein by reference its entirety and made part of the present U.S. Utility Patent Application for all purposes.

Some or all proximity-based interactions 111 and/or furnishing experiences described herein can be configured to be implemented for a given furnishing unit 110 while a corresponding user is seated in the given furnishing unit 110, for example, upon its seat bottom 122. Some or all proximity-based interactions 111 and/or furnishing experiences described herein can be configured to be implemented for a given furnishing unit 110 while and/or based on the corresponding user further holding, wearing, and/or carrying their corresponding client device 130, such as their personal smart phone, tablet, smart watch, wearable device, mobile device, or other client device 130, while seated in the given furnishing unit 110.

Figure 2A:
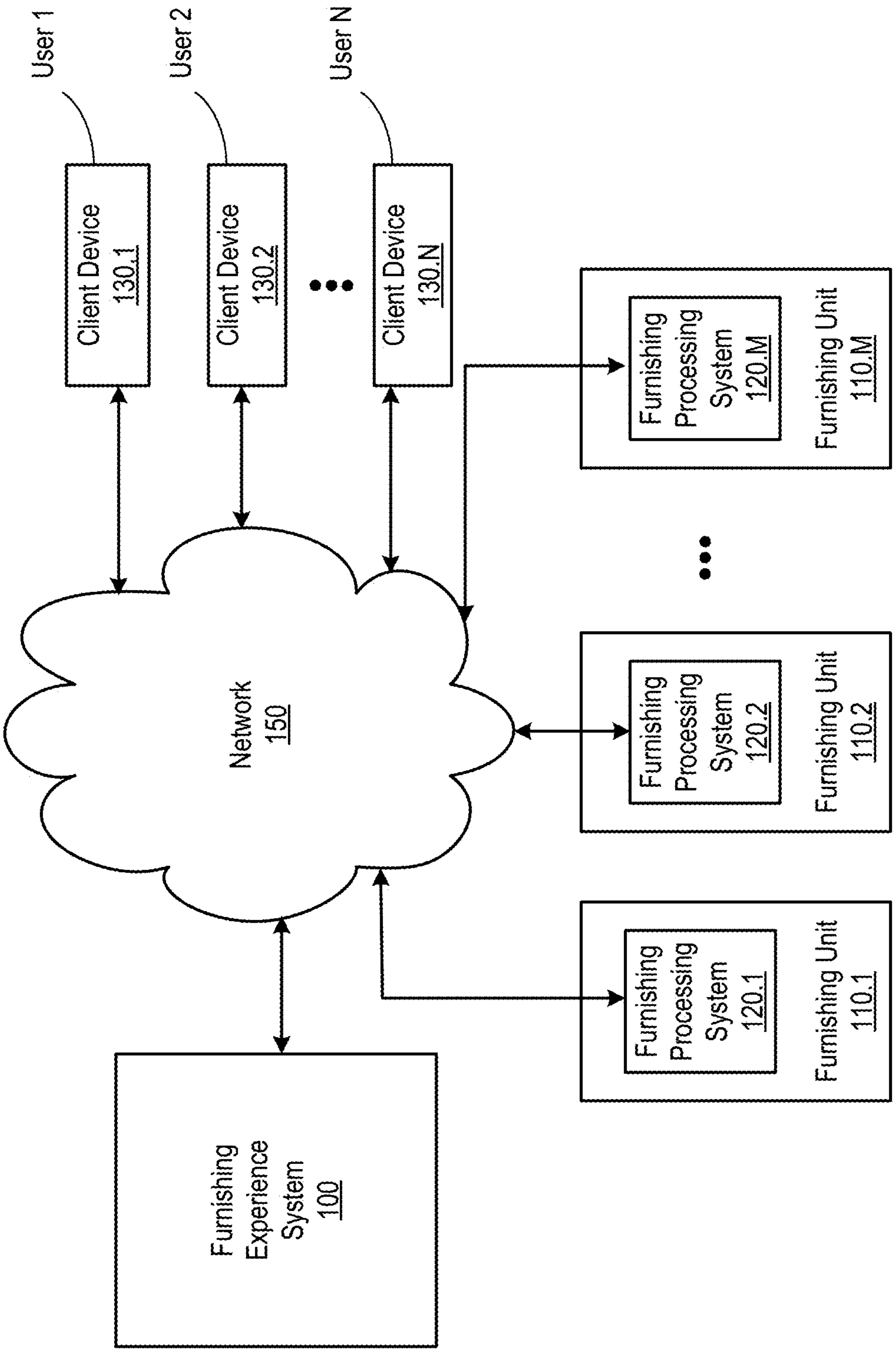
FIG. 2A is a schematic block diagram of a plurality of furnishing processing systems of a plurality of furnishing units in accordance with various examples.

As illustrated in FIG. 2A, one or more furnishing units 110 can implement their own furnishing processing system 120 that sends and/or receives communications via network 150 from furnishing experience system and/or directly from client devices 130 and/or client devices 135. The furnishing processing system 120 can be implemented within, can be attached to, and/or can be in physical proximity of a corresponding furnishing unit 110. A given furnishing processing system 120 can correspond to a single corresponding furnishing unit 110 and/or multiple corresponding furnishing units 110. A given furnishing unit 110 can correspond to exactly one furnishing processing system 120, or to no furnishing processing systems 120.

For example, the furnishing experience system 100 and/or a client device 130 sends control data to a furnishing processing system via network 150 to control output elements of the corresponding furnishing unit 110. As another example, the furnishing processing system collects and/or sends status data to the furnishing experience system 100 and/or one or more client devices 130 via network 150. In some embodiments, some or all furnishing units 110 discussed herein are configured to communicate via network 150. In some embodiments, some or all furnishing units 110 discussed herein are not configured to communicate via network 150.

Figure 2B:
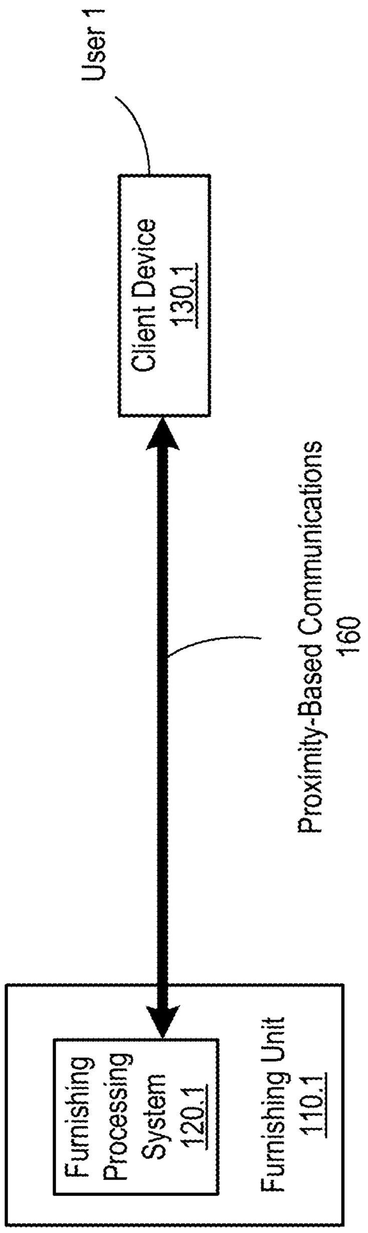
FIG. 2B is a schematic block diagram illustrating proximity-based communications between a furnishing processing system and a client device in accordance with various examples.
Figure 2C:
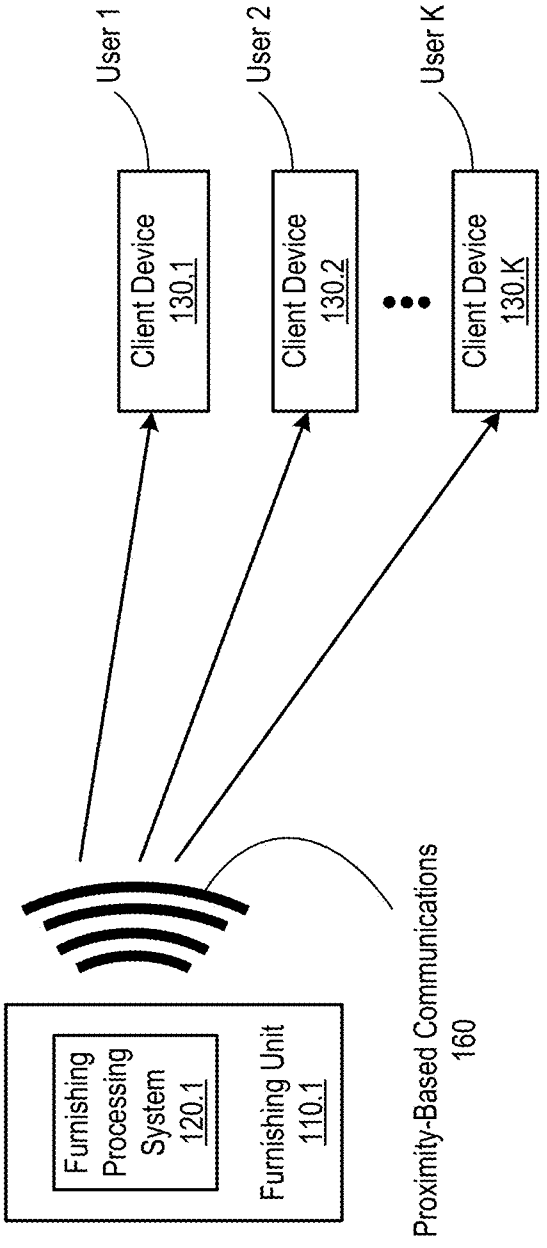
FIG. 2C is a schematic block diagram illustrating proximity-based communications between a furnishing processing system and a plurality of client devices in accordance with various examples.

As illustrated in FIGS. 2B and 2C, furnishing unit 110 and/or client device 130 can be operable to send and/or receive proximity-based communications 160. These proximity-based communications 160 can implement some or all of the proximity-based interaction 111 with a given furnishing unit 110 as discussed in conjunction with of FIG. 1.

In particular, client device 130 can receive communications from and/or send communications to a furnishing unit based on being in physical proximity with the furnishing unit, such as within a predefined physical range that is dictated by a physical range of the proximity-based communications. For example, a communications link for proximity-based communications 160 is implemented via a short range wireless communication protocol and/or contactless communication protocol such as ultra-wideband (UWB), Wi-Fi, ZigBee, Bluetooth, Near-Field Communication (NFC), Radio Frequency Identification (RFID) and/or Infrared (IR).

As illustrated in FIG. 2B, the proximity-based communications can be implemented as a wired and/or wireless communication link established via a communications link, such as a one-to-one connection between furnishing unit 110 and client device 130. In some embodiments, only one user can be linked with a given furnishing unit 110 at a time, where a furnishing unit 110 is configured to establish and/or communicate via proximity-based communications with exactly one client device 130 in a given time frame, for example, to ensure that exactly one user can use, reserve, be assigned to, control, and/or receive experiences related to the given furnishing unit. For example, a new user can only link with furnishing unit 110 via their client device if a prior user's client device ended their proximity-based communications, if these proximity-based communications timed-out, and/or if the prior user is not detected to be in range.

As illustrated in FIG. 2C the proximity-based communications 160 can be broadcast by a furnishing unit 110 for receipt and/or processing by any client devices 130, such as the set of multiple client devices 130.1-130.K of FIG. 1D, that are in range of furnishing unit 110 and/or have receiver's operable to receive and/or process the proximity-based communications 160.

Proximity-based communications 160 sent from a furnishing unit 110 to one or more client devices can include furnishing unit identifier data uniquely identifying the furnishing unit, product identifier data identifying a product line corresponding to the furnishing unit, status data of the furnishing unit 110 such as an indication of whether or not the furnishing unit 110 is available for use, and/or experience data corresponding to a furnishing experience facilitated by the furnishing unit 110 directly. Alternatively or in addition, some or all of these communications can be sent from a furnishing unit 110 to the furnishing experience system 100, where the furnishing experience system 100 sends this information to the corresponding client device 130, for example, where the furnishing unit is not operable to send its own proximity-based communications 160 to client devices 130.

Proximity-based communications 160 sent from a client device 130 to a furnishing unit 160 can include control data to control one or more output devices of the furnishing unit, can include identification data identifying the client device, can include a request to claim and/or reserve the furnishing unit for use by the corresponding user, can include requests and/or configuration for one or more furnishing experiences to be facilitated by the furnishing unit 110, and/or can include other instructions and/or information. Alternatively or in addition, some or all of these communications can be sent from a client device 130 to the furnishing experience system 100, where the furnishing experience system 100 sends this information to the corresponding furnishing unit 110, for example, where the furnishing unit is not operable to receive proximity-based communications 160 from client devices 130.

In some embodiments, some or all furnishing units 110 discussed herein are configured to communicate via proximity-based communications 160 instead of or in addition to communication via network 150. In some embodiments, some or all furnishing units 110 discussed herein are not configured to communicate via network 150 and/or are not configured to communicate via proximity-based communications 160. For example, some furnishing units 110 can be pieces of furniture, accessories, merchandise, or other units that do not implement furnishing processing system 120.

Figure 3A:
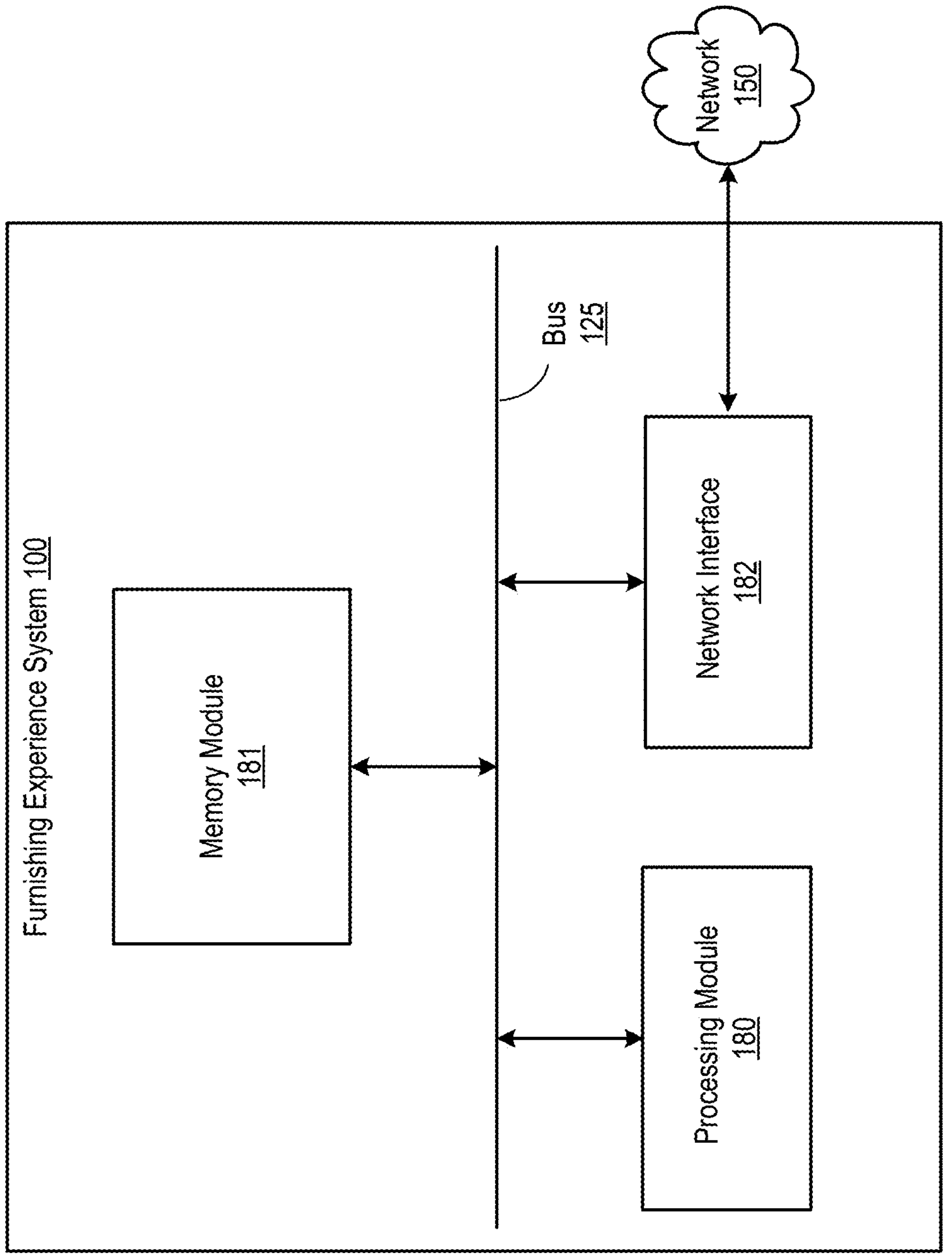
FIG. 3A is schematic block diagram illustrating a furnishing experience system in accordance with various examples.

FIG. 3A illustrates an embodiment of a furnishing experience system 100. Some or all features and/or functionality of the furnishing experience system 100 of FIG. 3A can be utilized to implement some or all other embodiments of furnishing experience system 100 described herein.

A furnishing experience system 100 can be implemented via one or more processing modules 180, one or more memory module 181, and/or one or more network interfaces 182, communicating via a bus 125. The one or more network interfaces 182 can be operable to send and/or receive data via the network 150 and/or via any other communication system. Bus 125 can facilitate communication of data between the one or more processing modules 180, one or more memory modules 181, and/or one or more network interfaces 182 via one or more wired and/or wireless communication resources.

The memory module 181 can include memory that stores operational instructions that, when executed by the one or more processing modules 180, cause the furnishing experience system 100 to execute some or all of the functionality described herein.

As another example, the operational instructions, when executed by the one or more processing modules 180, can cause the furnishing experience system 100 to utilize network interface 182 to receive data from one or more client devices 130 and/or one or more furnishing processing systems 120. via network 150. For example, this data can include experience selection data received from one or more client devices 130 and/or status data received from one or more furnishing processing systems 120.

As another example, the operational instructions, when executed by the one or more processing modules 180, can cause the one or more processing modules 180 to generate data. For example, this data is generated based on: receiving and processing other data, such experience selection data generated and/or sent by one or more client devices 130 and/or status data generated and/or sent by one or more furnishing units 110; retrieving and processing other data, such as data of one or more databases accessed in one or more memory modules 181; performing one or more functions on other data, for example, based on corresponding function entries of a function library; and/or one or more other mechanisms.

As another example, the operational instructions, when executed by the one or more processing modules 180, can further cause the one or more processing modules 180 to store data in one or more memory modules 181. For example, data can be stored as data of a user database, furnishing database, establishment database, and/or function database. This data can be obtained prior to storage in the one or more memory modules 181 based on being: generated by the one or more processing modules 180; stored in and retrieved from one or more memory modules 181; configured via user input by an administrator; received via network 150; and/or otherwise being determined.

As another example, the operational instructions, when executed by the one or more processing modules 180, can cause the furnishing experience system 100 to utilize network interface 182 to send data to one or more client devices 130, and/or furnishing processing systems 120 via network 150. This data can include information, instructions, and/or prompts for display via an interactive user interface of the client device. This data can include control data to control a furnishing unit 110. This data can include data utilized to facilitate a furnishing experience based on display and/or execution by a client device 130 and/or furnishing unit 110. This data can alternatively or additionally include application data for storage and/or execution by client devices 130. This data can be obtained prior to transmission to the one or more client devices 130 based on being: generated by the one or more processing modules 180; stored in and retrieved from one or more memory modules 181; configured via user input by an administrator; received via network 150; and/or otherwise being determined.

Figure 3B:
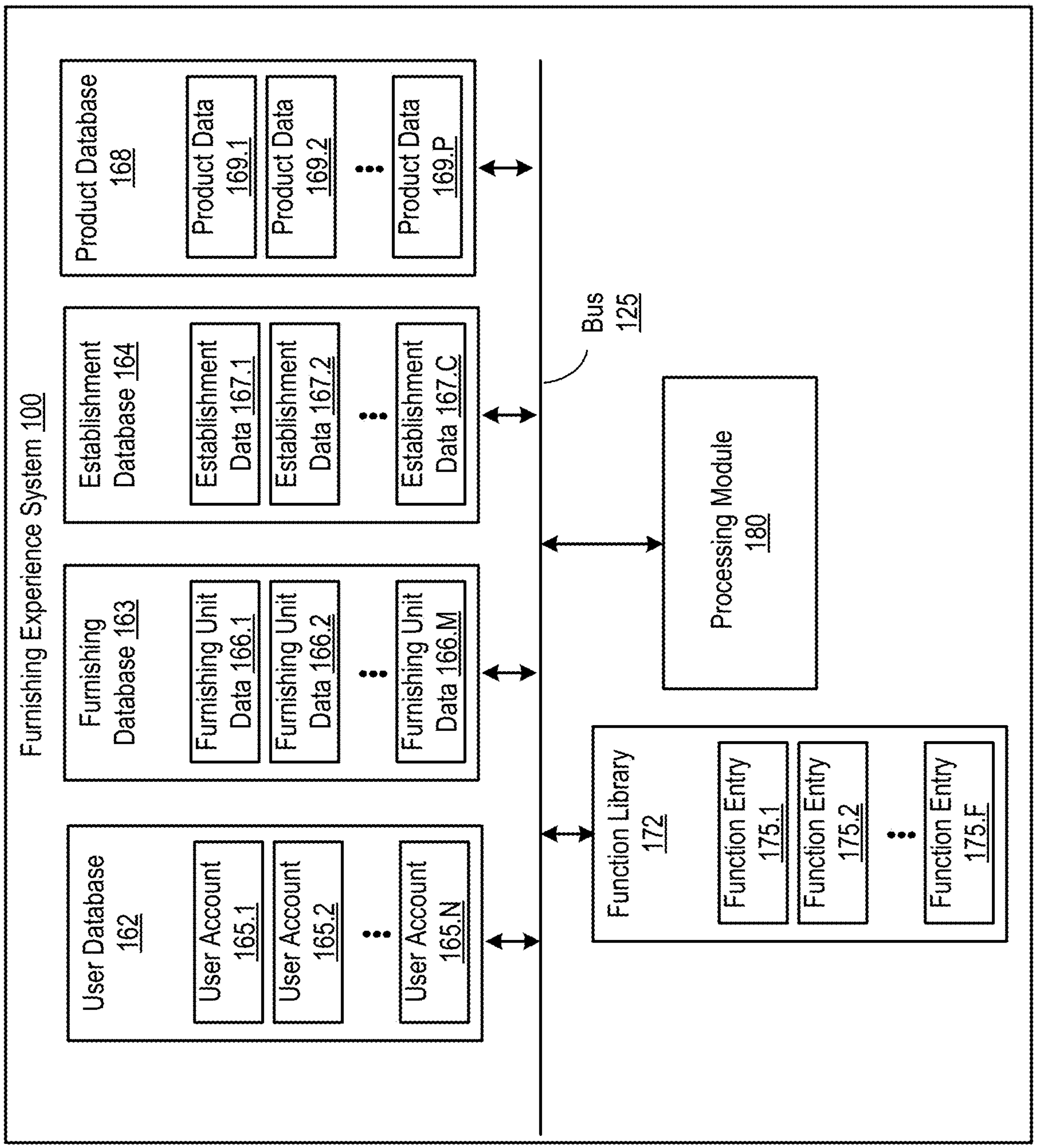
FIG. 3B is schematic block diagram illustrating a furnishing experience system that includes one or more databases in accordance with various examples.

FIG. 3B illustrates an embodiment of a furnishing experience system 100. Some or all features and/or functionality of the furnishing experience system 100 of FIG. 3B can be utilized to implement some or all other embodiments of furnishing experience system 100 described herein.

As illustrated in FIG. 3B, the furnishing experience system 100 can include and/or can communicate with: one or more user databases 162; one or more furnishing databases 163, one or more product databases 168, and/or one or more establishment databases 164. For example, these databases are stored utilizing memory module 181. Bus 125 can facilitate communication of data between the one or more user databases 162; one or more furnishing databases 163, and/or one or more establishment databases 164 with processing module 180, enabling processing module 180 to read from and/or write to these databases over time.

The user database 162 can store a plurality of user accounts 165. Each user account 165 can correspond to one of the plurality of users 1-N of the furnishing experience system 100. The user database 162 can be implemented as one or more relational and/or non-relational databases, and/or can be implemented via any one or more memory devices accessible by the furnishing experience system 100 that is operable to store and/or access the plurality of user accounts 165. Some or all user accounts 165 of the user database 162 can be generated by the furnishing experience system 100 based on data received from one or more client devices 130 and/or based on data received from one or more furnishing processing systems 120.

The furnishing database 163 can store a plurality of furnishing unit data 166. Each furnishing unit data 166 can correspond to one of a plurality of furnishing units 110.1-110.M. The furnishing database 163 can be implemented as one or more relational and/or non-relational databases, and/or can be implemented via any one or more memory devices accessible by the furnishing experience system 100 that is operable to store and/or access the plurality of furnishing unit data 166. Some or all furnishing unit data 166 of the furnishing database 163 can be generated by the furnishing experience system 100 based on data received from one or more client devices 130 and/or based on data received from one or more furnishing processing systems 120.

The establishment database 164 can store a plurality of establishment data 167. Each establishment data 167 can correspond to one of a plurality of establishments 110.1-110.M. The establishment database 165 can be implemented as one or more relational and/or non-relational databases, and/or can be implemented via any one or more memory devices accessible by the furnishing experience system 100 that is operable to store and/or access the plurality of establishment data 167. Some or all establishment data 167 of the establishment database 165 can be generated by the furnishing experience system 100 based on data received from one or more client devices 130 and/or based on data received from one or more furnishing processing systems 120.

The function library 172 can include a plurality of function entries 175. The function library 172 can be implemented via any one or more memory devices accessible by the furnishing experience system 100 that is operable to store and/or access the plurality of function entries 175. Some or all function entries 175 of the function library 172 can be: predetermined; configured via user input by an administrator of the furnishing experience system; stored in and retrieved from memory accessible by the furnishing experience system; received by the furnishing experience system; automatically generated, trained, and/or updated by the furnishing experience system; and/or otherwise determined by furnishing experience system. For example, one or more functions can be automatically trained in accordance with at least one artificial intelligence technique and/or at least one machine learning technique. As an example, one or more functions can be executed in accordance with performing at least one artificial intelligence technique and/or at least one machine learning technique.

Each function entry can include information and/or instructions utilized to perform a corresponding function. Some or all functions described herein can be stored in function library 172 and/or can be executed in accordance with the information and/or instructions of a corresponding function entry 175. Some or all functionality of the furnishing experience system 100 described herein is accomplished via execution of one or more functions of function library 172.

A function entry 175 can correspond to a function that can be executed by the furnishing experience system 100 to perform functionality of the furnishing experience system 100. For example, the furnishing experience system 100 performs a given function based on accessing and/or executing information and/or instructions stored in and/or indicated by the corresponding a function entry 175. Alternatively or in addition, the furnishing experience system 100 executes operational instruction stored in memory module 210 that cause the furnishing experience system 100 to execute a given function that corresponds to a function entry 175.

Alternatively or in addition, a function entry 175 can correspond to a function that can be executed by a client device 130. For example, the client device 130 performs a given function based on receiving information and/or instructions stored in and/or indicated by the corresponding a function entry 175, and/or based on storing and/or executing the received function entry 175. Alternatively or in addition, the client device 130 can receive application data from the furnishing experience system 100 via the network 150 that includes information and/or instructions corresponding to one or more function entries 175, and/or the client device can download the application data from an application marketplace assessable via a network based on user interaction with client device 130, where the client device 130 stores this received and/or downloaded application data via its memory resources, and/or where the client device 130 performs one or more corresponding functions based on accessing and/or executing this downloaded application data. Alternatively or in addition, the client device 130 can store information and/or instructions corresponding to one or more function entries 175, for example, as an Applet, a plug-in, and/or as application data native to client device 130, for example, based on being preinstalled upon client device 130 and/or based on being integrated within an operating system of the client device such as an operating system of a corresponding mobile device and/or wearable device, where the client device 130 can perform one or more corresponding functions based on accessing and/or executing this information and/or instructions.

Alternatively or in addition, a function entry 175 can correspond to a function that can be executed by a furnishing processing system 120. For example, the furnishing processing system 120 performs a given function based on receiving information and/or instructions stored in and/or indicated by the corresponding a function entry 175, and/or based on storing and/or executing the received function entry 175. Alternatively or in addition, the furnishing processing system 120 can receive application data from the furnishing experience system 100 via the network 150 that includes information and/or instructions corresponding to one or more function entries 175, the furnishing processing system 120 can store this application data via its memory resources, and/or the furnishing processing system 120 can perform one or more corresponding functions based on accessing and/or executing this application data. Alternatively or in addition, the furnishing processing system 120 can store information and/or instructions corresponding to one or more function entries 175 as instructions native to furnishing processing system 120, for example, hardcoded in hardware and/or software of furnishing processing system 120.

FIGS. 3C-3F illustrate embodiment of information stored in accordance with user accounts 165, furnishing unit data 166, establishment data 167, and product data 169. In some embodiments, some or all information illustrated and/or discussed in conjunction with FIGS. 3C-3F is not stored in these databases, but can be received by, accessed by, processed by, generated by, determined by, and/or communicated between furnishing experience system 100, one or more furnishing processing systems 120, and/or one or more client devices 130. In some embodiments, additional data not discussed in conjunction with FIG. 3C-3F that is received, accessed, processed, generated, generated, and/or determined by the furnishing experience system 100, furnishing processing system 120, and/or a client device 130 as discussed in conjunction with other Figures described herein can optionally be stored in these databases for some or all corresponding users, furnishing units 110, products, and/or establishments, and/or can be later accessed via access to corresponding user accounts 165, furnishing unit data 166, product data 169, and/or establishment data 167, respectively.

Alternatively or in addition to being stored by the furnishing experience system 100 in one of more of these databases of the furnishing experience system 100, any of the information discussed in conjunction with FIGS. 3C-3F can be: otherwise mapped to and/or linked to the corresponding user, furnishing unit 110, establishment 140, and/or product in memory resources accessible by the furnishing experience system 100; automatically generated by the furnishing experience system 100; automatically generated by one or more client devices 130 of the corresponding user; received by the furnishing experience system 100 via network 150, for example, from a client device 130 and/or a furnishing processing system 120; processed by the furnishing experience system 100 to generate other information; utilized as input to one or more functions of function library 172 performed by the furnishing experience system 100, client device 130, and/or furnishing processing system 120; generated as output of one or more functions of function library 172 performed by the furnishing experience system 100, the client device 130, and/or the furnishing experience system; configured by the corresponding user based on user input to a corresponding client device 130; configured by an administrator of the furnishing experience system 100; and/or otherwise received by, accessed by, processed by, generated by, determined by, and/or communicated between the furnishing experience system 100, a client device 130, and/or a furnishing processing system 120.

Alternatively or in addition to being stored by the furnishing experience system 100 in one of more of these databases of the furnishing experience system 100, the user accounts 165, furnishing unit data 166, establishment data 167, and product data 169 of FIGS. 3C-3F can be stored, generated, communicated, and/or determined in accordance with and/or based on a predetermined data format and/or protocol, and/or based on being extracted from data in the predetermined data format and/or protocol. This data format for some or all given user accounts 165, some or all given furnishing unit data 166, some or all given establishment data 167, and/or some or all given product data 169 can include a quick response (QR) code, a barcode, text and/or numeric data, visual data, a record of a relational or non-relational database, HTML data, JSON data, a hyperlink, and/or another data format conveying and/or directing to some or all of the corresponding information of the given user accounts 165, of the given furnishing unit data 166, given establishment data 167, and/or given product data 169.

In cases where multiple furnishing experience systems 100 are implemented at different locations, such as different establishments, different furnishing experience systems 100 can have their own distinct user databases 162; furnishing databases 163, product databases 168, and/or establishment databases 164. For example, a furnishing unit identifier need only distinguish the furnishing unit from other furnishing units at the same one or more establishments for which the given furnishing experience system 100 is implemented, where another furnishing unit identifier for a furnishing unit at another establishment of another furnishing experience system 100 can have the same furnishing unit identifier. Some or all of the information of these distinct databases can be private and/or not shared for different furnishing experience systems 100. Some or all of the information of these distinct databases can be shared across different furnishing experience systems 100.

Figure 3C:
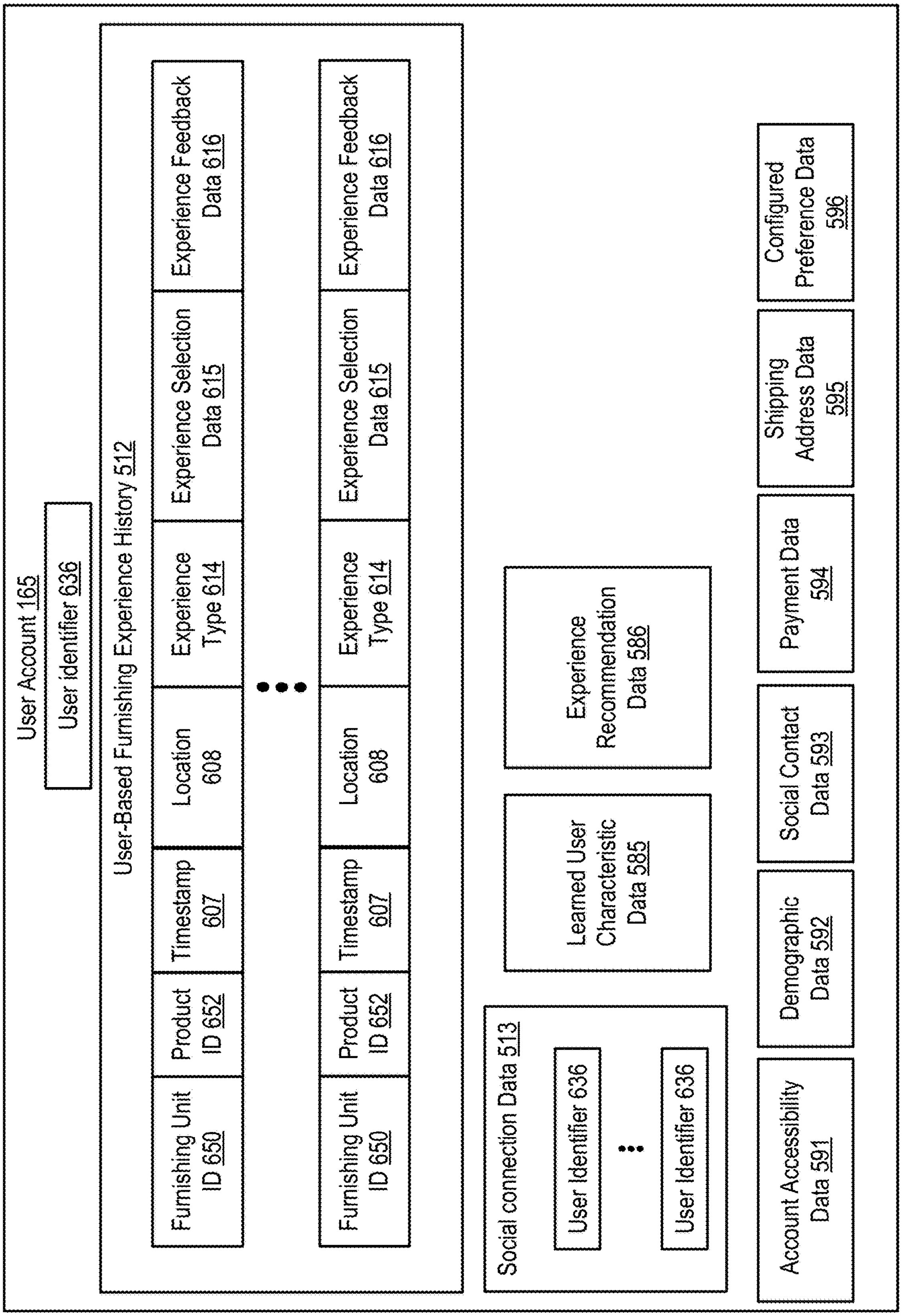
FIG. 3C illustrates various information included in a user account in accordance with various examples.

FIG. 3C illustrates an example embodiment of information of a user account 165. A given user account 165 can be denoted by a corresponding user identifier 636 that uniquely identifies the corresponding user. For example, some or all users of the furnishing experience system 100 can each have exactly one user account 165, where the user account 165 for a given user stores some or all of the corresponding information illustrated FIG. 3C for that given user. The user account 165 can be stored as one or more entries of one or more databases and/or other memory of furnishing experience system 100. Some or all information of user account 165 for a given user can optionally be stored and/or updated locally by the client device 130 of the given user.

A given user account can include user-based furnishing experience history 512, which can indicate some or all of the furnishing experiences facilitated for the user by furnishing experience system 100 and/or can indicate some or all proximity-based interactions between the user and various furnishing units 110, for example, located across different establishments visited by the user over time. Each entry of the user-based furnishing experience history 512 can indicate and/or be mapped to: a furnishing unit identifier 650 identifying the particular furnishing unit 110 with which the user interacted; a product identifier 652 identifying the type of furnishing unit 110 with which the user interacted; a timestamp 607 indicating when the interaction and/or corresponding experience took place; an location 608 identifying where the interaction and/or corresponding experience took place, such as an identifier of a particular establishment 140, a street address, and/or geolocation data, for example, based on geolocation data generated by and/or received from the client device 130 and/or the furnishing processing system 120 when the interaction and/or experience took place; an experience type 614 indicating a type of experience facilitated for the user; experience selection data 615 indicating one or more user selections generated by client device 130 and/or furnishing processing system 120 in accordance with user configuration of the experience facilitated for the user, for example, based on user input in response to one or more prompts displayed via an interactive user interface 275 to provide selections regarding the experience; and/or experience feedback data 616 indicating a rating and/or other feedback supplied by the user, for example, based on user input in response to one or more prompts displayed via an interactive user interface 275 to provide feedback regarding the experience.

A given user account 165 can alternatively or additionally indicate social connection data 513 indicating identifiers for one or more other users with which the user is connected and/or has interacted with via furnishing experience system 100. For example, the social connection data 513 is generated and/or tracked in accordance with types of furnishing experiences that include connecting different users and/or facilitating communication between different users via at least one messaging platform, video platform, social media platform, and/or other communication platform. In some cases, the user-based furnishing experience history can include user identifiers 636 for other users with which the user previously interacted, but did not persist as a social connection, for example, based on the experience feedback data 616 for the connection being unfavorable. In some embodiments, some user identifiers of social connection data 513 can be automatically populated based on a user's list of contacts, such as cellular contacts in their client device 130; a user's set of social connections in one or more social media platforms based on a social media account of the corresponding user; a user's set of messaging connections in one or more email and/or messaging platforms based on a messaging accounts of the corresponding user; or other prior contacts configured by the user and/or determined automatically for the user.

Alternatively or in addition, a user account 165 can indicate account accessibility data 591, such as: a username and/or password associated with the user; other user credentials that are utilized to facilitate login to the user account by the corresponding user and/or to prevent other people from maliciously accessing the given user's user account 165; account recovery information; two step authentication credentials and/or information; and/or other information utilized to facilitate login to and/or access to user account 165. The account accessibility data 591 can be based on: data generated by the furnishing experience system 100 and/or data received from one or more client devices 130 for the corresponding user.

Some or all population of and/or updates to a given user account 165 can be based on receiving data from a client device 130 in conjunction with login to the user account by the user in conjunction with the account accessibility data 591. For example, new experience selection data 615 is added to a particular user account 165 based on a client device 130 sending the experience selection data 615 in conjunction with being logged in to the particular user account 165.

A user that accesses their user account 165 successfully can optionally enter, edit, view and/or view various types of data stored in user account 165. For example, some or all information of user account 165 can be sent to client device 130 for display to the corresponding user via interactive user interface 275. As a particular example, experience option data associated with facilitating an experience is displayed to the user based on the user creating and/or accessing their user account 165. In some embodiments, some data of user account 165 described herein is stored in conjunction with the corresponding user, but is not viewable, changeable, and/or accessible by the corresponding user.

Alternatively or in addition, a user account 165 can indicate demographic data 592, such as the user's age, race, ethnicity, and/or other characteristics and/or other demographic information corresponding to the user.

Alternatively or in addition, a user account 165 can indicate social contact data 593, such as one or more social media handles for the user; one or more phone numbers for the user; one or more email addresses for the user; one or more mailing addresses and/or residential addresses for the user; one or more messaging handles corresponding to one or more messaging platforms; and/or other contact information. The social contact data 593 can be utilized to facilitate interactions between different users as described herein.

Alternatively or in addition, the user account 165 can indicate payment data 594 payment information such as credit card information, payment platform information, or other payment details utilized to facilitate the user's payment for use of experiences facilitated by the furnishing experience system 100 and/or to facilitate user's payment for products purchased by the user in conjunction with furnishing experiences. The payment data 594 can be utilized to facilitate payment of products purchased by the user and/or services corresponding to experiences purchased by the user in conjunction with one or more furnishing experiences.

Alternatively or in addition, the user account 165 can indicate shipping address data 595, which can indicate shipping preferences and/or one or more shipping and/or delivery addresses to which products purchased by the user in conjunction with one or more furnishing experiences be shipped and/or delivered. The shipping address data 595 can be utilized to facilitate shipment of products purchased by the user, in conjunction with one or more furnishing experiences, to the appropriate address for receipt by the user.

Alternatively or in addition, the user account 165 can indicate configured preference data 596, which can be generated based on data received from the client device 130 and can be utilized to: configure features and/or layout of interactive user interface 275; configure alerts and/or notifications sent to the user by the furnishing experience system 100; configure types of experiences recommended by and/or provided by the furnishing experience system 100 for the user; and/or other configurations by the user in conjunction with interacting with their user account and/or undergoing furnishing experiences via furnishing experience system 100. For example, the configured preference data 594 can be based on: data generated by the furnishing experience system 100 and/or data received from one or more client devices 130 for the corresponding user.

Alternatively or in addition, the user account 165 can indicate learned user characteristic data 585, which can include various statistical and/or trend data generated for the user. For example, at least one analytics function and/or model training function of the function library 172 is performed by furnishing experience system 100 to generate statistical and/or trend data for some or all users based on their respective user-based furnishing experience history 512, indicating relative purchasing trends, types of furnishing experiences they prefer and/or frequently undergo, types of establishments they frequently visit and/or prefer, and/or other characteristics.

The demographic data, the learned user characteristic data 585, the user-based furnishing experience history 512, and/or other data determined of some or all users can be utilized to generate experience recommendation data 586 for some or all users. For example, a recommendation function of the function library 172 is performed by furnishing experience system 100 to generate experience recommendation data 586 based on trends in the learned user characteristic data 585 across some or all users. For example various types of items and/or experiences that the users often undergoes, selects and/or enjoys can be learned over time for various user of the furnishing experience system 100 based on respective experiences and/or enjoys in prior furnishing experiences. This can be ideal in helping ensure the user explores new options and/or enjoys future furnishing experiences over time.

The recommendation data can indicate recommendations of furnishing units, establishments, products, and/or furnishing experiences similar to prior furnishing units, establishments, products, and/or furnishing experiences similar indicated in the user's furnishing experience history, such as furnishing units, establishments, products, and/or types of furnishing experiences with favorable similarity scores, generated via performing a similarity function and/or recommendation function, with: these prior furnishing units, establishments, products, and/or furnishing experiences similar indicated in the user's furnishing experience history; learned types of furnishing units, establishments, products, and/or furnishing experiences similar indicated in the user's learned user characteristic data 585; and/or configured types of furnishing units, establishments, products, and/or furnishing experiences similar indicated in the user's configured preference data 596.

This experience recommendation data 586 can be displayed to a respective user via interactive user interface 275, for example, to prompt and/or guide users to undergo the recommended experiences of experience recommendation data 586. For example, users are prompted with recommendations regarding particular establishments they should visit based on the characteristics of establishments, such as their locations, services provided, atmosphere, learned characteristics of other users that frequent and/or prefer these establishments in their user-based furnishing history data. As a particular example, other establishments similar to an establishment the user is currently visiting and/or has previously visited can be identified and recommended to the user based on: being nearby, serving similar food and/or drinks; having a same or similar owner, chef, winemaker, barista, and/or mixologist; having a similar atmosphere, such as similar capacity, size, lighting, noise level, furnishing units, products, indoor and/or outdoor spaces, type of experiences provided, or other atmosphere; similar demographic, such as other users that are known and/or tracked to visit this establishment being a similar age, gender, race, having similar demographic data, having similar learned characteristics; and/or other known and/or inferred similarities.

As another example, users are prompted with recommendations regarding particular products they should purchase based on the characteristics of products, such as their price and/or type, similarity to other products purchased by the user, similarity to products purchased by the other user with similar learned characteristics as the user, and/or other information. Recommendation data can optionally be displayed as and/or in conjunction with experience option data presented via interactive user interface.

As another example, users are prompted with recommendations regarding particular other users with which they should meet virtually and/or in-person, such as other users with similar experience histories, configured preference data, and/or learned user characteristics, other users currently located nearby, other users currently or previously having same or similar furnishing experience with same or similar furnishing units 110 and/or corresponding products, other users currently at the same establishment or a similar establishment, and/or other information indicating similarity and/or likelihood of a favorable interaction.

As another example, users are prompted with recommendations regarding particular configurations of furnishing units 110 with which the user is having a proximity-based interaction, or is otherwise detected to be near to, and/or that are controllable, such as recommended lighting levels, heating levels, sound levels, music type, entertainment content, and/or other recommendations for configuration of furnishings.

Figure 3D:
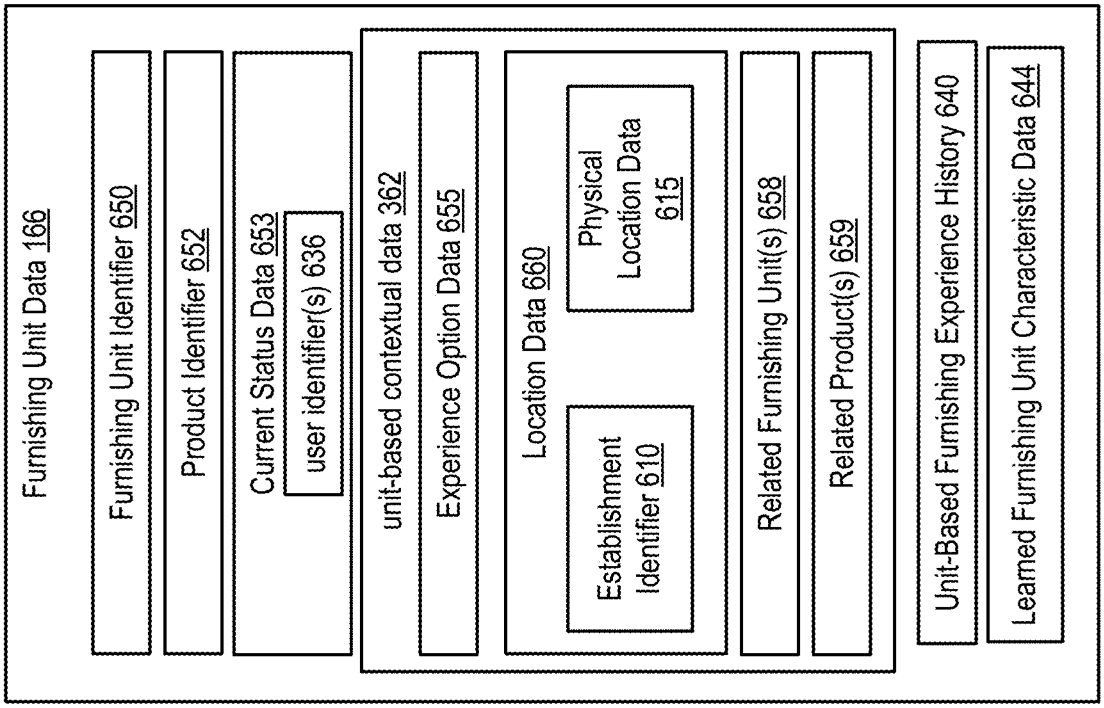
FIG. 3D illustrates various information included in furnishing unit data in accordance with various examples.

FIG. 3D illustrates an example embodiment of information of furnishing unit data 166. A given furnishing unit data 166 can be denoted by a corresponding furnishing unit identifier 650 that uniquely identifies the corresponding furnishing unit 110. For example, some or all furnishing units 110 of the furnishing experience system 100 can each have exactly one furnishing unit data 166 mapped to their unique furnishing unit identifier 650. The furnishing unit data 166 can be stored as one or more entries of one or more databases and/or other memory of furnishing experience system 100.

Furnishing unit data for a given furnishing unit 110 can indicate a product identifier 652, indicating the product corresponding to the furnishing unit 110. For example, a given furnishing unit 110 is a particular product made by a particular manufacturer and/or corresponding to a particular model of many products made by the particular manufacturer. The product can be available for purchase, where users can indicate experience selection data 615 indicating they wish to purchase the product corresponding to the furniture unit 110 with which they are interacting, where an identical and/or mostly identical product of the same make and/or model can be sold to the user. Multiple furnishing units 110 in one or more locations, such as a particular make of table or chair used to furnish one or more establishments, can correspond to the same product and can thus have the same product identifier 652.

Furnishing unit data 166 for a given furnishing unit 110 can alternatively or additionally indicate current status data 653, which can indicate various information regarding current usage of the furnishing unit 110. For example, the current status data 653 can indicate: whether or not the given furnishing unit 110 is available for use; one or more user identifiers 636 of one or more users currently using and/or otherwise interacting with the furnishing unit 110 via a proximity-based interaction 111; a user identifier of a user that has reserved and/or been assigned to seating at the furnishing unit 110 for use in a current time frame or a future timeframe; a type of experience being provided to a user, such as experience type 614; user selection data for the experience being provided to the user, such as user selection data 615; whether or not one or more experience facilitation elements of the furnishing unit 110, such as lighting elements, heating elements, cooling elements; vibration elements, speakers, display elements, or other experience facilitation elements of the furnishing unit 110 configured to provide corresponding experiences to users, are on or off; current configuration of the one or more experience facilitation elements, such as: a current lighting level or lighting configuration, such as brightness, warmth color, and/or a pattern or frequency of flashing, for example, when lights are decorative lights and/or holiday lights; a current heating level or current heating configuration; a current cooling level, water misting level, fan level, and/or current cooling configuration, a current song, playlist, podcast, or other audio content played by speakers; a current volume, balance, and/or other audio configuration; current entertainment content being displayed; current display configurations such as brightness, contrast, and/or resolution; current virtual reality and/or augmented reality being displayed; timers for how long one or more of these configurations of the corresponding type of output should persist; and/or other current configurations of experience facilitation elements; and/or other current status data.

Alternatively or in addition, the furnishing unit data 166 for a particular furnishing unit can indicate unit-based contextual data 362, which can indicate: particular types of furnishing experiences that can be facilitated via interaction with the particular furnishing unit, location of the furnishing unit and/or relative location of the furnishing unit relative to other furnishing units and/or products, and/or other physical, experience-based, establishment-based and/or product-based context for the furnishing unit.

The unit-based contextual data 362 of furnishing unit data 166 for a given furnishing unit 110 can indicate experience option data 655, which can indicate the types of possible experiences that can be facilitated for the user based on the interaction with furnishing unit 110; prompt data for display via an interactive user interface 275 indicating one or more configurable options for the experience; and/or other data indicating and/or defining the experience option data 655. Different furnishing units can have different experience option data, even if they are of the same product type, for example, based on their location and/or the establishment housing these furnishing units. Different furnishing units can have different experience option data, even if they are within the same establishment and the same product type, for example, based on their relative location within the establishment, such as which room they are in and/or whether they are indoors and outdoors, and/or other context with respect to the establishment. In some cases, furnishing units can have experience option data that is based on their proximity and/or other relation to other furnishing units and/or products.

Alternatively or in addition, the furnishing unit data 166 for a given furnishing unit 110 can indicate location data, which can indicate an establishment identifier 610 indicating the establishment in which the furnishing unit 110 is located, and/or physical location data 615 indicating a physical location, such as geolocation data and/or an address. The physical location data 615 can optionally indicate a particular location of the furnishing unit 110 within the establishment denoted by establishment identifier 610, such as whether the furnishing unit 110 is located in the indoor or outdoor space of the establishment, which floor of the establishment the furnishing unit is located, which room of the establishment the furnishing unit is located, the locating of the furnishing unit within the room, and/or other information identifying the location of the furnishing unit within the context of the full space of the establishment. As the configuration of furnishing units 110 changes over time, their respective locations can be updated.

The unit-based contextual data can further indicate product identifiers of one or more related furnishing units 658. For example, the related furnishing units 658 of a given furnishing unit 110 can indicate furnishing unit identifiers for other furnishing units 110 in proximity of the furnishing unit 110 and/or that are collectively grouped and/or controlled. This set of related furnishing units can influence the experience option data 655 accordingly, where a user is optionally presented with control and/or experience options relating to these nearby and/or grouped furnishing units 110.

For example, a table implemented as a furnishing unit 110 is in proximity of a heater, fan, lighting unit, and/or speakers, which are all themselves furnishing units. In particular, the heater, fan, lighting unit, and/or speakers can be configured for use by guests at the corresponding table. Thus, proximity-based interaction 111 with the table implementing furnishing unit 110 can automatically enable proximity-based interaction 111 with the corresponding heater, fan, lighting unit, and/or speakers for this table, such as user configuration of the heater, fan, lighting unit, and/or speakers by a user based on sitting at the table and/or based on their proximity-based interaction 111 with the table. Furnishing unit identifiers for the heater, fan, lighting unit, and/or speakers can be indicated as related furnishing units 658 accordingly.

The unit-based contextual data can further indicate product identifiers of one or more related products 659. For example, a given furnishing unit 110 can indicate multiple product identifiers, for example, based on the furnishing unit 110 being accessorized embellished with multiple products and/or based on the furnishing unit 110 being in proximity of multiple products. This set of related products can influence the experience option data 655 accordingly, where a user is optionally presented with experience options relating to nearby, accessorizing, and/or similar furnishing units 110.

For example, a chair implemented as a furnishing unit 110 that includes decorative pillows can include product identifiers for the chair itself, as well as the decorative pillows, where the identifiers for these decorative pillows are optionally related products 659. As another example, wall art implemented as a furnishing unit 110 can include product identifiers for artwork, as well as a particular frame framing the artwork.

Note that these other products of related products 659 need not be permanently fixed to and/or always within proximity of the furnishing unit 110. For example, a table implemented as a furnishing unit 110 can include product identifiers in related products 659 for glassware, dishes, and/or cutlery that is used by the establishment to serve food or drinks upon its tables, even though the glassware, dishes, and/or cutlery are not always upon the table.

Note that these other products of related products 659 need not be in the vicinity, or even in the establishment. For example, the corresponding product of a table implemented as a furnishing unit 110 may have optional accessories produced by the same manufacturer, such as an umbrella and/or matching chairs, that are not used at the establishment and/or are not in vicinity of the furnishing unit 110. As another example, the corresponding product of a chair implemented as a furnishing unit 110 may be produced in multiple colors, with multiple types of materials, or multiple other configurations, where all of these other configurations of the chair all have corresponding product identifiers. These product identifiers for other configurations can be indicated in related products 659.

In some cases, some or all related products 659 can correspond to similar and/or related products learned by the furnishing experience system, for example, via performing at least one analytics function and/or model training function and/or recommendation function, for example, based on various furnishing experience history across different furnishing units.

Figure 5A:
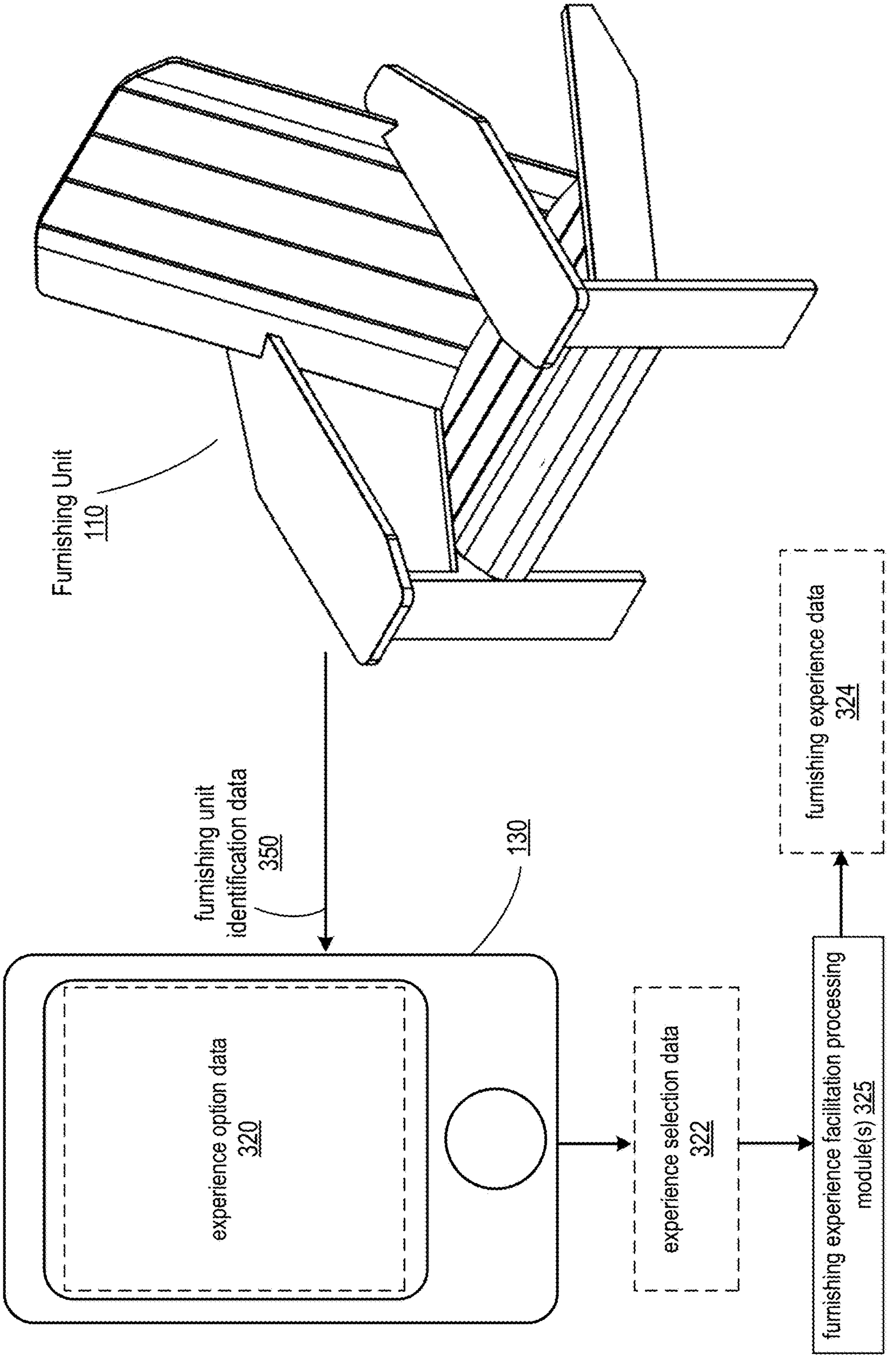
FIG. 5A is a schematic block diagram illustrating generation of experience selection data based on determining furnishing unit identification data in accordance with various examples.
Figure 5B:
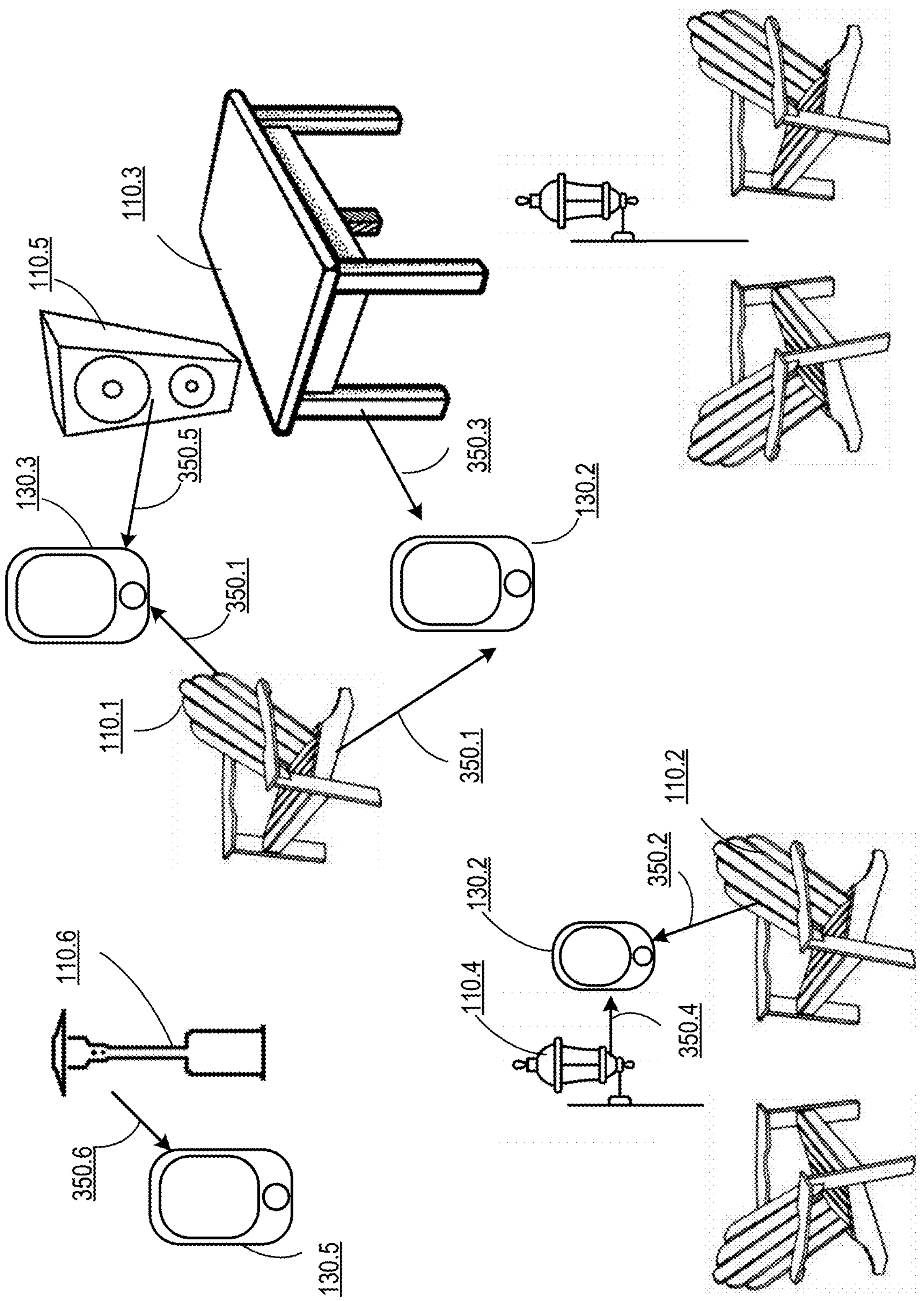
FIG. 5B illustrates determination of furnishing unit identification data by various client devices in physical proximity to various furnishing units in accordance with various examples.
Figure 5C:
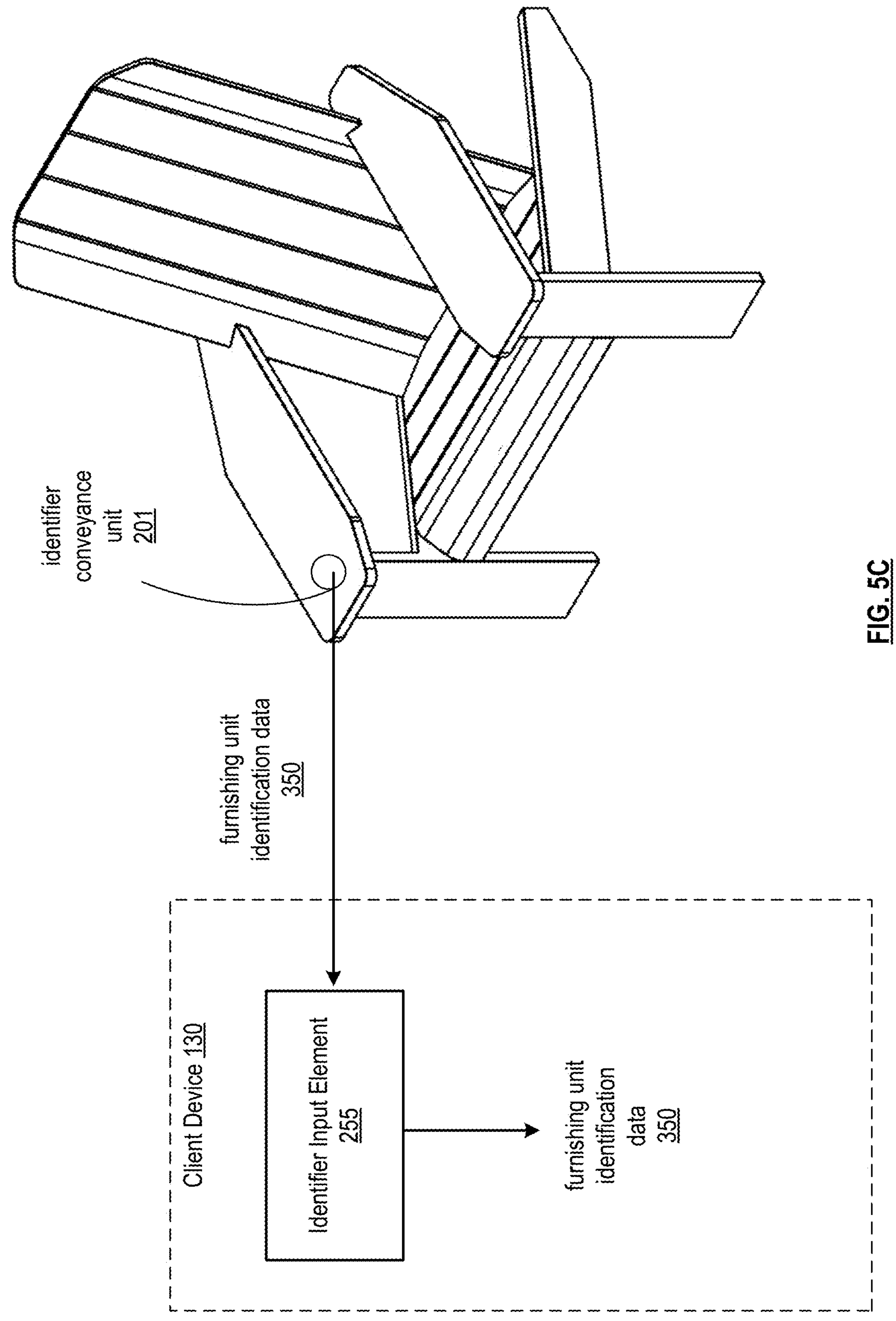
FIG. 5C is a schematic block diagram illustrating determination of furnishing unit identification data conveyed by an identifier conveyance unit of a furnishing unit in accordance with various examples.
Figure 5D:
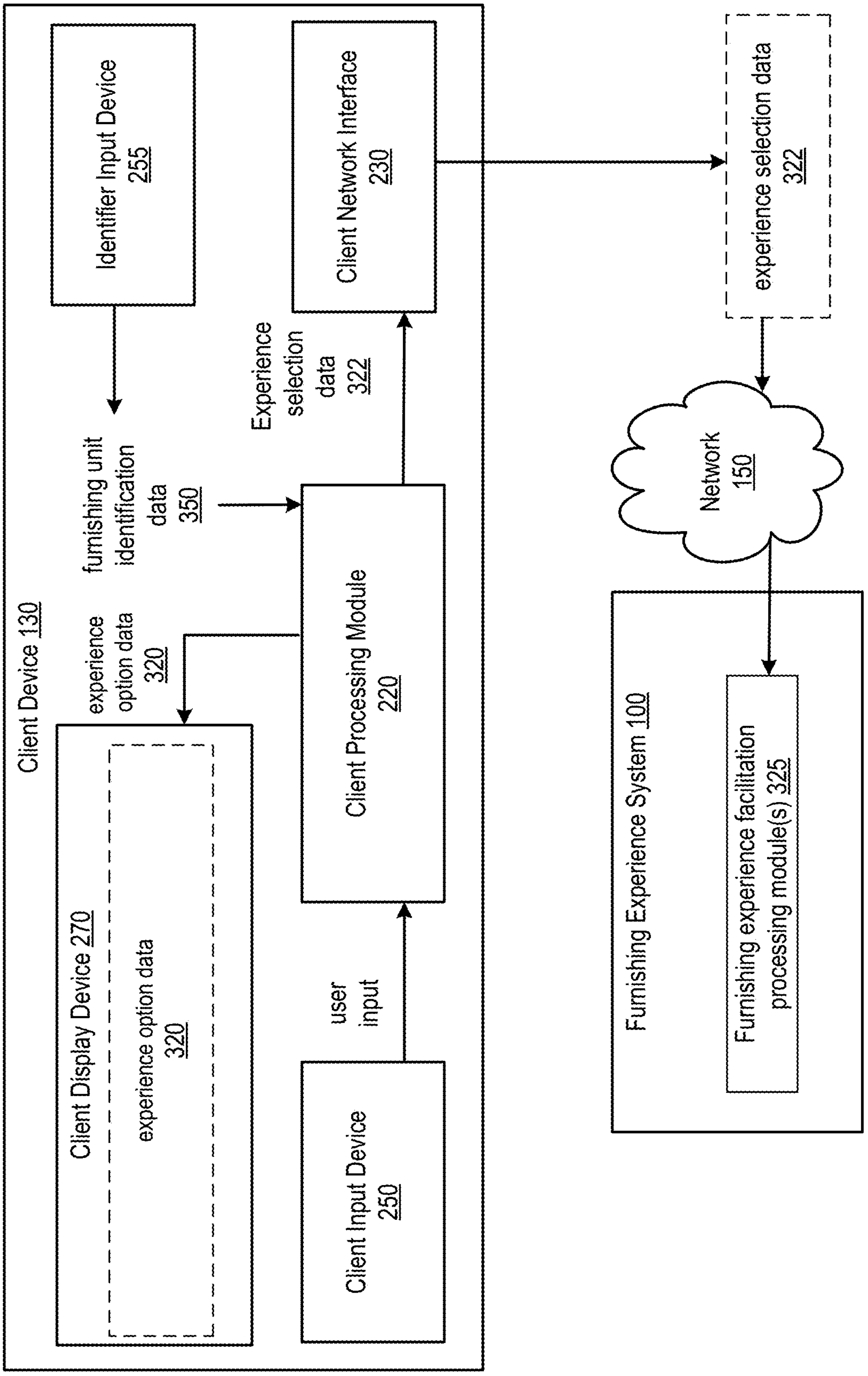
FIGS. 5D and 5E are schematic block diagrams of a client device and a furnishing experience system in accordance with various examples.

Alternatively or in addition, the furnishing unit data 166 can indicate unit-based furnishing experience history 640, which can be similar to and/or based on the user-based furnishing experience history 512 of user accounts as discussed in conjunction with FIG. 5D and/or can otherwise indicate some or all user interactions with, and/or corresponding furnishing experiences performed based on user interactions with, the given furnishing unit 110.

Alternatively or in addition, the furnishing unit data 166 can indicate learned furnishing unit characteristic data 644, which can indicate and/or be based on various statistical and/or trend data generated for the furnishing unit. For example, at least one analytics function and/or model training function of the function library 172 is performed by furnishing experience system 100 to generate statistical and/or trend data for some or all furnishing unit data 166 based on their respective unit-based furnishing experience history 640, indicating relative types and/or feedback of experiences facilitated via interaction with the furnishing units, how often and/or which times of day, week, month, and/or year the furnishing units tend to be interacted with, demographics and/or learned characteristics of users that tend interact with different furnishing units, the interaction with of the furnishing unit relative to other furnishing units in the same establishment, a rate of purchases of the same product via interactions with each given furnishing unit, and/or other information.

Figure 3E:
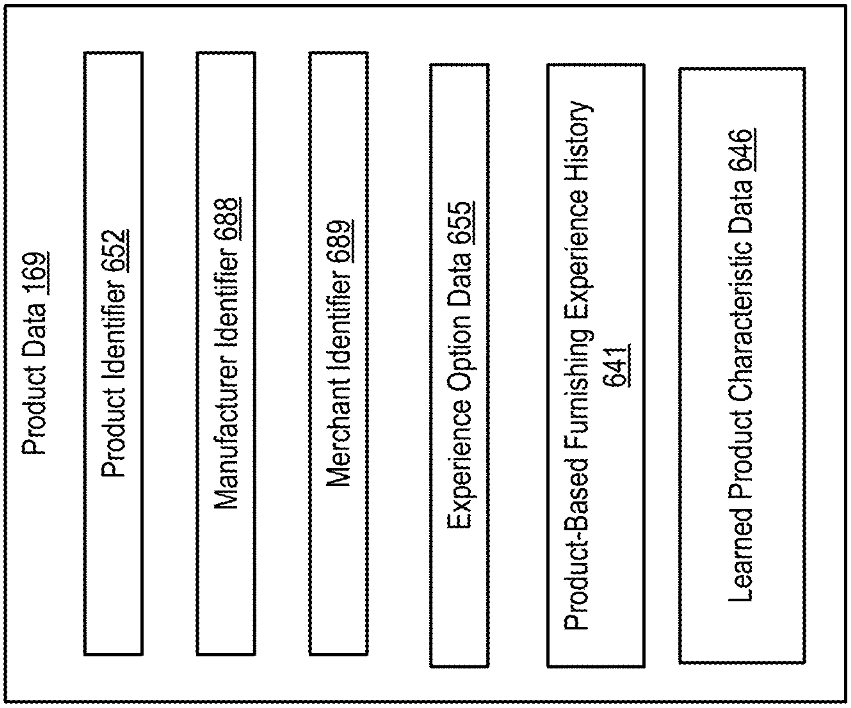
FIG. 3E illustrates various information included in product data in accordance with various examples.

FIG. 3E illustrates an example embodiment of information of product data 169. A given product data 169 can be denoted by a corresponding product identifier 652 that uniquely identifies the corresponding type of product, such as the particular make and/or model of the product.

The product data 169 for a given product can indicate a manufacturer identifier 688 identifying the manufacturer and/or brand of the corresponding product. Alternatively or in addition, the product data 169 for a given product can indicate one or more merchant identifiers 689 indicating one or more merchants from which the corresponding product can be purchased. For example, a furnishing experience can include facilitating purchase of the product from the merchant and/or can include facilitating shipment and/or delivery of the product by the merchant.

Alternatively or in addition, the product data 169 for a given product can indicate experience option data 655, which can indicate the types of possible experiences that can be facilitated for the user based on the interaction with a furnishing unit 110 that includes and/or is the corresponding product; prompt data for display via interactive user interface 275 indicating one or more configurable options for the experience; and/or other data indicating and/or defining the experience option data 655.

Alternatively or in addition, the product data 169 for a given product can indicate product-based furnishing experience history 641, which can be similar to and/or based on the user-based furnishing experience history 512 of user accounts as discussed in conjunction with FIG. 5D and/or can otherwise indicate some or all user interactions with, and/or corresponding furnishing experiences performed based on user interactions with, one or more different furnishing units 110 that include and/or correspond to the given product.

Alternatively or in addition, the furnishing unit data 166 can indicate learned product characteristic data 646, which can indicate and/or be based on various statistical and/or trend data generated for the product. For example, at least one analytics function and/or model training function of the function library 172 is performed by furnishing experience system 100 to generate statistical and/or trend data for some or all product data 169 based on their respective unit-based furnishing experience history 640, indicating relative types and/or feedback of experiences facilitated via interaction with the furnishing units that correspond to the given product, how often and/or which times of day, week, month, and/or year the furnishing units that correspond to the given product tend to be interacted with, demographics and/or learned characteristics of users that tend interact with different furnishing units that correspond to the given product, types and/or proportion of establishments that tend to use this type of furnishing, and/or other information. The learned product characteristic data 646 of a given product can optionally be based on aggregating over the learned furnishing unit characteristic data 644 of some or all furnishing unit data 166 with product identifiers 652 indicating this given product.

In some embodiments, some or all furnishing units 110 do not have their own furniture unit data 166 and/or their own furnishing unit identifiers 650 based on not being easily distinguishable from other furnishing units 110 of the same type of product, based on not requiring distinction from other furnishing units 110 of the same type of product, and/or based on not having corresponding types of experiences that are based on a particular furnishing units 110 and/or location of the particular furnishing units 110 within the establishment.

For example, consider a restaurant that includes a plurality of chairs and/or tables with which users can interact via a proximity-based interaction 111, and that further includes glassware, dishes, and/or cutlery that are served to users while at these tables and/or chairs, and with which users can also interact via a proximity-based interaction 111. All chairs, tables, glassware, dishes, and/or cutlery can be implemented as furnishing units 110, where users can have a furnishing experience facilitated accordingly based on the proximity-based interactions 111 with these various furnishings.

However, it may not be feasible and/or necessary for each individual fork, plate, and/or wine glass to be distinguishable from other forks, plates, and/or wine glasses at the given establishment. Furthermore, the furnishing experience facilitated for glassware, dishes, and/or cutlery may not require distinguishing between individual forks, plates, and/or wine glasses. For example, the furnishing experience facilitated for glassware, dishes, and/or cutlery can include enabling a user to purchase products of identical make and model of this glassware, dishes, and/or cutlery, based on their product identifiers. Thus, while the user can have proximity-based interactions 111 with these furnishing units 110, the furnishing units are only distinguishable by their product identifiers 652, and not by furnishing unit identifiers 650. In such cases, the furnishing unit data 166 of these furnishing units 110 can optionally be implemented as the product identifier.

Meanwhile, it can be reasonable and/or desirable to differentiate between the different chairs and/or tables at the restaurant, even if the chairs are the same make and model and/or even if the tables are the same make and model, based on some or all corresponding furnishing experiences being based on the particular chair and/or table, and/or being based upon the particular location of the chair and/or table within the establishment. For example, the furnishing experience facilitated for chairs and/or tables at the restaurant can include enabling a user to order food for delivery to their given chair and/or table; to configure the lighting, heating, cooling, and/or audio supplied to the user via their chair and/or table, and/or via other furnishing units 110 in proximity to their chair and/or table; to indicate that their chair or table is reserved and/or in use, for example, while they visit the restroom, and/or other experiences.

In some cases, these furnishing unit 110 of a same product still have furnishing unit data 166 to denote their respective establishment, enabling the interaction with products across different establishments to be tracked accordingly. In such cases, a furnishing unit identifier 650 can denote a particular establishment and a particular product, where all of a same type of product at a given establishment are denoted with a same furnishing unit identifier 650 For example, multiple furnishing unit data 166 can indicate a given product identifier 652 for a particular make and model of wine glass, where one furnishing unit data 166 for this particular make and model of wine glass has a first furnishing unit identifier 650 corresponding to use of this make and model of wine glass at a first establishment, and where another furnishing unit data 166 for this particular make and model of wine glass has a different furnishing unit identifier 650 corresponding to use of this make and model of wine glass at a different, second establishment.

Figure 3F:
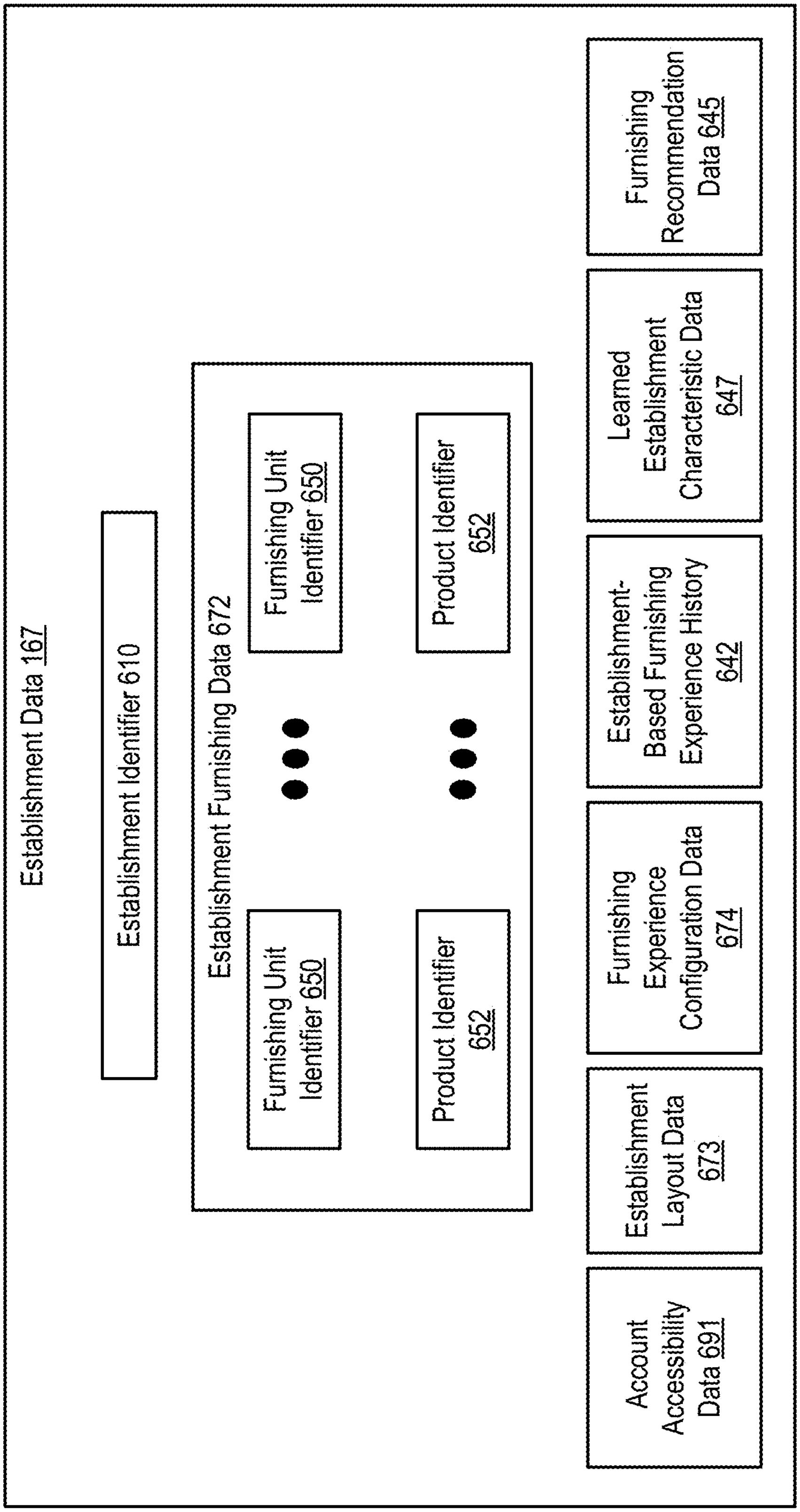
FIG. 3F illustrates various information included in establishment data in accordance with various examples.

FIG. 3F illustrates an example embodiment of information of establishment data 167. A given establishment data 167 can be denoted by a corresponding establishment identifier 610 that uniquely identifies the corresponding establishment 140, such as the particular address, location and/or branch of the corresponding establishment.

The establishment data 167 for a given establishment can indicate establishment furnishing data 672, indicating some or all furnishing units 110 that are included at the establishment and/or with which visitors of the establishment can have corresponding furnishing experiences. The establishment furnishing data 672 can indicate one or more furnishing unit identifiers 650 of one or more particular furnishing units 110 included in the establishment, for example, where one or more of these furnishing unit identifiers 650 denote furnishing units 110 of the same type of product that are uniquely distinguished within the establishment as discussed previously. For example, the restaurant of the previous example has furnishing unit identifiers 650 for their tables and/or chairs. Alternatively or in addition, the establishment furnishing data 672 can indicate one or more product identifiers 652 identifying the types of products included in the establishment, for example, in cases where furnishing units 110 of the same type of product need not be distinguished from one another as discussed previously. For example, the restaurant of the previous example has product identifiers 652 for their glassware, dishes, and cutlery.

Alternatively or in addition, establishment data 167 can indicate account accessibility data 691 corresponding to an account associated with the particular establishment, such as: a username and/or password associated with the establishment data 167; other user credentials that are utilized to facilitate login to the establishment data 167 by a corresponding establishment entity, such as an employee and/or owner of the establishment, and/or to prevent other people from maliciously accessing the given establishment's establishment data 167; account recovery information; two step authentication credentials and/or information; and/or other information utilized to facilitate login to and/or access to an account associated with establishment data 167. The account accessibility data 691 can be based on: data generated by the furnishing experience system 100 and/or data received from one or more client devices 130 for a corresponding establishment entity.

Some or all population of and/or updates to a given establishment data 167 for a given establishment can be based on receiving data from a client device 130 in conjunction with login to the establishment data 167 by the establishment entity in conjunction with the account accessibility data 691. For example, addition of new furnishing units 110 changes in layout of furnishing units 110 can be updated accordingly based on a client device 130 sending the these updates in conjunction with being logged in to an account associated with the particular establishment data 167.

An establishment entity that accesses their establishment data 167 successfully can optionally enter, edit, view and/or view various types of data stored in establishment data 167. For example, some or all information of establishment data 167 can be sent to client device 130 for display to the corresponding establishment entity via interactive user interface 275. In some embodiments, some data of establishment data 167 described herein is stored in conjunction with the corresponding establishment, but is not viewable, changeable, and/or accessible by the corresponding establishment entity.

Alternatively or in addition, the establishment data 167 for a given establishment can indicate establishment layout data 673, which can indicate where some or all of the various furnishing units 110 of establishment furnishing data 672 are located within the establishment. For example, the establishment layout data 673 is based on, and/or is utilized the generate, the physical location data 615 for some or all furnishing units 110 in the establishment.

Alternatively or in addition, the establishment data 167 for a given establishment can indicate furnishing experience configuration data 674, which can indicate configured preferences for types of furnishing experiences available to users interacting with furnishing units 110 at the establishment. For example, the configured preferences dictate the experience option data 655 for the corresponding furnishing units 110, such as a particular menu of food and/or drinks from which users can order selected food items based on the type of food and/or drinks cooked and/or served at the establishment. The furnishing experience configuration data 674 can be configured based on user input to client device 130 by a corresponding establishment entity.

Alternatively or in addition, the establishment data 167 for a given establishment can indicate establishment-based furnishing experience history 642, which can be similar to and/or based on the user-based furnishing experience history 512 of user accounts as discussed in conjunction with FIG. 5D and/or can otherwise indicate some or all user interactions with, and/or corresponding furnishing experiences performed based on user interactions with, one or more different furnishing units 110 that are located within the establishment.

Alternatively or in addition, the establishment data 167 can indicate learned establishment characteristic data 647, which can indicate and/or be based on various statistical and/or trend data generated for the establishment. For example, at least one analytics function and/or model training function of the function library 172 is performed by furnishing experience system 100 to generate statistical and/or trend data for some or all establishment data 167 based on their respective establishment-based furnishing experience history 642, indicating relative types and/or feedback of experiences facilitated via interaction with the furnishing units at the establishment, how often and/or which times of day, week, month, and/or year the furnishing units in different locations within the establishment end to be interacted with, demographics and/or learned characteristics of users that tend to visit the establishment based on their tracked interaction with different furnishing units in the establishment, user enjoyment and/or rating of the establishment based on the experience feedback data across many furnishing experiences at the establishment, inclusion of different products by different establishments, and/or other information. The learned product characteristic data 646 of a given establishment can optionally be based on aggregating over the learned furnishing unit characteristic data 644 of some or all furnishing unit data 166 with establishment identifiers 610 indicating this establishment.

The learned establishment characteristic data 647 and/or the establishment-based furnishing experience history 642 of some or all establishments can be utilized to generate furnishing recommendation data 645 for some or all establishments. For example, a recommendation function of the function library 172 is performed by furnishing experience system 100 to generate furnishing recommendation data 645 based on trends in the learned establishment characteristic data 647 across some or all establishments. This furnishing recommendation data 645 can be displayed to a respective establishment entity via interactive user interface 275, for example, to prompt and/or guide establishment entity to change the furnishings of their establishment and/or the layout of furnishings of their establishment to enhance user experience and/or increase the rate of furnishing experiences within the establishment. For example, establishment entities are prompted with recommendations regarding particular products they should furnish their establishment with based on the characteristics of these product and/or of users that tend to enjoy interaction with and/or purchase these products at other establishments, recommending furnishings included in other establishments based on their learned establishment characteristic data being similar to that of the given establishment, and/or other recommendations based on other information. This can enable establishments entities to furnish their respective establishments with products and/or corresponding layouts inspired by location, user experience, demographic, buying history, and/or other historical data and/or learned data.

Figure 3G:
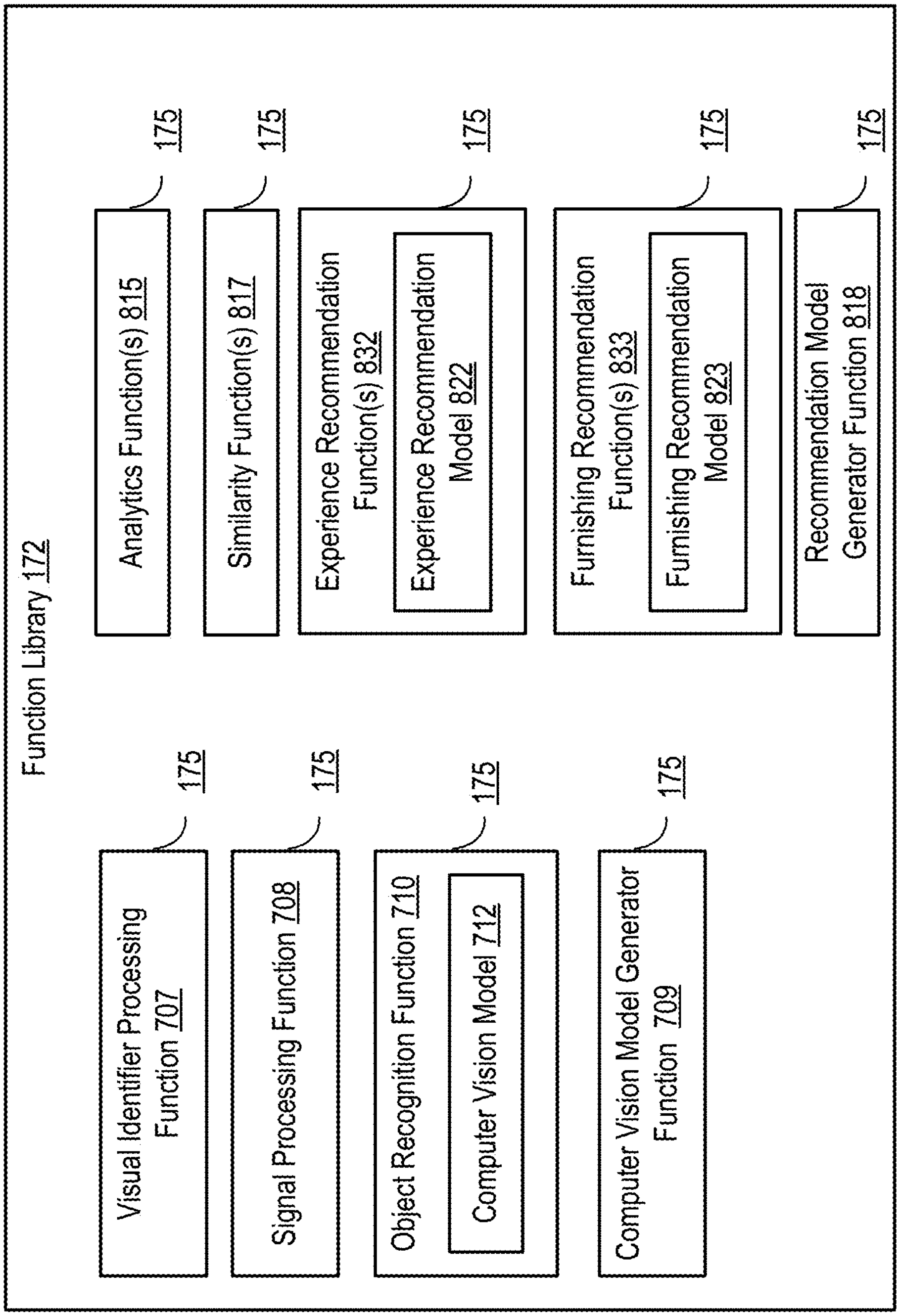
FIG. 3G illustrates various functions included in a function library in accordance with various examples.

FIG. 3G illustrates an embodiment of function library 172. Some or all functions in function library 172 as illustrated in FIG. 3F can be performed by the furnishing experience system 100 to perform some or all of its functionality as described herein. Some or all functions in function library 175 as illustrated in FIG. 3F can be included in application data 212 stored in client device 130 and/or can otherwise be performed by the client device 130 to perform some or all of its functionality as described herein. The data included in corresponding function entries for these functions can include parameters, executable code, code written in a programming language, model data, and/or function definition data enabling execution of the corresponding functions.

Function library 172 can indicate at least one visual identifier processing function 707. Visual identifier processing function 707 can be implemented to process visual identifiers mounted upon and/or attached to furnishing units 110 to identify furnishing units as discussed in further detail herein. Performing signal processing function 708 can be based on a known code and/or pattern structure of these visual identifiers and/or can be based on implementing one or more image processing techniques. Performing visual identifier processing function 707 can optionally include performing: at least one image processing function, for example, trained via artificial intelligence and/or performed by utilizing a computer vision model that utilizes artificial intelligence.

Function library 172 can include at least one signal processing function 708. Signal processing function 708 can be implemented to process signals received from tags, beacons, and/or transmitters of furnishing units 110 to identify furnishing units as discussed in further detail herein. Performing signal processing function 708 can be based on a known signal structure of these signals and/or based on implementing one or more signal processing techniques.

Function library 172 can include at least one object recognition function 710. Object recognition function 710 can be implemented to process image data capturing objects corresponding to particular furnishing units 110 and/or particular products to identify these particular furnishing units 110 and/or particular products as discussed in further detail herein. Performing object recognition function 710 can include utilizing at least one image processing function, at least one artificial intelligence technique, and/or at least one machine learning technique. Performing object recognition function 710 can include performing at least one inference function, for example, by utilizing at least one artificial intelligence technique, and/or at least one machine learning technique.

Function library 172 can include at least one computer vision model training function 709. Computer vision model training function 709 can be implemented to generate one or more computer vision models, for example, such as the one or more computer vision models 712 utilized to implement one or more corresponding object recognition functions 710. This can include training computer vision models, such as computer vision model 712, for example, via a supervised and/or unsupervised learning algorithm of one or more artificial intelligence techniques and/or machine learning techniques.

Function library 172 can include at least one analytics function 815. Analytics function 815 can be implemented to generate any of the learned characteristic data 585, 644, 646, and/or 647 described herein. Analytics function 815 can be implemented via performing at least one statistical function and/or aggregation function. Analytics function 815 can be implemented via at least one machine learning technique and/or artificial intelligence technique.

Function library 172 can include at least one similarity function 817. Similarity function 817 can be implemented to generate similarity scores and/or other similarity data discussed herein, for example, to indicate similarity between two or more users; two or more furnishing units; two or more products; and/or two or more establishments. Similarity function 817 can be implemented via at least one distance function, for example, between feature vectors corresponding to some or all data of corresponding database entries of two or more users; two or more furnishing units; two or more products; and/or two or more establishments. Similarity function 817 can be implemented via at least one clustering function and/or unsupervised learning algorithm. Similarity function 817 can be implemented to identify and/or recommend social connections between various users in conjunction with social experiences implementing one or more types of furnishing experiences as described herein.

Furnishing library 172 can include at least one experience recommendation function 832. Experience recommendation function 832 can be implemented to generate experience recommendation data, for example, recommending particular furnishing experiences discussed herein for users, for example, based on their furnishing experience history relative to the furnishing experience history of other users. Performing experience recommendation function 832 can include performing at least one inference function, such as an inference function that utilizes at least one machine learning technique and/or at least one artificial intelligence technique. Experience recommendation function 832 can be implemented by utilizing an experience recommendation model 822, which is optionally trained and/or updated utilizing at least one artificial intelligence technique and/or at least one machine learning technique. Experience recommendation function 832 can optionally be implemented via performance of at least one similarity function 817.

Furnishing library 172 can include at least one furnishing recommendation function 833. Furnishing recommendation function 833 can be implemented to generate furnishing recommendation data, for example, recommending particular furnishing units and/or layout configurations discussed herein for establishments, for example, based on their furnishing experience history relative to the furnishing experience history of other establishments. Performing furnishing recommendation function 833 can include performing at least one inference function, such as an inference function that utilizes at least one machine learning technique and/or at least one artificial intelligence technique. Furnishing recommendation function 833 can be implemented by utilizing a furnishing recommendation model 823, which is optionally trained and/or updated utilizing at least one artificial intelligence technique and/or at least one machine learning technique. Furnishing recommendation function 833 can optionally be implemented via performance of at least one similarity function 817.

Function library 172 can include at least one recommendation model generator function 818. Recommendation model generator function can be implemented to generate and/or update one or more recommendation models, such as experience recommendation model 822 and/or furnishing recommendation model 823. This can include training recommendation models, such as experience recommendation model 822 and/or furnishing recommendation model 823, for example, via a supervised and/or unsupervised learning algorithm of one or more artificial intelligence techniques and/or machine learning techniques. Recommendation model generator function 818 and/or recommendation generator function 832 can be implemented via performance of at least one similarity function 817.

The function library 172 can optionally include other functions described herein and/or implemented to perform other functionality of client devices 130, furnishing processing systems 120, and/or furnishing experience system 100.

Figure 3H:
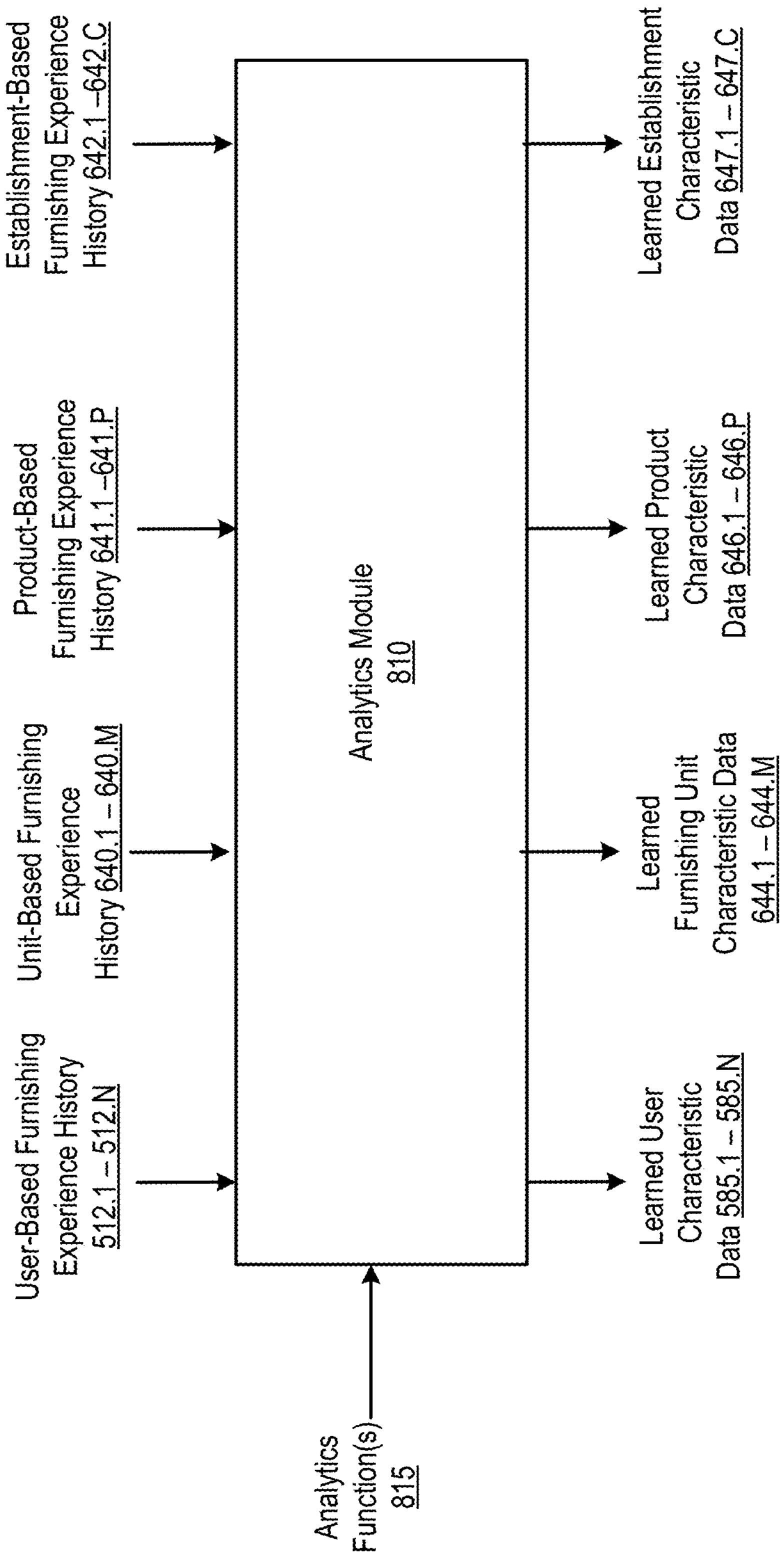
FIG. 3H is a schematic block diagram of an analytics module of a furnishing experience system in accordance with various examples.

FIG. 3H illustrates an example embodiment of a furnishing experience system 100 that implements an analytics module 810 via at least one processor and/or at least one memory to: generate the learned user characteristic data 585 for some or all users 1-N, generate the learned furnishing unit characteristic data 644 for some or all furnishing units 1-M; generate the learned product characteristic data 646 for some or all products 1-P; and/or generate the learned establishment characteristic data for some or all establishments 1-C. This can be based on performing one or more analytics functions 815, for example, of function library 172.

Performing the one or more analytics functions 815 can be based on utilizing user-based furnishing experience history 512 for some or all users 1-N as input, where the learned user characteristic data 585 for some or all users 1-N is generated based on processing furnishing experience history for some or all users 1-N. Performing the one or more analytics functions 815 can be based on utilizing unit-based furnishing experience history 640 for some or all furnishing units 1-M as input, where the learned furnishing unit characteristic data 644 for some or all furnishing units 1-M is generated based on processing unit-based furnishing experience history 640 for some or all furnishing units 1-M. Performing the one or more analytics functions 815 can be based on utilizing product-based furnishing experience history 641 for some or all products 1-P as input, where the learned product characteristic data 646 for some or all products 1-P is generated based on processing product-based furnishing experience history 641 for some or all products 1-P. Performing the one or more analytics functions 815 can be based on utilizing establishment-based furnishing experience history 642 for some or all establishments 1-C as input, where the learned establishment characteristic data 647 for some or all establishments 1-C is generated based on processing establishment-based furnishing experience history 642 for some or all establishments 1-C.

This can include generating distribution data for individual and/or jointly considered types of data for users, furnishing units, products, and/or establishments, such as types of data included in corresponding furnishing experience history, where the learned characteristic data for a given user, furnishing unit, product, and/or establishment is based on the furnishing history of the user, furnishing unit, product, and/or establishment relative to other users, furnishing units, products, and/or establishments as indicated by the distribution data. The distribution data can optionally be based on feature vectors generated for furnishing experience history for each given user, furnishing unit, product, and/or establishment, where these feature vectors are populated with quantitative and/or categorical values based on the corresponding furnishing experience history, and/or other data in their corresponding database entry, of the given user, furnishing unit, product, and/or establishment.

Aggregate statistics and/or trends in distribution data can be optionally displayed to an administrator of the furnishing experience system 100. Aggregate statistics and/or trends in distribution data for a given establishment, for example, as indicated in learned establishment characteristic data 647, can be optionally displayed to an establishment entity of the corresponding establishment via interactive user interface 275 displayed via a client device of the establishment entity. Aggregate statistics and/or trends in distribution data for a given user, for example, as indicated in learned user characteristic data 585, can be optionally displayed to the given user via interactive user interface 275 displayed via their client device 130.

Figure 3I:
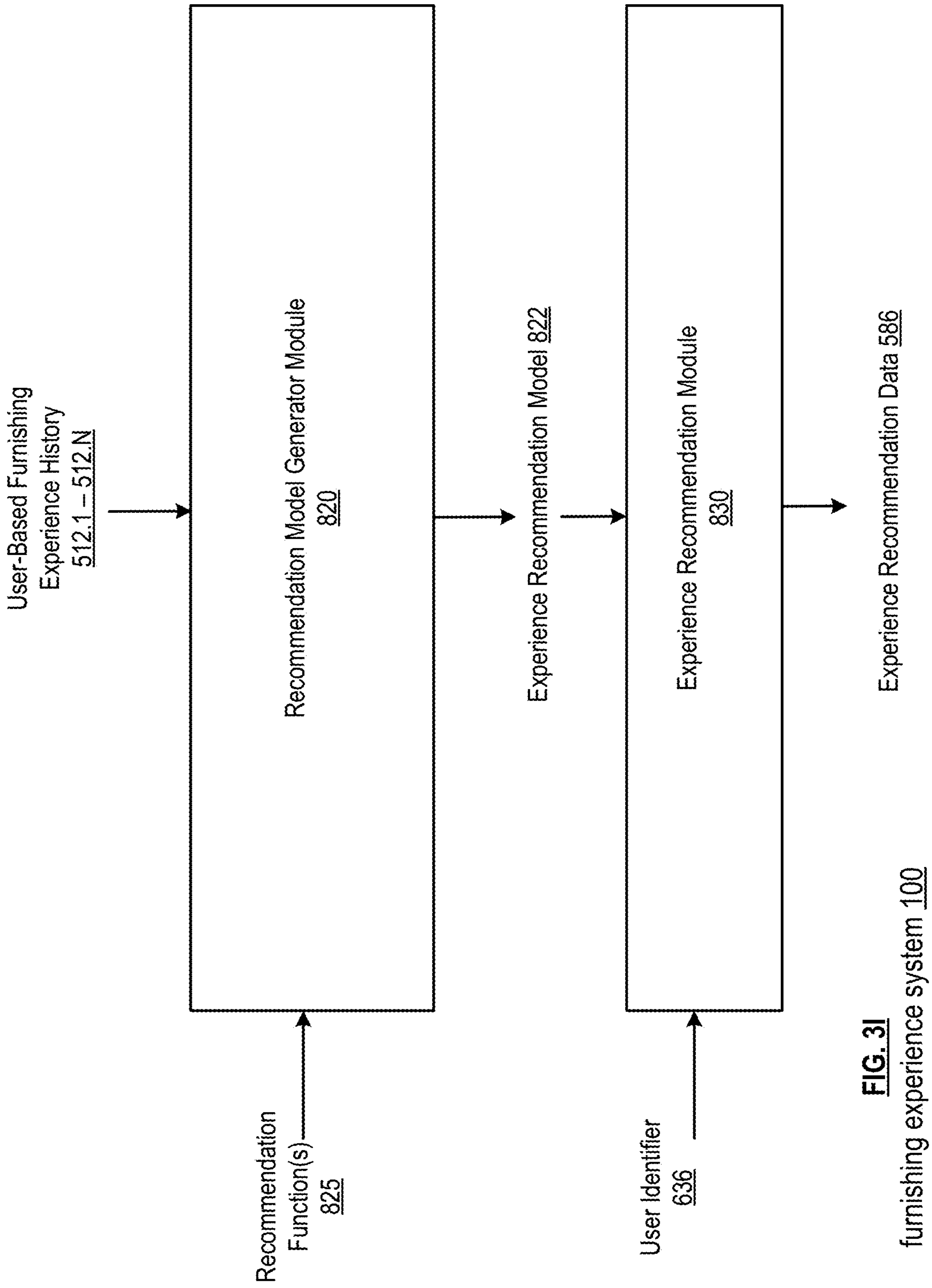
FIG. 3I is a schematic block diagram of a recommendation model generator module and an experience recommendation module of a furnishing experience system in accordance with various examples.

FIG. 3I illustrates an example embodiment of a furnishing experience system 100 that implements a recommendation model generator module 820 via at least one processor and/or at least one memory to generate at least one experience recommendation model 822. This can be based on performing one or more recommendation model generator functions 825, for example, of function library 172. This can include processing user-based furnishing experience history 512 for some or all users and/or otherwise processing any other furnishing experience history collected over time as furnishing experiences are facilitated for users for different furnishing units, products, and/or establishments.

The experience recommendation model 822 can be updated over time as more users are added to the system and/or as existing users continue to have furnishing experiences over time at different establishments and/or with different types of products, for example, where their user-based furnishing experience histories 585 are updated over time accordingly and utilized to update the experience recommendation model 822.

The furnishing experience system 100 can alternatively or additionally implement an experience recommendation module 830 that via at least one processor and/or at least one memory to generate experience recommendation data 586 for one or more given users based on their user identifier 636. For example, some or all data of a corresponding user account 165 is accessed based on the user identifier 636, where the data of the user account 165 is utilized in conjunction with experience recommendation model 822 to generate the experience recommendation data 586 for this user.

The experience recommendation module 830 can utilize the experience recommendation model 822 to perform a corresponding experience recommendation function 832 to generate the experience recommendation data 586 for a given user. This can include generating a feature vector based on the data of the user account 165 to generate the recommendation data for the user, and/or performing an inference function utilizing experience recommendation module 822 based on the feature vector. Alternatively, the experience recommendation model 822 includes recommendation data for the user determined in generating the full experience recommendation model 822 based on the plurality of users.

For example, the experience recommendation data 586 indicates one or more recommended experiences for optional selection by the users, for example, as one or more recommended options in the experience option data determined for a given user when interacting with a corresponding furnishing unit 110.

The experience recommendation data 586 can be based on other experiences had by and/or enjoyed by one or more other users similar to the user, for example, based on having a favorable similarity score with the user outputted by a similarity function 817. For example, experience recommendation data 586 can indicate one or more other experiences being indicated in the user-based furnishing experience history 585 of other users, based on these experiences having favorable feedback data 616 by these other users, based on the other users also having one or more same and/or similar types of past experiences as the user in their respective user-based furnishing experience history 585, and/or based on the user and/or other users based on these past shared experiences having favorable feedback data 616 by the user and/or these other users.

The experience recommendation data 586 can optionally be generated based on determining a set of recommendation scores, such as quantitative values indicating a probability that the user will have favorable experience feedback for the experience, indicating a percentage of other users similar to the user that had and/or enjoyed the corresponding experiences, and/or another value indicating how strong and/or favorable the corresponding recommended option is for the given user.

Figure 3J:
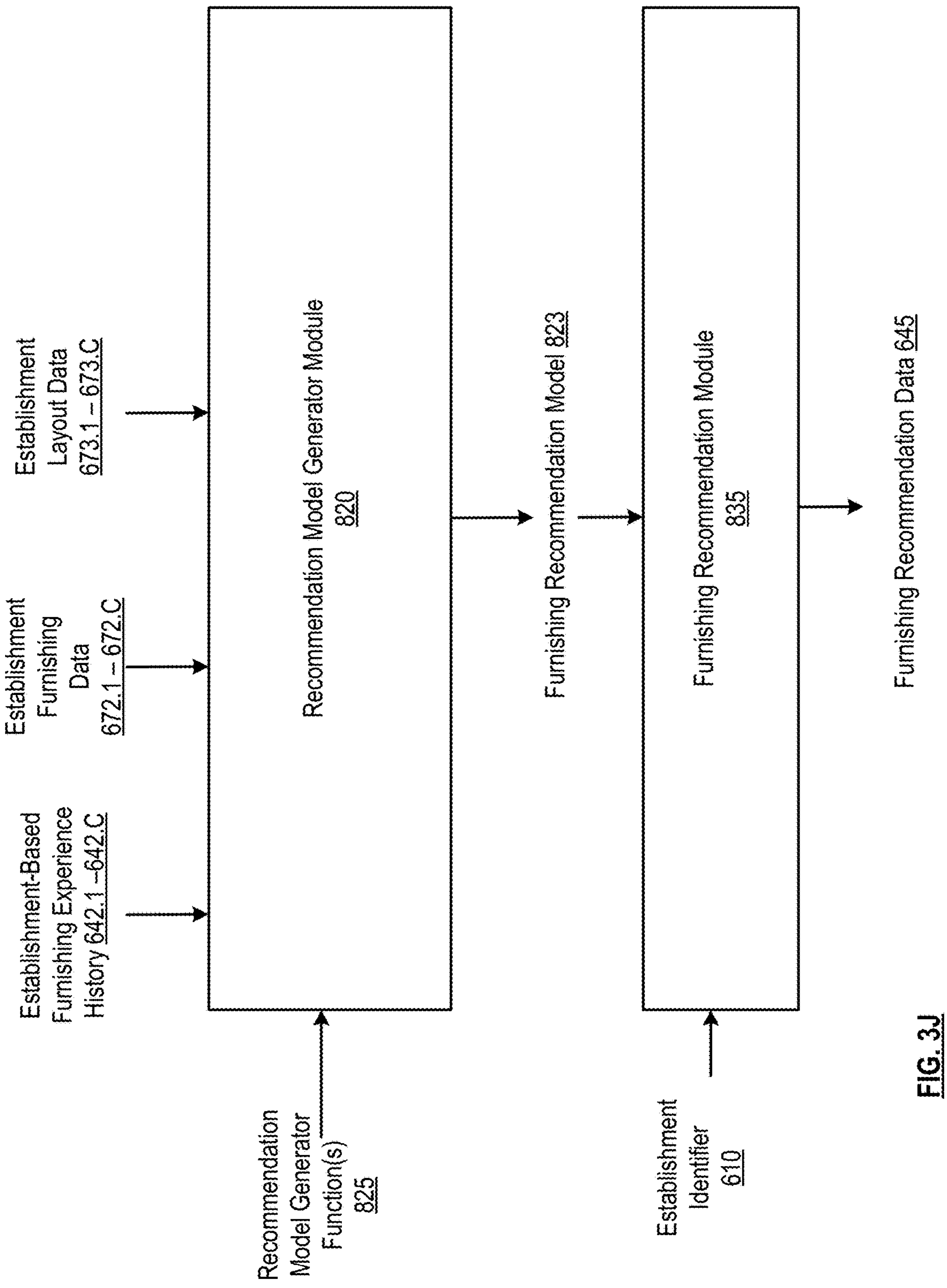
FIG. 3J is a schematic block diagram of a recommendation model generator module and a furnishing recommendation module of a furnishing experience system in accordance with various examples.

FIG. 3J illustrates an example embodiment of a furnishing experience system 100 that implements the same or different recommendation model generator module 820 via at least one processor and/or at least one memory to generate at least one furnishing recommendation model 823. This can be based on performing one or more recommendation model generator functions 825, for example, of function library 172. This can include processing establishment-based furnishing experience history 642 for some or all establishments and/or otherwise processing any other furnishing experience history collected over time as furnishing experiences are facilitated for users at various establishments for different furnishing units and/or products. This alternatively or additionally include processing establishment furnishing data 672 and/or establishment layout data 673 of some or all establishments.

The furnishing recommendation model 823 can be updated over time as more establishments are added to the system and/or as existing establishments continue to have furnishing experiences facilitated for corresponding users at the establishments over time, for example, where their establishment-based furnishing experience histories 642, establishment furnishing data 672, and/or establishment layout data 673 are updated over time accordingly and utilized to update the furnishing recommendation model 823.

The furnishing experience system 100 can alternatively or additionally implement a furnishing recommendation module 835 via at least one processor and/or at least one memory to generate experience recommendation data 586 for one or more given establishments based on their establishment identifier 610. For example, some or all establishment data 167 of a corresponding establishment 140 is accessed based on the establishment identifier 610, where the data of the establishment identifier 610 is utilized in conjunction with furnishing recommendation model 823 to generate the furnishing recommendation data 645 for this establishment.

The furnishing recommendation module 835 can utilize the furnishing recommendation model 823 to perform a corresponding furnishing recommendation function 833 to generate the furnishing recommendation data 645 for a given user. This can include generating a feature vector based on the data of the corresponding establishment data 167 to generate the recommendation data for the establishment, and/or performing an inference function utilizing furnishing recommendation module 823 based on the feature vector. Alternatively, the furnishing recommendation model 823 includes recommendation data for the establishment determined in generating the full furnishing recommendation model 823 based on the plurality of establishments.

For example, the furnishing recommendation data 645 indicates one or more recommended products and/or recommended furnishing layouts, for example, to be implemented as establishment furnishing data 672 and/or establishment layout data 673 by a corresponding establishment 140. The furnishing recommendation data 645 can be based on experiences had by and/or enjoyed by one or more users at other establishment similar to the establishment, for example, based on having a favorable similarity score with the other establishment outputted by a similarity function 817 based on catering to similar types of users, providing similar types of furnishing experiences, providing a similar type of service to customers, having a similar type of atmosphere, having a similar size and/or similar types of indoor and/or outdoor spaces, being in a same city and/or geographic region, having a similar climate, and/or other similarities. For example, furnishing recommendation data 645 can indicate one or more particular products and/or layout types being indicated in the establishment furnishing data 672 and/or establishment layout data 673 of other establishments, for example, based on the corresponding furnishing units and/or products having favorable feedback data 616 by users at these other establishments that are similar to the establishment.

The furnishing recommendation data 645 can optionally be generated based on determining a set of recommendation scores, such as quantitative values, indicating a probability that the corresponding product and/or layout will have favorable experience feedback for experiences by users at the establishment, indicating a percentage of other establishments similar to the user that have the corresponding types of products and/or layouts experiences, and/or another value indicating how strong and/or favorable the corresponding recommended product and/or layout is for the given establishment.

Figure 4A:
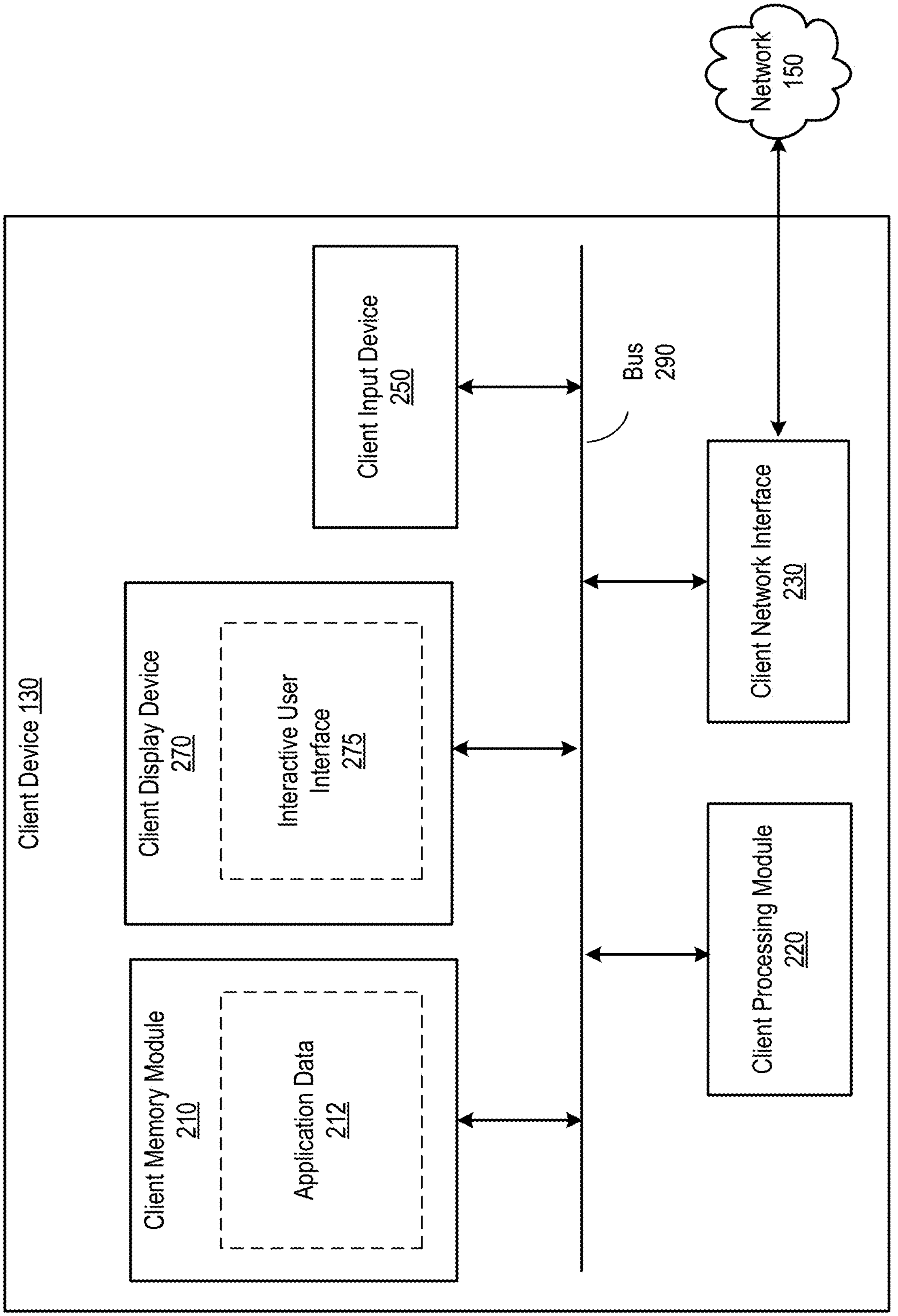
FIG. 4A is a schematic block diagram of a client device in accordance with various examples.

FIG. 4A illustrates an embodiment of a client device 130. Some or all features and/or functionality of the client device 130 of FIG. 4A can be utilized to implement some or all other embodiments of client device 130 described herein.

A given client device can be implemented via: one or more client processing modules 220; one or more client memory modules 210; one or more client network interfaces 230; one or more client display devices 270; and/or one or more client input devices 250, communicating via bus 290. The one or more network interfaces 230 can be operable to send and/or receive data via the network 150 and/or via any other communication system. Bus 290 can facilitate communication of data between the: one or more client processing modules 220; one or more client memory modules 210; one or more client network interfaces 230; one or more client display devices 270; and/or one or more client input devices 250. One or more client devices 130 can be implemented as: a mobile device, a cellular phone, a tablet, a smart device, a wearable device, a computer, a laptop computer, a desktop computer, and/or any other computing device. One or more client devices 130 can be implemented as a specialty controller, such as a remote control unit, for a corresponding one and/or type of the plurality of furnishing units. One or more client devices 130 can be implemented as an AR and/or VR capable device, such as at least one display device, an AR headset, interactive AR glasses, a VR headset, 3D glasses, interactive VR glasses, and/or other device capable of facilitating an AR, VR, and/or mixed reality experience.

The client display device 270 can be operable to display one or more views of an interactive user interface 275. Interactive user interface 275 can be implemented as a graphical user interface (GUI), can present prompts and/or information as described herein, and/or can facilitate user selection of presented options and/or input of user text. For example, client display device 270 can be implemented via at least one touchscreen, at least one monitor, at least one screen, and/or at least one other display device. In some embodiments, client device 130 is implemented to convey some or all information and/or prompts as audio data, for example, via at least one speaker of the client device 130, and/or the user optionally responds to prompts via voice commands, for example, processed via at least one microphone of the client device 130.

The client input device 250 can be operable to collect user input, for example, in response to one or more prompts presented via interactive user interface 275. For example, client input device 250 can be implemented via at least one keyboard, at least one touchscreen, at least one mouse, at least one knob or button, at least one microphone, at least one camera, at least one receiver, at least one transceiver, at least one interface to one or more memory drives storing document files, and/or at least one other input device that collects data utilized as user input.

The client memory module 210 can include memory that stores operational instructions that, when executed by the one or more client processing modules 220, cause the corresponding client device 130 to execute some or all of the functionality described herein. For example, the operational instructions, when executed by the one or more client processing modules 220, can cause the one or more client processing modules 220 to utilize network interface 230 to receive data from the furnishing experience system 100 via network 150. As another example, the operational instructions, when executed by the one or more client processing modules 220, can cause the corresponding client display device 270 to display information and/or prompts, such as experience option data, via interactive user interface 275 in one or more views, for example, based on instructions, information and/or prompts included in the data received from the furnishing experience system 100. As another example, the operational instructions, when executed by the one or more client processing modules 220, can cause the one or more client processing modules 220 to generate data based on user input to client input device 130, for example, as experience selection data for a corresponding prompt displayed via interactive user interface 275. As another example, the operational instructions, when executed by the one or more client processing modules 220, can cause the one or more client processing modules 220 to utilize network interface 230 to send data generated by client input device 130, for example, to the furnishing experience system 100 via network 150.

The memory module 210 can optionally store application data 212 corresponding to the furnishing experience system 100. The application data, when executed by the client device 130, can cause the client device 130 to perform some or all functionality described herein. The application data 212 can include some or all of the operational instructions that cause the client device 130 to perform some or all of its functionality. The application data 212 can include prompts and/or information for display via interactive user interface 275. The application data 212 can indicate one or more functions for execution by the client device 130, such as one or more function entries 175. The application data can include, and/or can facilitate access to via network 150, user account 165 of the corresponding user of client device 130 and/or one or more other users to which the user is socially connected; furnishing unit data 166 of furnishing database 163, such as furnishing unit data 166 for furnishing units 110 with which the user is currently interacting and/or has previously interacted; and/or establishment data 167 of establishment database 164 such as the establishment data 167 for an establishment the user is currently visiting or located within, and/or an establishment at which the user owns and/or works, where the user corresponds to an establishment entity of the corresponding establishment.

The application data 212 can be received from the furnishing experience system 100, such as a server system associated with the furnishing experience system 100. The application data 212 can alternatively be received from application marketplace based on the application marketplace receiving the application data from the furnishing experience system 100. The application data 212 can alternatively or additionally integrated within an operating system of client device 130.

Alternatively or in addition to storing and executing application data to perform its functionality, the client device 130 can interact with furnishing experience system 100 via a browser application and/or via a webpage, for example, hosted by a server system of the furnishing experience system 100. For example, prompts are displayed via interactive user interface 275 based on display of this webpage via execution of the browser application.

Figure 4B:
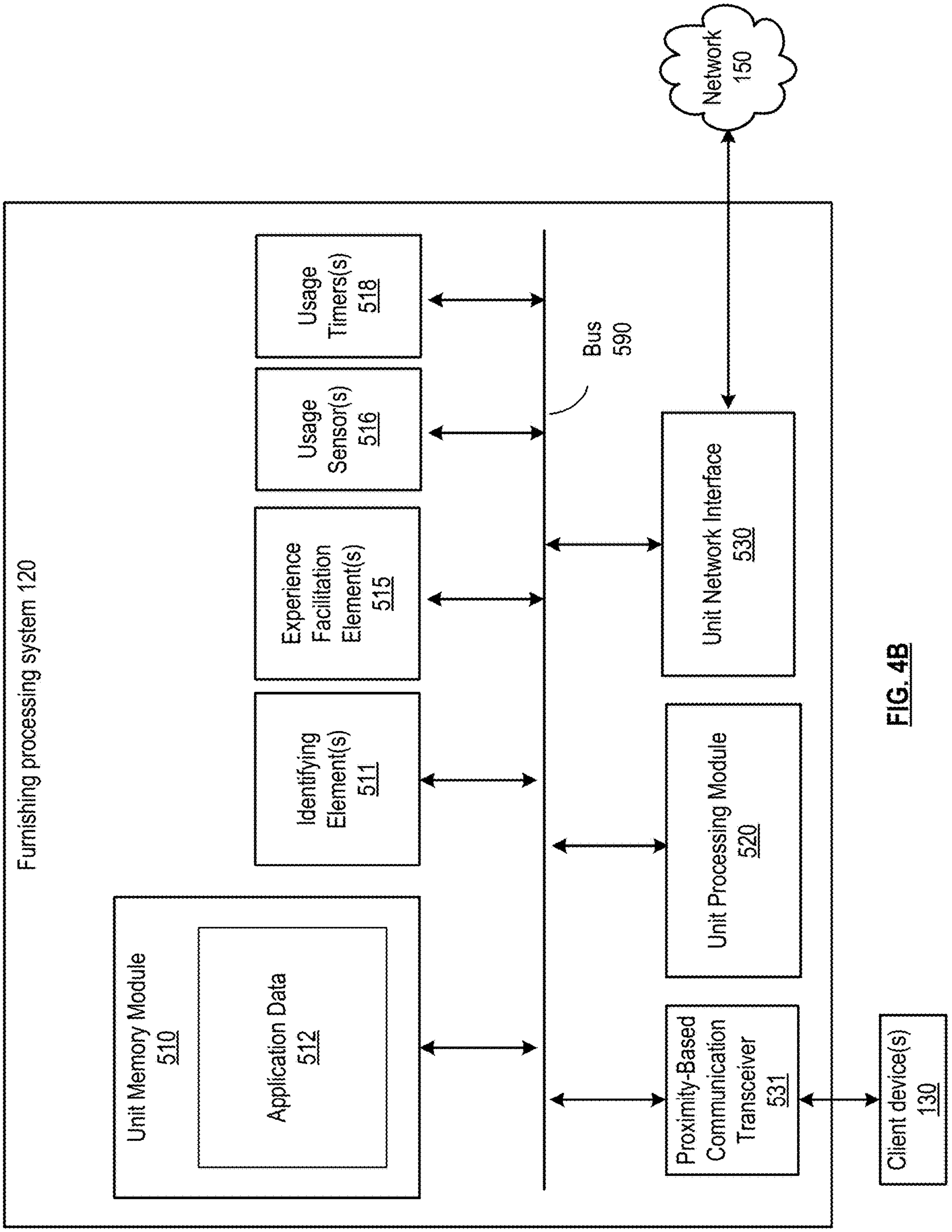
FIG. 4B is a schematic block diagram of a furnishing processing system in accordance with various examples.

FIG. 4B illustrates an embodiment of furnishing processing system 120 of a furnishing unit. Some or all features and/or functionality of the furnishing processing system 120 of FIG. 4B can be utilized to implement some or all other furnishing processing systems 120 and/or furnishing units 110 described herein.

A given furnishing processing system 120 can be implemented via: one or more unit processing modules 520; one or more unit memory modules 510; one or more unit network interfaces 530; one or more proximity-based communication transceivers 531; one or more identifying devices 511, one or more experience facilitation elements 515, one or more usage sensors 516, and/or one or more usage timers 518, communicating via bus 590. The one or more network interfaces 530 can be operable to send and/or receive data via the network 150 and/or via any other communication system. The one or more proximity-based communication transceivers 531 can be operable to send and/or receive the proximity-based communications 160 of FIGS. 2B and/or 2C.

Some or all elements of furnishing processing system 120 can be functional when powered, for example, via a power supply. For example, the furnishing processing system 120 operates based on being powered by a power supply, where the corresponding furnishing unit includes and/or connects to this power supply. The power supply can be implemented by at least one battery, solar panels, a standard outlet connection, a DC power supply, an AC power supply, and/or other power supply. Bus 290 can optionally facilitate delivery of power to some or all elements of furnishing processing system 120 via a common power supply.

Bus 290 can facilitate communication of data between the: one or more unit processing modules 520; one or more unit memory modules 510; one or more unit network interfaces 530; one or more proximity-based communication transceivers 531; one or more identifying devices 511, and/or one or more experience facilitation elements 515. The unit memory module 510 can include memory that stores operational instructions that, when executed by the one or more unit processing modules 520, cause the corresponding furnishing processing system 120 to execute some or all of the functionality described herein. The unit memory module 510 can be implemented via at least one memory, and/or the unit processing module 520 can be implemented via at least one processor.

The one or more identifying devices 511 can include a display device, such as one or more screens, operable to display identifying information of the corresponding one or more furnishing units 110, such as their furnishing unit identification data and/or their product identification data. The display device can optionally display status information, instructions, and/or other information regarding use of and/or configuration of experiences via the corresponding furnishing unit. The display device can optionally display an interactive user interface to enable interaction by a corresponding user, for example, via at least one input device of the furnishing processing system and/or via instructions and/or responses to prompts of the interactive user interface received from a client device 130 communicating with the furnishing units 110.

The one or more identifying devices 511 can include at least one lighting device, such as an array of LEDs and/or one or more other lighting devices described herein. The at least one lighting device can illuminate a proper subset of a plurality of lighting devices, for example, of an array of LEDs, in a particular static pattern, can illuminate one or more lighting devices in one or more particular identifying colors, and/or can dynamically flash and/or change illumination and/or color of one or more lighting devices in a particular identifying pattern.

The one or more identifying devices 511 can alternatively or additionally be operable to emit signals that include identifying information of the corresponding one or more furnishing units 110. In some embodiments, some or all of the identifying devices 511 can be implemented as proximity-based communication transceivers 531.

The one or more identifying devices 511 can alternatively or additionally include a radio frequency identification (RFID) chip with digital data encoded with identifying information of the corresponding one or more furnishing units 110, such as their furnishing unit identification data and/or product identification data. The one or more identifying devices 511 can alternatively or additionally include a near-field communication (NFC) tag and/or can be operable emitting a signal with digital data encoded with identifying information of the corresponding one or more furnishing units 110, such as their furnishing unit identification data and/or product identification data, in accordance with an NFC communication protocol.

The one of more identifying devices 511 can alternatively or additionally include a microchip storing the furnishing unit identification data 350 as digital data, for example, in the predetermined data format, that is conveyed when in proximity to another device, such as the client device 130, providing energy to an identifying device 511, where the identifying device 511 emits the digital data based on being energized by the other device. For example, this other device is implemented via an NFC reader and/or a RFID reader implemented by client device 130 and/or a coil and/or antenna of client device 130 emitting an electromagnetic field. The one of more identifying devices 511 can alternatively or additionally emit the digital data based on electromagnetic induction and/or based on inductive coupling between a coil of the other device in the vicinity and a coil of the identifying device, where the coil of the other device and/or of the identifying device is a copper coil or other coil. For example, an electromagnetic field emitted by the other device is modulated with the digital data stored on the microchip of the identifying device 511 based on the other device being in proximity to the identifying device 511.

The one or more identifying devices 511 can alternatively or additionally include a Bluetooth Beacon transmitting a Bluetooth signal with digital data encoded with identifying information of the corresponding one or more furnishing units 110, such as their furnishing unit identification data and/or product identification data. The one or more identifying devices 511 can alternatively or additionally include a Bluetooth Beacon transmitting a Bluetooth signal with digital data encoded with identifying information of the corresponding one or more furnishing units 110, such as their furnishing unit identification data and/or product identification data.

The one or more identifying devices 511 can include any transmitter that transmits with identifying information of the corresponding one or more furnishing units 110, such as their furnishing unit identification data and/or product identification data, for example, in accordance with a short range communication protocol.

In some embodiments, alternatively or in addition to an identifying device 511, the corresponding furnishing unit has a corresponding static visual identifier, such as a QR code, bar code, or other identifying information upon the surface of, attached to, and/or in proximity of the corresponding furnishing unit 110, where this identifying information is visible and by a user and/or camera of a corresponding client device 130.

The one or more experience facilitation elements 515 can correspond to devices that are operable to generate various types of output that facilitate a furnishing experience for a corresponding user, such as: one or more heating elements supplying heat to a user; one or more cooling elements such as fans, air conditioning system, misting-based cooling and/or water-based cooling elements, ventilation elements, or other elements utilized to cool the user; one or more lighting elements supplying lighting to a user; one or more speakers or other audio output elements supplying music or other audio content to the user; one or more vibration elements or other mechanical elements supplying a massage or other tactile experience to the user; one or more display devices supplying video content, gaming content, entertainment content, or other visual experiences to the user; one or more virtual reality and/or augmented reality devices supplying a virtual reality and/or augmented reality experience to the user; one or more controllers that include one or more knobs, buttons, touchscreens, or other input devices enabling user configuration of their experience via the furnishing unit 110; one or more power output elements such as charging ports such as USB and/or USC-C ports and/or wireless charging surfaces operable to charge and/or deliver power to other devices, such as client device 130, other devices of a corresponding user having a rechargeable battery, and/or other furnishing units 110 and/or other devices in proximity; and/or other devices operable to generate other types experiences for a corresponding user.

Some or all experience facilitation elements 515 and/or corresponding furnishing experiences discussed herein can be implemented via some or all features and/or functionality of the heating element and/or corresponding heating supplied by furnishing units described in U.S. patent application Ser. No. 17/457,098, entitled "HEATING-CAPABLE FURNISHING UNIT", filed Dec. 1, 2021, which is incorporated herein by reference its entirety and made part of the present U.S. Utility Patent Application for all purposes.

The one or more usage sensors 516 can include sensors configured to detect whether a user is currently engaging in a proximity-based interaction with the furnishing unit 110. A usage sensor can be implemented via a pressure sensor and/or a weight detection sensor, for example, configured to detect whether someone is sitting in a chair or other seating furnishing corresponding to the furnishing unit 110. In some embodiments, if the chair or other seating furnishing includes a corresponding resistive heating element, a corresponding heating circuit can detect a user is sitting in the chair or other seating furnishing based on detecting a change in resistance, capacitance, and/or inductance. In some embodiments, an IR sensor and/or occupancy sensor can be implemented a or more usage sensors 516 to detect whether a user is within a physical distance of the furnishing unit 110. A usage sensor can optionally be implemented as proximity-based communication transceiver 531, where usage sensor data corresponds to short-range communications received from a client device 130 and/or pairing with a client device 130. These short-range communications can correspond to a user electing and/or paying to reserve the furnishing unit 110 and/or claim the furnishing unit 110 for their use. A usage sensor 516 can optionally be implemented via unit network interface 530, where usage sensor data corresponds to communications received from client device 130 and/or furnishing experience system 100 via network 150. For example, these communications can be generated by furnishing experience system 100 and/or a seat assignment system local to the corresponding establishment indicating assignment of a user to the furnishing unit 110.

The experience facilitation elements 515 can optionally require a payment transaction by a user's client device, for example, with the furnishing processing system 120 and/or furnishing experience system 120. For example, given experience facilitation elements 515 is turned on and/or becomes configurable by a given user when a corresponding user is determined to have paid for, reserved, and/or been assigned to the experience facilitation elements 515, for example, based on this payment confirmation being determined via a usage sensor 516.

Usage data collected by the one or more usage sensors 516 indicating whether or not a user is currently using the furnishing unit 110, such as whether or not a user is currently sitting upon the furnishing unit and/or is communicating with the furnishing unit 110 via short range communications, and/or is otherwise detected to be engaging with the furnishing unit via a proximity-based interaction 111 can be transmitted by the furnishing unit 110 to the furnishing experience system 100. The usage data is optionally transmitted to a point of sale system or other system local to the corresponding establishment to indicate usage of furnishing units 110 within the establishment, for example, indicating how many chairs and/or tables of the establishment are currently occupied. In some embodiments, furnishing experiences are only facilitated via furnishing processing system 120 and/or furnishing experience system 100 for a user when the user is detected to be currently sitting on, in proximity to, and/or otherwise using the furnishing unit 110, and/or is detected to have reserved, been assigned to, and/or paid for usage of the furnishing unit 110. This usage data of a given furnishing unit 110 be implemented as current status data 653.

The one or more usage timers 518 can correspond to timing devices and/or other timers indicating a countdown and/or remaining allotment of time for a user's usage of the furnishing unit 110 and/or the user's engagement in the corresponding furnishing experience 110. For example, a user can pay or otherwise elect to reserve the furnishing unit, and/or can be assigned to use the furnishing unit, for a predetermined maximum and/or configured amount of time, where the maximum and/or configured amount is configured by the user, by the corresponding establishment, and/or by the furnishing experience system. The amount of time remaining, and/or a corresponding user identifier for a user using the furnishing unit in conjunction with this amount of time remaining, can be implemented as current status data 653.

A usage timer 518 can be set and/or can start its countdown based on usage sensor data indicating a corresponding user has begun its allotted usage of the furnishing unit 110. The experience facilitation elements 515 can be further controlled in accordance with a corresponding usage timer 518. For example, a given experience facilitation elements 515 shut off and/or are no longer configurable by a given user when a corresponding usage timer 518 elapses.

As a particular example, the user pays to control the heating element of the furnishing processing system 120 to enable heat to be provided to the user for 30 minutes, where the heating automatically ends after the 30 minutes based on the usage timers 518 and/or ends unless the user pays for additional heating time via payment communication with the furnishing processing system 120 and/or the furnishing experience system 100. As another example, the user reserves usage of the furnishing unit 110 for one hour, where the furnishing unit 110 becomes available for usage by other users after the one hour based on the usage timers 518 indicating elapsing of the user's reservation of the furnishing unit 110. As another example, the furnishing experience system 100 only facilitates furnishing experiences for a given user if the current status data 653 of the corresponding furnishing unit 110 indicates the user still has usage time remaining via usage timers 518. In other embodiments, there is no time limit placed on a user's usage of the furnishing unit and/or there is no time limit placed on facilitating furnishing experiences for a given user of a furnishing unit 110.

The memory module 510 can optionally store application data 212 corresponding to the furnishing experience system 100. The application data, when executed by the furnishing experience system 100, can cause the furnishing processing system 120 to perform some or all functionality described herein. The application data 212 can include some or all of the operational instructions that cause the furnishing experience system 100 to perform some or all of its functionality. The application data 212 can be received from the furnishing experience system 100, such as a server system associated with the furnishing experience system 100. The application data 212 can alternatively be preinstalled in memory of the furnishing processing system 120.

FIGS. 5A-5J illustrate embodiments where furnishing experiences are facilitated based on a client device collecting furnishing unit identification data 350 indicating a furnishing unit 110 based on being in proximity of this furnishing unit, for example, as part of the proximity-based interaction 111.

FIG. 5A illustrates an embodiment of a client device that determines and processes furnishing unit identification data. Some or all features and/or functionality of the client device 130 of FIG. 5A can be utilized to implement some or all other embodiments of client device 130 described herein.

Furnishing unit identification data 350 can be determined by a given client device 130 based on being in proximity of this furnishing unit 110. Based on determining the furnishing unit identification data 350, the client device 130 can display experience option data 320, for example, via interactive user interface 275, which can indicate a set of options for a corresponding furnishing experience. The furnishing unit identification data 350 can be implemented as, can indicate, and/or can be processed to determine: furnishing unit identifier 650; product identifier 652; and/or establishment identifier 610 of the corresponding furnishing unit 110.

The client device 130 can generate experience selection data 322 based on user input to the interactive user interface 275. Experience selection data 322 can indicate selection of one or a set of options indicated in experience option data 320 and/or can otherwise indicate selection and/or configuration of a corresponding furnishing experience based on responses to one or more prompts displayed via interactive user interface 275 in conjunction with presenting the experience option data 320.

Experience option data 320 displayed via interactive user interface 275 can be implemented as and/or based on the experience option data 655 of a corresponding furnishing unit data 166 of the given furnishing unit 110, as denoted by a furnishing unit identifier 650 of the furnishing unit identification data 350. Experience option data can be alternatively or additionally be implemented as and/or based on the experience option data 655 of a corresponding product data 169, as denoted by a product identifier 652 of the furnishing unit identification data 350.

In some embodiments, some or all experience option data 320 displayed via interactive user interface 275 can indicate and/or be based on experience recommendation data 586, such as recommended options for the user indicated in the experience recommendation data 586. For example, the experience option data can be ordered and/or ranked in accordance with accordance with recommendation scores. As another example, the experience option data indicates a proper subset of options based on ones of the set of experience option data indicated in recommendation data 586 and/or with a recommendation score that compares favorably to a recommendation threshold. The user can elect whether or not to view their options in accordance with the recommendation options, and can optionally elect to instead view the full set of experience options, such as all experience option data 655 of a corresponding furnishing unit 110 and/or product.

At least one furnishing experience facilitation processing module 325 can facilitate the corresponding furnishing experience for the user based on the experience selection data 322. This can include generating, transmitting, and/or displaying furnishing experience data 324 in conjunction with facilitating the corresponding furnishing experience for the user. The furnishing experience facilitation processing module 325 can be implemented via at least one processor and/or at least one memory of: the client device 130 that generated the experience selection data 322; a furnishing experience system 100 that receives the experience selection data 322 that was generated by the client device, where the client device transmitted the experience selection data 322 via network 150, a furnishing processing system 120 that receives the experience selection data 322 that was generated by the client device, where the client device transmitted the experience selection data 322 via network 150 and/or via proximity-based communications 160; and/or another computing system that receives the experience selection data 322 and utilizes at least one processor and/or at least one memory to generate, display, and/or transmit the furnishing experience data 324 and/or to otherwise facilitate the corresponding furnishing experience for the user based on the experience selection data 322.

FIG. 5B illustrates how client devices 130 within a given physical space, such as a given establishment, can determine furnishing unit identification data 350 for one or more furnishing units based on being in physical proximity of these one or more furnishing units. Display of experience option data 320 and/or generating of experience selection data 322 can be performed by a given client device 130 as it determines furnishing unit identification data 350 for some or all furnishing units 110 with which it comes into physical proximity as a corresponding user moves through the physical space over time. Some or all features and/or functionality of the client devices 130 of FIG. 5B can be utilized to implement some or all other embodiments of client device 130 described herein.

FIG. 5C illustrates an embodiment of a furnishing unit 110 that includes an identifier conveyance unit 201. Some or all features and/or functionality of the client device 130 of FIG. 5C can be utilized to implement the client device of FIG. 5A some or all other embodiments of client device 130 described herein. Some or all features and/or functionality of the furnishing unit of FIG. 5C can be utilized to implement the furnishing unit of FIG. 5A some or all other embodiments of furnishing unit 110 described herein. Some or all features and/or functionality of the identifier conveyance unit 201 of FIG. 5C can be utilized to implement the identifying device 511 of FIG. 4B some or all other embodiments of identifying device 511 described herein.

An identifier conveyance unit 201 of furnishing unit can be mounted upon, attached to, integrated within, inscribed and/or etched upon, and/or otherwise included in and/or upon furnishing unit 110. The identifier conveyance unit 201 can convey the furnishing unit identification data 350, for example, visibly, audibly, tactilely, as an emitted signal, and/or via other means that can be collected and processed by an identifier input element 255 of client device 130.

While FIG. 5C depicts the furnishing unit 110 as having its identifier conveyance unit 201 located upon a chair arm of a corresponding seating unit implemented as furnishing unit 110, the furnishing unit 110 can include identifier conveyance unit 201 within and/or upon any other part of furnishing unit 110, which can be implemented as a chair, table, or any other type of furnishing unit described herein. While FIG. 5C depicts the furnishing unit 110 as having a single identifier conveyance unit 201, the furnishing unit 110 can include any number of identifier conveyance unit 201 of the same or different type in the same or different location of furnishing unit 110. Examples of identifier conveyance unit 201 are discussed in further detail in conjunction with FIGS. 5G-5I.

A given identifier conveyance unit 201 can be permanently included within and/or upon to the corresponding furnishing unit based on being embedded in, engraved in, screwed to, permanently adhered to, and/or otherwise permanently attached to and/or integrated within the furnishing unit 110. Alternatively, a given identifier conveyance unit 201 can be temporarily attached to the given furnishing unit, for example, as a detachable sticker, panel, and/or other element. In such embodiments, the given identifier conveyance unit 201 can optionally be configured to be removable, can be configured to be exchanged with a different identifier conveyance unit 201 at a later time to enable updating of a given furnishing unit's identifier conveyance unit 201, and/or can be configured to be relocated for inclusion within and/or upon a different furnishing unit 110 at a later time to enable updating of a given identifier conveyance unit's furnishing unit that it identifies.

The furnishing unit identification data 350 can be conveyed by identifier conveyance unit 201 for collection, extraction, and/or further processing by an identifier input element 255 of a client device 130 in sufficient physical proximity, such as a proximity required for a corresponding proximity-based interaction 111. For example, the identifier conveyance unit 201 can be configured to convey furnishing unit identification data 350 for collection and processing by client devices only if identifier conveyance unit 201 is within view of the identifier input element 255, only if identifier conveyance unit 201 is within communications range of the identifier input element 255, and/or only if furnishing unit identification data 350 conveyed by identifier conveyance unit 201 can be seen, heard, received, felt, and/or otherwise sensed and/or collected by identifier input element 255.

The furnishing unit can optionally include instructions, symbols, and/or visual information upon and/or near the identifier conveyance unit 201, for example, that can be visually observed by a user to enable the user to locate the portion of the furnishing unit that conveys the furnishing unit identification data 350. For example, the user determines the identifier conveyance unit 201 is located upon the top of a chair arm of the furnishing unit based on identifying words and/or symbols printed in this location, and positions their client device near and/or facing this the top of this chair arm to enable the identifier input element to collect the furnishing unit identification data 350 conveyed by the identifier conveyance unit 201 accordingly.

A client device 130 can thus determine the furnishing unit identification data 350 via its identifier input element 255, which can include at least on sensing device and/or hardware and/or software operable to collect and/or extract the furnishing unit identification data 350 based on being in proximity to identifier conveyance unit 201 conveying this furnishing unit identification data 350. The identifier input element 255 can be implemented as at least one input device and/or sensor device, such as a camera, receiver, communications interface, touchscreen, keyboard, mouse, and/or microphone. The identifier input element 255 can be implemented via hardware and/or software preloaded and/or preinstalled upon a corresponding client device 130, such as the camera, touchscreen, communications interface, touchscreen, keyboard, mouse, and/or microphone of a corresponding smart phone, tablet, and/or wearable device.

The data conveyed by identifier conveyance unit 201 can optionally alternatively or additionally include some or all other types of information of furnishing unit data 166 and/or product data 169 for the corresponding furnishing unit 110. Alternatively or in addition, the identifier input element 255 can collect and/or extract other types of information of furnishing unit data 166 the corresponding furnishing unit 110 based on the information conveyed via the identifier conveyance unit 201.

The data conveyed by identifier conveyance unit 201 can alternatively or additionally include information and/or instructions for executing corresponding application data enabling selection of experience data and/or facilitation of corresponding furnishing experiences. Such information and/or instructions conveyed by identifier conveyance unit 201, when received and processed by identifier input element 255, can enable the client device 130 to: open, download, and/or install a corresponding application corresponding to the furnishing experience system 100; download and/or execute a corresponding portion of this application data not requiring full installation, such as an App Clip and/or an Instant App; determine a hyperlink for a website hosted by a server system corresponding to the furnishing experience system 100 and/or automatically visit the corresponding webpage via a web browser of the client device; identify information the corresponding furnishing unit via its furnishing unit identifier and/or product identifier and automatically populate a corresponding field in the application and/or to execute the application accordingly; establish proximity-based communications 160 between the client device 130 and the furnishing unit 110; and/or perform other operations as necessary in: facilitating the determination of experience option data for the furnishing unit, facilitating the display of the experience option data for the furnishing unit; facilitating generation of the experience selection data; facilitating transmission of the experience selection data to the furnishing unit directly and/or to the furnishing experience system 100; and/or otherwise facilitating a selected furnishing experience.

The identifier conveyance unit 201 can convey furnishing unit identification data 350, some or all other information of furnishing unit data 166 and/or product data 169 for the corresponding furnishing unit 110, and/or some or all other information and/or instructions for facilitating furnishing experiences, in accordance with a predetermined data format. Alternatively or in addition, the identifier input element 255 can determine the furnishing unit identification data 350, some or all other information of furnishing unit data 166 and/or product data 169 for the corresponding furnishing unit 110, and/or some or all other information and/or instructions for facilitating furnishing experiences, in accordance with the predefined data format, even if the furnishing unit identification data 350 was not conveyed in accordance with this predefined data format. This predefined data format can be implemented as and/or can be based on quick response (QR) code, a barcode, text and/or numeric data, image data, a record of a relational or non-relational database, HTML data, JSON data, a hyperlink, NFC data, RFID data, and/or data in accordance with any data format and/or communications protocol. This predefined format can optionally include encoding and/or encryption of the corresponding furnishing unit identification data 350, for example, in accordance with a NFC communication protocol other communication protocol implemented by identifier conveyance unit 201 and/or identifier input element 255, where the identifier input element 255 is operable to decode and/or decrypt this information to extract relevant information of furnishing unit identification data 350 such as the furnishing unit identifier, product identifier, and/or other information of furnishing unit data 166 and/or product data 169 for the corresponding furnishing unit 110 included in and/or indicated by furnishing unit identification data 350.

This collection and/or extraction of furnishing unit identification data 350 and/or other information conveyed by an identifier conveyance unit 201 of a furnishing unit by an identifier input element 255 of a client device 130 can be implemented as a proximity-based interaction 111 between this furnishing unit and this client device. Once the furnishing unit identification data 350 is collected and/or extracted by the client device 130, it can then be used to enable selection of and/or facilitation of a corresponding furnishing experience as discussed previously.

In some embodiments, the client device implements identifier input element 255 in accordance with execution of application data corresponding to the furnishing experience system 100. For example, this application data corresponds to a mobile application that was previously downloaded to client device 130 from an application marketplace. While this application data is being executed, the client device is operable to invoke sensors of client device 130 implementing identifier input element 255 to collect furnishing unit identification data 350 and/or can perform processing of collected data to extract furnishing unit identification data 350, enabling furnishing units 110 in the proximity to be identified.

In other embodiments, the client device implements identifier input element 255 automatically, without application data corresponding to the furnishing experience system 100 being necessarily predownloaded and/or executed. For example, in conjunction with normal operations and/or execution with another application not associated with the furnishing experience system 100, the identifier conveyance unit 201 automatically collects and/or extracts furnishing unit identification data 350. For example, a QR code conveyed by identifier conveyance unit 201 and/or implementing furnishing unit identification data 350 is automatically identified via a camera of client device 130 and/or corresponding processing of collected image data by the camera via use of a camera application executed by the client device 130. As another example, an NFC reader implementing identifier input element 255 automatically detects and processes furnishing unit identification data 350 in normal operation of client device 130 based on client device 130 being in close physical proximity to an NFC tag implementing the identifier conveyance unit 201 and/or based on an NFC reader application of the client device 130 being executed.

In such embodiments where furnishing unit identification data 350 is automatically collected and/or extracted without application data corresponding to furnishing experience system 100 being open and/or currently executing, client device 130 optionally displays a prompt via its display device, where user interaction with the prompt enables the user to elect to visit a corresponding webpage, to open a predownloaded application corresponding to furnishing experience system 100, and/or to download and install the corresponding application data for execution, via interaction with a prompt displayed via a display of the client device 130, for example, based on data embedded in embedded in and/or extracted from an automatically detected QR code and/or the automatically detected NFC communications via the NFC reader. The display of experience option data 320, and/or the selection and facilitation of one or more corresponding furnishing experiences, can then be facilitated in conjunction with display of the corresponding webpage and/or execution of the corresponding application data, once downloaded if necessary, based on the user interaction with the prompt to open the webpage, download the application, and/or open the application.

Alternatively or in addition, rather than necessitating download and installation of the full application data corresponding to the furnishing experience system 100, for example, via an authenticated process and/or in response to the user electing to download the application data corresponding to the furnishing experience system 100, a portion of the application data can be automatically downloaded and/or executed based on the identifier input element 255 collecting and/or extracting furnishing unit identification data 350, for example, from an automatically detected QR code and/or the automatically detected NFC communications via the NFC reader. In some cases, this portion of the application data is automatically downloaded from an application marketplace via an unauthenticated process, and/or without necessitating user interaction with the display device to elect and/or confirm this application data be downloaded and installed, and/or without downloading and installing the full application associated with the furnishing experience system 100, where the display of experience option data 320, and/or the selection and facilitation of one or more corresponding furnishing experiences, can then be facilitated in conjunction with display of a corresponding graphical user interface and corresponding processing via the automatic execution of this partial application.

As a particular example, the experience option data 320 is automatically displayed in response to automatic download of the portion of the application data as an App Clip by a client device implemented as an iPhone and/or implemented by operating in accordance with iOS. As another particular example, the experience option data 320 is automatically displayed in response to automatic download of the portion of the application data as an Instant App by a client device implemented as an Android device.

For example, the user is presented with a graphical user interface to configure heating by the furnishing unit 110 based on download of a corresponding partial application to enable the user to quickly configure heating without waiting for a corresponding application to install in its entirely. In some embodiments, a user of the client device can later elect to download and install the full application associated with the furnishing experience system 100 for selection and facilitation of future furnishing experiences with the same or different furnishing unit.

In some embodiments, after furnishing unit identification data 350 is determined, the furnishing unit identification data 350 is saved locally upon client device 130 and/or is saved to the user's user account 165, for example, as user-based furnishing experience history 512 as discussed previously, even if a corresponding furnishing experience is not facilitated. This can include saving information indicated by the furnishing unit identification data 350 for future use such as: the corresponding furnishing unit identifier 650; the corresponding product identifier 652; a corresponding QR code; the corresponding pairing instructions used to establish a communications channel with the furnishing unit; corresponding application data that is downloaded, installed, and/or executed in conjunction with facilitating a corresponding furnishing experience; corresponding weblinks to a webpage that, when visited by via a browser application of the client device, enables selection of experience selection data in conjunction with facilitating a corresponding furnishing experience; and/or other information. In some cases, this information is saved for access even after the proximity-based interaction 111 and/or corresponding proximity-based communications 160 between the client device 130 and the corresponding furnishing unit 110 elapse, for example, based on the user no longer using the furnishing unit 110 and/or based on the user and their client device no longer being in proximity with the furnishing unit 110, for example, based on leaving a corresponding establishment.

For example, the client device 130 can automatically facilitate reestablishing of the proximity-based communications 160 with the furnishing unit at a later time once the user is again in contact with the furnishing unit, without some or all furnishing unit identification data 350 needing be re-received, re-processed and/or re-authenticated, based on the accessing the saved furnishing unit identification data 350 in memory of their client device 130 and/or via access to their user account 165. This can include re-executing corresponding application data to present experience option data 320 based on a previously installed full application and/or based on a previously downloaded partial application, and/or can include applying previously selected experience selection data 322 automatically, for example, sent to the furnishing unit automatically to control the furnishing unit at this later time, without re-prompting the user to make this selection via the presentation of the experience option data 320.

As another example, a client device can enable control of a given furnishing unit with saved furnishing unit identification data 350 remotely, for example, via Internet communications and/or via routing via furnishing experience system 100. For example, an owner of one or more furnishing units 110 is presented via interactive user interface 275 after they leave the corresponding establishment and/or while otherwise not in proximity with the one or more furnishing units based on accessing the corresponding saved furnishing unit identification data 350 in memory of their client device 130 and/or via access to their user account 165, where interaction with this interactive user interface 275 enables the user to turn off experience facilitation elements 515 of these furnishing units, set timers and/or schedules for configuration of experience facilitation elements 515 of these furnishing units 110, retrieve unit-based furnishing unit history 640 or other information collected by these furnishing units, or configure and/or gather information relating to these furnishing units remotely.

As another example, a client device can enable other furnishing experience corresponding to the given furnishing unit with saved furnishing unit identification data 350 remotely. A client device 130 of a visitor to an establishment collects furnishing unit identifier data 350 of a furnishing unit 110 at the establishment, for example, in conjunction with a corresponding furnishing experience and/or proximity based interaction 111 while at the establishment. After leaving the establishment and/or after the proximity-based interaction 111 otherwise ends, a same or different furnishing experience can be facilitated remotely based on accessing the corresponding saved furnishing unit identification data 350 in memory of their client device 130 and/or via access to their user account 165. For example, a purchasing experience, such as purchase of the furnishing unit or one of the other furnishing units that were nearby, is facilitated for the user using the furnishing unit identification data 350 once the user is home and has had time to contemplate the purchase. As another example, a social experience is facilitated via chat communications between two users that previously connected while having proximity-based interaction 111 with respective furnishing units, even after one or both users are no longer in proximity to these furnishing units.

FIG. 5D illustrates an embodiment of a client device that generates experience selection data based on furnishing unit identification data. Some or all features and/or functionality of the client device 130 of FIG. 5D can be utilized to implement the client device of FIG. 5A some or all other embodiments of client device 130 described herein. An identifier input element 255 can collect and/or determine furnishing unit identification data 350.

Client processing module 220 can process furnishing unit identification data 350 to determine corresponding experience option data 320. Client processing module 220 can facilitate display of experience option data 320 via client display device 270 based on determining the furnishing unit identification data 350. A client input device 250 can be utilized to generate user input in response to at least one prompt displayed in conjunction with experience option data 320, for example, to facilitate interaction with a corresponding interactive user interface 275. This client input device 250 can optionally be a touchscreen, one or more buttons, mouse, and/or a keyboard, and/or can be the same as or different from the identifier input element 255. Experience selection data 322 is generated based on the user input, and is transmitted by client network interface 230 to furnishing experience system 100 via network 150 for processing via furnishing experience facilitation processing module 325.

Figure 5E:
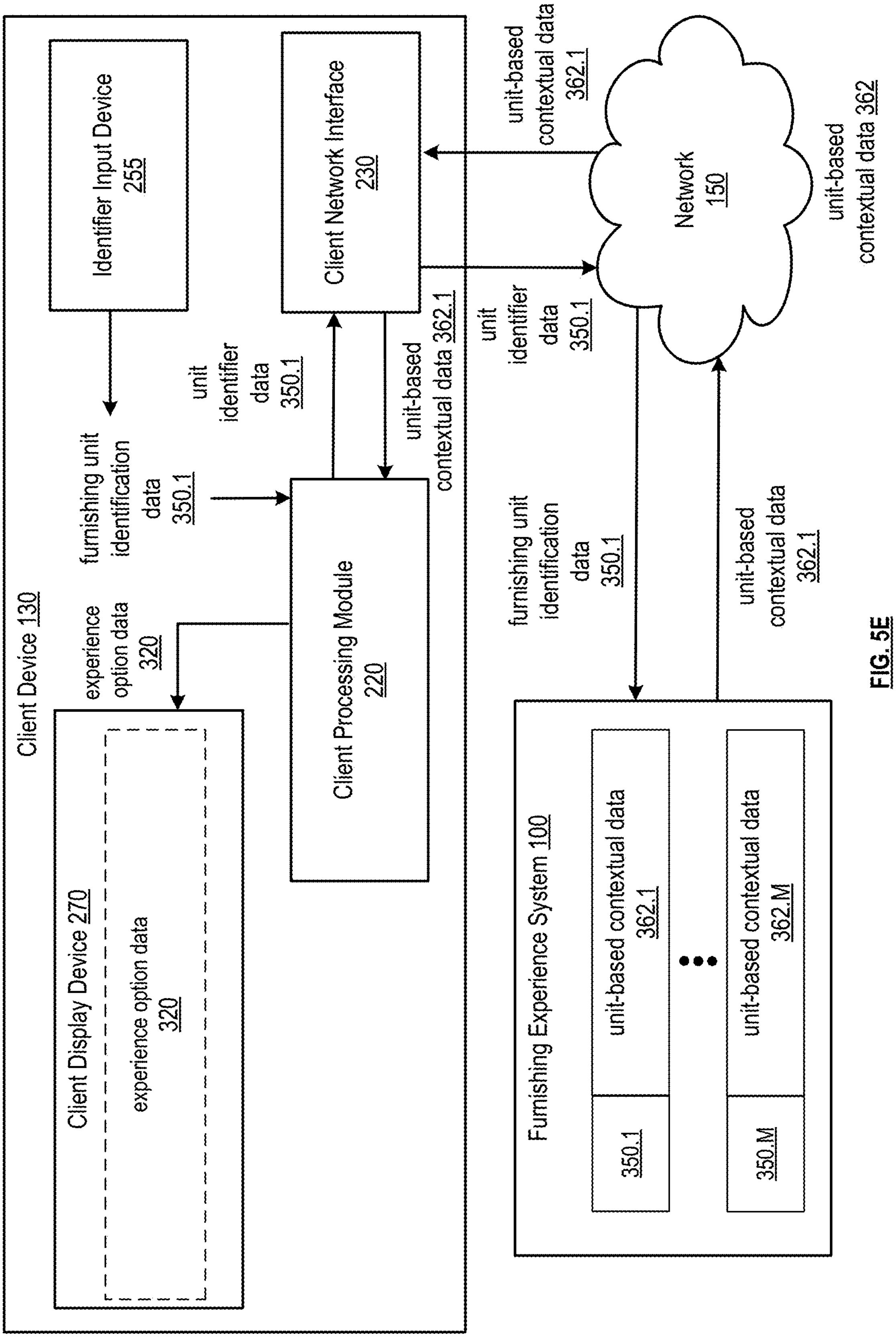

FIG. 5E illustrates another embodiment of a client device that generates experience selection data based on furnishing unit identification data. Some or all features and/or functionality of the client device 130 of FIG. 5E can be utilized to implement the client device 130 of FIG. 5A and/or some or all other embodiments of client device 130 described herein.

Once given furnishing unit identification data 350.1 is collected and/or determined via identifier input element 255 and/or client processing module 220 as the furnishing unit identification data 350.1 can be transmitted to furnishing experience system 100. The furnishing experience system 100 stores unit-based contextual data 362.1-362.M for various furnishing units 110, mapped to identifiers of their furnishing unit identification data 350 via at least one memory, and can send the particular unit-based contextual data 362.1 for the given furnishing unit based on its furnishing unit identification data 350.1. The client display device 270 can display experience option data 320 indicated by and/or based on processing of the unit-based contextual data 362.1.

For example, the furnishing experience system 100 accesses particular furnishing unit data 166 of furnishing database 163 based on a furnishing unit identifier 650, product identifier 652, and/or establishment identifier 610 of furnishing unit identification data 350 to determine the corresponding unit-based contextual data 362. As another example, the furnishing experience system 100 accesses particular product data 169 of product database 168 based on a product identifier 652 of furnishing unit identification data 350 to determine experience option data 655 as the unit-based contextual data 362.

This process of sending the furnishing unit identification data 350 to the furnishing experience system 100 and receiving unit-based contextual data 362 from the furnishing experience system 100 in response can optionally be utilized to implement the processing of furnishing unit identification data 350 to display experience option data 320 of FIG. 5D. Alternatively, the processing of furnishing unit identification data 350 to display experience option data 320 can be based on accessing similar unit-based contextual data 362 in local memory of the client device, for example, stored in conjunction with application data 212, and/or otherwise determining the experience option data 320 without sending the furnishing unit identification data 350 to the furnishing experience system 100.

Figure 5F:
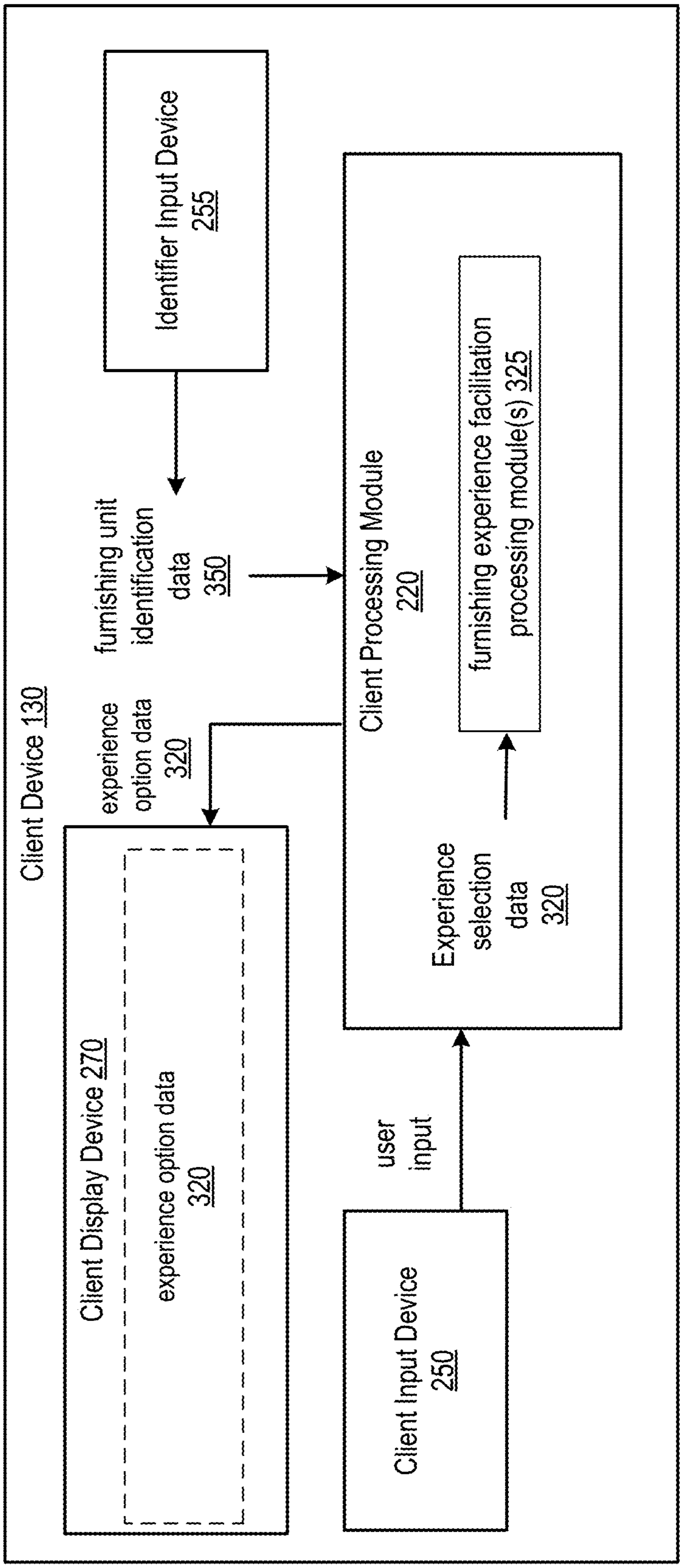
FIG. 5F is a schematic block diagram of a client device in accordance with various examples.

FIG. 5F illustrates another embodiment of a client device that generates experience selection data based on furnishing unit identification data. Some or all features and/or functionality of the client device 130 of FIG. 5F can be utilized to implement the client device 130 of FIG. 5A and/or some or all other embodiments of client device 130 described herein.

One or more furnishing experience facilitation processing modules 325 can be implemented via client processing module 220, for example, based on execution of the application data 212. Furnishing unit identification data 350 is processed to determine the experience option data as illustrated in FIGS. 5D and/or 5E, and the experience option data is displayed accordingly. User input to client device based on display of experience option data can be utilized to determine experience selection data 320 as discussed in conjunction with FIG. 5D. Experience selection data 322 determined via user input can be utilized by one or more furnishing experience facilitation processing modules 325 to facilitate the corresponding furnishing experience.

Figure 5G:
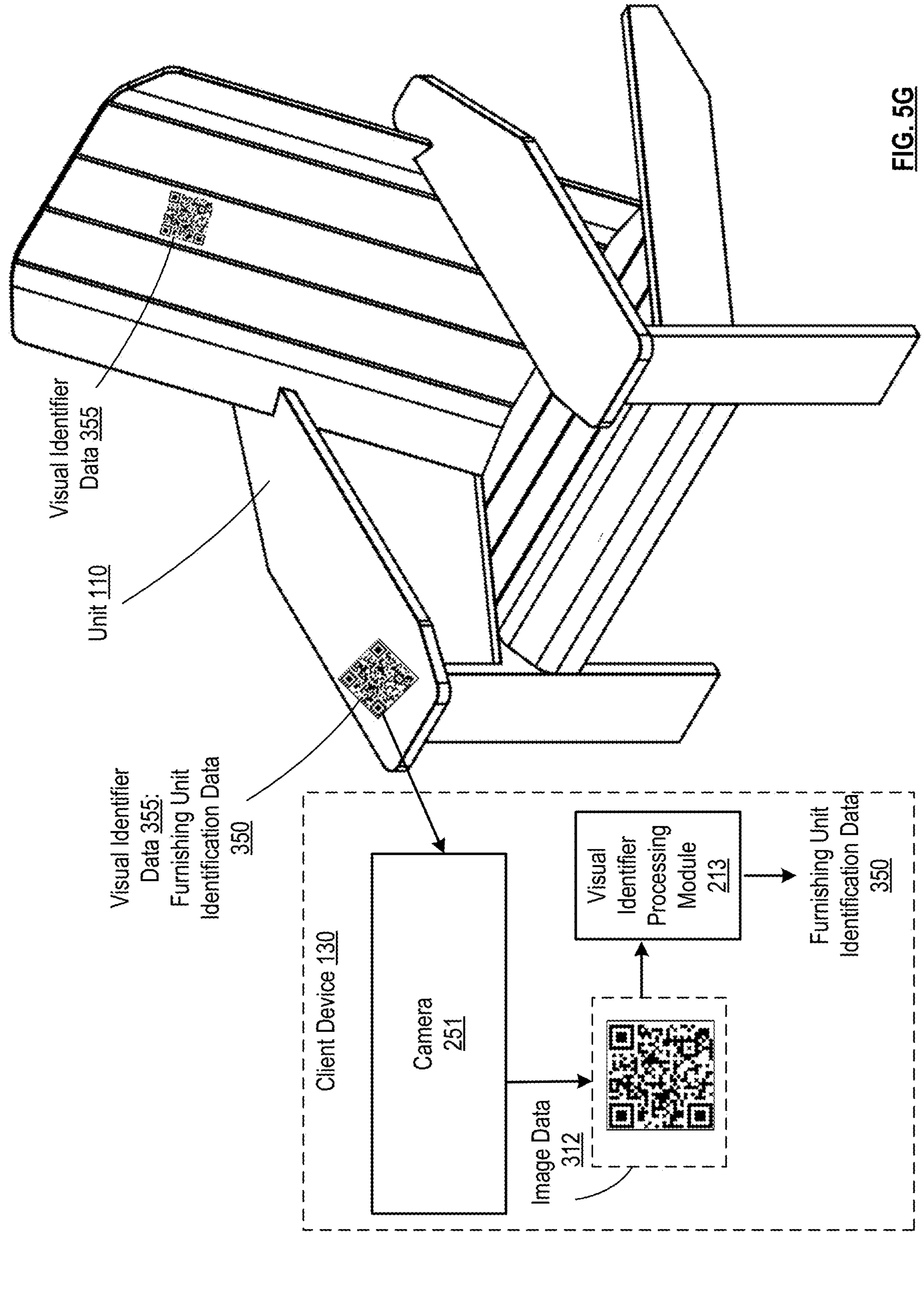
FIG. 5G is a schematic block diagram illustrating determination of furnishing unit identification data based on visual identifier data in accordance with various examples.

FIG. 5G illustrates an embodiment of client device 130 that determines furnishing unit identification data 350 based on processing visual identifier data 355 attached to, mounted upon, and/or presented upon the surface of a corresponding furnishing unit 110. Some or all features and/or functionality of the client device 130 of FIG. 5G can be utilized to implement the client device 130 of FIG. 5A and/or some or all other embodiments of client device 130 described herein. Some or all features and/or functionality of the furnishing unit 110 of FIG. 5G can be utilized to implement the furnishing unit 110 of FIG. 5A and/or some or all other embodiments of furnishing unit 110 described herein. Some or all features and/or functionality of the visual identifier data 355 of FIG. 5G can be utilized to implement the identifier conveyance unit 201 of FIG. 5C and/or some or all other embodiments of identifier conveyance unit 201 described herein.

Visual identifier data 355 can be implemented as a QR code, barcode, or other unique code, name, shape, display, one or more colors, alphanumeric pattern, and/or other visually identifiable data presented upon furnishing unit 110 as discussed previously. A camera 251 of client device 130 can implement the identifier input element 255, and can collect image data 312 capturing the corresponding visual identifier data 355. A visual identifier processing module 213 can be implemented via identifier input element 255 and/or client processing system 220, can be operable to extract furnishing unit identification data 350 from the image data 312, for example, based on performing an image processing function and/or based on communicating via network 150 to determine the furnishing unit identification data from the image data 312, for example, based on sending the image data 312 to furnishing experience system 100 for processing to identify the corresponding furnishing unit and/or based on locally processing image data 312 to identify the corresponding furnishing unit. Visual identifier processing module 213 can be implemented to perform a visual identifier processing function 707.

Alternatively to utilizing a camera, if the visual identifier data 355 can be feasibly processed via a corresponding user based on being implemented as text such as a short name or code, an identifiable shape, or other easily distinguishable visual identifier, the user can type, dictate, and/or other enter the corresponding furnishing unit identification data 350 via keyboard, microphone, and/or touchscreen input. The user can optionally draw and/or select a shape or symbol of the visual identifier data 355 from a plurality of options presented via an interactive user interface 275 to enter the corresponding furnishing unit identification data 350.

Other visual information can be presented upon the furnishing unit 110 in conjunction with visual identifier data 355, such as displayed instructions for receiving furnishing experience via the furnishing unit 110 and/or displayed furnishing experience options for this particular furnishing unit 110 to help the user determine whether they wish to use this furnishing unit 110.

In some embodiments, the visual identifier data is a static element, for example, that is printed upon, written upon, painted upon, engraved into, etched upon, embossed upon, and/or otherwise physically imparted upon a material such as the surface of the furnishing unit and/or another material such as a sticker, paper product, plastic product, or other material that is temporarily or permanently surface-mounted to and/or otherwise attached to the surface of the furnishing unit, for example, via an adhesive backing, glue, tape, screws, nails, or other means of attaching. For example, the visual identifier data corresponds to static, two-dimensional image data physically imparted to material attached to the furnishing unit, that can further be rendered as digital image data and/or a corresponding digital code when processed via visual identifier processing module.

Figure 5H:
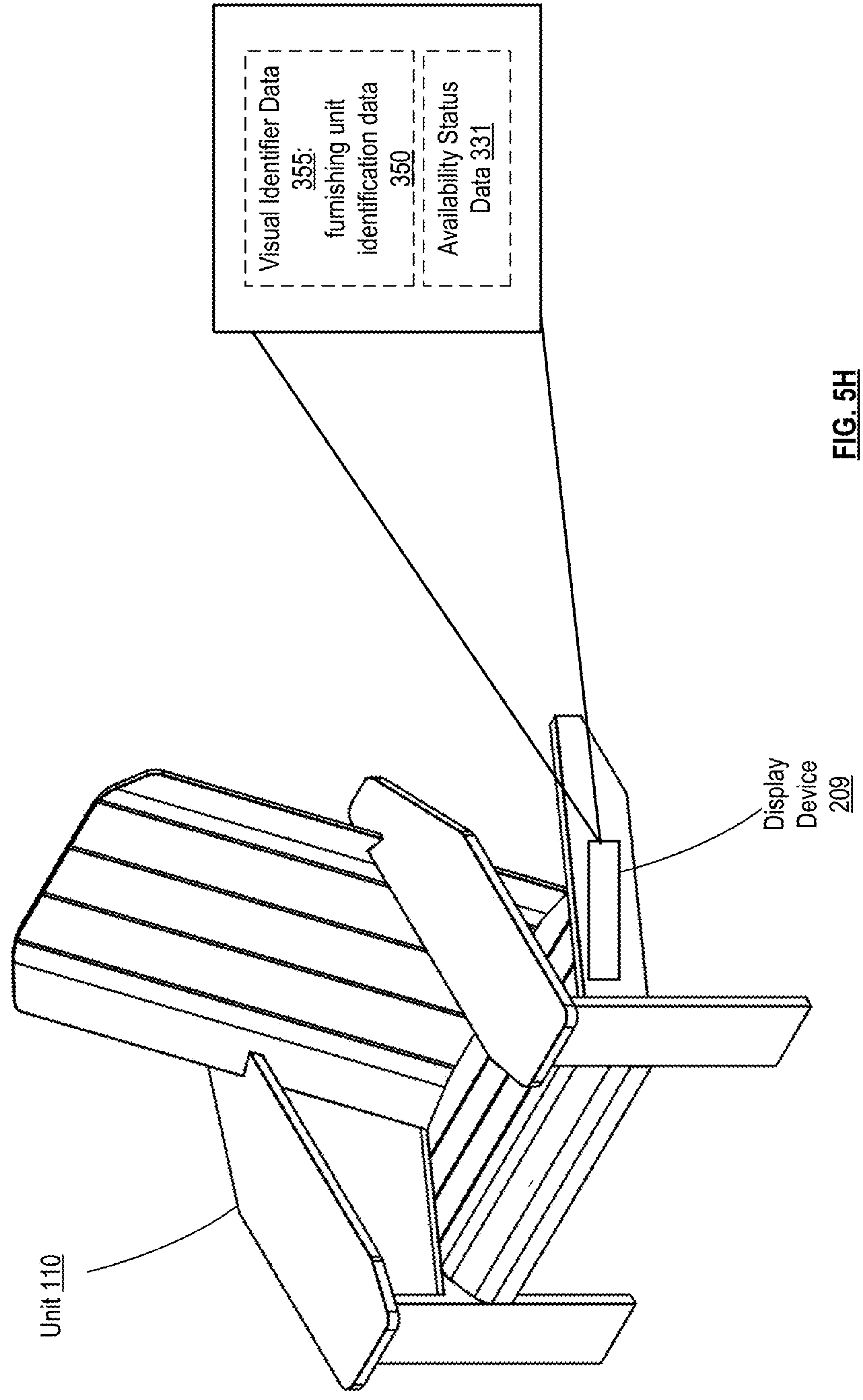
FIG. 5H is a schematic block diagram illustrating determination of furnishing unit identification data based on visual identifier data displayed by a display device of a furnishing unit in accordance with various examples.

FIG. 5H illustrates an embodiment of furnishing unit 110 that displays its visual identifier data 355 via an electronic display device 209, for example, instead of visual identifier data 355 that is simply printed upon or adhered to the furnishing unit 110 as a sticker or other static element. Some or all features and/or functionality of the furnishing unit 110 of FIG. 5H can be utilized to implement the furnishing unit 110 of FIG. 5A and/or some or all other embodiments of furnishing unit 110 described herein. Some or all features and/or functionality of the display device 209 of FIG. 5H can be utilized to implement the identifier conveyance unit 201 of FIG. 5C and/or some or all other embodiments of identifier conveyance unit 201 described herein.

Display device 209 can be implemented as an identifying device 511 of a furnishing processing system 120 of the furnishing unit 110, and/or can be a stand-alone device that simply operates to display the visual identifier data 355 and/or other information of the corresponding furnishing unit via a screen and/or display of the display device 209. The display device can be powered via a power source, enabling display of digital data via a screen and/or at least one lighting element of the display device. The visual identifier data 355 can optionally be implemented as a type and/or format of visual identifier data discussed in conjunction with FIG. 5G, such as a QR code or other visible pattern, that is displayed digitally via the screen of display device 209 rather than being physically imparted upon material upon of the surface of the furnishing unit.

The visual identifier data 355 can optionally change over time, for example, to reassign the furnishing unit identification data 350 over time as the furnishing unit moves within an establishment, is utilized by different people, and/or has its one or more identifiers changed in furnishing database 163 and/or product database 168 accordingly. The display device 209 can update the display to display the most current visual identifier data 355 for the given furnishing unit.

Alternatively or in addition, the visual identifier data 355 can be implemented as dynamic image data, such as video data or other image data that otherwise that moves and/or changes on the screen of display device 209 to present the furnishing unit identification data 350. A camera can similarly capture this dynamic image data for processing, for example, as a video and/or as multiple image frames. As another example, the user can easily identify text, colors, and/or symbols presented via the dynamic image data to enter the furnishing unit identification data 350 themselves via keyboard and/or touchscreen.

Alternatively or in addition, the display device can display further information instead of or in addition to the visual identifier data 355 that can be informative to a given user. If this information changes over time, it can be ideal to present this information via a dynamic display device 209 rather than static data adhered to the furnishing unit. As a particular example, current status data 653 can be determined by furnishing processing system 120 and/or can be received from furnishing experience system 100, and can be displayed via display device. The given current status data 653 can be conveyed and updated based on displaying and updating corresponding text, particular corresponding symbols, and/or particular corresponding colors displayed via the display device.

For example, availability status data 331 can be included in the current status data 653, and can indicate whether the furnishing unit is available for use and/or when the furnishing unit will become available for use, for example, based on whether it is already being used by, paid for by, and/or reserved by another user. For example, the display device 209 can display "available" or "unavailable" based on the availability status data 331. Other current status data 653 corresponding to current status and/or configuration of experience facilitation elements 515, can be displayed, for example, to indicate whether the heating element of a corresponding chair is still on and/or was turned off very recently, where the chair is still warm and is thus more desirable for use by the user than other chairs that have been off and cold for a long time.

Figure 5I:
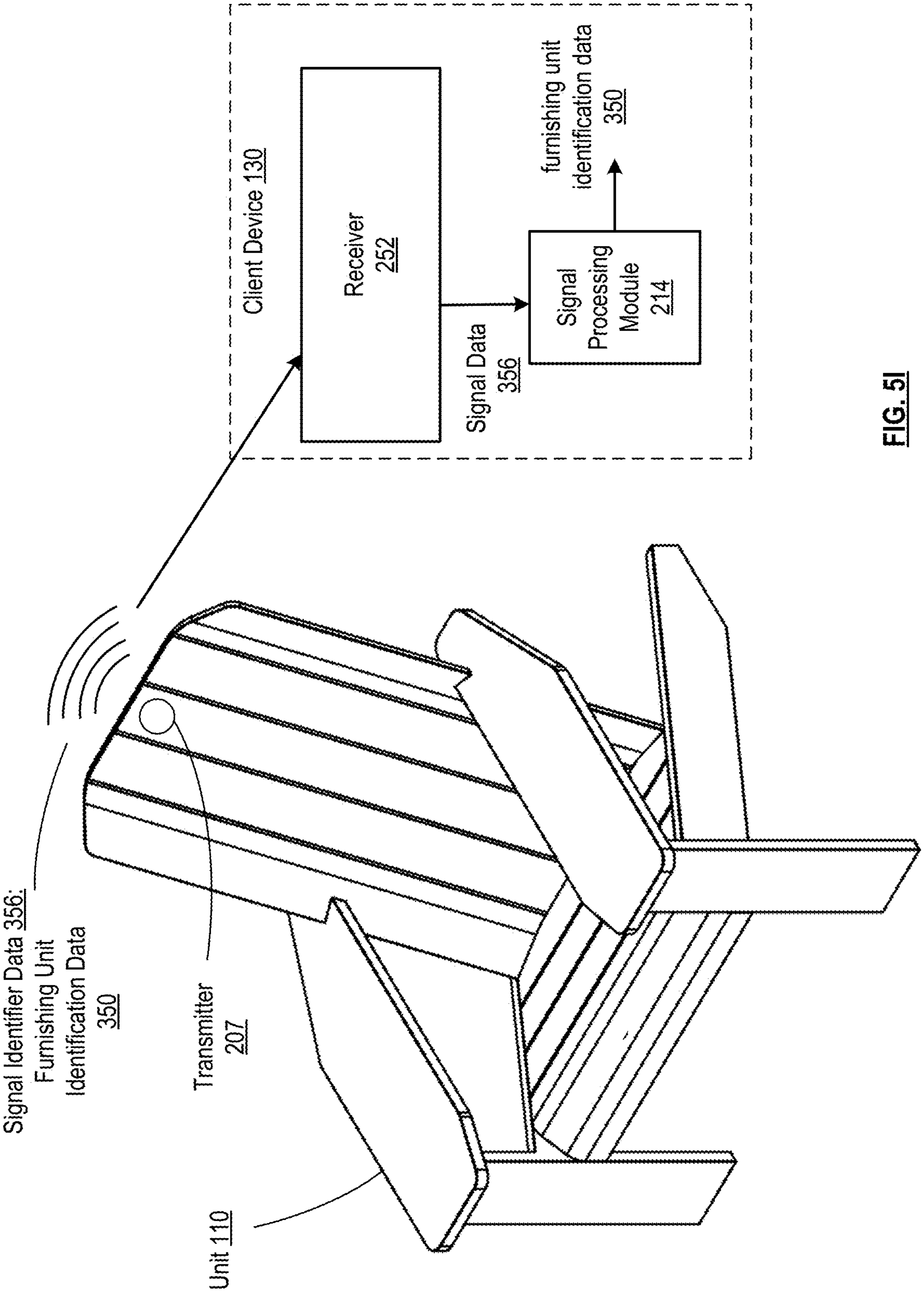
FIG. 5I is a schematic block diagram illustrating determination of furnishing unit identification data based on signal identifier data emitted by a transmitter of a furnishing unit in accordance with various examples.

FIG. 5I illustrates an embodiment of client device 130 that determines furnishing unit identification data 350 based on processing signal identifier data 358 transmitted by a transmitter 207 of furnishing unit 110. Some or all features and/or functionality of the client device 130 of FIG. 5I can be utilized to implement the client device 130 of FIG. 5A and/or some or all other embodiments of client device 130 described herein. Some or all features and/or functionality of the furnishing unit 110 of FIG. 5I can be utilized to implement the furnishing unit 110 of FIG. 5A and/or some or all other embodiments of furnishing unit 110 described herein. Some or all features and/or functionality of the transmitter 207 of FIG. 5I can be utilized to implement the identifier conveyance unit 201 of FIG. 5C and/or some or all other embodiments of identifier conveyance unit 201 described herein. Some or all features and/or functionality of the transmitter 207 of FIG. 5I can be implemented via the proximity-based communication transceiver 531 of FIG. 4B.

Signal identifier data 358 can be implemented as an identifying wireless signal in accordance with a RFID, NFC, Bluetooth, and/or other communication protocol as discussed previously. Transmitter 207 can be implemented as an identifying device 511 of a furnishing processing system 120 of the furnishing unit 110, a proximity-based communication transceiver 531, and/or can be a stand-alone device that simply operates to identify the corresponding furnishing unit via the transmitted signal identifier data 358. Transmitter 207 can optionally be implemented as a tag and/or beacon, such as an RFID and/or NFC tag and/or chip. Transmitter 207 can be implemented as a transponder and/or a passive transmitter, where transmitter 207 does not include and/or is not coupled to its own internal power source. For example, transmitter 207 is implemented via a copper coil or other coil that only transmits the furnishing unit identification data and/or product identification data as transmitted signal identifier data 358 when energized by an electromagnetic field generated by this other device in proximity, such as client device 130, where the transmission of transmitted signal identifier data 358 by transmitter 207 is enabled only when this other device is in physical proximity to the identifying device 511, such as within a physical range enabling inductive coupling between a coil of transmitter 207 and a coil of the other device, such as a physical range less than four centimeters and/or another range associated with a corresponding communications protocol. Alternatively, the transmitter 207 can be powered via a power source of the furnishing unit and/or can be operable to broadcast the transmitted signal identifier data 358 for receipt by client devices 130 in proximity, for example, constantly or in predefined intervals, regardless of whether any client devices 130 are in proximity at a given time.

A receiver 252 of client device 130 can implement the identifier input element 255, and can collect signal identifier data 358. Receiver 252 can further include and/or be coupled to a transmitter, for example, that generates an electromagnetic signal to facilitate inductive coupling with a passive transmitter 207 of identifying device 511 to enable identifying device 511 to emit transmitted signal identifier data 358. For example, the identifier input element 255 can optionally be implemented as an NFC reader and/or an RFID reader.

A signal processing module 214 can be implemented via identifier input element 255 and/or client processing system 220, can be operable to extract furnishing unit identification data 350 from the received signal, for example, based on performing a signal processing function and/or based on communicating via network 150 to determine the furnishing unit identification data from the signal identifier data 358, for example, based on sending raw and/or processed signal identifier data 358 to furnishing experience system 100 for processing to identify the corresponding furnishing unit and/or based on locally processing signal identifier data 358 to identify the corresponding furnishing unit. Signal processing module 214 can be implemented to perform a signal processing function 708.

The receipt of signal identifier data 358 emitted by the transmitter 207 by receiver 252 can be implemented as proximity-based communications 160 between the corresponding furnishing unit and client device. In some embodiments, further proximity-based communications 160 can be facilitated between the corresponding furnishing unit and client device based on a corresponding communications channel being established between the corresponding furnishing unit and client device in response to the identifier input element 255 of client device 130 receiving and processing the signal identifier data 358. For example, the signal identifier data 358 indicates pairing instructions and/or other information that, when processed by client device 130, enables the client device to transmit data to the furnishing processing system 120 for processing and/or enables establishing of the corresponding communications channel via the same and/or different type of signaling and/or communications protocol by which signal identifier data 358 is transmitted via transmitter 207.

In such embodiments, the client device 130 can optionally transmits confirmation data, control data, and/or other data to the furnishing unit 110 for processing via furnishing processing system 120 via this established communications channel, and/or the furnishing processing system 120 of the furnishing unit 110 sends further communications to the client device 130 via this established communications channel. This communications channel can be implemented via a Bluetooth pairing, an NFC pairing, and/or any other one-way or two-way short range wired and/or wireless communications facilitating any proximity-based communications 160 discussed herein. This communications channel can facilitate sending of control data to the furnishing unit 110 corresponding to configuration of at least one furnishing experience facilitated via output by one or more experience facilitation elements 515 of the furnishing unit 110, for example, as discussed in conjunction with some or all of FIGS. 6A-6D.

The identifier input element 255 can be alternatively or additionally be implemented to collect furnishing unit identification data 350 conveyed by any identifier element 511 of furnishing unit 110. For example, the identifier input element 255 determines furnishing unit identification data 350 based on one or more lighting devices implementing identifier element 511, such as one or more LEDs, that identify the furnishing unit and/or its current status data 653 via an identifying pattern of illuminated bulbs in a grid of bulbs, via an identifying pattern of one or more colors, via dynamic flashing of the illuminated bulbs, or other means. As another example, the identifier input element 255 determines furnishing unit identification data 350 and/or its current status data 653 based on one or more speakers implementing identifier element 511, for example, based on an identifying pattern of music and/or sound emitted by the speakers of the furnishing unit.

In some embodiments, the furnishing unit identification data 350 is received and/or determined in accordance with and/or based on a data format corresponding to visual identifier data 355 of FIG. 355, such as a QR code, a barcode, or another predetermined data format, even if the visual identifier data 355 is not included upon furnishing unit 110 for capturing by camera 251. For example, another type of identifier input element 255, such as a transmitter 207, conveys the QR code or barcode as digital information, for example, extracted from and/or generated based on other information included in signal identifier data 356.

Figure 5J:
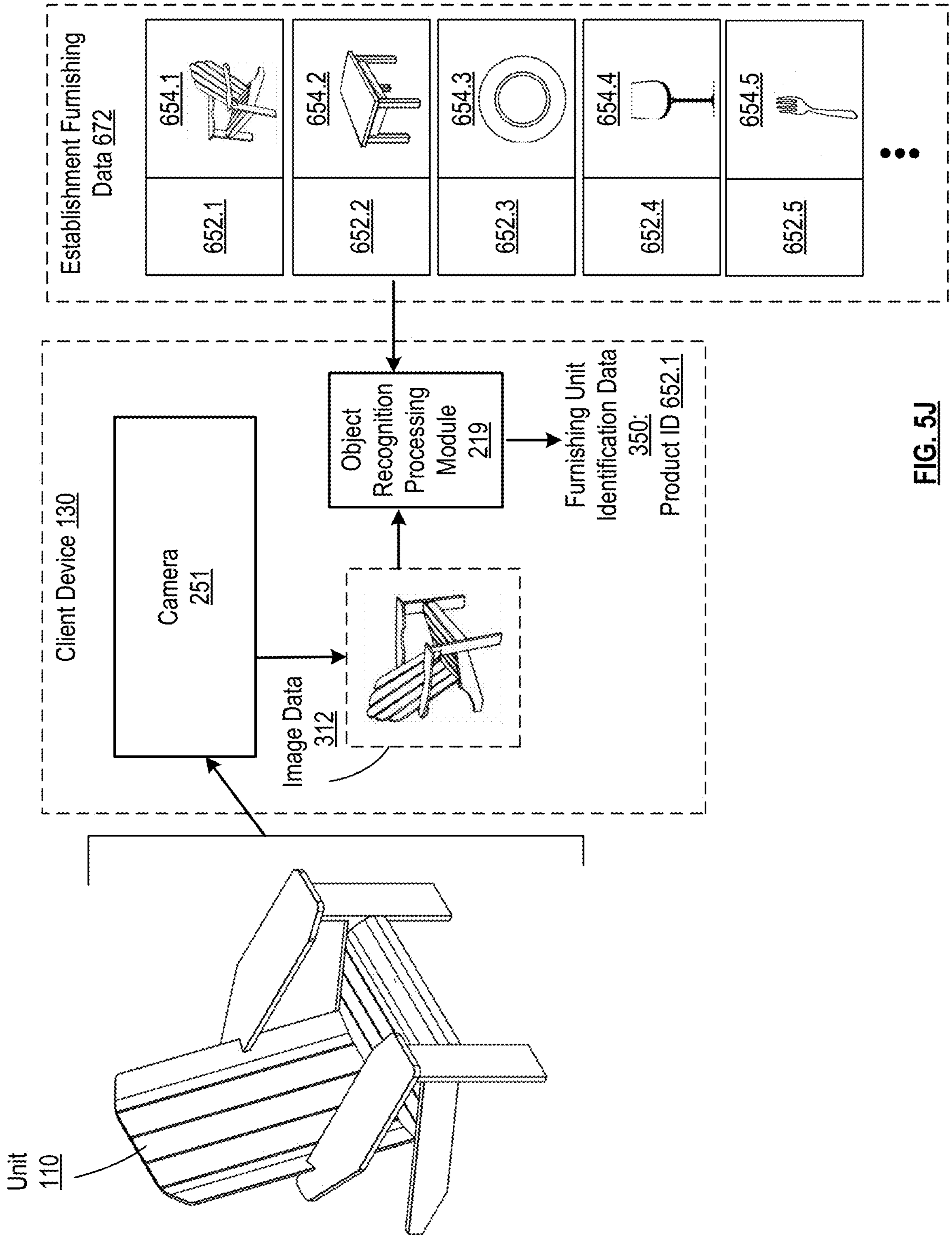
FIG. 5J is a schematic block diagram illustrating determination of furnishing unit identification data based on applying an object recognition processing module to captured image data in accordance with various examples.

FIG. 5J illustrates an embodiment of client device 130 that determines furnishing unit identification data 350 based on processing image data 312 capturing features of the furnishing unit itself. Some or all features and/or functionality of the client device 130 of FIG. 5J can be utilized to implement the client device 130 of FIG. 5A and/or some or all other embodiments of client device 130 described herein.

Alternatively or in addition to necessitating that QR codes or other visual identifier data 355 is attached to and/or visible upon furnishing units 110, or that they be operable to transmit identifying signals, image data capturing furnishing units themselves can be utilized to distinguish furnishing units. For example, in embodiments where only the product identifier corresponding to the furnishing unit is necessary for facilitating furnishing experiences, it can be reasonable for object recognition to be implemented to distinguish different types of products, for example, via artificial intelligence techniques, machine learning techniques, and/or computer vision models. In particular, as a given establishment may be using a reasonably-sized set of products, such as only a couple dozen or couple hundred different products, object recognition can be reliable and efficient in these cases as image features for fewer products need be distinguishable given the knowledge that a client device is in a particular location. This can be particularly effective in cases where products that could be easily confused, such as multiple brands of a given product, are not included in the same establishment based on the establishment only carrying one brand and/or type of a given product.

For example, a given restaurant may utilize only one type of fork, despite many different fork products being included in product database and/or being possible object for recognition in image data. An object recognition processing module 219, upon recognizing a fork in image data, can automatically presume that this fork is the type of fork product known to be utilized at the corresponding restaurant, enabling small feature differences between different forks to not require processing by object recognition processing module 219. Despite not being configured to detect these small feature differences, the exact model of fork in image data can still be distinguished based on the additional context corresponding to the user's location.

Alternatively, in some embodiments, all possible products are distinguishable via object recognition processing module 219, and a proper subset of possible options is not utilized to limit detectable objects in this fashion.

When image data 312 is captured by client device 130, the image data 312 can be processed via an object recognition processing module 219, which can be implemented via execution of application data 212 stored in memory of client device and/or can be implemented via furnishing experience system 100, for example, where image data 312 is sent to furnishing experience system 100 for processing by furnishing experience system 100 to determine furnishing unit identification data 350. This can include performing at least one image processing function, for example, of function library 172. The at least one image processing function can be trained from a training set of image data via artificial intelligence. For example, a user can pan their client device while sitting in a furnishing unit 110 to identify other furnishing units in the vicinity via the camera of their client device 130. Information corresponding to the identified other units can optionally be displayed to the user in conjunction with an augmented reality experience implementing the furnishing experience, where this information is superimposed upon a display of client device 130 and/or of another display of an augmented reality device as corresponding other furnishing units by the camera are identified accordingly. Object recognition processing module 219 can be implemented to perform an object recognition function 710, for example, based on storage or and/or access of a corresponding computing vision model 712.

For example, the object recognition processing module can utilize a computer vision model trained utilizing image processing techniques, artificial intelligence techniques, and/or machine learning techniques. The computer vision model can be trained via various image data 654 of all products and/or all furnishing units of furnishing experience system 100. The computer vision model can be based on and/or fine-tuned from object recognition computer vision models trained to detect a larger plurality of possible objects. Alternatively or in addition, this computer vision model can be fine-tined for each establishment based on a proper subset of products included at each establishment.

Only products known to be included in a given establishment can be considered as possible objects detectable in image data 312, for example, based on determining the client device is in the given establishment based on geolocation data of the client device and/or the client device currently and/or recently having a proximity-based interaction 111 at the establishment, for example, based on a corresponding furnishing unit being identified as being at the establishment. The user can otherwise indicate they are at the establishment via user input to interactive user interface 275. The furnishing experience system 100 can optionally determine a user is at an establishment based on the user being logged in a reservation system of a restaurant and/or having ordered food at the restaurant, for example, via computing systems of the restaurant communicating with the furnishing experience system 100. For example, the output of an image processing function performed by object recognition processing module 219 is compared to only product identifiers and/or image data 654 of products that are included in the establishment.

In some embodiments, some or all larger furnishing units 110, such as chairs and tables, can have visual identifier data 355 and/or can transmit signal identifier data 358. Other furnishing units 110 where it is less feasible to attach visual identifier data 355 and/or embed beacons or tags for transmission of signal identifier data 358 can be simply identifiable based on being captured in image data. A user can have a proximity-based interaction 111 with the larger furniture, such as a chair or table. A furnishing experience facilitating via the user identifying given larger furniture can include enabling detection of smaller furnishings and/or other furnishings that do not have their own tags and/or visible labels, that optionally only become detectable once the user has proximity-based interaction 111 with the larger furniture to enable these other furnishings to become detectable, for example, based on the establishment in which the larger furnishing is location.

In some cases, an even smaller subset can be employed, for example, based on which products and/or furnishing units are in a room and/or area within an establishment in which a corresponding furnishing unit a user is known to be sitting and/or interacting with. For example, unit-based contextual data of a given furnishing unit 110, such as related furnishing units 658 and/or related products 659, can be employed alternatively or in addition to the establishment furnishing data 672 to enable identification via object recognition of only the items known to be in the vicinity of and/or otherwise related to the furnishing unit 110.

Figure 6A:
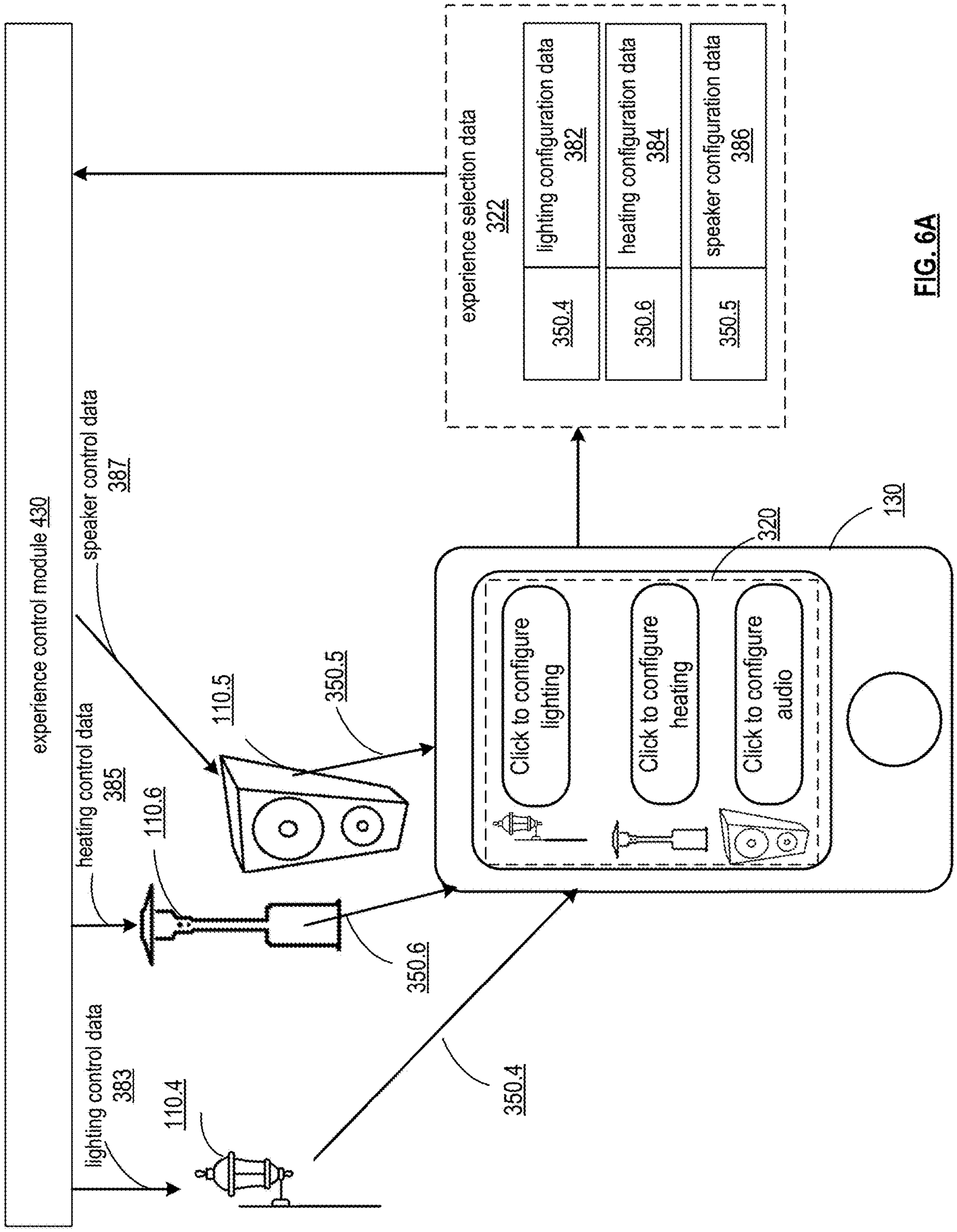
FIGS. 6A-6C are schematic block diagrams illustrating control of furnishing units via an experience control module in accordance with various examples.
Figure 6B:
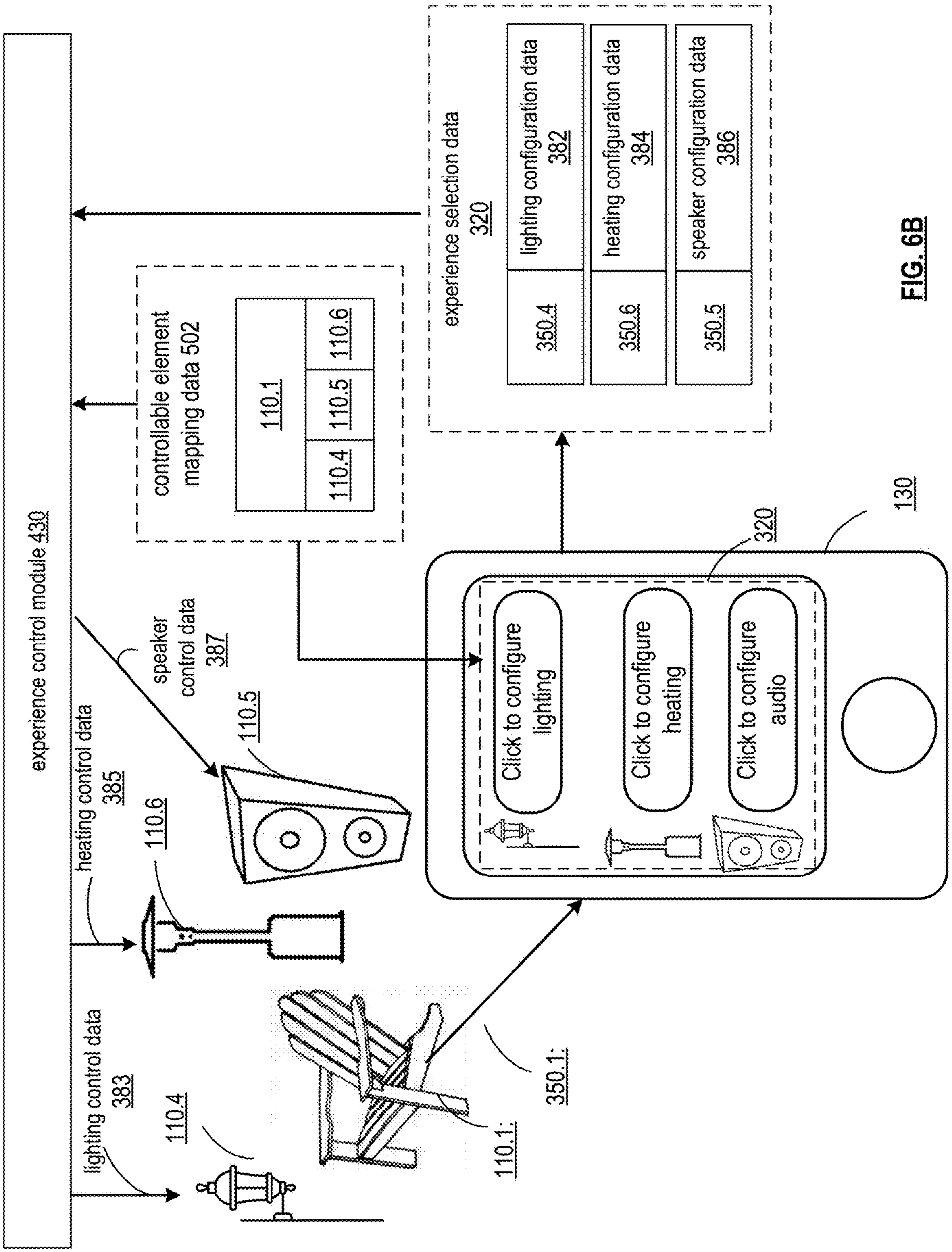
Figure 6C:
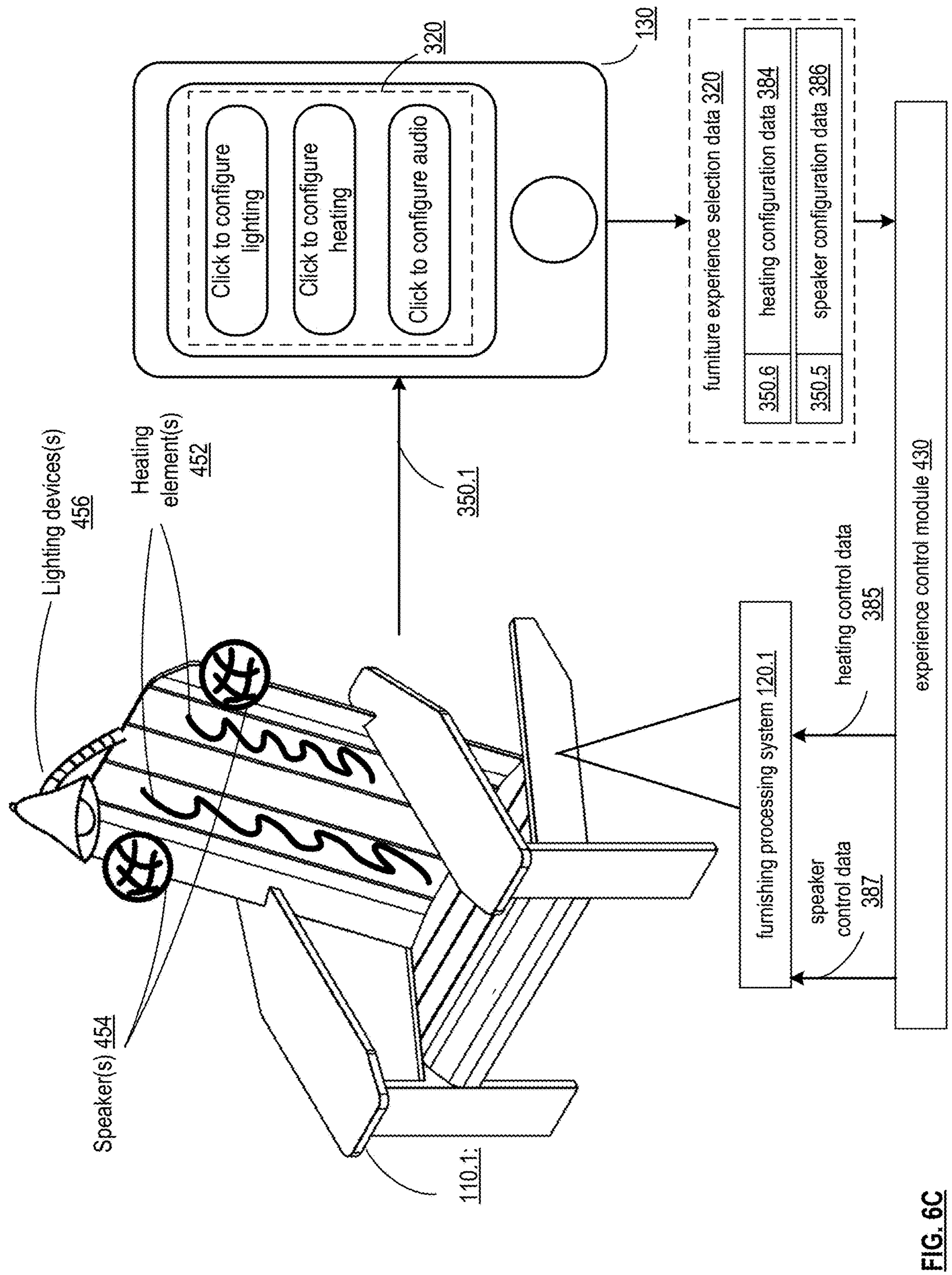

FIGS. 6A-6C illustrate example embodiments of proximity-based interactions 111 utilized to facilitate configuration of output of furnishing units 110. Some or all features and/or functionality of client devices 130, furnishing units 110, and/or furnishing experience system 100 of FIGS. 6A-6C can be utilized to implement some or all features and/or functionality of other embodiments of client devices 130, furnishing units 110, and/or furnishing experience system 100 discussed herein.

As illustrated in FIG. 6A, a client device 130 receives furnishing unit identification data 350 from a set of furnishing units 110.4, 110.5, and 110.6. In this example, the furnishing unit 110.4 corresponds to a lamp and/or otherwise includes a lighting device configured to illuminate and/or provide lighting to a location in proximity to the furnishing unit, for example, as one or more of its experience facilitation elements 515; the furnishing unit 110.5 corresponds to a speaker and/or otherwise includes an audio output device, for example, as one or more of its experience facilitation elements 515; and/or the furnishing unit 110.6 corresponds to a heating lamp and/or otherwise includes a heating element, for example, as one or more of its experience facilitation elements 515. In some embodiments, a heating element can be further implemented as a lighting element, for example, producing heat and light via at least one flame and/or based on glowing or illuminating when activated to emit heat.

Based on receiving and processing furnishing unit identification data 350.4, 350.5, and 350.6 for these furnishing units, the client device displays experience option data 320 indicating options to turn on and/or configure the respective outputs of furnishing units. The user can interact with the corresponding interactive user interface 275 via user input, which is processed to render experience selection data 322. For example, a corresponding user can elect to and/or perform a payment transaction via client device 130 to: turn on and/or configure lighting by furnishing unit 110.4; turn on and/or configure heating by furnishing unit 110.5; and/or turn on and/or configure audio output of speakers 110.6. The experience selection data 322 can indicate lighting configuration data 382, heating configuration data 384, and/or speaker configuration data 386 accordingly.

This experience selection data can be processed via an experience control module, which can: process the lighting configuration data 382 to generate lighting control data 383 that is utilized to turn on and/or control the lighting provided by furnishing unit 110.4; process the heating configuration data 384 to generate heating control data 385 that is utilized to turn on and/or control the heating provided by furnishing unit 110.6; and/or process the speaker configuration data 386 to generate speaker control data 387 that is utilized to turn on and/or control the audio provided by furnishing unit 110.5.

In some embodiments, the experience option data 320 displayed via the interactive user interface 275 can indicate configuration options for each of the set of furnishing units in proximal range, each of the set of furnishing units from which the client device collected furnishing unit identification data 350, each of the set of furnishing units with which the client device established a communication channel for proximal-based communications 160, and/or each of the set of set of furnishing units the user has elected to and/or paid to use and/or configure via user input to interactive user interface 275 and/or in their user account. In some embodiments, the experience option data 320 is displayed as a set of experience option data 320, where each experience option data 320 corresponding to option for a given corresponding one of the set of furnishing units. In this example, a set of three experience option data corresponding to options for the set of furnishing unit 110.4, 110.5, 110.6 can be displayed one at a time and/or in a same view of interactive user interface 275 to facilitate selections by a corresponding user. In some embodiments, the user controls only a single furnishing unit 110 at a given time, where the experience option data 320 indicates configuration options for a single furnishing unit.

The experience option data 320 for a given furnishing unit 110 displayed via interactive user interface 275 can indicate two or more options for some or all experience facilitation elements 515 of the given furnishing unit 110, and/or some or all types of corresponding controllable experiences facilitated via the given furnishing unit 110. For example, the two or more options for each controllable experience facilitation element 515 and/or type of experience can be displayed one at a time and/or in a same view of interactive user interface 275 to facilitate selections by a corresponding user. In some embodiments, the given furnishing unit 110 has only one controllable experience facilitation element 515 and/or only one type of controllable experience (e.g. the furnishing unit is only operable to supply heating via one or more heaters, and this heating is configurable via selections to experience option data).

The set of two or more options for a given experience facilitation element 515 and/or type of controllable experience in experience option data can simply correspond to turning the corresponding experience facilitation element 515 on or off, and/or otherwise enabling or disabling the corresponding type of controllable experience. For example, a heater can be turned on or off, but its level of heating while turned on cannot be further configured. Alternatively or in addition, the set of two or more options for a given experience facilitation element 515 and/or type of controllable experience can include further configuration of the output of the experience facilitation element 515 and/or type of controllable experience when enabled, such as an intensity of the output, type of the output, location the output be applied, or other further configuration. This further configuration of the given experience facilitation element 515 and/or type of controllable experience can correspond to one or more discrete categories (e.g. intensity, location, duration, etc.) and/or each category can have two or more discrete options, or optionally a continuous set of options within a range (e.g. whether heating to be applied the back of the chair, bottom of the chair, or both; whether of intensity of heating in each location be high, medium, or low; duration for the heating; etc.). Some or all of these features of experience option data 320 can implement experience option data 655 for the corresponding furnishing unit and/or product.

The experience control module 430 can be implemented as a furnishing experience facilitation processing module 325 of FIG. 5A. The experience control module 430 can alternatively or additionally be implemented via at least one processor and/or at least one memory of the client device itself, where client device 130 generates and transmits this control data to furnishing units 110 directly based on the configuration data of experience selection data 322, for example, via proximity-based communications 160 and/or after establishing a corresponding communications channel between a given furnishing unit 110 based on signal identifier data 358 received from an identifier conveyance unit 201 of the given furnishing unit 110.

Alternatively or in addition, this experience control module 430 can be implemented via at least one processor and/or at least one memory of furnishing processing system 120 of these furnishing units, where a furnishing processing system 120 receives the experience selection data 322 from a furnishing experience system 100, for example, that received the experience selection data 322 from the client device 130, and/or from the client device 130 directly, for example, via proximity-based communications 160 and/or after establishing a corresponding communications channel between a given furnishing unit 110 based on signal identifier data 358 received from an identifier conveyance unit 201 of the given furnishing unit 110. In such embodiments, the furnishing processing system 120 can generate the control data itself that is utilized to control its experience facilitation elements 515 based on the experience selection data 322 generated by from the client device 130. Alternatively or in addition, the experience control module 430 can be implemented via at least one processor and/or at least one memory of the furnishing experience system 100, where client device 130 transmits experience selection data 322 to furnishing experience system 100, where furnishing experience system 100 processes experience selection data 322 to generate this control data 383, 385, and 387 and where the furnishing experience system 100 transmits this control data 383, 385, and 387 to the respective furnishing units based on their furnishing unit identifier data 350 received from client device 130.

As illustrated in FIG. 6B, the output of nearby furnishing units 110 such as the example furnishing units 110.4, 110.5, and 110.6 of FIG. 6A or other devices that are near the client device, are controllable even if the client device 130 does not receive and/or determine their respective furnishing unit identification data 350. For example, these more auxiliary elements do not have their own furnishing unit identification data 350 and/or their furnishing unit identification data 350 is not determinable by client devices, but instead based on being near other furnishing units the user can interact with directly. For example, the user sits in a chair or interacts with another furnishing unit 110.1 and determines its furnishing unit identifier data 350.1. These other furnishing units 110.4, 110.5, and 110.6 can be in proximity to the chair or other furnishing unit 110.1 and/or can be mapped to the given furnishing unit 110.1 as controllable element mapping data 502, which can be included in and/or determined from the furnishing unit 110.1's unit-based contextual data 362 that is received from furnishing experience system 100, is stored in local memory of client device 130, and/or is indicated in the furnishing unit identification data 350 and/or other information collected based on the proximity-based interaction 111 with furnishing unit 110. Experience selection data can similarly be generated based on user input as discussed in FIG. 6A to indicate configuration of these other furnishing units. The experience control module can utilize the controllable element mapping data 502 to generate and/or send control data to these other furnishing units, for example, based on the experience selection data and the furnishing unit identification data 350 of the furnishing unit 110.1.

As illustrated in FIG. 6C, output elements of the furnishing unit itself, such as one or more lamps or other lighting devices 456, speakers 454 and/or heating elements 452 that are installed in and/or in proximity to the furnishing unit 110, can be similarly controlled. For example, one or more lighting devices 456, one or more speakers 454 and/or one or more heating elements 452 can be implemented as experience facilitation elements 515 of a corresponding furnishing processing system, and/or other types of experience facilitation elements 515 of the furnishing unit can be controlled similarly.

In some cases, preferences regarding user's configuration of various types of output devices can be configured by the user in configured preference data 596, for example, as saved and/or learned experience selection data 322. For example, when furnishing unit identification data 350 is determined based on a client device 130 of a user coming into proximity with a corresponding furnishing unit 110 as discussed previously, the corresponding furnishing unit and/or adjacent furnishing units mapped to this furnishing unit are automatically controlled via these saved and/or learned preferences, rather than necessitating that new experience selection data be selected via interaction with a graphical user interface displaying the experience option data. In some cases, the user is prompted via interactive user interface 275 whether they wish to pay for and/or initiate this control upon coming into contact with a new furnishing unit.

For example, a user selects their preferred heating levels, where heaters of furnishing units in which the user has a proximity-based interaction 111 can automatically begin heating based on receiving the user's predetermined experience selection data 322 from client device 130 and/or furnishing experience system 100. As another example, a recommended playlist is learned for the user in learned user characteristic data 585, where speakers of furnishing units in which the user has a proximity-based interaction 111 can automatically begin playing songs from this learned playlist based on receiving the user's learned user characteristic data 585 from client device 130 and/or furnishing experience system 100.

Different preferences can be learned and/or saved for different types of furnishing units 110, such as different given products, furnishing units 110 at different establishments, and/or for particular furnishing units the user owns and/or has previously come into contact with. For example, different types of heating and/or lighting can be desirable at different establishments. As another example, the user may prefer different settings for different types of products, based on their respective output of heat, sound, and/or lighting being slightly different due to having different makes and models.

Different preferences can be learned and/or saved for other different contextual data, such as whether it is day or night, the weather and/or temperature outside, the current noise level of the establishment, of the and/or geographic region. For example, it can be desirable to turn heat on in freezing temperatures, but not in warm summer temperatures. As another example, it can be desirable to play speakers when there isn't already at least a threshold amount of ambient noise, while it may not be desirable to play speakers when it is already loud at the establishment. This current contextual data can be collected via one or more sensors and/or via the Internet, for example, where furnishing experience system 100 and/or client device 130 automatically presents options of experience option data 320 and/or recommends the configurations of experience selection data 322 based on this other contextual data. In some cases, these contextual based recommendations can be implemented as and/or be based on experience recommendation data 586 for the corresponding user.

In some embodiments, the experience option data 320 can be presented in conjunction with experience recommendation data 586 indicating recommendations for configuration of various output devices, such as playlist recommendations, heating level recommendations, audio volume recommendations, lighting level recommendations, entertainment content recommendations, VR and/or AR content recommendations, and/or other recommendations.

Figure 6D:
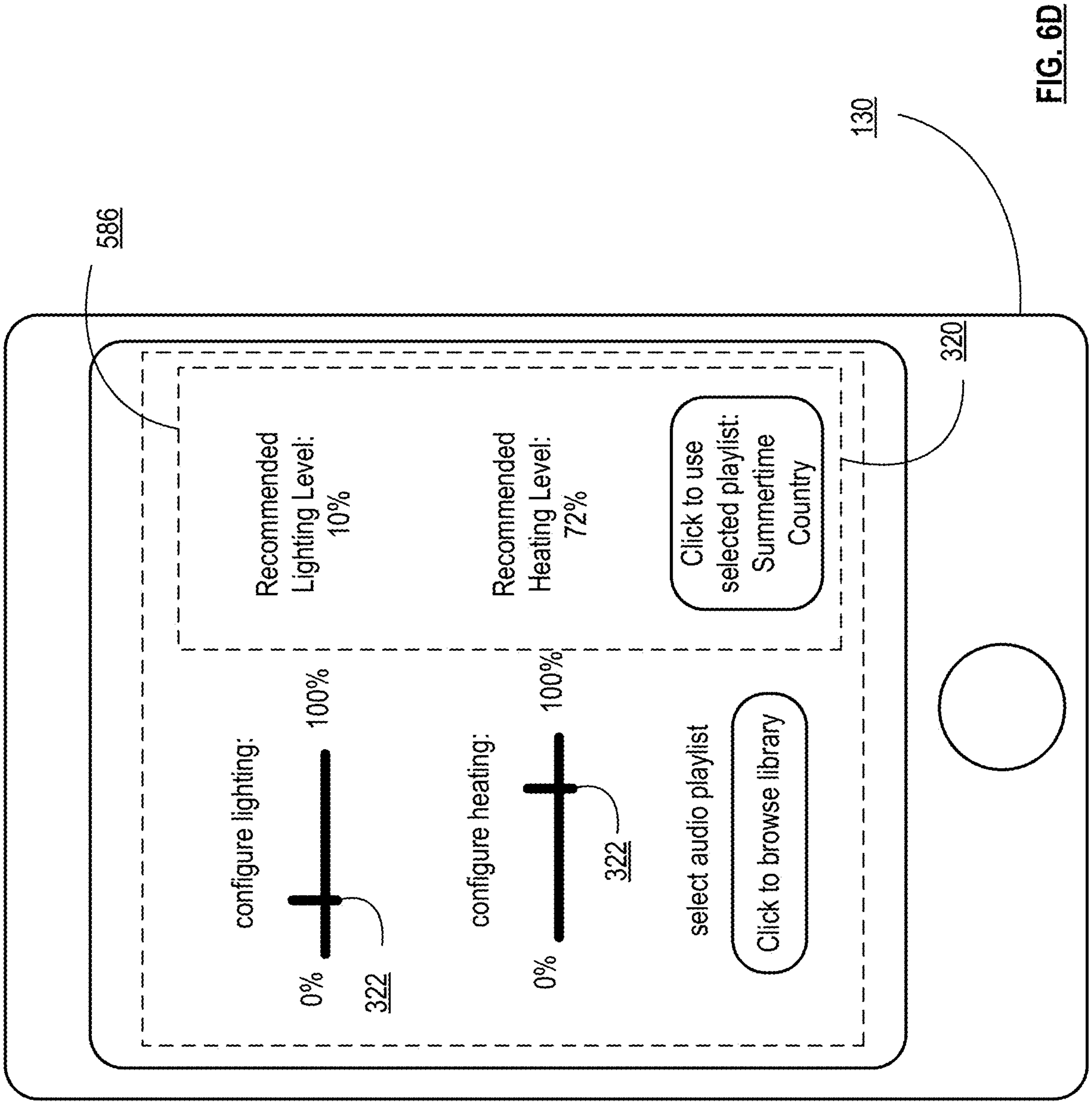
FIG. 6D illustrates experience option data presented via an example interactive user interface displayed via a display of a client device in accordance with various examples.

Such an embodiment is illustrated in the example of FIG. 6D. Different configurations for configuration of nearby and/or interacted output devices, such as the example types of output as illustrated in FIGS. 6A-6C based on corresponding proximity-based interactions 111, can be recommended to the user based on past and/or configured configurations of furnishing units by other users with similar characteristics and/or preferences in output configurations in their respective furnishing experience history. The recommendations can be alternatively or additionally based on other configurations by other users during times of day, noise levels, and/or weather, or other contexts that are correspondingly similar to the current weather, time of day, noise level, and/or other context.

As illustrated in FIG. 6D, the user can optionally configure various options via interaction with a displayed slide bar and/or other input mechanism enabling the user to configure output of the corresponding type of device and/or furnishing. The settings can optionally automatically be presented with recommended levels and/or configurations selected, for example, where the slide bar for heating level is initially set to 72% for heating based on 72% being the corresponding recommendation for the user. The user can elect to change the configurations, for example, where the user elects to configure heating to 90% rather than the recommended 72%.

In some embodiments, the experience option data 320 displayed via the interactive user interface 275 can indicate configuration options for each of the set of furnishing units in proximal range, each of the set of furnishing units from which the client device collected furnishing unit identification data 350, each of the set of furnishing units with which the client device established a communication channel for proximal-based communications 160, and/or each of the set of set of furnishing units the user has elected to and/or paid to use and/or configure via user input to interactive user interface 275 and/or in their user account. In some embodiments, the experience option data 320 is displayed as a set of experience option data 320, where each experience option data 320 corresponding to option for a given corresponding one of the set of furnishing units. In this example, a set of three experience option data corresponding to options for the set of furnishing unit 110.4, 110.5, 110.6 can be displayed one at a time and/or in a same view of interactive user interface 275 to facilitate selections by a corresponding user. In some embodiments, the user controls only a single furnishing unit 110 at a given time, where the experience option data 320 indicates configuration options for a single furnishing unit.

The experience option data 320 for a given furnishing unit 110 displayed via interactive user interface 275 can indicate two or more options for some or all experience facilitation elements 515 of the given furnishing unit 110, and/or some or all types of corresponding controllable experiences facilitated via the given furnishing unit 110. For example, the two or more options for each controllable experience facilitation element 515 and/or type of experience can be displayed one at a time and/or in a same view of interactive user interface 275 to facilitate selections by a corresponding user. In some embodiments, the given furnishing unit 110 has only one controllable experience facilitation element 515 and/or only one type of controllable experience (e.g. the furnishing unit is only operable to supply heating via one or more heaters, and this heating is configurable via selections to experience option data).

The set of two or more options for a given experience facilitation element 515 and/or type of controllable experience in experience option data can simply correspond to turning the corresponding experience facilitation element 515 on or off, and/or otherwise enabling or disabling the corresponding type of controllable experience. For example, a heater can be turned on or off, but its level of heating while turned on cannot be further configured. Alternatively or in addition, the set of two or more options for a given experience facilitation element 515 and/or type of controllable experience can include further configuration of the output of the experience facilitation element 515 and/or type of controllable experience when enabled, such as an intensity of the output, type of the output, location the output be applied, or other further configuration. This further configuration of the given experience facilitation element 515 and/or type of controllable experience can correspond to one or more discrete categories (e.g. intensity, location, duration, etc.) and/or each category can have two or more discrete options, or optionally a continuous set of options within a range (e.g. whether heating to be applied the back of the chair, bottom of the chair, or both; whether of intensity of heating in each location be high, medium, or low; length of time the heating be applied; etc.). Some or all of these features of experience option data 320 can implement experience option data 655 for the corresponding furnishing unit and/or product.

The user can optionally revisit the interactive user interface 275 to adjust configuration of various experience facilitation elements 515 during their proximity-based interaction 111, for example, to increase heating and/or lighting over time as the outdoor conditions become darker and colder during their evening use of the furnishing unit. For example, the same or different experience option data is presented to enable new selections. Alternatively or in addition, adjustments are automatically determined and controlled via the furnishing unit and/or the experience control module 430, for example, based on collecting other sensor data or other information, where heat intensity is automatically increased over time due to detecting the time of day becoming later into the evening and/or due to detecting the ambient temperature has become colder.

FIGS. 7A-7G illustrate example embodiments of proximity-based interactions 111 utilized to facilitate furnishing experiences that include purchasing experiences. Some or all features and/or functionality of client devices 130, furnishing units 110, and/or furnishing experience system 100 of FIGS. 7A-7G can be utilized to implement some or all features and/or functionality of other embodiments of client devices 130, furnishing units 110, and/or furnishing experience system 100 discussed herein.

As users detect and identify products in their vicinity based on proximity-based interactions 111 with corresponding furnishing units 110, users can be presented with the option to purchase these products as experience option data 320. Users can select any products they wish to rent and/or purchase, for example, based on the user wishing to have corresponding furnishings in their own home and their own business via interaction with interactive user interface 275, where selected products for purchase can correspond to experience selection data 322. The furnishing experience can correspond to facilitating a transaction to enable the user to pay for their selected products and/or facilitating shipping of the purchased products to the user's home and/or another preferred delivery address. For example, a merchant selling and/or stocking the product is identified in product data 169 of selected products for purchase via merchant identifier 689, and the product is purchases from the merchant based on payment data 594 and/or shipping data 595 of the corresponding user's user account 165.

This can improve the technology of purchasing systems based on not requiring users to visit stores that stock merchandise, while enabling users to physically inspect the products they wish to buy. Thus, this enhances the shopping experience beyond what is available via online shopping where users must rely on user reviews and/or pictures to make their purchases. Furthermore, a user can still select items for purchase via this physical inspection without having to go to the trouble to travel to a store for the dedicated purpose of purchasing items, where instead a users' leisure time at various establishments they wish to visit for dining, social, and/or other types of experience doubly functions to facilitate the advantages of in-person shopping. This can further improve the technology of purchasing systems by enabling purchases to be processed more efficiently and/or to reduce a number of returns needed to be processed.

In some embodiments, an establishment stocking these products can be paid a commission for products purchased by users while at their establishment. For example, the establishment is paid by the merchant and/or the furnishing experience system 100 based on users having proximity-based interactions 111 at their establishment that lead to purchases of products. For example, the establishment is paid a predetermined fraction of all purchases made by users via proximity-based interactions 111 at their establishment, despite the establishment not selling and/or manufacturing these products themselves. Alternatively or in addition, a company and/or other entity associated with the furnishing experience system 100, such as a company that hosts and/or maintains a corresponding server system and/or enables facilitation of corresponding furnishing experiences as described herein, can be paid a commission by merchants and/or establishments for all purchases, such as purchases products, goods, and/or services, made by made by users via proximity-based interactions 111 with furnishing units 110 while at one or more establishments.

In some embodiments, the establishment can optionally stock some items, for example, that are very popular, themselves to enable the user to carry their purchased product from the store rather than waiting for the product to be delivered to their home. Alternatively, the establishment does not sell any of its own stocked products to users, but merely utilizes these products as examples to motivate the users to buy duplicate products for themselves.

Figure 7A:
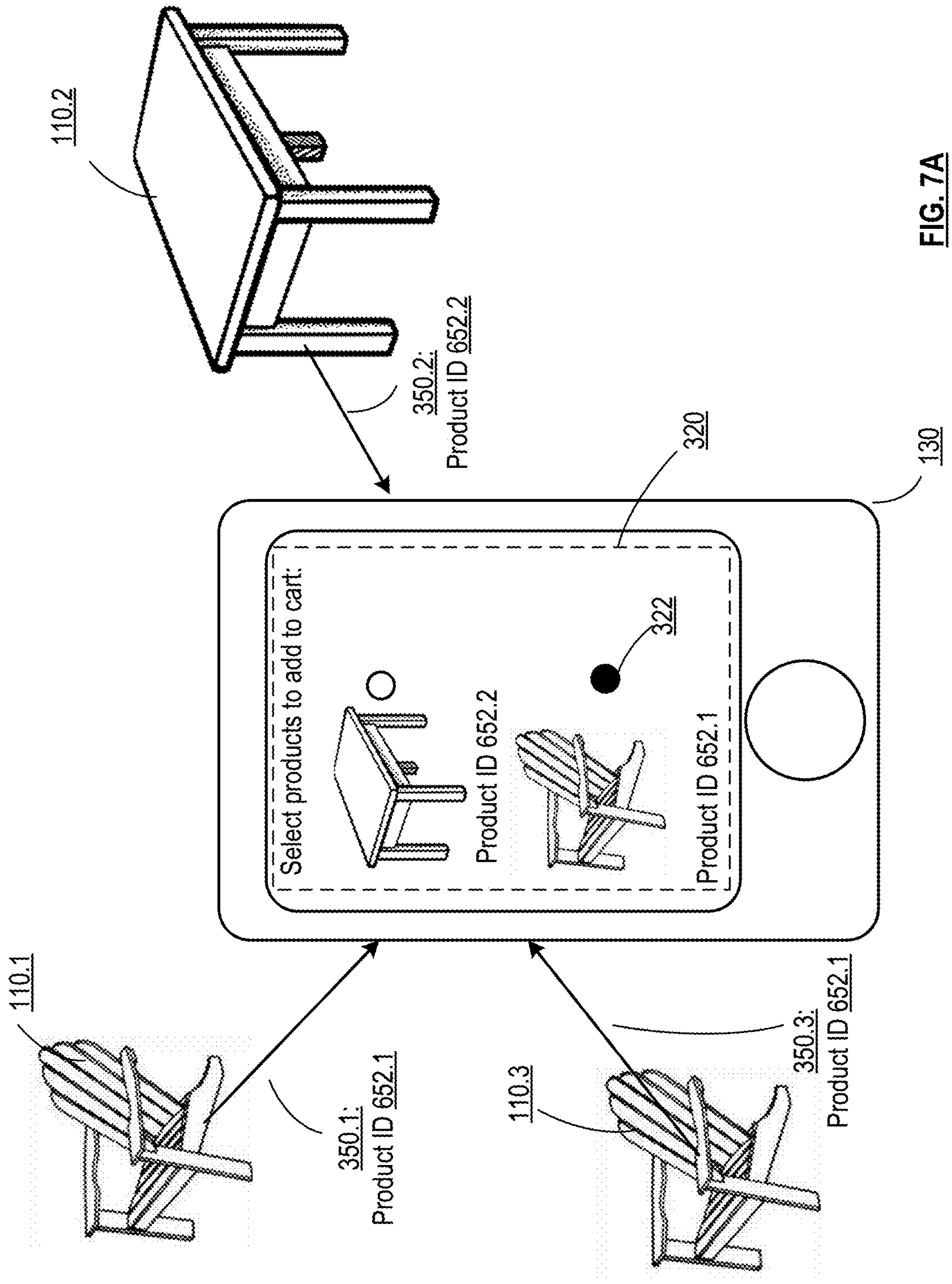
FIGS. 7A-7G illustrates experience option data presented via example interactive user interfaces displayed via a display of a client device based on determining at least one product identifier of one or more proximal furnishing units in accordance with various examples.

As illustrated in FIG. 7A, the furnishing unit identification data 350 can include and/or can be utilized to identify product identifiers 652 of corresponding products. As a user collects furnishing unit identification data 350 as discussed in conjunction with FIGS. 5A-5J, the corresponding product identifiers 652 can be determined and can be utilized to generate the experience option data, indicating the option to purchase these detected products. The user can select any products they wish to purchase as experience selection data 322.

Figure 7B:
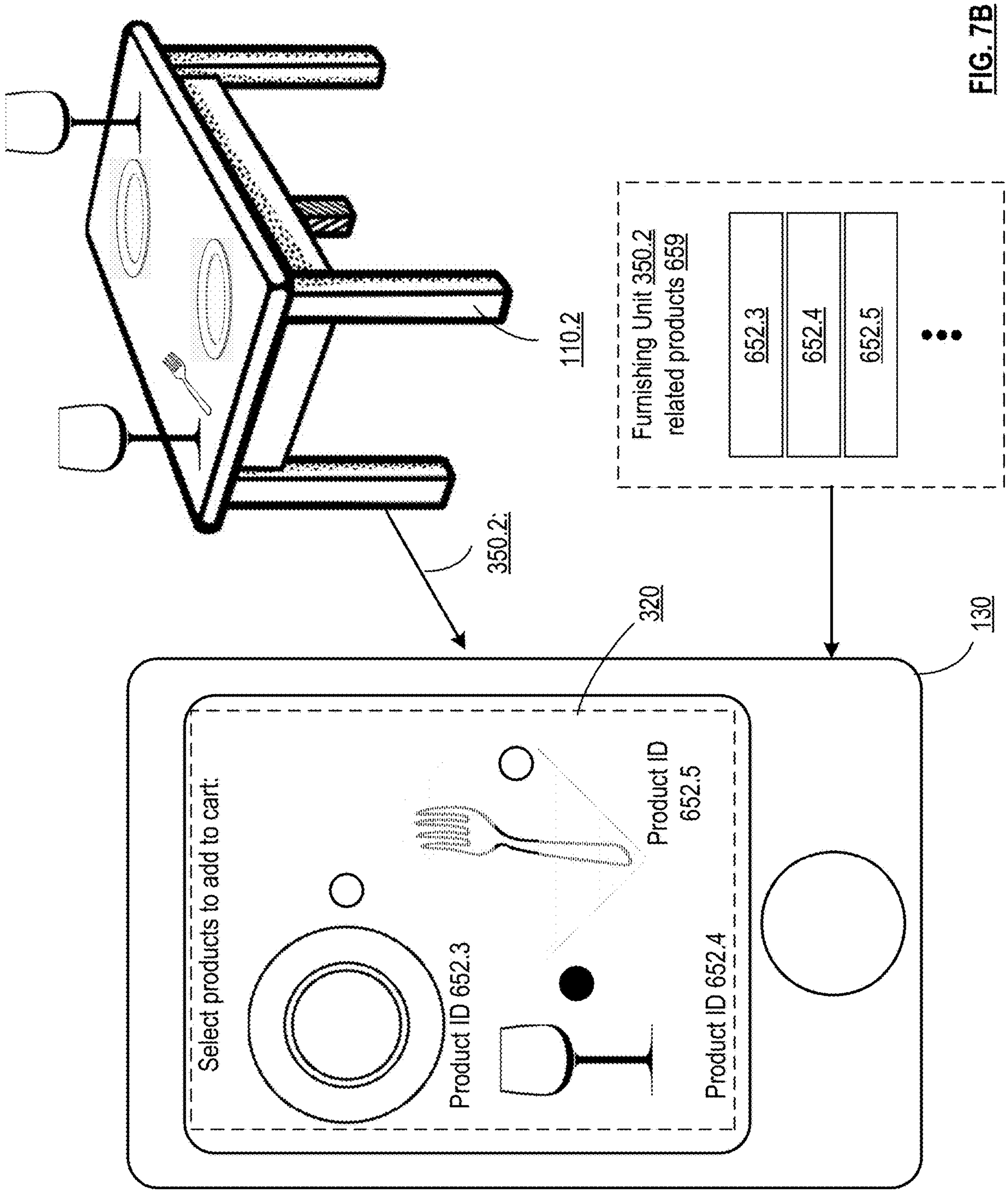

As illustrated in FIG. 7B, some products available for purchase may not have their own furnishing unit identifiers and/or may not have visible identifiers and/or beacons as discussed previously. The furnishing unit identification data 350 can include and/or can be utilized to identify product identifiers 652 of a given furnishing unit, such as a table in this example. Other products known to be associated with the furnishing unit, even if they are not currently in the vicinity of the furnishing unit, can be presented as options for purchase instead of or in addition to the given furnishing unit. In this example, based on identifying the table via furnishing unit identification data 350.2, identifiers for related products 659 of the table can be determined via furnishing experience system 100 and/or local data stored in application data 212. In this example, the related products include the items in place settings utilized to furnish the table at the establishment, such as a corresponding establishment's plates, cutlery, and glassware utilized to serve their food and drinks. Physical furnishing units 110 corresponding products may become available to the user while they are at the table, such as after their food arrives to the table. For example, a user can inspect their wine glass while drinking their glass of wine at the table to determine whether they wish to purchase this style of wine glass for their own home.

Figure 7C:
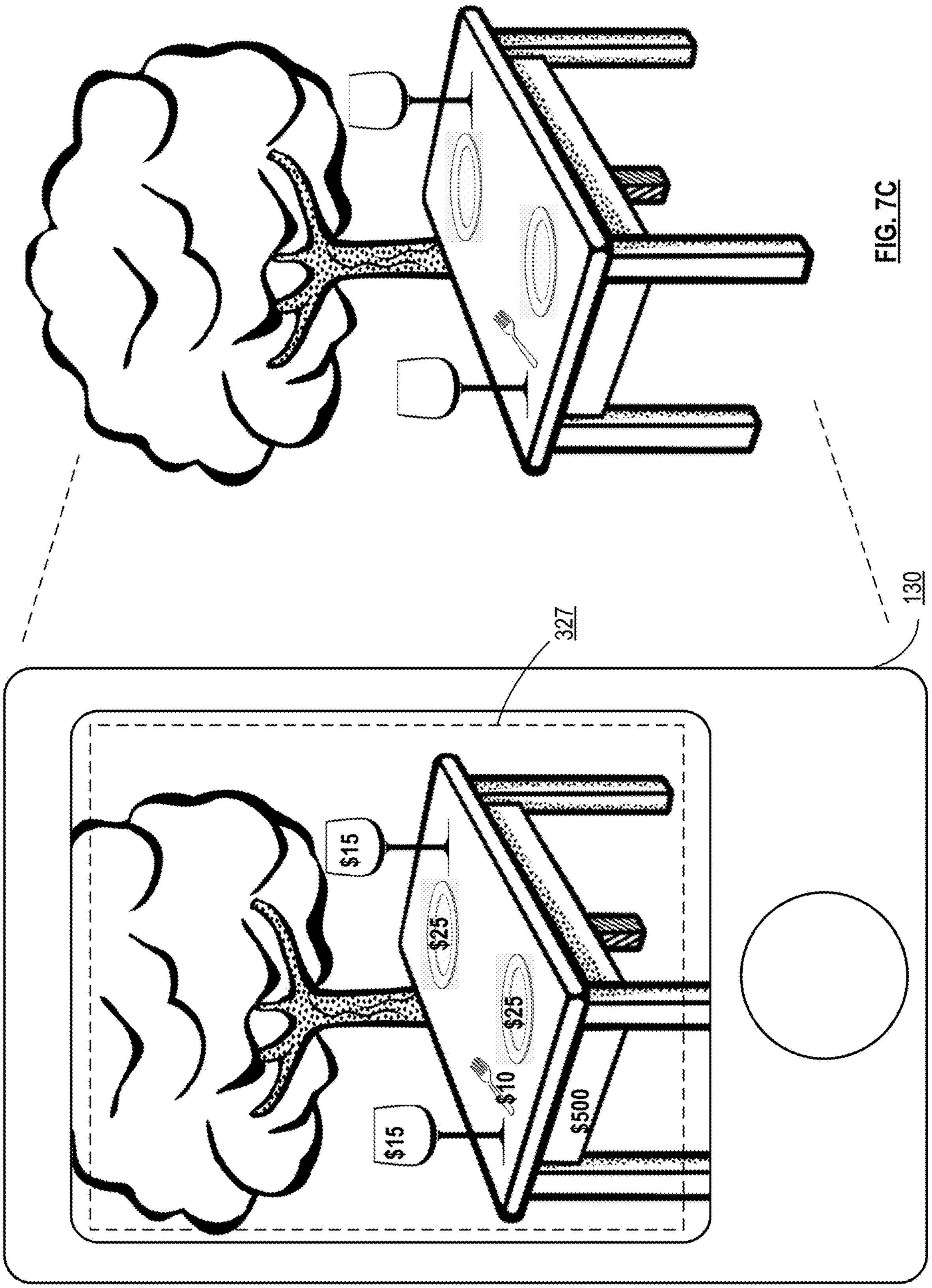

As illustrated in FIG. 7C, the purchasing experience can be presented as an augmented reality experience presented via an augmented reality display 327. For example, a camera of the client device can collect image data of the user's vicinity, for example, based on the user having a proximity-based interaction 111 with a given furnishing unit 110. As the camera 251 captures various objects that are processed via an object recognition processing module 219 as discussed in conjunction with FIG. 5I, these objects can have overlaid information, such as their cost, product name, brand name, and/or other information relating to the product. The user can optionally interact with the display, for example, by clicking on products and/or their corresponding price to be directed to a website and/or other view of the interactive user interface directing the user to check out and/or purchase the selected products.

In this example, the user is optionally having a proximity-based interaction 111 with the chair in which they are sitting, and are capturing image data of their surroundings, such as the table they are sitting at. As another example, the user is optionally having a proximity-based interaction 111 with the table at which they are dining, and are capturing image data of their surroundings, such as the setting of this table. The client device 130 can be the user's smart phone and/or wearable device, an augmented reality headset and/or goggles and/or other client device owned by the user operable to facilitate an augmented reality display. Other augmented reality equipment for use by the user can optionally be owned by and/or included at the establishment, for example, for use by the user while having a proximity-based interaction 111 with a table and/or chair that has a wired and/or wireless connection with the chair and/or table, where this other augmented reality equipment presents the augmented reality display 327.

Alternatively, the embodiment of FIG. 7C can similarly utilize the camera 251 captures various objects that are processed via an object recognition processing module 219 as discussed in conjunction with FIG. 5I, but the detected products are optionally displayed in a list and/or table rather than as augmented reality data overlaid upon the captured image data.

Figure 7D:
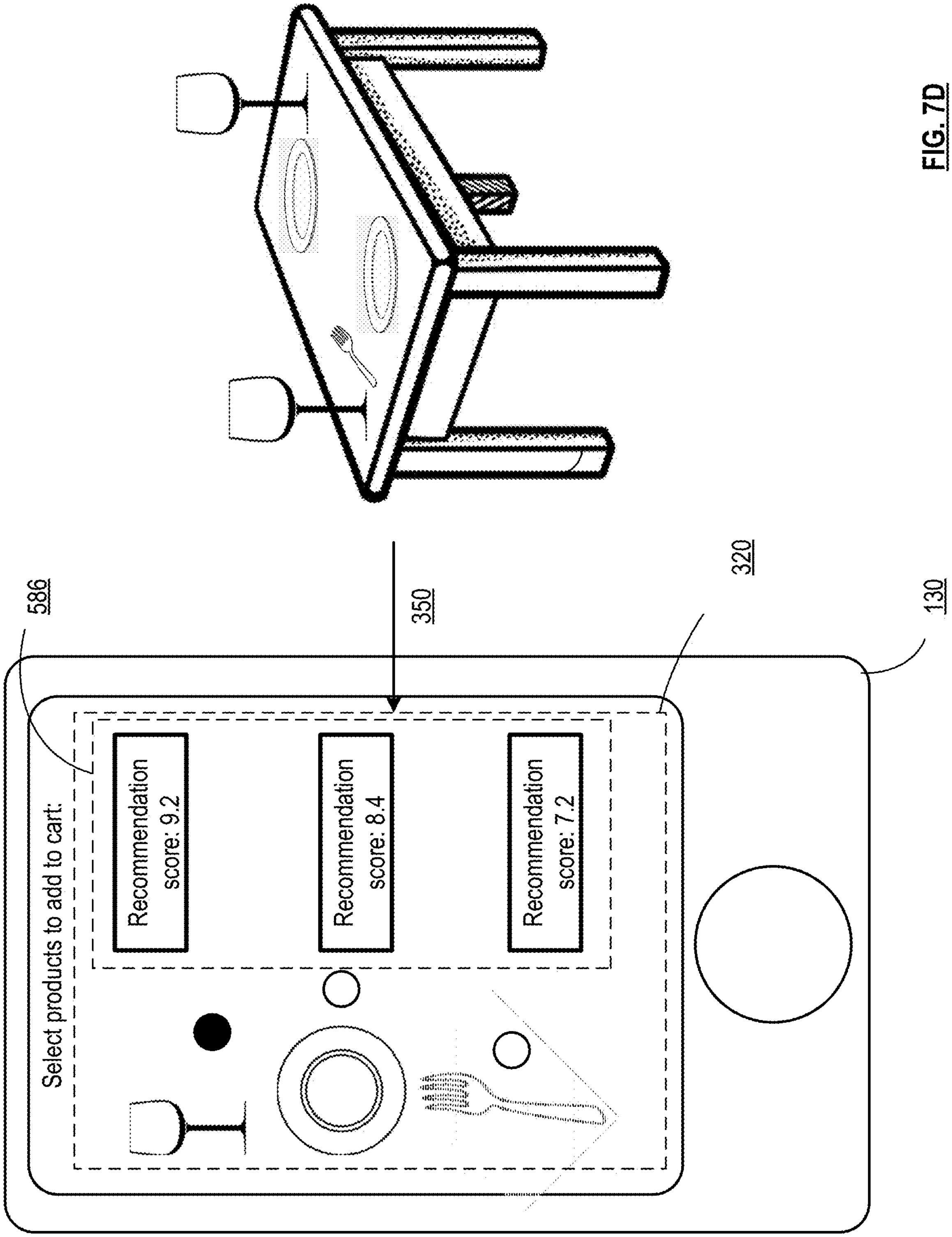

As illustrated in FIG. 7D, in some embodiments, the products are presented as experience option data 320 that indicates and/or is further determined based on the recommendation data 586 for the corresponding user. For example, the products are sorted and/or displayed in accordance with recommendation scores of the recommendation data 586, which can be determined based on learned user characteristics of the user and/or based on similarity to other users that, for example, ordered these items in the past and enjoyed these items as indicated in their respective furnishing unit histories.

In some embodiments, alternatively or in addition to purchasing products, users can elect to rent these products, for example, for an event being hosted by and/or for the user. For example, a user with an upcoming wedding may admire the decor and/or place settings at a particular establishment, and may wish to rent and/or purchase the chair, tables, decor, place settings, wedding dress, attire of guests in the wedding party, and/or other items for use to furnish their upcoming wedding. For example, the establishment 140 is a wedding venue hosting another wedding or another event, and/or the establishment otherwise includes decor and/or other furnishing units whose products are rentable for weddings. The user can similarly have proximity-based interactions 111 with various furnishing units 110 to identify products for rental at their own wedding, where the user can elect to rent the corresponding products and/or schedule a corresponding data for rental of the corresponding products via interactive user interface 275.

As another example, a user with an upcoming wedding may admire other various furnishings they wish to add to their wedding registry or other wish list, for example, to furnish their home. The user can similarly have proximity-based interactions 111 with various furnishing units 110 to identify products for addition to their wedding registry, where other people can purchase these products for the user based on viewing the wedding registry.

Figure 7E:
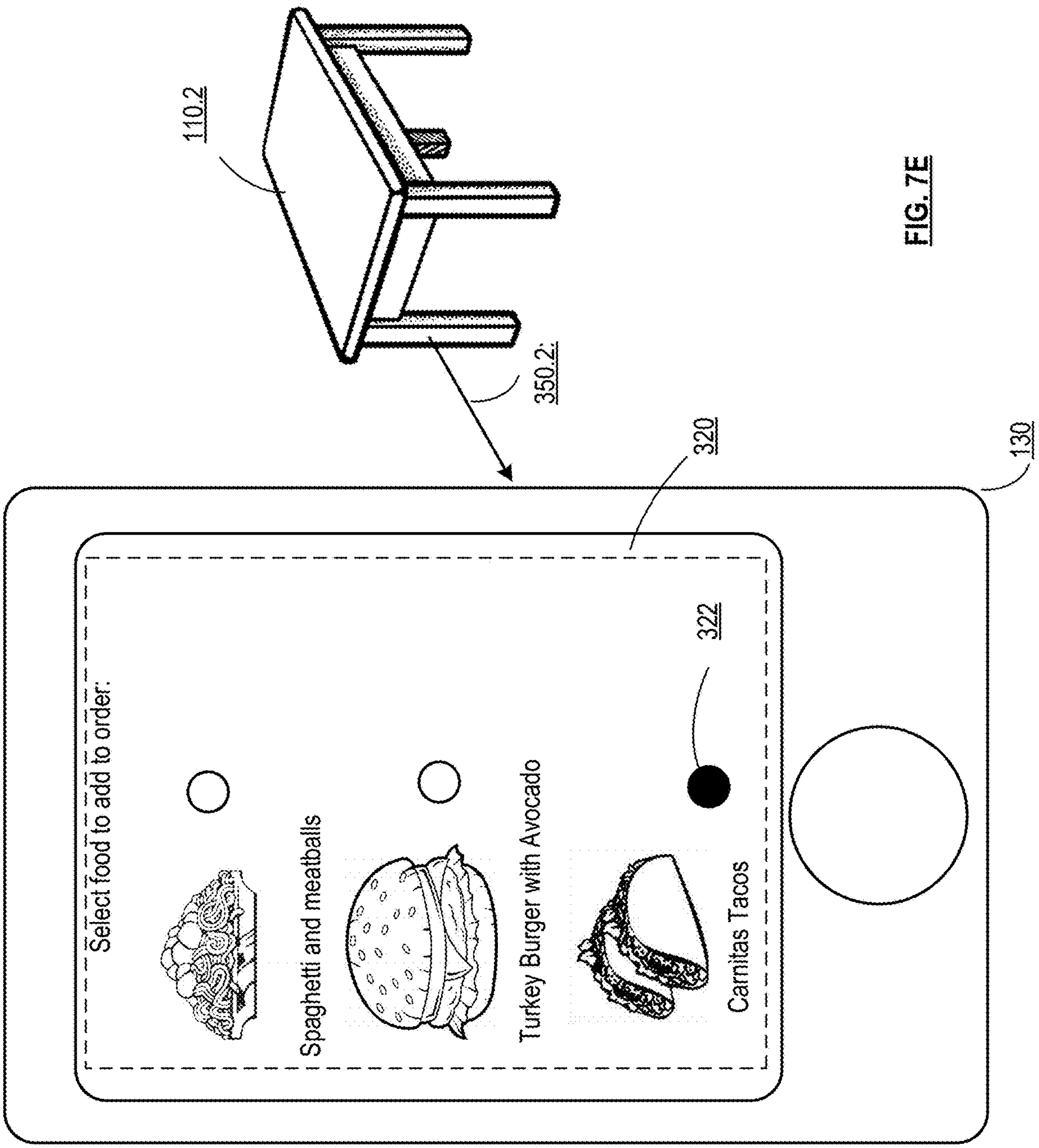

As illustrated in FIG. 7E, the user can purchase other goods and/or services, for example, provided by the corresponding establishment 140 and/or relating to their proximity-based interaction 111 with furnishing units. For example, an establishment serving food and/or beverages can serve food to the user's table, identified via furnishing unit identification data 350, based on the user selecting food to order from experience option data 320. For example, a POS system or other system utilized to track and deliver menu order by users at a restaurant can communicate with and/or implement the furnishing experience system 100 and can be utilized to enable payment by the user to the establishment, and delivery of food and/or beverages ordered by the user as experience selection data 322 to the corresponding furnishing unit.

Figure 7F:
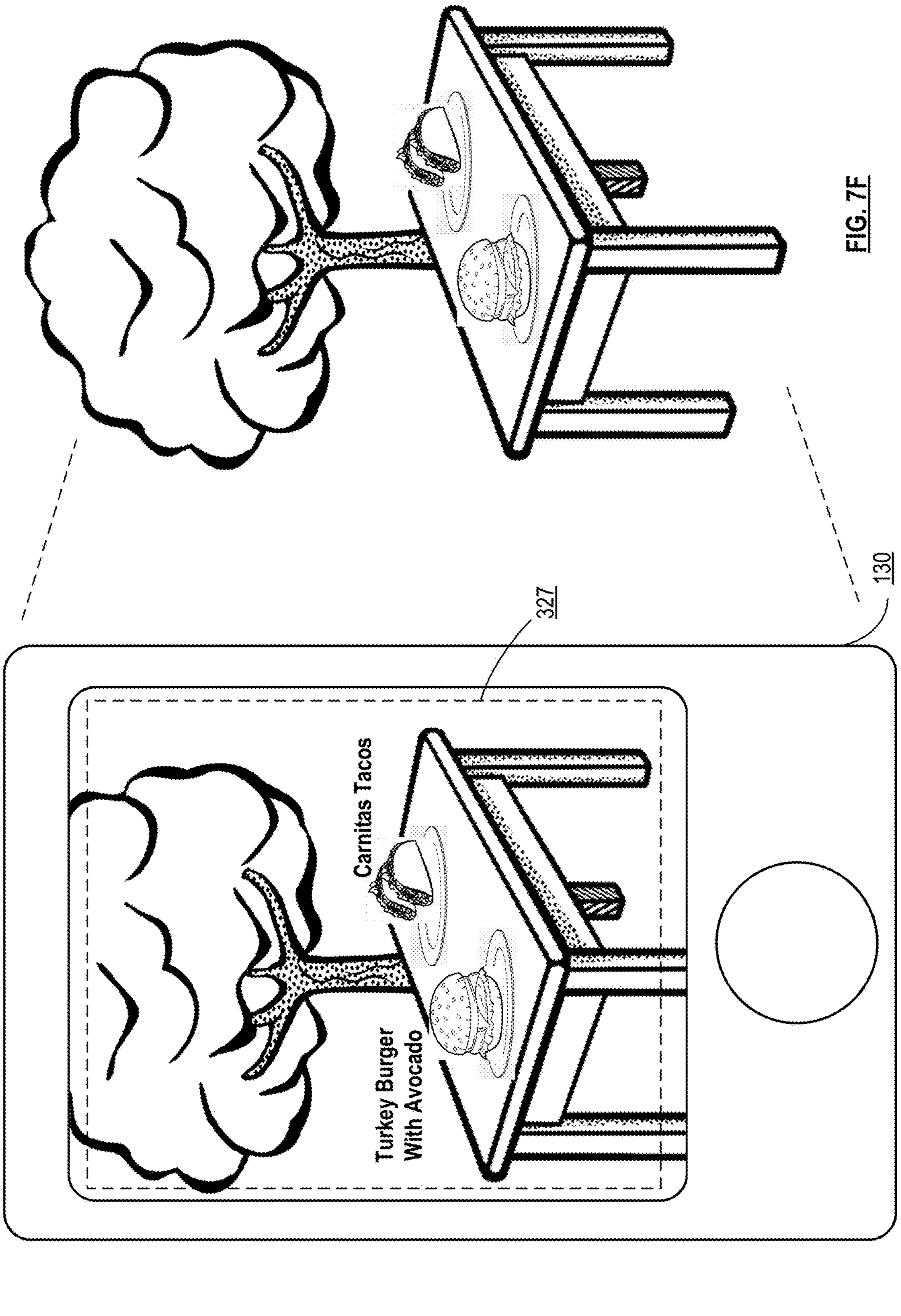
Figure 7G:
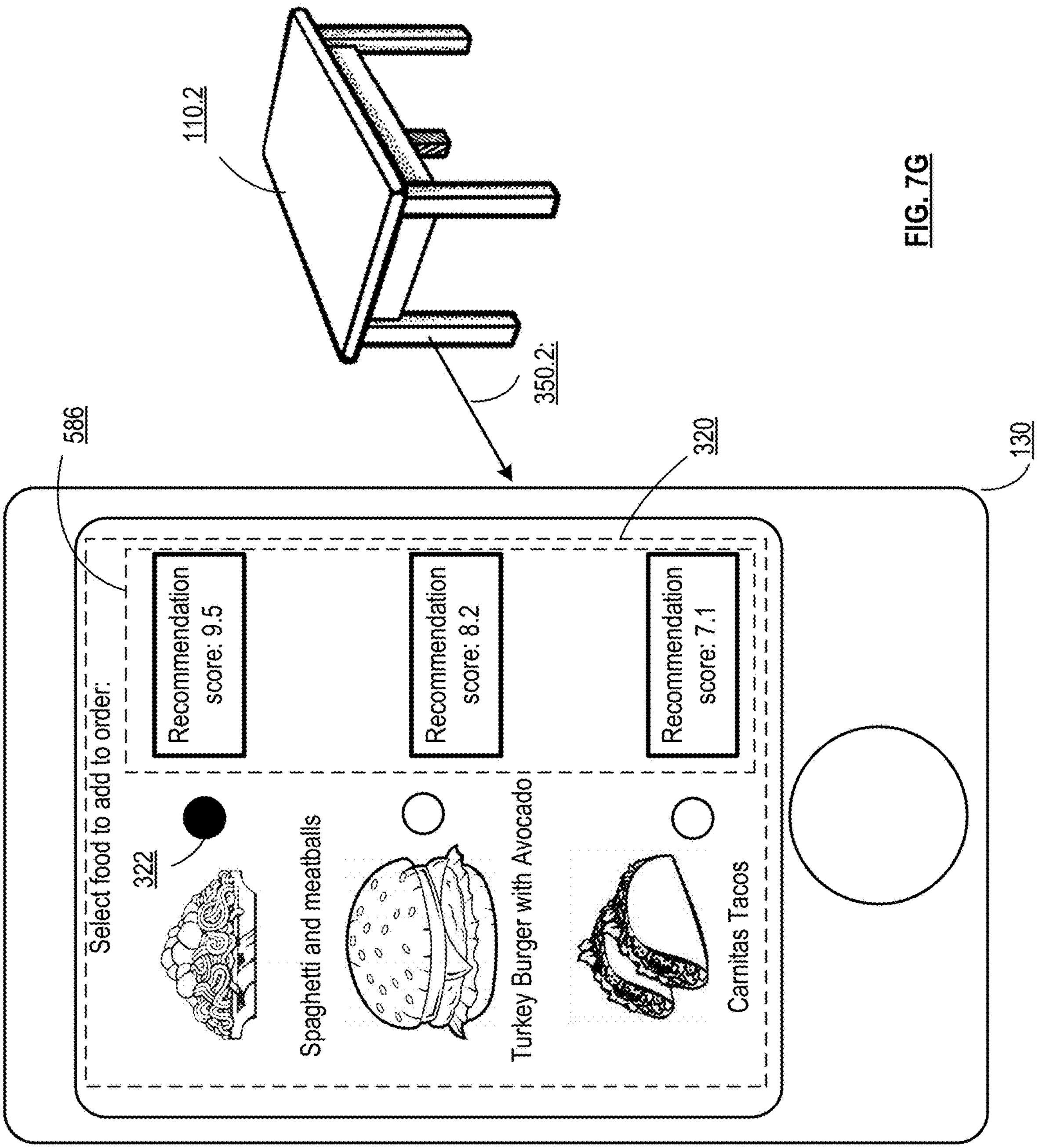

As illustrated in FIG. 7F, the user can optionally utilize their client device in a similar fashion as presented in FIG. 7C to detect goods and/or services, such as food and drink on the menu of the establishment, at other tables nearby, for example, via an augmented reality experience.

For example, a user contemplating what they wish to order can determine what was ordered at tables nearby. The user may be influenced by the smell or visual appearance of the food at neighboring tables, or based on observing the people at these neighboring tables reacting well or poorly to their dishes. Sometimes it can be difficult to discern exactly what another person ordered based on appearance alone, in trying to map the given food to a menu option, and the user may not wish to disturb other guests by asking what they ordered.

The client device can determine goods and services being utilized nearby, such as food at neighboring tables. As one example, the same or different object recognition processing module 219 of FIG. 5J is trained to detect different menu options of a given establishment and/or across multiple establishments as image data 312. As another example, the food ordered by users currently dining at different chairs and/or tables via their respective client devices communicating with the furnishing experience system 100 can be stored, for example, as current status data 653 and/or other data determined based on receiving experience selection data 322 indicating the good and/or services selections, such as menu selection, by these other users via interaction with their client devices in conjunction with their proximity-based interactions with these nearby furnishings as discussed in conjunction with FIG. 7E.

The detected menu items of neighboring tables, such as the names of these items on the menu, their respective costs, and/or clickable elements to direct the user to their description and/or enable the user to order these items, can be displayed, for example, as the user's camera pans to these tables and/or as an augmented reality display 327. Alternatively, the menu items or other detected goods and/or services are optionally displayed in a list and/or table rather than as augmented reality data overlaid upon the captured image data.

As illustrated in FIG. 7F, in some embodiments, the goods and/or services are presented as experience option data 320 that indicates and/or is further determined based on the recommendation data 586 for the corresponding user. For example, the menu items are sorted and/or displayed in accordance with recommendation scores of the recommendation data 586, which can be determined based on learned user characteristics of the user and/or based on similarity to other users that, for example, ordered these items in the past and enjoyed these items as indicated in their respective furnishing unit histories.

FIGS. 8A-8F illustrate example embodiments of proximity-based interactions 111 utilized to facilitate furnishing experiences that include social experiences. Some or all features and/or functionality of client devices 130, furnishing units 110, and/or furnishing experience system 100 of FIGS. 8A-8F can be utilized to implement some or all features and/or functionality of other embodiments of client devices 130, furnishing units 110, and/or furnishing experience system 100 discussed herein.

Figure 8A:
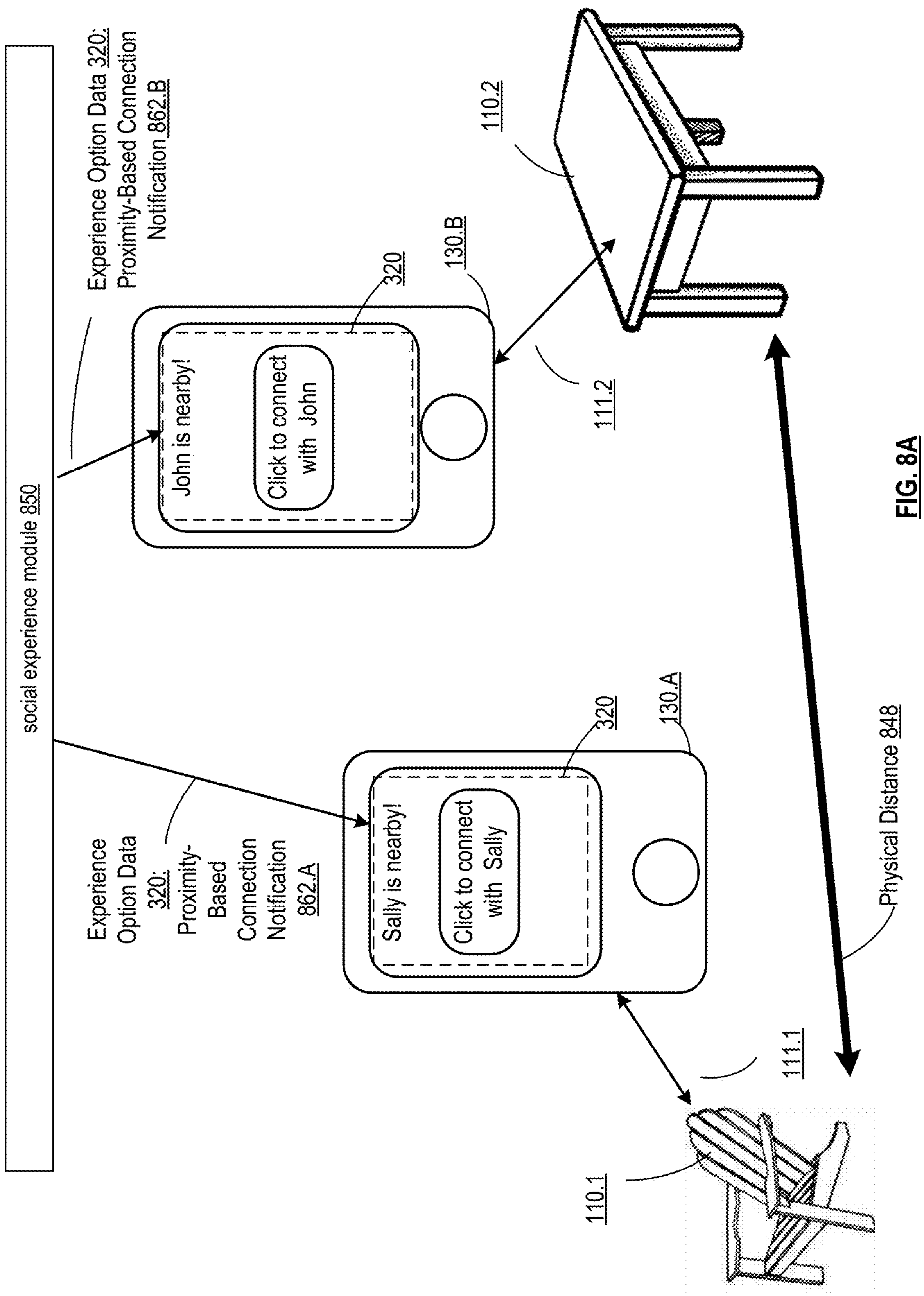
FIGS. 8A-8F are schematic block diagrams of a social experience module in accordance with various examples.

As illustrated in FIG. 8A, a social experience module 850 can be operable to generate and send proximity-based connection notifications 862 to client devices based on detecting sets of users, such as pairs of users or three or more users, are in physical proximity. For example, the social experience module 850 is implemented via at least one processor and/or at least one memory of furnishing experience system 100 and/or via at least one processor and/or at least one memory of one or more client devices 130.

In this example, two client devices 130.A and 130.B, corresponding to two users John and Sally, respectively, have proximity-based interactions 111 with furnishing units 110.1 and 110.2, respectively, at a same given time, within overlapping timeframes, and/or at two times with a temporal difference that compares favorably to a predetermined threshold temporal difference. The experience option data 320 generated for these two users John and Sally by social experience module 850 indicates proximity-based connection data notifications 862 based on the social experience module determining a physical distance 848 between furnishing units 110.1 and 110.2 is favorable, for example, based on being within and/or otherwise comparing favorably to a maximum distance and/or other proximity threshold as discussed in conjunction with FIG. 8C. For example, user John receives proximity-based connection data notifications 862.A indicating that user Sally is nearby, and/or user Sally receives proximity-based connection data notifications 862.B indicating that user John is nearby based on their physical distance 848 being determined to be favorable.

Figure 8B:
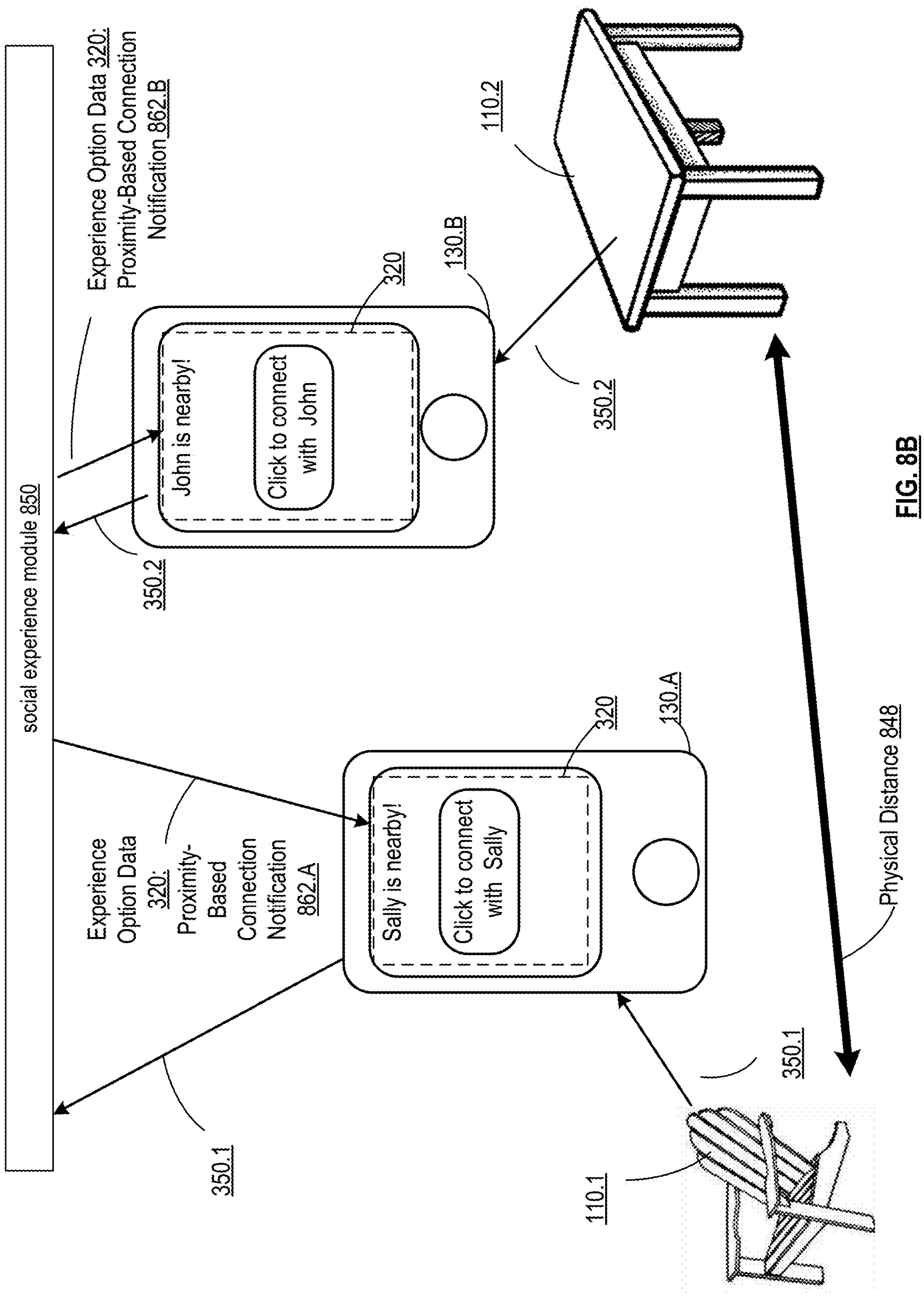

As illustrated in FIG. 8B, social experience module 850 can determine these proximity-based interactions 111 based on receiving and/or determining the furnishing unit identification data 350.1 and 350.2 of furnishing units 110.1 and 110.2, respectively. For example, client devices 130.A and 130.B collect furnishing unit identification data 350.1 and 350.2, respectively, as discussed in conjunction with FIGS. 5A-5J. This can be utilized to identify the respective locations of furnishing units 110.1-110.2, for example, based on location data 660 of their respective furnishing unit data 166. The physical distance 848 can be determined by social experience module 850 as a function of location data 660.

Figure 8C:
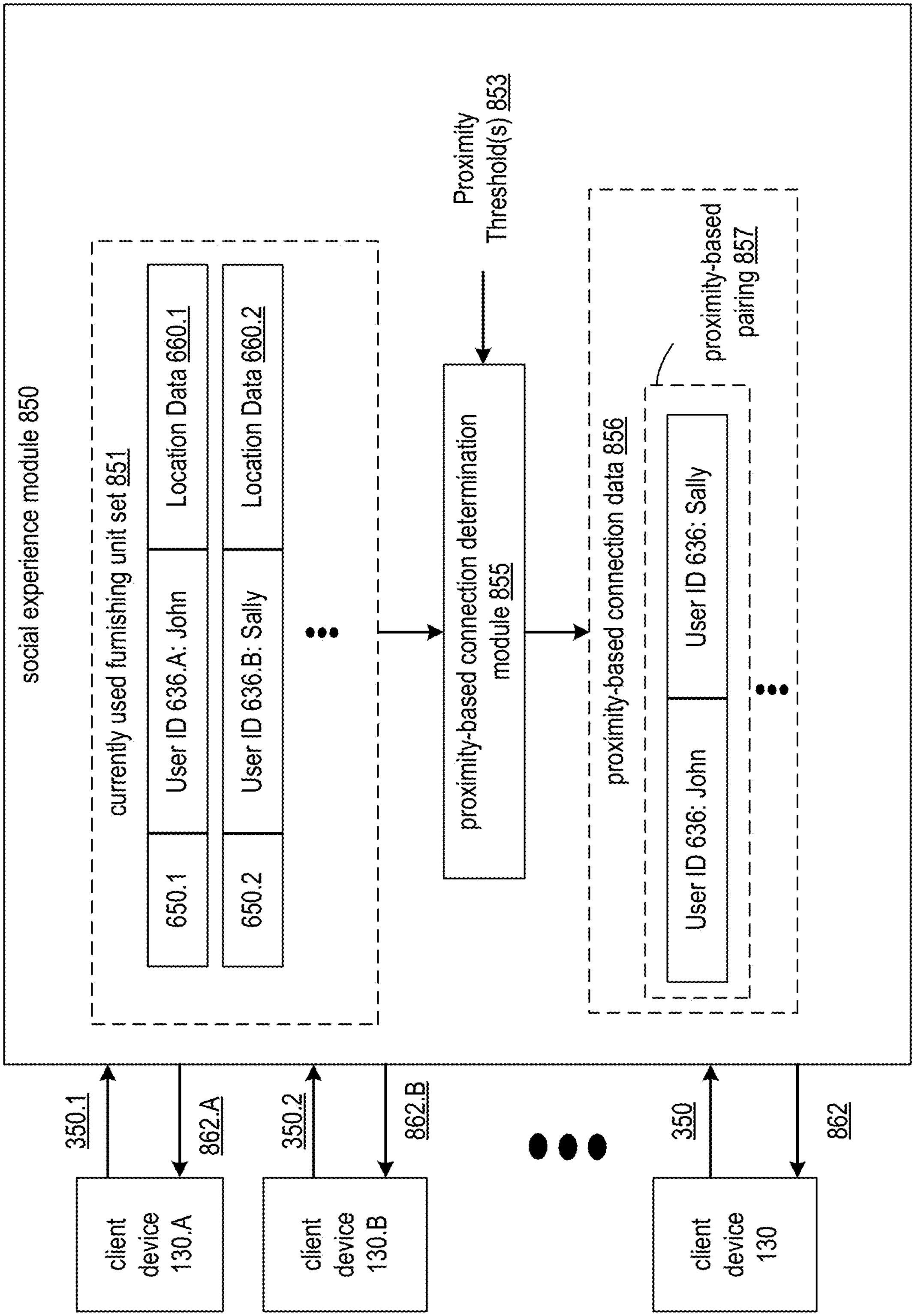
Figure 8D:
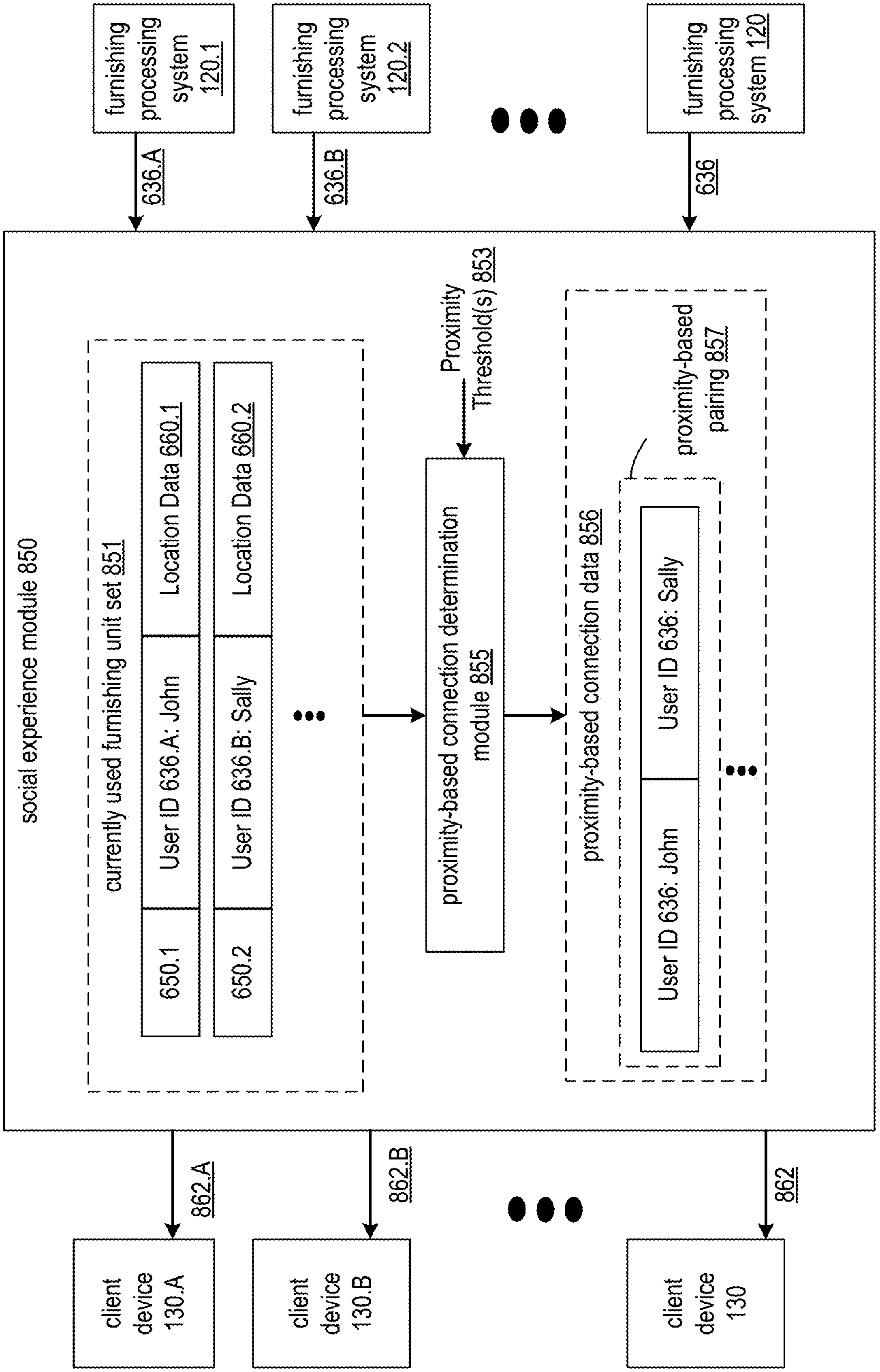

FIGS. 8C and 8D present another embodiment of the social experience module 850. Some or all features of social experience module 850 of FIGS. 8C and/or 8D can be utilized to implement the social experience module 850 of FIG. 8A and/or any other embodiment of social experience module 850, and/or a corresponding furnishing experience system 100, described herein.

As illustrated in FIGS. 8C and 8D, the social experience module 850 can be operable to determine a currently utilized furnishing unit set 851 at a given time, for example, based on ones of the furnishing units 110 with furnishing unit data 166 with current status data 653 denoting corresponding users, denoted with user identifiers 636, are currently having and/or recently had proximity-based interactions 111 with these furnishing units. The locations of these furnishing units can further be indicated, for example, based on location data 660 of furnishing unit data 166 of the corresponding furnishing units, which can indicate an establishment identifier 610 and/or physical location data 615 indicating a geolocation, address, and/or location of the furnishing unit within the corresponding establishment.

As illustrated in FIG. 8C, the user identifiers of a given user currently utilizing a given furnishing unit 110 can be based on receiving furnishing unit identification data 350 indicating the furnishing unit identifier 650 and/or establishment identifier 610 of the given furnishing unit from a client device 130 of the given user based on the client device collecting and/or transmitting this furnishing unit identification data 350 as discussed previously. Alternatively or in addition, as illustrated in FIG. 8D, the user identifiers of a given user currently utilizing a given furnishing unit 110 can be based on receiving current status data 653 indicating these user identifiers 636 from corresponding furnishing processing systems 120, for example, based on pairing with and/or receiving user identifiers 636 from corresponding client devices 130 in proximity-based communications 160 with these client devices 130.

In such embodiments, geolocation data of the client devices 130 and/or corresponding users themselves optionally need not be utilized, for example, based on the respective locations and/or approximate locations being determinable directly from the known locations of the furnishing units 110, and the knowledge that client devices 130.A and 130.B are currently and/or were recently in proximity of these furnishing units based on determining the client devices has their proximity-based interactions 111 with these furnishing units. Alternatively, in other embodiments, geolocation data received the client devices 130 and/or corresponding users can be utilized instead of or in addition to the known locations of the furnishing units 110.

A proximity-based connection determination module 855 can be operable to generate proximity-based connection data 856 based on the currently used furnishing unit set 851. This can include comparing various distances between location data 660 of some or all possible pairs of furnishing units 110 in the currently used furnishing unit set 851 with one or more proximity based thresholds 853. Some or all pairs of furnishing units 110 in the currently used furnishing unit set 851 can have their corresponding user IDs 636 of users currently utilizing these furnishing units as denoted in currently used furnishing unit set 851 indicated in a proximity-based pairing 857. A proximity-based connection notification 862 can be generated for one or more both users in some or all proximity-based pairings 857 indicating the other user in the proximity based pairing.

Proximity threshold 853 can dictate furnishing units being within a same establishment, for example, regardless of the size of the establishment. For example, a given pair users are only connected via proximity-based connection notifications 862 if their corresponding furnishing units 110 are within the same establishment 140. Proximity threshold 853 can dictate furnishing units being within a same given room and/or same physical region within establishment. For example, a given pair users are only connected via proximity-based connection notifications 862 if their corresponding furnishing units 110 are within the same room and/or physical boundary within the same establishment. Proximity threshold 853 can alternatively correspond to a threshold distance, such as a number of meters, blocks, and/or kilometers between furnishing units and/or different establishments in which different furnishing units are located. For example, a given pair users are only connected via proximity-based connection notifications 862 if their corresponding furnishing units 110 are within establishments 140 that are within the threshold distance from each other, and/or are otherwise at locations that are within this threshold distance. Proximity threshold 853 can alternatively correspond to a threshold travel time, such as an expected amount of time for travel between the establishments the user to travel via car, bike, foot, and/or public transit. For example, a given pair users are only connected via proximity-based connection notifications 862 if their corresponding furnishing units 110 are within establishments 140 that are within the threshold travel time from each other, and/or are otherwise at locations that are within this threshold travel time.

Different users can optionally configure their own proximity thresholds, for example, based on how far they wish to relocate to physically connect with another user. For example, a given pair users are only connected via proximity-based connection notifications 862 if their corresponding furnishing units 110 compare favorably to the proximity thresholds configured by both users. As another example, a first user in a given pair of users receives proximity-based connection notifications 862 based on the two furnishing units 110 in the pair comparing favorably to the proximity thresholds configured by this first user, while the second user in the given pair of users does not receive proximity-based connection notifications 862 based on the two furnishing units 110 in the pair comparing unfavorably to the proximity threshold configured by this second user. Alternatively or in addition, the proximity threshold can be predetermined by the social experience module 850 and/or a corresponding administrator.

Users can elect to communicate via chat, voice, and/or video communications in response to receiving the proximity-based connection notifications 862, for example, via a communications platform facilitated via social experience module 850. This election to elect to communicate via chat, voice, and/or video communications can correspond to experience selection data 322. The corresponding furnishing experience can include the facilitation of these chat, voice, and/or video communications. In some embodiments, communications are only enabled once both users in a given pair elect to communicate with the other respective user via interactive user interface 275 and/or via their configured preferences in their user accounts.

Alternatively or in addition to indicating a name and/or identifier of the other user in the proximity based pairing, a given proximity-based connection notification 862 can indicate the location data 660 of the other corresponding furnishing unit 110 when presented via interactive user interface 275, such as an address, name of the corresponding establishment, and/or location of the furnishing unit within its given establishment such as, for example, "rooftop", "ballroom", "back left corner", "to the right of the bar" and/or "back patio space". Navigation data can optionally be presented to the user via interactive user interface 275 to direct a first user to the location of the other user in the pairing. The corresponding furnishing experience can include the facilitation of an in-person meetup via presentation of the location data 660 of the other corresponding furnishing unit 110. In some embodiments, locations of a first user in a given pair is only presented to a second user in a given pair if the first user elects to share their location with the second user via interactive user interface 275 and/or via their configured preferences in their user accounts.

In some embodiments, if connected users are currently at different respective establishment and elect to meet-up in person, the proximity-based connection notification 862 can be generated to indicate a proposed meet-up location to which both users can relocate to meet in person. The proposed meet-up location can be automatically selected, for example, based on an intermediate point between the two users and/or having a similar distance from both users.

The proposed meet-up location can be automatically indicated as a selected establishment selected from a set of establishments 140, for example, with corresponding entries in the establishment database and/or with furnishing units 110 of the furnishing experience system 100. The selected establishment 140 can be selected based on its respective location from the two other locations at which the users are currently located, such as a midpoint and/or being relatively equidistant from both current locations. Alternatively or in addition, the selected establishment 140 can be selected based on being similar to the two establishments 140 the respective pair of users are currently located, such as based on having a similarity score with one or more both establishments via performance of a similarity function that compares favorably to a similarity score threshold. This can be ideal in ensuring users are not relocated to a type of establishment that is too different in atmosphere, type of food served, and/or other learned and/or known characteristics from their current establishment. Alternatively or in addition, the selected establishment 140 can be selected based on being a recommended establishment 610 in experience recommendation data 585 for one or both users. This can be ideal in ensuring users are expected to enjoy relocating to the new establishment, even if their meetup with the other user ends up not being as favorable as they hoped.

Figure 8E:
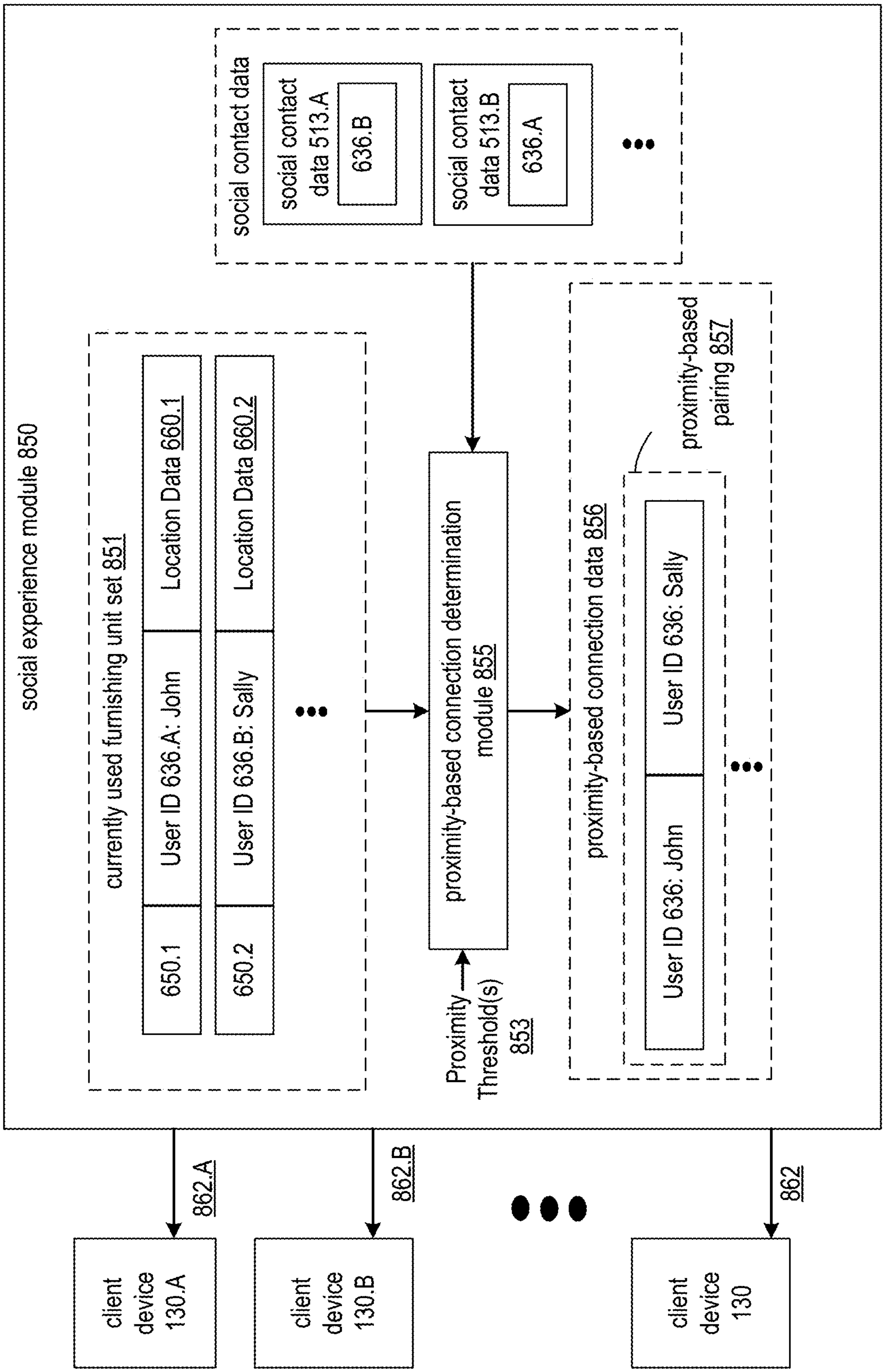

FIG. 8E presents another embodiment of the social experience module 850. Some or all features of social experience module 850 of FIG. 8E can be utilized to implement the social experience module 850 of FIG. 8A and/or any other embodiment of social experience module 850, and/or a corresponding furnishing experience system 100, described herein.

As illustrated in FIG. 8E, the proximity-based connection data can be optionally based on existing social contacts of users identified in currently used furnishing unit set 851. For example, a first user is only paired with a second user, and/or corresponding proximity-based connection notifications 862 are only sent to these users, when the first user and second user have a prior and/or existing connection, for example, in their social connection data 513. In this example, John receives the proximity-based connection notifications 862 indicating Sally based on Sally's social connection data 513 indicating John's user identifier, and/or further based on John's social connection data 513 indicating Sally's user identifier.

The social connection data indicating a given pair of users can optionally be generated when this pairing is first identified. For example, the two users John and Sally may be strangers that have never met in person or virtually, but can elect to connect in this instance despite being strangers. For example, users can configure their configured preference data 596 to indicate whether they are open to meeting strangers, and/or whether they wish to only be connected with existing contacts in social connection data 513 with which they previously connected, for example via social experience module 850 in a prior temporal period and/or otherwise knew previously and denoted as a social connection in their social connection data 513.

In such embodiments, experience feedback data 616 can optionally be collected for both users during and/or after their virtual and/or in-person connection, for example, where John and Sally only persist in each other's social connection data 513 when both John and Sally provide favorable experience feedback data 616 for the social connection. For example, John and Sally can be paired in future instances when their respective furnishing units compare favorably to the proximity threshold 853 based on having previously connected, for example, initially as strangers, and further based on having both provided favorable experience feedback data 616 for some or all prior connections and/or otherwise indicating they would meet up with this user again if they were nearby.

Figure 8F:
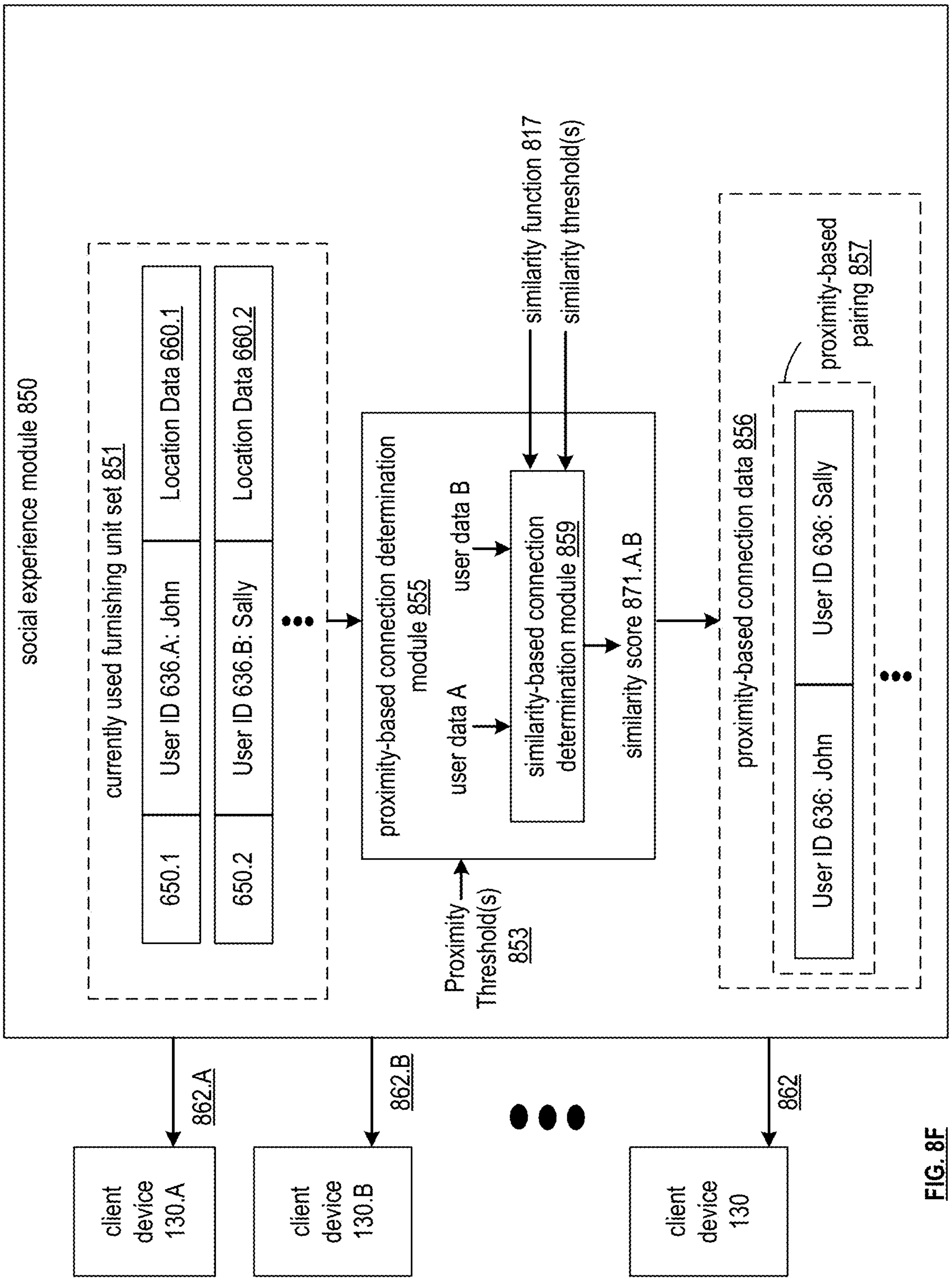

FIG. 8F presents another embodiment of the social experience module 850. Some or all features of social experience module 850 of FIG. 8F can be utilized to implement the social experience module 850 of FIG. 8A and/or any other embodiment of social experience module 850, and/or a corresponding furnishing experience system 100, described herein.

As illustrated in FIG. 8F, the proximity-based connection data can be optionally based on identifying pairs of users that are expected to have a favorable connection, for example, when the two users are strangers and/or are otherwise not prior contacts indicated in each other's social contact data 513. This can include implementing a similarity-based connection determination module 859, for example, to perform a similarity function 817 to generate a similarity score 871 for some or all pairs of possible users, and/or for only pairs of users with respective locations of their furnishing units 110 already determined to compare favorably to proximity thresholds.

For example, performing similarity function can be based on comparing some or all information in user account, such as learned user characteristic data 585, demographic data 592, and/or other information indicated in and/or derived from user-based furnishing experience history. For example, users that enjoy similar types of experiences, similar types of establishments, having visited and/or enjoyed same establishments, live in similar locations, are similar ages, enjoy similar types of food, have purchased similar types of products, and/or are otherwise determined to be similar can have favorable similarity scores 871 generated accordingly and/or can be paired accordingly.

In some embodiments, another user in a same pair as a given user based on being identified as similar and/or likely to have a favorable connection can be identified in and/or implemented as the given user's recommendation data 586, where these proposed connections are presented to the user as recommended options of presented experience option data 320 presented via interactive user interface 275 and/or correspond to recommended furnishing experiences for the given user.

Alternatively or in addition, performing similarity function can be based on the similarity of the respective establishments in which the users are currently located. For example, the users are paired based on currently being located in establishments with a similarity score that compare favorably to a similarity threshold, such as predetermined threshold value. Alternatively or in addition, performing similarity function can be based on whether the respective establishment at which a given user is currently located is a recommended establishment in experience recommendation data 586 for the other user in the pair. Such establishment-based pairings can be ideal in ensuring that if one user relocates to the establishment of the other user, their experience at the other establishment is expected to be similar and/or expected to be enjoyed by this one user, which can be ideal in ensuring the one user's general experience is not disrupted even if their meeting with the other user ends up not being favorable.

Users can optionally configure one or more types of connection in which they are interested, such as whether they are interested in social, professional, and/or romantic connections, for example, in configured preference data 596, and are optionally connected with users looking for one or more of the types of connections. Similarity functions for different types of connections are optionally different, for example, where the relevant data and/or criteria for a professional connection that would induce a favorable similarity score is different from the relevant data and/or criteria for a romantic connection that would induce a favorable similarity score.

In some embodiments, different proximity thresholds can be configured by a user for different ones of their social connections and/or different types of connections, for example, in configured preference data 596 based on user input to interactive user interface 275. For example, a given user may indicate they are only interested in meeting new people if they are located within the same given establishment, but that they would be willing to relocate multiple blocks to a different restaurant or bar to meetup with prior connections. Particular people with which the user is more interested in reconnecting can be configured with proximity thresholds of greater distances accordingly. Particular types of people, as indicated in data stored in users accounts 165, with which the user is interested in connecting, for example, for the first time, can be configured with proximity thresholds of particular configured distances accordingly.

In some cases, users can be connected based on similarity scores regardless of their current locations. For example, users can be prompted to meet up at an establishment identified automatically as being recommended for both users at a later time based on these users having a favorable similarity score.

In some cases, the type of establishment can further come into account, for example, where pair of users are only paired based on the respective establishment in which one or both users are located. For example, a user indicates they are only interested in meeting up with other users if they are also located in the same type of establishment and/or at another establishment with a similarity score with the establishment at which the user is currently located that compares favorably to a similarity threshold, for example, based on having a same type of atmosphere, serving the same type of food, having similar types of furnishing units, and/or otherwise being learned and/or known to be of a same or similar type. As another example, the user can indicate they only wish to relocate to particular types of establishments, for example, where the user elects to relocate only if the destination location is and/or includes a bar. As another example, the user can indicate that they wish to relocate only if the destination location serves a particular type and/or brand of food and/or beverage. For example, the user indicates they will only relocate to bars that serve French fries and/or a particular make of whiskey. As another example, the user can indicate they only wish to relocate to establishments that have a recommendation score for the user that is at least as favorable as a recommendation threshold, and/or that is otherwise recommended for the user in experience recommendation data 586. As another example, the user can indicate they only wish to relocate to establishments that the user has previously visited and/or that have favorable experience feedback data 616 for example, as indicated in their user-based furnishing experience data 512. Some or all of these preferences can be indicated in filtering parameter data and/or configured preference data utilized to filter parameters recommended for the user as discussed in conjunction with FIG. 9C and/or FIG. 9D.

In some embodiments, proximity thresholds can be automatically adjusted based on the similarity score for a given pair of users, for example, where greater distances are deemed acceptable in proximity thresholds when the corresponding similarity score is high and/or exceeds a configured threshold, while closer proximity is required by proximity thresholds when the corresponding similarity score is lower and/or does not exceed a configured threshold. For example, the threshold distance indicated by proximity thresholds is an increasing function of similarity score, where more favorable similarity scores induce greater distance maximums.

FIGS. 9A-9I illustrate embodiments of location guidance facilitated to inform users of and/or direct users to furnishing units 110 and/or establishments 140 in various locations.

Some or all features and/or functionality of client devices 130, furnishing experience system 100, and/or furnishing units 110 of FIGS. 9A-9I can be utilized to implement client devices 130, furnishing experience system 100, and/or furnishing units 110 of other embodiments discussed herein.

As illustrated in 9A, a location information communication module 870 can be operable to send an establishment set 771 indicating a set of some or all possible establishments for view by the user via interactive user interface 275. Alternatively or in addition, as illustrated in 9B, a location information communication module 870 can be operable to send a furnishing unit set 777 indicating a set of some or all possible furnishing units for view by the user via interactive user interface 275. For example, the location information communication module 870 is implemented via at least one processor and/or at least one memory of furnishing experience system 100, via at least one processor and/or at least one memory of furnishing processing systems 120, and/or via at least one processor and/or at least one memory of one or more client devices 130.

In these instances, the user is optionally not currently engaging in a proximity-based interaction 111 with a furnishing unit 110, and instead is looking to browse, select, and/or be directed to the location of possible furnishing units 110 and/or possible establishments 140. For example, once the user selects a particular furnishing unit 110 and/or particular establishments 140 based on browsing and selecting from a corresponding furnishing unit set 777 and/or establishment set, the user can receive the location of and/or navigation data directing the user to the selected furnishing unit 110 and/or establishments 140. Upon arriving at the location of the selected furnishing unit 110 and/or establishment 140, the user can have at least one proximity-based interaction 111 with the selected furnishing unit 110 and/or with one or more furnishing units 110 at the selected establishment 140, respectively.

Alternatively, this information can be presented in conjunction with facilitating a furnishing experience and/or presenting experience option data 320, based on the user already engaging in a proximity-based interaction with a furnishing unit 110. For example, the user can be presented with a set of other furnishing units and/or other establishments as options for where to head to next, from their current location at the given furnishing unit and/or corresponding establishment, for further furnishing experiences, such as a nearby restaurant and/or bar with its own furnishing units 110.

The establishment set 771 can indicate names, locations of, a type of establishment, and/or other data of one or more establishments 140. The furnishing unit set 777 can indicate unique identifiers of, locations of, type of product, and/or other data of one or more furnishing units 110.

The respective locations of establishments and/or furnishing units can optionally be depicted graphically upon a map and/or overhead image data presented via interactive user interface 275 depicting a geographic region that includes these establishments and/or furnishing units. Navigation instructions can optionally be visually presented via interactive user interface 275 to direct the user to the locations of selected establishments and/or furnishing units by car, bike, foot, a rideshare system, and/or public transportation. The user can optionally be navigated to a furnishing unit within an establishment, such as "head outside to the back left corner next to the rose bush."

The possible establishments of an establishment set 771 optionally correspond only to establishments 140 in the establishment database 164, and/or that have furnishing units 110 and/or products of the furnishing experience system The possible furnishing units 110 of a furnishing unit set 777 optionally correspond only to furnishing units 110 in furnishing unit database 163, and/or products of product database 168, such as furnishing units 110 with known locations and/or products known to be at particular establishments.

The establishment set 771 and/or furnishing unit set 777 can optionally be filtered subsets selected from a full set of establishments and/or furnishing units. For example, establishment set 771 is selected as a proper subset of all establishments in establishment database 164. As another example, furnishing unit set 777 is selected as a proper subset of all establishments in furnishing unit database 163.

Figure 9A:
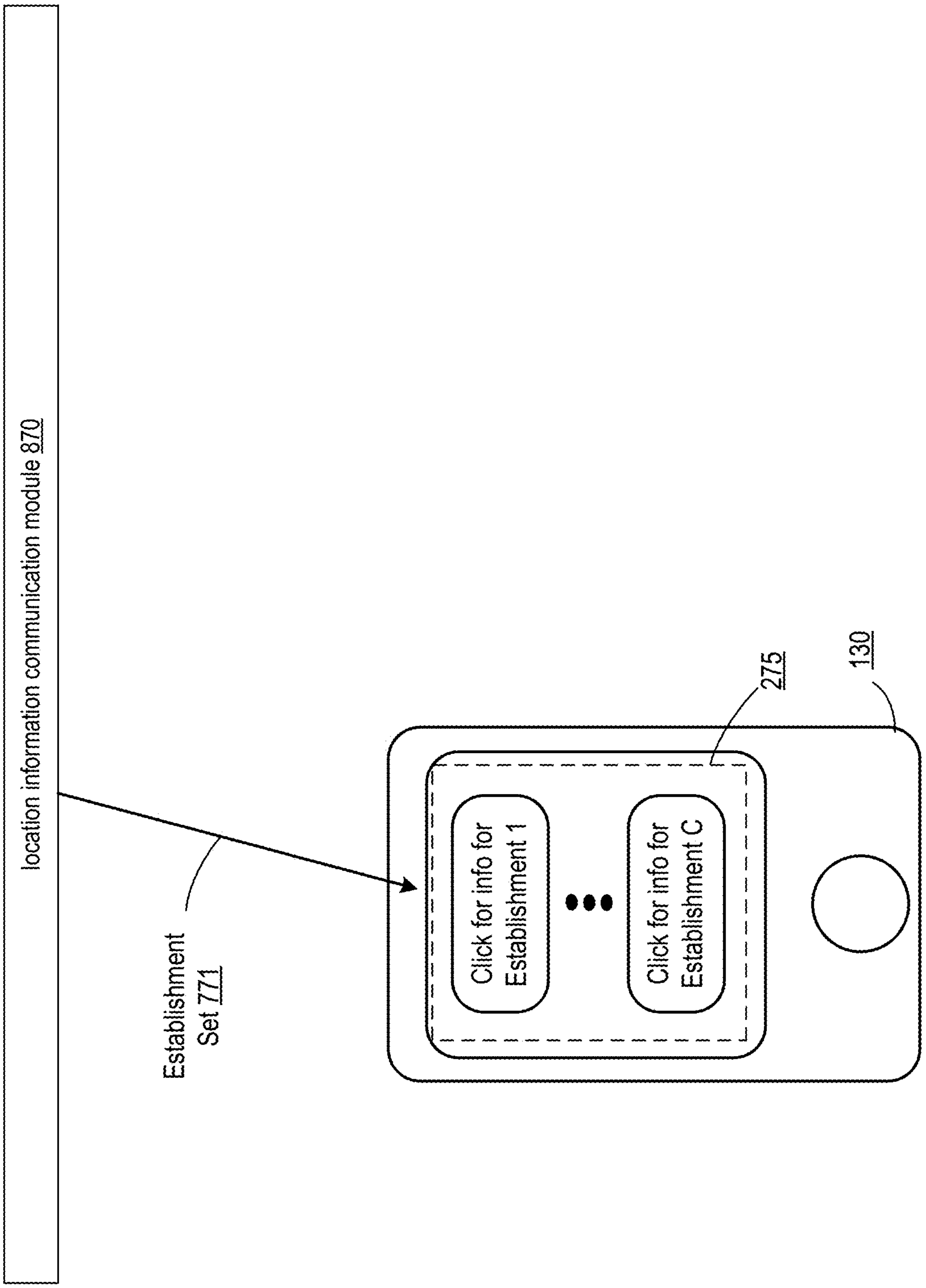
FIGS. 9A-9G are schematic block diagrams of a location information communication module in accordance with various examples.
Figure 9B:
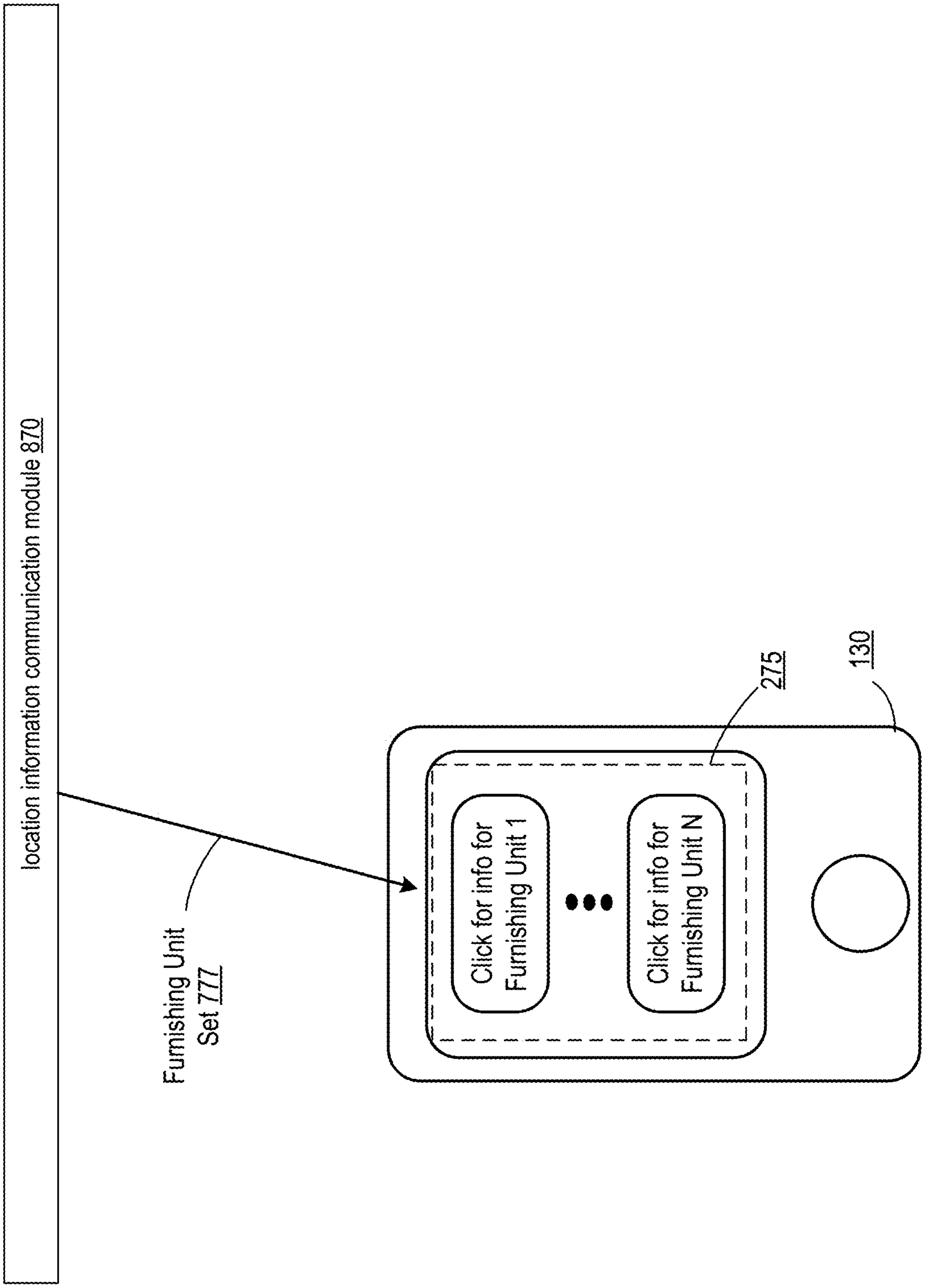
Figure 9C:
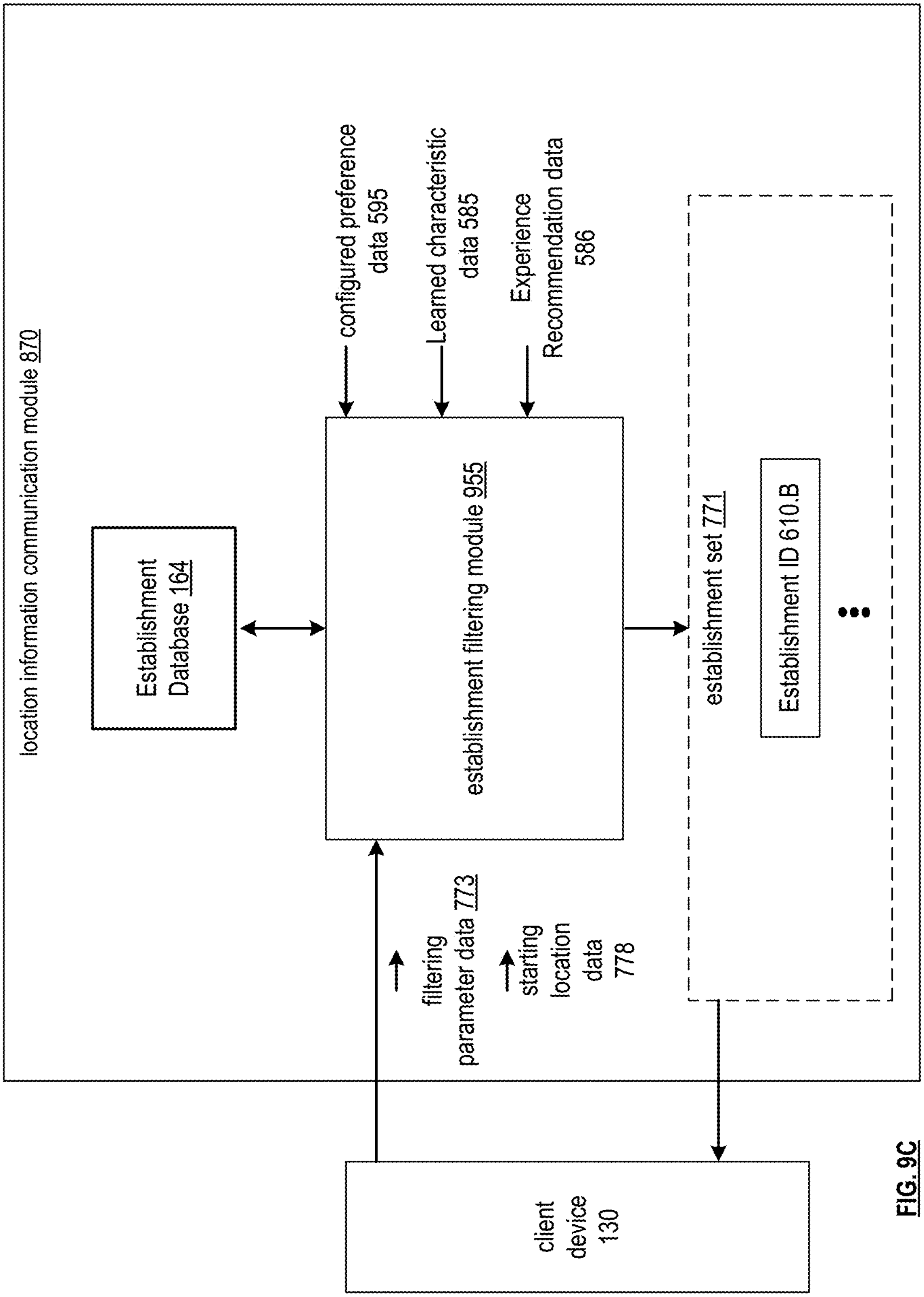
Figure 9D:
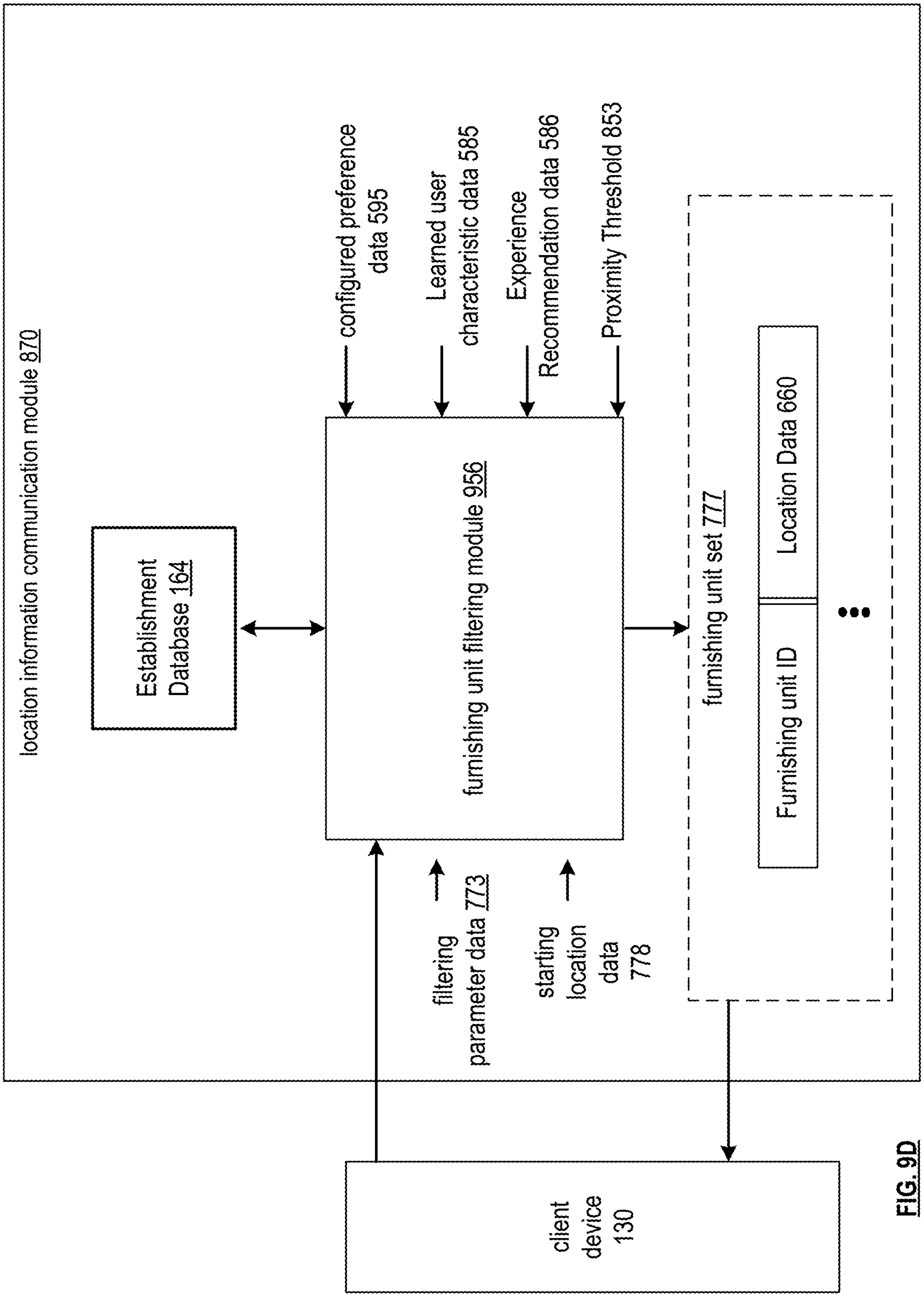

FIGS. 9C and 9D illustrate such embodiments of a location information communication system 870 that generate the establishment set 771 and/or furnishing unit set 777 sent to client devices of one or more users via an establishment filtering module 955 and/or a furnishing unit filtering module 956. Some or all features and/or functionality of the location information communication system 870 of FIGS. 9C and/or 9D can implement the location information communication system 870 of FIGS. 9A and/or 9B, respectively, and/or any other embodiment of location information communication system 870 described herein.

The establishment set 771 can be generated as a filtered subset of a plurality of possible establishments and/or the furnishing unit set 777 can be generated as a filtered subset of a plurality of possible furnishing units 110 based on: filtering parameter data 773 received by the user based on their current and/or recent interaction with interactive user interface 275, starting location data 778 configured by and/or determined or the user; configured preference data 595 stored in and/or accessed from the user's user account 165; learned user characteristic data 585 generated for the given user; and/or experience recommendation data generated for the given user.

The establishment set 771 can be generated based on accessing and/or generating experience recommendation data 586 for the user, where the establishment set 771 indicates a set of establishments recommended for the user to visit as discussed previously. Different users can have different establishment sets 771 generated based on having different experience recommendation data 586.

The establishment set 771 can alternatively or additionally be generated based on the starting location data 778, such as the user's current location and/or a configured starting location, where establishments are selected based on being within proximity of the starting location data 778. For example, only establishments whose distance from starting location data 778 compares favorably to a proximity threshold 853 are indicated in establishment set 771 for the user. Different users can have different establishment sets 771 generated based on having different starting location data 778. The user's current location can optionally be based on location data 660 of a furnishing unit 110 with which the current is currently interacting and/or has recently interacted.

Alternatively or in addition, the filtering parameter data 773, configured preference data 595, and/or learned user characteristic data 585 can indicate one or more user selections and/or learned preferences regarding filtering of establishments, such as: a name of the particular establishment; configured type of establishment; particular types and/or brands of food and/or beverages served at the establishment; particular brand of the establishment; particular owner, chef, mixologist, barista, and/or other particular prominent personnel and/or particular type of prominent personnel; maximum physical and/or travel distance to the establishment, such as a user configured proximity threshold 853 as discussed in conjunction with FIGS. 8A-8F, from a starting location indicated in starting location data 778 such as the users current location, users home, or other configured starting location; one or more product names of furnishing units 110 and/or other products included in the establishment; operating hours of the establishment; configured crowds at the establishment, for example, denoting configured preferences for current wait time, parking availability, crowdedness of the establishment, and/or availability of furnishing units 110, such as chairs and/or tables, at the establishment; configured social connections and/or number of social connections of the user currently at the establishment; configured configuration of furnishing units at the establishment, current weather, noise, and/or atmosphere conditions at the establishment; and/or other configured preference regarding various characteristics of the establishment. One or more of these configured preferences can optionally be received from client device 130 as selections indicated in experience selection data 322 based on a user having a proximity-based interaction with a furnishing unit 110. Different users can have different establishment sets 771 generated based on having filtering parameter data 773, configured preference data 595, and/or learned user characteristic data 585.

For example, these preferences are compared to known, current and/or learned characteristics of corresponding establishments in the establishment database 164, such as its address and/or location, its learned establishment characteristic data 647, product identifiers 652, establishment layout data 673, current data of the establishment, and/or other data for the establishment. For example, only ones of the plurality of possible establishments 140 with requirements indicated to be met by the establishments respective data are included in the establishment set 771.

Current data for these establishments, such as weather, how crowded the establishment is, and/or atmosphere of the establishment, can optionally be collected via the Internet. Current data for the establishment, such how crowded the establishment is and/or how many furnishing units are currently available can be based on current status data 653 of its furnishing units. Estimated current data for the establishment, such how crowded the establishment is, how favorable the current atmosphere is, or how favorable being at the establishment currently is. can be automatically generated based on: recently received experience feedback data 616 for proximity-based interactions with furnishing units at this establishment, for example, that are with users similar to the given user; and/or historical current status data 653 for proximity-based interactions with furnishing units at this establishment, for example, that are with users similar to the given user, and/or that are at similar times of day, similar days of the week, and/or similar times of year.

The establishment set 771 can optionally be generated for a given user based on information regarding a current establishment at which the user is currently located, where the current establishment is optionally indicated as the starting location data 778. The user can be determined to be currently located at this current establishment based on an establishment identifier 610. This establishment identifier 610 can optionally be indicated in furnishing unit identification data 350 received from the client device 130 of a proximity-based interaction currently or recently had by the user. This establishment identifier 610 can alternatively or additionally be determined based on a furnishing processing system 120 of a furnishing unit at the establishment identifying the user identifier 636 of the corresponding user. This establishment identifier 610 can alternatively or additionally be determined based on determining a geolocation and/or current address of the user, received from and/or generated by the client device 130, is within and/or is in proximity of a corresponding geolocation and/or address of the establishment 140 corresponding to this establishment identifier 610.

Establishments can be selected for inclusion in establishment set 771 based on only including other establishments of a same type as the current establishment at which the user is currently located and/or establishment having a similarity score with the current establishment at which the user is currently located that compares favorably to a similarity threshold, for example, based on having a same type of atmosphere, serving the same type of food, having similar types of furnishing units, having similar learned establishment characteristic data, and/or otherwise being learned and/or known to be of a same or similar type.

In some embodiments, proximity thresholds can be automatically adjusted based on the similarity score for a current establishment and establishments for inclusion the establishment set 771, and/or a recommendation score of establishments for inclusion the establishment set 771 for example, where greater distances of travel are deemed acceptable in proximity thresholds when the corresponding similarity score and/or recommendation score is high and/or exceeds a configured threshold, while closer proximity is required by proximity thresholds when the corresponding similarity score and/or recommendation score is lower and/or does not exceed a configured threshold. For example, the threshold distance indicated by proximity thresholds is an increasing function of similarity score and/or recommendation score, where more favorable similarity scores and/or/or recommendation score induce greater distance maximums.

Furnishing unit set 777 can be selected in a same or similar fashion as the establishment set 771. The furnishing unit set can be selected based on further configurations by and/or learned preferences for the user relating specifically to furnishing units such as: preferences regarding whether the furnishing unit is located indoors or outdoors; preferences regarding the room within an establishment and/or floor withing an establishment; preferences regarding the product type and/or product identifier of the furnishing unit; preferences regarding layout and/or relative proximity to other furnishing units; preferences regarding type of furnishing experiences available via proximity-based interactions 111 with the furnishing unit; preference regarding maximum wait time until the furnishing unit becomes available; and/or other preferences relating to the furnishing unit.

For example, these preferences are compared to known, current and/or learned characteristics of corresponding furnishing units 110 in the furnishing unit database 163, such as its location data 660, its learned establishment characteristic data 647, its product identifier 652, its establishment identifier 610, current status data of the furnishing unit, experience option data 320 for the furnishing unit, and/or other data for the furnishing units 110. For example, only ones of the plurality of possible furnishing units 110 with requirements indicated to be met by the establishments respective data are included in the furnishing unit set 777.

For example, the user may only wish to go to a particular establishment if it has furnishing units that meet particular criteria, instead of or in addition to criteria for the destination establishment as a whole. For example, a user only wishes to visit an establishment at a given time if it is within 10 miles of the user's current location, has a particular brand of chair implementing furnishing unit 110 currently available for use outside in non-rainy weather, with configurable heaters that deliver heat to the user as a furnishing experience, where this establishment also serves food and beverage to these outdoor furnishing units, and where the menu of the establishment includes hot chocolate. Inclusion of establishments in an establishment set 771 can be based on such criteria for furnishing units 110 within the establishments.

In some embodiments, the user is already at and/or near a given establishment, and wishes to identify an available furnishing unit 110 within the establishment, for example, so that they can easily find available seating and/or so that they can easily find a furnishing unit that meets their configured criteria. The furnishing unit set 777 can optionally indicate locations of and/or other information for some or all furnishing units within this given establishment 140. The user can be directed to a given furnishing unit in the furnishing unit set 777, such as a recommended furnishing unit and/or furnishing unit meeting configured criteria. For example, instructions such as "Head upstairs and turn left at the bar" and/or "look for the purple chair" can be displayed.

For example, the user can view a contextual layout display of the establishment presented via interactive user interface 275 that indicates a layout of, and/or image data capturing, the interior and/or exterior of the establishment. The locations of various furnishing units 110 are indicated within this contextual layout display. Different furnishing units 110 can be visually denoted in the display with different colors and/or other visible differences denoting whether they are available, which type of product they correspond to, which types of furnishing experience they facilitate, and/or whether or not they meet the user's configured criteria. The user can optionally click on and/or otherwise select particular furnishing units in the contextual layout display to reserve and/or to view additional data. This contextual layout display can optionally indicate and/or implement the furnishing unit set 777.

In some cases, dynamic output data, such as particular colored lighting of lighting devices of the furnishing unit and/or text or other data displayed via a display device 209 of the furnishing unit, can denote the particular furnishing unit 110 the user has reserved, the particular furnishing unit 110 assigned to the user, and/or the particular furnishing unit 110 the user has selected to locate within the establishment. For example, a lighting device flashes purple for the given user based on the user selecting this furnishing unit, where interactive user interface 275 displays the given chair in contextual layout display as flashing purple or otherwise denotes that the user search for a purple flashing chair. At the same time, another nearby chair flashes a different color to denote they are selected by and/or reserved for a different user, so that these two different furnishing units are not confused by the two different users. As another example, the display device displays the user's name or other code unique to the user and/or assigned to that user to denote their identification of and/or use of the corresponding furnishing unit.

Figure 9E:
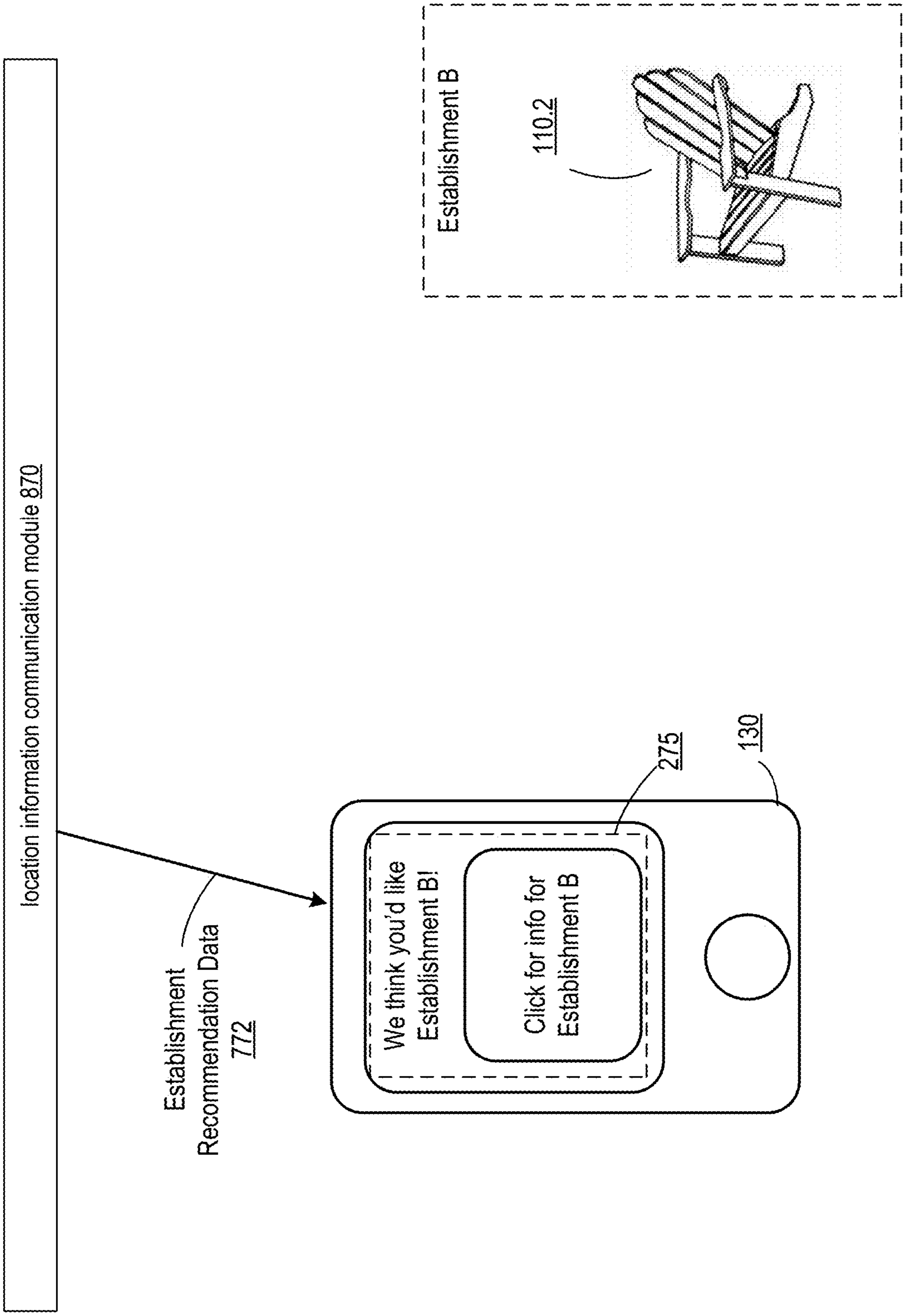

FIG. 9E illustrates an embodiment where establishment recommendation data 772 is generated for example, based on a ranking of one or more establishments 140 in the establishment set and/or based on otherwise being selected as a filtered subset of a plurality of options as discussed in conjunction with FIGS. 9C and 9D. The establishment recommendation data 772 can indicate an establishment B and/or can indicate corresponding furnishing unit 110.2 within this establishment B. For example, the establishment recommendation data 772 is implemented as establishment set 771 that includes only one establishment, or a small number of establishments. The establishment recommendation data 772 can alternatively or additionally be included in or implemented as the corresponding user's experience recommendation data 586. Some or all features and/or functionality of the location information communication system 870 of FIG. 9E can implement the location information communication system 870 of FIG. 9A and/or any other embodiment of the location information communication system 870.

Figure 9F:
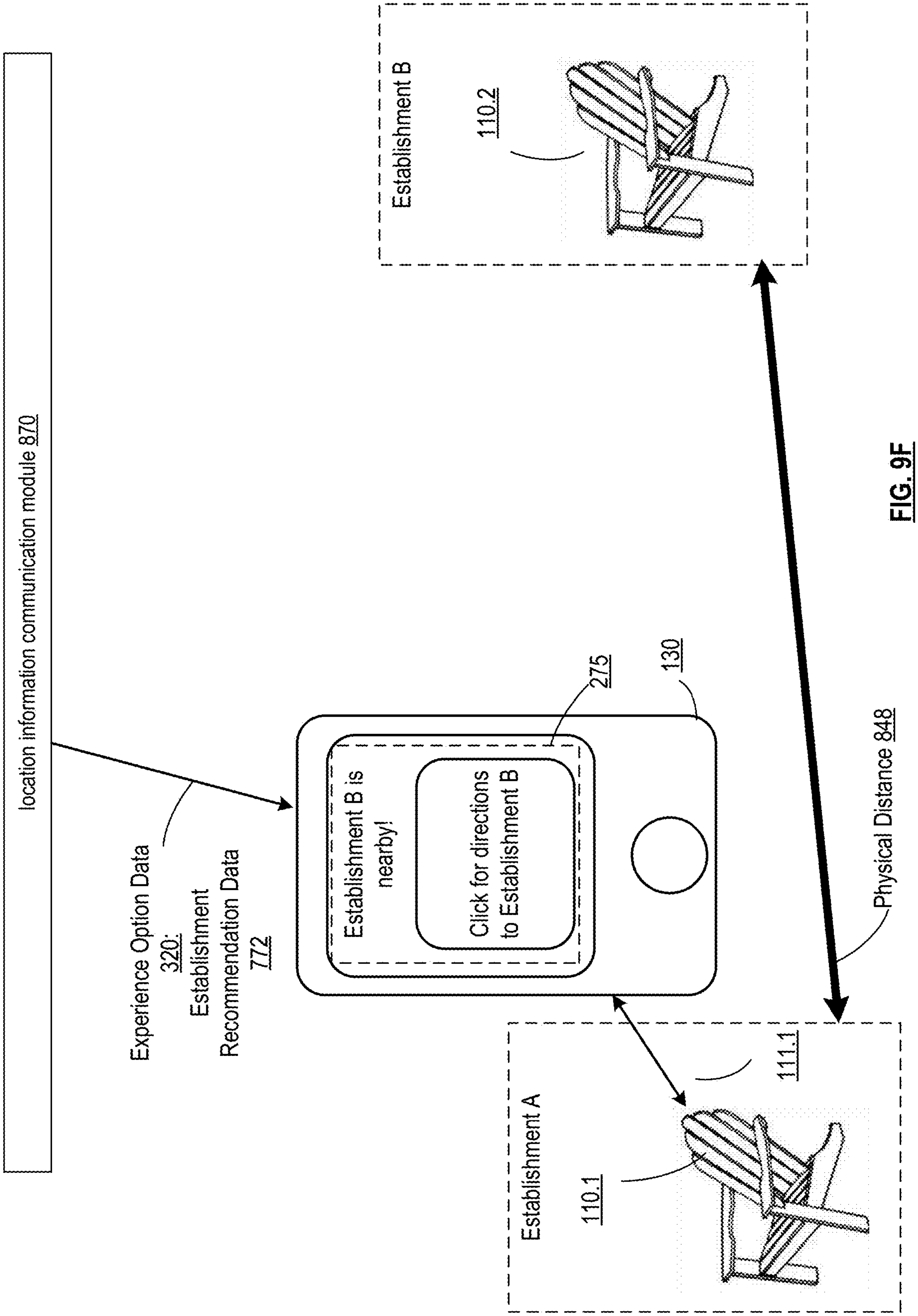

FIG. 9F illustrates an embodiment where the establishment recommendation data 772 is implemented as experience option data 320, and/or furnishing experience data, presented to the user based on a proximity-based furnishing interaction 111 with a furnishing unit 110.1. For example, establishment recommendation data 772 indicates establishment B and/or furnishing unit 110.2 based on a physical distance 848, determined between establishment A and establishment B, and/or between furnishing unit 110.1 and furnishing unit 110.2, being determined to compare favorably to the proximity threshold 853. Some or all features and/or functionality of the location information communication system 870 of FIG. 9F can implement the location information communication system 870 of FIG. 9E and/or any other embodiment of the location information communication system 870.

Figure 9G:
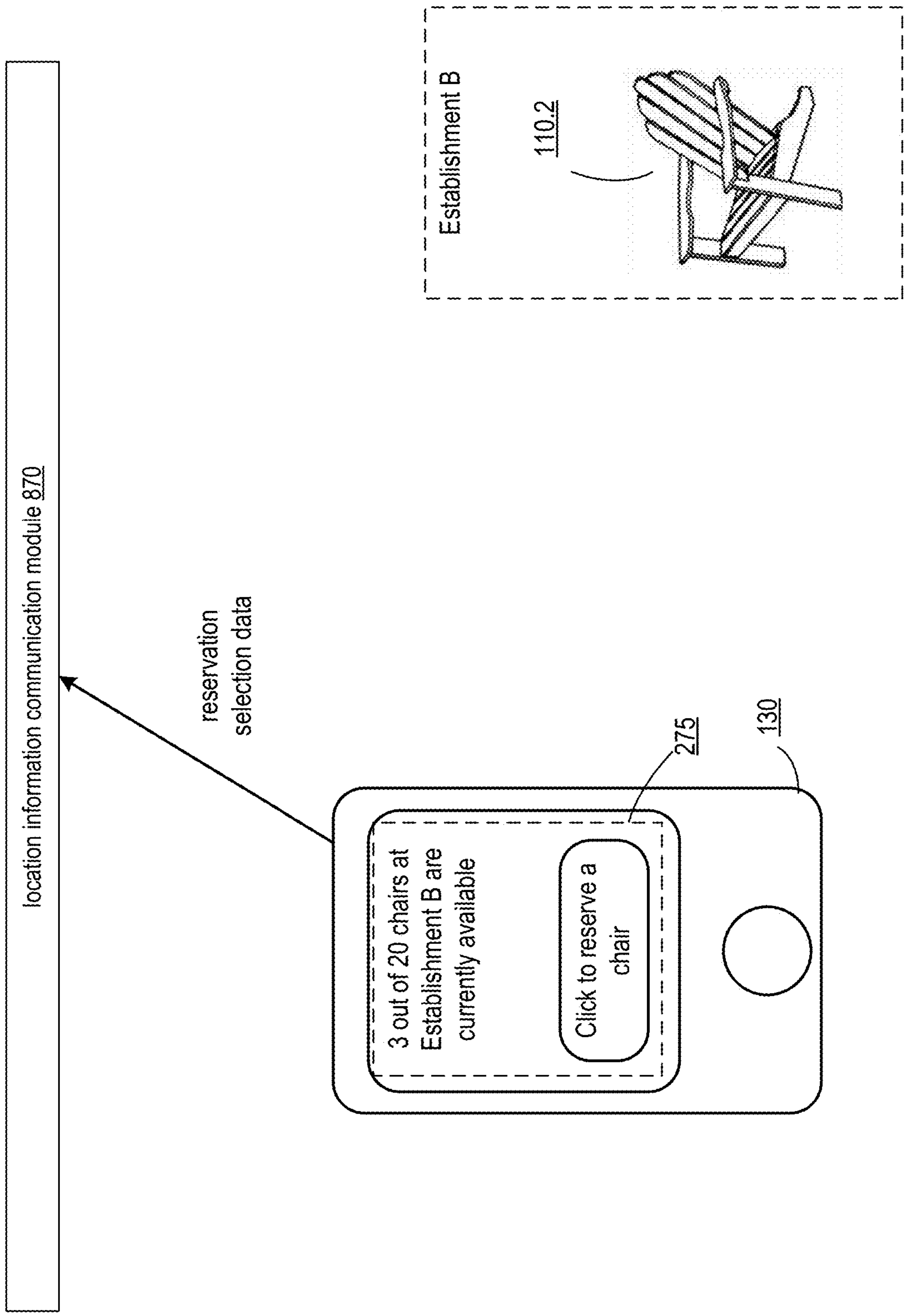

FIG. 9G illustrates an embodiment where the user can view current availability of furnishing units at one or more establishments and/or can elect to reserve a chair, for example, at an establishment recommended to and/or selected by the user and/or for a particular furnishing unit recommended and/or reserved by the user as discussed in conjunction with FIGS. 9A-9F. Some or all features and/or functionality of the location information communication system 870 of FIG. 9G can implement the location information communication system 870 of FIG. 9A and/or any other embodiment of the location information communication system 870.

The user can be presented with the option to reserve the furnishing unit 110 based on having current status data 653 indicating it is currently available, and/or is not yet reserved in a time frame selected by the user to reserve the corresponding furnishing unit 110. If the user elects to reserve a chair via interaction with interactive user interface 275, the location information communication system 870 can optionally set current status data of the corresponding furnishing unit 110 to "reserved" or "in use" rather than "available" for the current time, and/or for a scheduled time selected by the user. This can be ideal if the user is already at the establishment or at an establishment nearby, and only wishes to relocate if they can guarantee a furnishing unit 110 will be available for their use when they arrive at the corresponding establishment and/or the corresponding location of the given furnishing unit. The user can optionally pay a fee to reserve the furnishing unit 110.

In cases where furnishing units 110 and/or locations are very popular and/or rarely available, the user can optionally elect to be alerted with particular furnishing units meeting their criteria become available at a selected establishment and/or at any establishment meeting their criteria. For example, the user is currently at a first bar, but wishes to relocate to the second bar once a rooftop chair becomes available. Corresponding notifications can be generated and transmitted to users accordingly based on these configured notification preferences.

The user can optionally schedule and/or initiate one or more furnishing experiences described prior to their arrival via interaction with interactive user interface 275. For example, the user can order food and/or drinks for delivery to their table, for example, based on the food and/or drinks taking several minutes to prepare, such that the food and/or drinks are ready and/or delivered when the user arrives at the corresponding furnishing unit and/or shorty before and/or after the user arrives. As another example, the user initiates heating of their furnishing unit prior to their arrival so that the furnishing unit 110 is sufficiently warm when they arrive.

In some cases, users are only allowed to reserve furnishing units and/or initiate furnishing experiences if their current location is within a proximity threshold 853 configured by an administrator the furnishing experience system 100 and/or an establishment entity of the corresponding establishment 140.

Figure 9H:
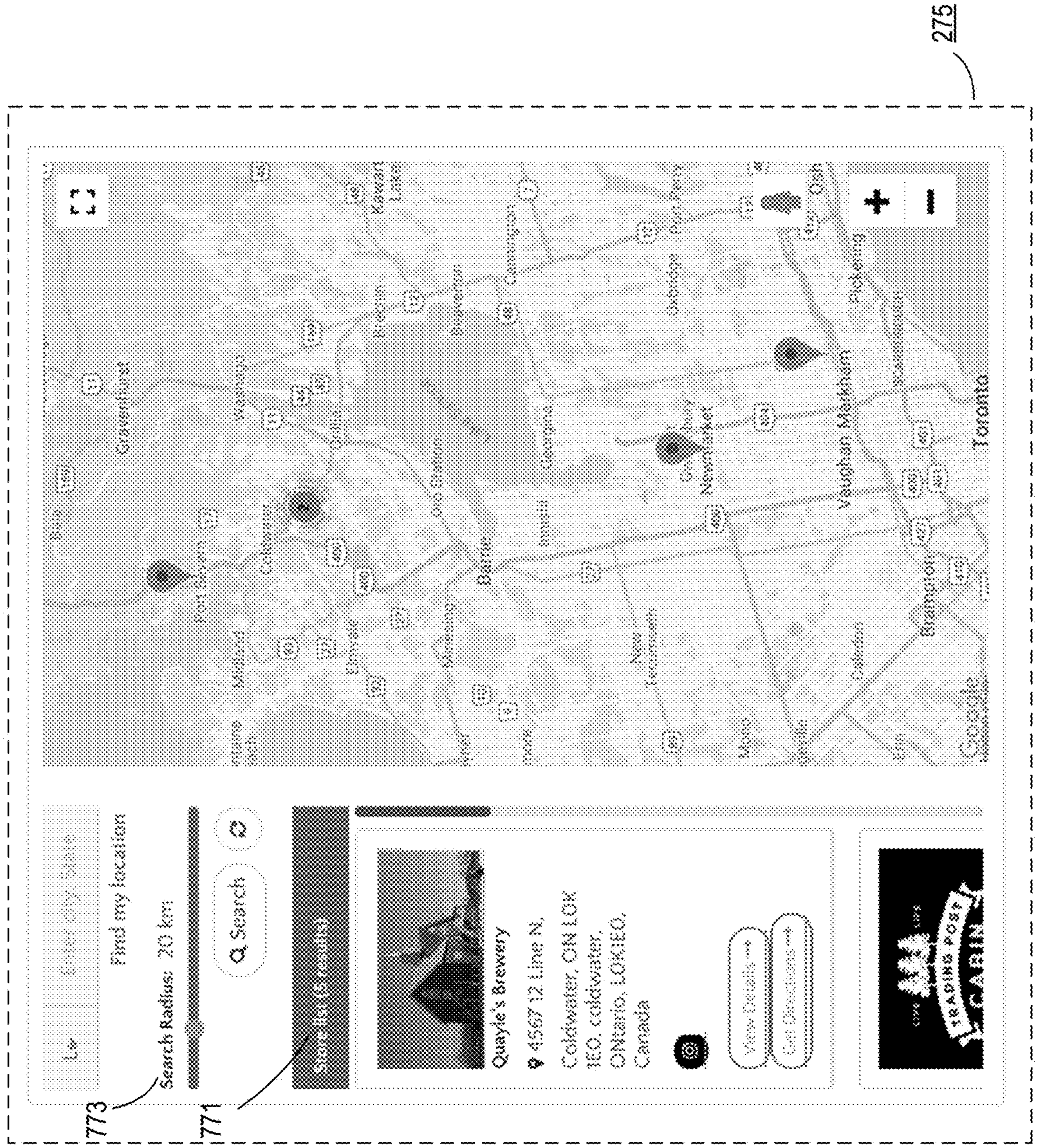
FIGS. 9H-9J illustrate examples of an interactive user interface displayed via a display of a client device in accordance with various examples.
Figure 9I:
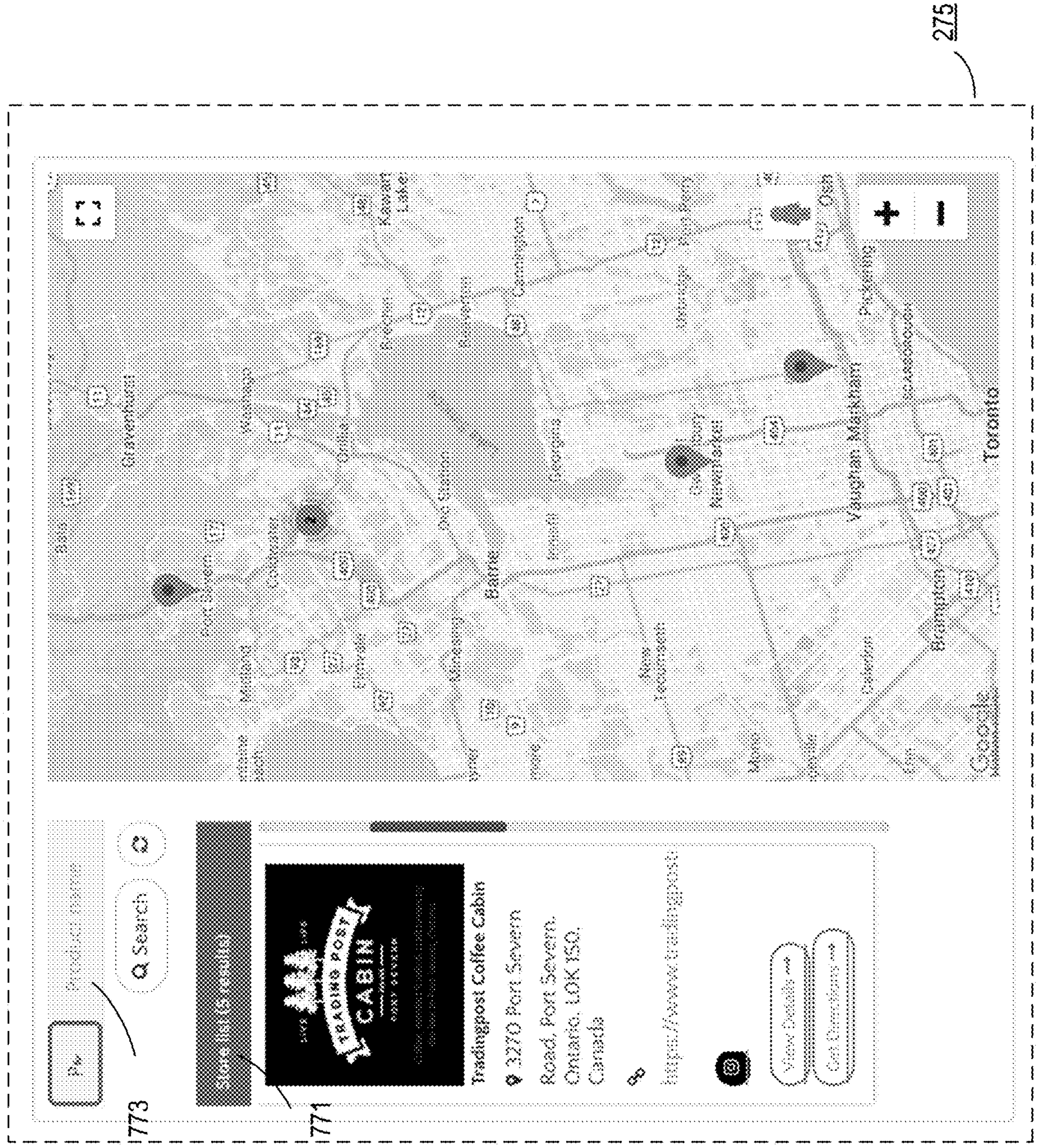
Figure 9J:
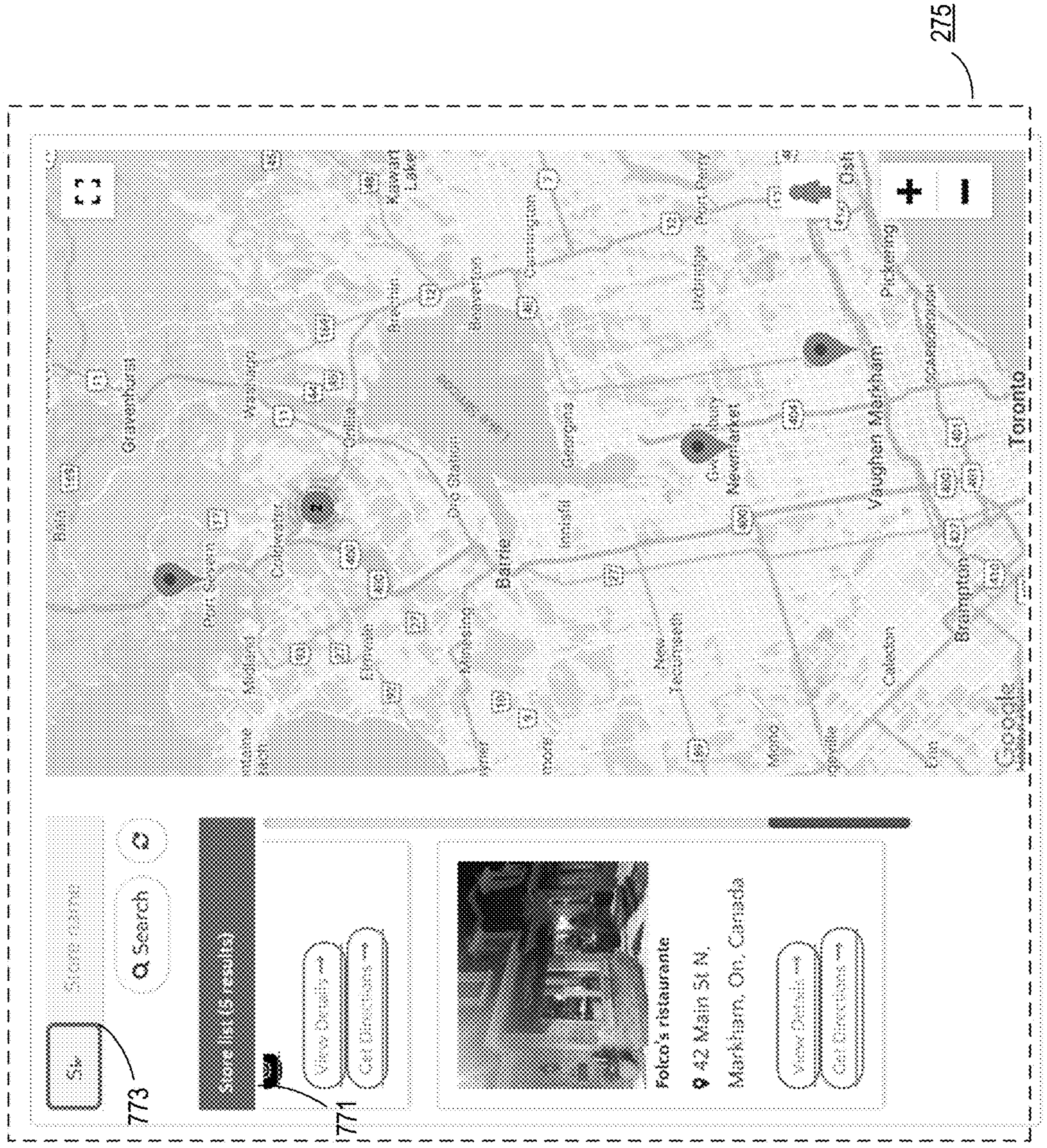

FIGS. 9H-9J illustrate example embodiments of an interactive user interface that presents various establishments 140 of the system that include furnishing units 110, for example, based on a corresponding client device receiving a corresponding establishment set 771 and/or furnishing unit set 777 from location information communication module 870. Some or all features and/or functionality of the interactive user interface 275 of FIGS. 9H, 9I, and/or 9J can implement the interactive user interface 275 of FIG. 9A, embodiments of experience option data 320 described herein, and/or any other embodiment of interactive user interface 275 described herein.

Search results can be presented in a list and/or graphically. The list can be sorted based on a similarity score, a recommendation score, and/or a distance from the user's starting location. Known, learned, current, and/or expected current data and/or characteristics of each establishment, such as crowdedness, noise level, weather, and/or furnishing unit availability, can be presented in conjunction with each establishment as discussed previously. Users can select establishments to be directed to their selected establishment and/or to reserve furnishing units at their selected establishment.

For each establishment, a number of furnishing units 110 at the establishment can be displayed. This can include indicating a number of currently available furnishing units at a given establishment; a proportion of available furnishing units the given establishment; a number and/or proportion of furnishing units corresponding to a particular product ID and/or type of product; a number and/or proportion of furnishing units that can provide a particular type of furnishing experience, and/or other information regarding particular furnishing units.

As illustrated in FIG. 9H, the user can elect to filter displayed locations of establishments with furnishing units 110 based on a configured search radius, which can be implemented as proximity threshold 853 and/or as some or all filtering parameter data 773.

As illustrated in FIG. 9I, the user can alternatively or additionally elect to filter displayed locations of establishments with furnishing units 110 based on a configured product name, or other product criteria for furnishing units 110 at these establishments, which can be implemented as some or all filtering parameter data 773.

As illustrated in FIG. 9J, the user can alternatively or additionally elect to filter displayed locations of establishments based on a selected name and/or type of the establishment, or other criteria for these establishments, which can be implemented as some or all filtering parameter data 773.

Figure 10A:
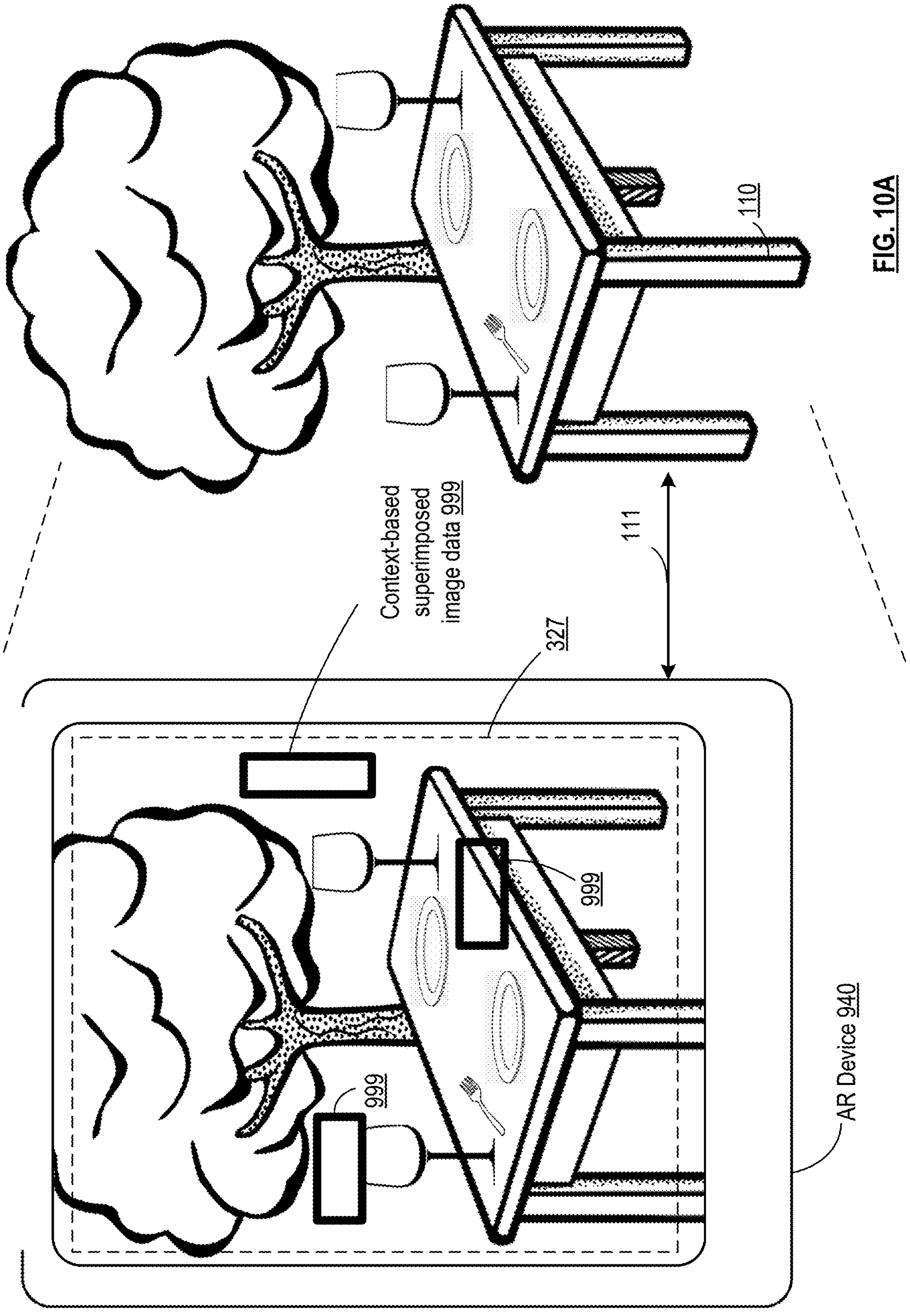
FIG. 10A illustrates example augmented reality data presented via an augmented reality device in accordance with various examples.
Figure 10B:
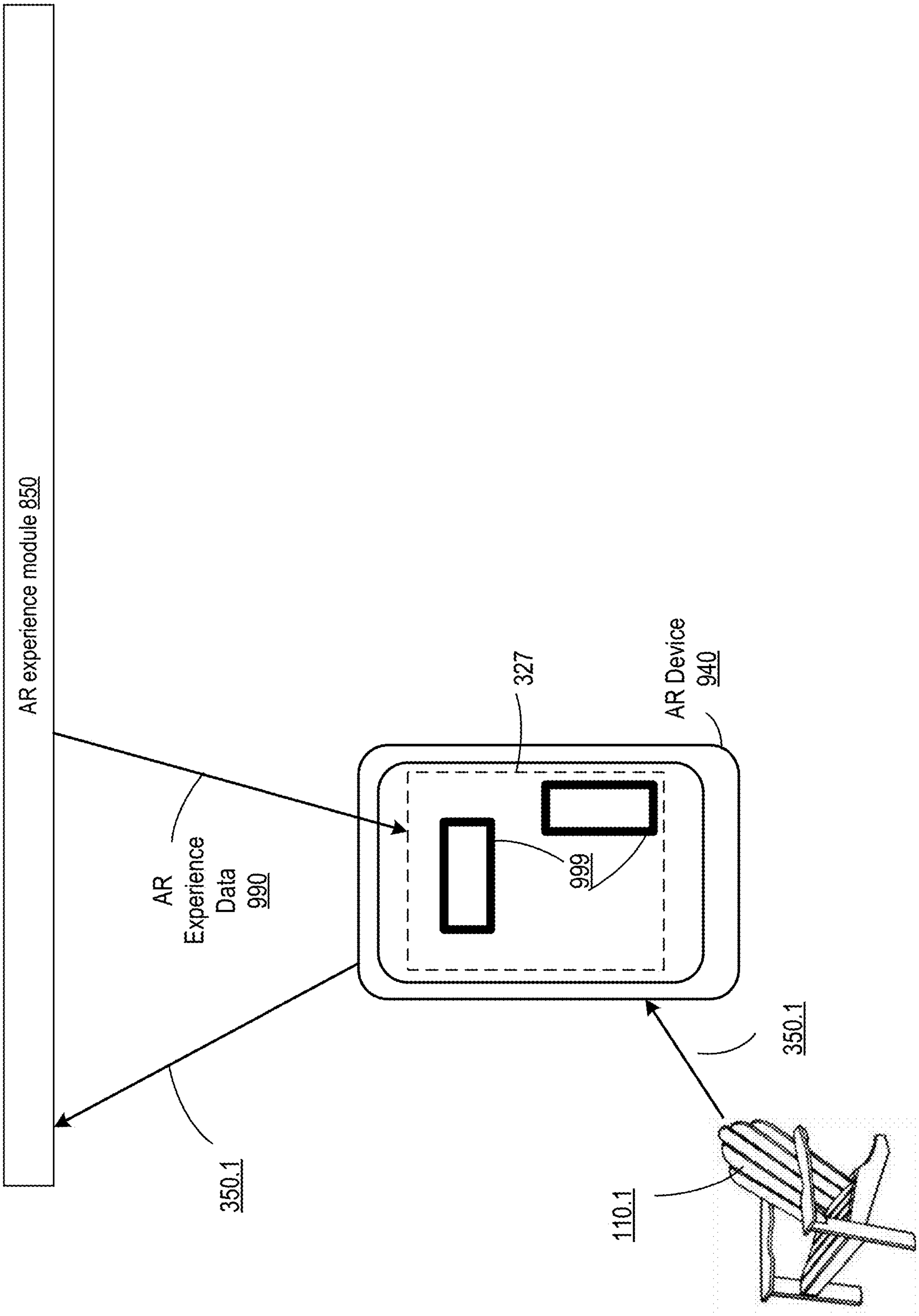
FIG. 10B is a schematic block diagram of an augmented reality experience module.

FIGS. 10A and 10B illustrate embodiments of AR experiences facilitated via proximity-based interactions 111. Some or all features and/or functionality of client devices 130, furnishing experience system 100, and/or furnishing units 110 of FIGS. 10A and/or 10B can be utilized to implement client devices 130, furnishing experience system 100, and/or furnishing units 110 of other embodiments discussed herein.

As illustrated in FIG. 10A, an augmented reality experience can be facilitated for a user via proximity-based interactions 111 between one or more furnishing units 110 and an AR device at a given time. The AR device can be implemented as a client device 130, can be implemented as a furnishing unit 110, can be implemented via communication with and/or control by a client device 130, can be implemented via communication with and/or control by a furnishing processing system 120, can be implemented via communication with and/or control by a furnishing experience system 100, and/or can otherwise be implemented to collect image data via at least one camera and/or to display context-based superimposed image data 999 via an augmented reality display 327 presented via at least one lens and/or display device based on at least one proximity-based interactions 111 with at least one furnishing units 110.

The augmented reality experience of FIG. 10A can implement any furnishing experiences described herein. The augmented reality experience of FIG. 10A can implement the augmented experiences described in conjunction with FIGS. 5J, 7C, and/or 7F.

In particular, the context-based superimposed image data 999 can be presented based on context of the corresponding image data collected via a camera, for example, that is displayed via a display device and/or corresponding and/or surroundings viewed by the user through a lens. This corresponding image data can correspond to image data 312 and can be processed, for example, via one or more object recognition processing functions as discussed previously to detect particular furnishing units 110 as discussed previously and/or corresponding physical features of the surroundings, such as features of the environment of the corresponding establishment.

The locations upon which context-based superimposed image data 999 is superimposed upon image data, projected upon a corresponding lens, or otherwise superimposed upon the user's viewed surroundings, can be based on the relative locations of these detected features. For example, data regarding and/or based on products are displayed upon and/or near these products in the user's view based on these products being detected and identified. As another example, data regarding and/or based on the establishment is displayed upon and/or near corresponding features, such as ground. floor, walls, doors, or other attributes of the establishment itself.

As illustrated in FIG. 10B this context-based superimposed image data 999 and/or other features of a corresponding augmented reality display 327 can be presented based on corresponding AR experience data received from an AR experience module that configures the context-based superimposed image data 999, other features of a corresponding augmented reality display 327, and/or other features of the corresponding AR experience.

The AR experience module can be implemented via at least one processor and/or at least one memory of the given AR device 940, a corresponding client device 130, the furnishing processing system 120 of the corresponding furnishing unit 110.1, and/or the furnishing experience system 100.

The AR experience data 990 can be determined based on an identifier of a corresponding furnishing unit 110 and/or product, for example identified based on furnishing unit identification data 350 collected by and received from a corresponding client device 130 implementing the AR device 940 and/or communicating with the AR device 940. Alternatively or in addition, the given user can be identified to be interacting with a given furnishing unit 110 based receiving, accessing, and/or determining the current status data of the corresponding furnishing unit 110. Alternatively or in addition, the given user can be identified to be interacting with a given furnishing unit 110 based on receiving a corresponding user identifier from a corresponding furnishing unit as discussed previously.

The AR experience data 990 can be indicated as one of a set of options of experience option data 990. The AR experience data 990 can alternatively or additionally be determined based on receiving experience selection data 322 configuring the user's AR experience and/or otherwise selecting the AR experience from a set of options. The user can optionally be presented with recommendations regarding the AR experience based on corresponding recommendation data 586 generated for the user.

The context-based superimposed image data 999 and/or augmented reality display 327 of AR experience data 990 can be presented in accordance with visually, audibly, and/or textually presenting a price of, product data of, history of, manufacturing process of, or other data relating to the corresponding product that the user is viewing in the display, that the user is sitting upon, and/or that the user is detected to be in proximity of. The context-based superimposed image data 999 and/or augmented reality display 327 of AR experience data 990 can be presented in accordance with visually, audibly, and/or textually presenting a story of the manufacturing company owner, engineer, designer, and/or other personnel responsible for creating and/or selling the corresponding product that the user is viewing in the display, that the user is sitting upon, and/or that the user is detected to be in proximity of.

The context-based superimposed image data 999 and/or augmented reality display 327 of AR experience data 990 can be presented in accordance with visually, audibly, and/or textually presenting a history of a corresponding establishment to the user, where context-based superimposed image data 999 indicates historical data of the establishment that the user is viewing in the display and/or in which the corresponding proximity-based interaction is occurring. The context-based superimposed image data 999 and/or augmented reality display 327 of AR experience data 990 can be presented in accordance with visually, audibly, and/or textually presenting a story of: the owner of, chef of, winemaker of, mixologist of, barista of, and/or other prominent personnel of a corresponding establishment to the user that the user is viewing in the display and/or in which the corresponding proximity-based interaction is occurring. The context-based superimposed image data 999 can and/or augmented reality display 327 of AR experience data 990 can be presented in accordance with visually, audibly, and/or textually presenting an imaginary future of the location, such as a fantasy and/or fictional future of the location, configured by the user via experience selection data 322, that the user is viewing in the display and/or in which the corresponding proximity-based interaction is occurring; a proposed and/or in-progress renovations of, building of, redecorating of, and/or reconfiguration of layout of the corresponding establishment that the user is viewing in the display and/or in which the corresponding proximity-based interaction is occurring; or other possible or impossible future location for the location that the user is viewing in the display and/or in which the corresponding proximity-based interaction is occurring.

The context-based superimposed image data 999 can and/or augmented reality display 327 of AR experience data 990 can be presented in accordance with visually, audibly, and/or textually presenting furnishing units 110 and/or corresponding types of same and/or related products of these furnishing items, for example based on being captured via image data and/or in which the user is in proximity in other locations. For example, these other locations can include and/or be based on: the user's home based on image data of the user's home collected as experience selection data 322 in which the user contemplates purchasing corresponding products for use in their home; a user's place of business based on image data of the user's home collected as experience selection data 322 in which the user contemplates purchasing corresponding products for use in their place of business; other venues and/or locations in which the user contemplates renting corresponding products for an event hosted by the user; other establishments; other indoor and/or outdoor environment configured by the user via experience selection data 322, other fantasy locations corresponding to a video game, book, movie, entertainment content, painting, image, or other fantasy location configured by the user via experience selection data 322; and/or other real and/or imaginary locations. This can be presented in conjunction with shopping and/or purchasing experiences described previously, to better enable the user to picture corresponding products furnishing, decorating, clothing, accessorizing, and/or otherwise being located within and/or upon a given location and/or a given person, such as the user.

The context-based superimposed image data 999 and/or augmented reality display 327 of AR experience data 990 can be presented in accordance with visually, audibly, and/or textually presenting a particular type of AR and/or VR experience configured by the user and/or selected as experience selection data 322 from a set of options in experience option data 320 based on a configured and/or selected: one or more storytelling variations, one or more gaming skins, one or more gaming experiences, one or more experimental variations, and/or one or more various other types of AR and/or VR experiences.

Some or all types of AR and/or VR experiences can require a fee, for example, where payment of a corresponding service is facilitated via furnishing experience system 100 as discussed previously to the furnishing experience system 100, to the establishment, and/or another entity associated with creating and/or selling these AR and/or VR experiences.

Figure 11A:
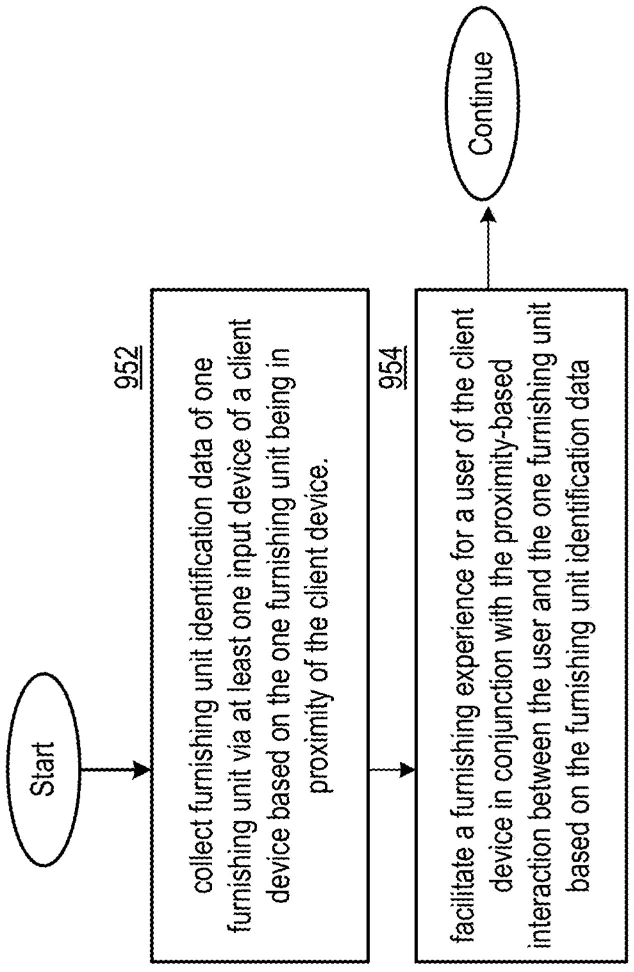
FIGS. 11A-17 are logic diagrams presenting methods for execution in accordance with various examples.

FIG. 11A illustrates a method for execution by a client device. For example, some or all steps of FIG. 11A are executed by a client device 130 in conjunction with performing some or all functionality of client device 130 discussed in accordance with one or more of the various embodiments of client device 130 described herein. Some or all steps of FIG. 11A can be performed in conjunction with performing steps illustrated of one or more other Figures in conjunction with performing other corresponding methods described herein.

Step 952 includes collecting furnishing unit identification data of one furnishing unit via at least one input device of a client device based the one furnishing unit being in proximity of the client device.

In various embodiments, the furnishing unit identification data includes a unique one of a plurality of furnishing unit identifiers, a unique one of a plurality of product identifiers identifier, and/or a unique one of a plurality of establishment identifiers. For example, the one furnishing unit is one of a plurality of furnishing units at a given establishment and/or across multiple establishments.

In various embodiments, the furnishing unit identification data uniquely identifies the one furnishing unit from a plurality of other furnishing units at a same establishment. In various embodiments, the furnishing unit identifier uniquely identifies the one furnishing unit from a plurality of other furnishing units across a plurality of establishments. In various embodiments, the furnishing unit identifier uniquely identifies the one furnishing unit from a plurality of other furnishing units with a same product identifier and/or corresponding to a same product. In various embodiments, the furnishing unit identifier indicates at least one of: a product identifier of the furnishing unit and/or an establishment in which the furnishing unit is located.

In various embodiments, the at least one input device is at least one camera of the client device, and collecting the furnishing unit identification data includes capturing the visual furnishing unit identification data as image data via the at least one camera. In various embodiments, the furnishing unit identification data is indicated in visual identifier data 355 visually indicated upon at least one surface of the furnishing unit. In various embodiments, the furnishing unit identification data is visual identifier data a quick response (QR) code, a barcode, text and/or numeric data, or other visual data identifying the furnishing unit. In various embodiments, the method can further include processing the image data to extract and/or determine the furnishing unit identification data.

In various embodiments, the furnishing unit identification data is based on a distinguishing shape, color, and/or other visually identifiable data corresponding to the furnishing unit itself, where collecting the furnishing unit identification data includes capturing a picture and/or video of the visual furnishing unit via a camera of the client device. The method can further include performing at least one image processing function, for example, based on applying a computer vision model trained via at least one machine learning technique and/or at least one artificial intelligence technique, to generate the furnishing unit identification data identifying the furnishing unit.

In various embodiments, the at least one input device is at least one receiver of the client device, and collecting the furnishing unit identification data includes receiving at least one signal that includes furnishing unit identification data via the at least one receiver. In various embodiments, at least one signal can include an RFID signal, an NFC signal, a Bluetooth signal, and/or another signal that is configured for short-range communication. In various embodiments, the method further include processing the at least one signal to extract and/or determine the furnishing unit identification data.

In various embodiments, the at least one input device is at least one keyboard and/or microphone of the client device, and collecting the furnishing unit identification data includes receiving text and/or dictation data indicating the furnishing unit identification data, such as a number, code, and/or name identifying the furnishing unit from other furnishing units at a given establishment, and/or a number, code, and/or name identifying the product identifier, such as a make and/or model of the furnishing unit, from a plurality of product types, and/or a number, code, and/or name identifying the establishment from a plurality of establishments.

Step 954 includes facilitating a furnishing experience for a user of the client device in conjunction with a proximity-based interaction between the user and the one furnishing unit based on the furnishing unit identification data. The furnishing experience can include any of the furnishing experiences described herein. Facilitating the furnishing experience can include sending the furnishing unit identification data to a furnishing experience system 100 via a network. Facilitating the furnishing experience can include receiving furnishing experience data from a furnishing experience system 100 via a network. Facilitating the furnishing experience can include displaying furnishing experience data via at least one display device of the client device. Facilitating the furnishing experience can include presenting experience option data via the display device, generating experience selection data based on the experience option data, and/or facilitating the experience based on the experience selection data. Facilitating the furnishing experience can include sending experience selection data to a furnishing experience system 100 and/or to a furnishing processing unit. Facilitating the furnishing experience can include generating and transmitting control data to a furnishing unit. Facilitating the furnishing experience can include generating and transmitting chat communication data to another client device. Facilitating the furnishing experience can include displaying augmented reality (AR) data via an AR device.

In various embodiments, a client device includes at least one input device configured collect furnishing unit identification data of one furnishing unit via at least one input device of a client device based the one furnishing unit being in proximity of the client device. The client device further includes at least one processor and at least one memory that stores operational instructions that, when executed by the at least one processor, cause the client device to facilitate a furnishing experience based on the experience selection data.

Figure 11B:
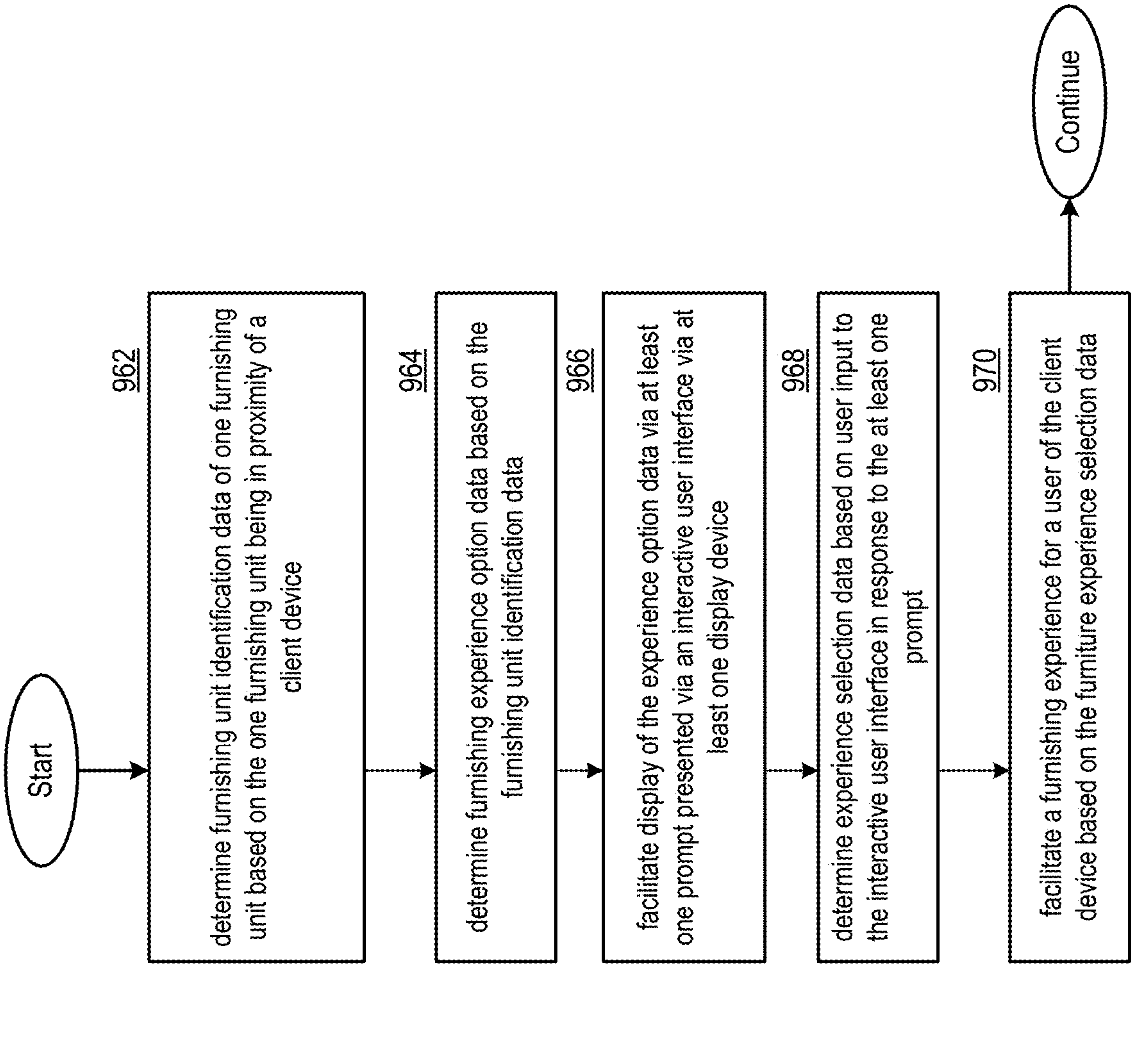

FIG. 11B illustrates a method for execution by a client device and/or a furnishing experience system 100. For example, some or all steps of FIG. 11B are executed by a client device 130 in conjunction with performing some or all functionality of client device 130 discussed in accordance with one or more of the various embodiments of client device 130 described herein. As another example, some or all steps of FIG. 11B are executed by a furnishing experience system 100 in conjunction with performing some or all functionality of furnishing experience system 100 discussed in accordance with one or more of the various embodiments of furnishing experience system 100 described herein. Some or all steps of FIG. 11B can be performed in conjunction with performing steps illustrated of one or more other Figures in conjunction with performing other corresponding methods described herein.

Step 962 includes determining furnishing unit identification data of one furnishing unit based on the one furnishing unit being in proximity of a client device. Step 964 includes determining furnishing experience option data based on the furnishing unit identification data. Step 966 includes facilitating display of the experience option data via at least one prompt presented via an interactive user interface via at least one display device. Step 968 includes determining experience selection data based on user input to the interactive user interface in response to the at least one prompt. Step 970 includes facilitating a furnishing experience for a user of the client device based on the furniture experience selection data.

Figure 11C:
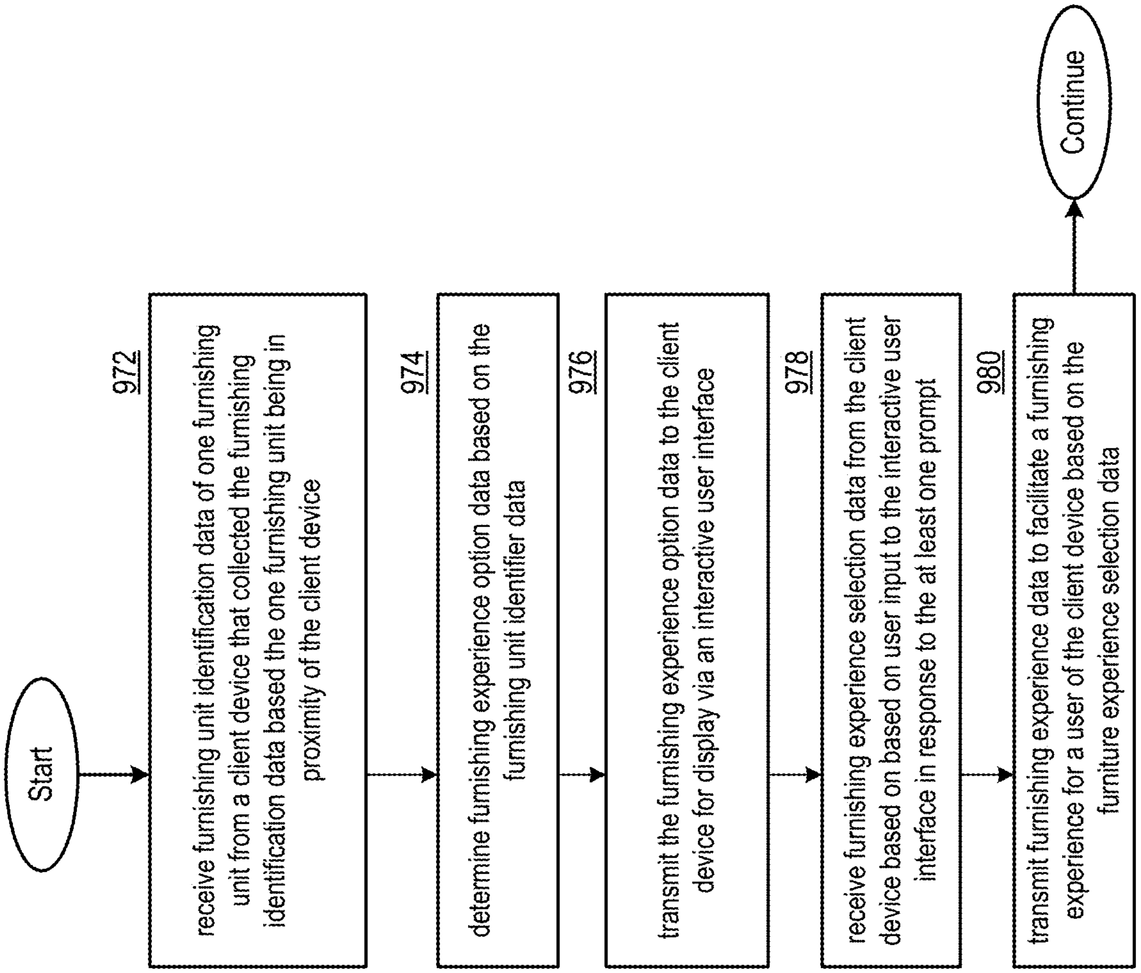

FIG. 11C illustrates a method for execution by a furnishing experience system 100. For example, some or all steps of FIG. 11C are executed by a client device 130 in conjunction with performing some or all functionality of furnishing experience system 100 discussed in accordance with one or more of the various embodiments of furnishing experience system 100 described herein. Some or all steps of FIG. 11C can be performed in conjunction with performing steps illustrated of one or more other Figures in conjunction with performing other corresponding methods described herein.

Step 972 includes receiving furnishing unit identification data of one furnishing unit from a client device that collected the furnishing identification data based the one furnishing unit being in proximity of the client device. Step 974 includes determine furnishing experience option data based on the furnishing unit identifier data. Step 976 includes transmitting the furnishing experience option data to the client device for display via an interactive user interface. Step 978 includes receiving furnishing experience selection data from the client device based on based on user input to the interactive user interface in response to the at least one prompt. Step 980 includes transmitting furnishing experience data to facilitate a furnishing experience for a user of the client device based on the furniture experience selection data.

Facilitating the furnishing experience can include sending furnishing experience data to the client device via a network for display via a display device of the client device. Facilitating the furnishing experience can include generating and transmitting control data to a furnishing processing system of the furnishing unit via a network. Facilitating the furnishing experience can include generating and transmitting chat communication data to another client device. Facilitating the furnishing experience can include displaying augmented reality (AR) data via an AR device.

In various embodiments, a furnishing experience system includes at least one processor, and at least one memory that that stores operational instructions that, when executed by the at least one processor, cause the furnishing experience system to: receive furnishing unit identification data of one furnishing unit from a client device that collected the furnishing identification data based the one furnishing unit being in proximity of the client device; determine furnishing experience option data based on the furnishing unit identifier data; transmit the furnishing experience option data to the client device for display via an interactive user interface; receive furnishing experience selection data from the client device based on based on user input to the interactive user interface in response to the at least one prompt; and/or transmit furnishing experience data to facilitate a furnishing experience for a user of the client device based on the furniture experience selection data.

Figure 11D:
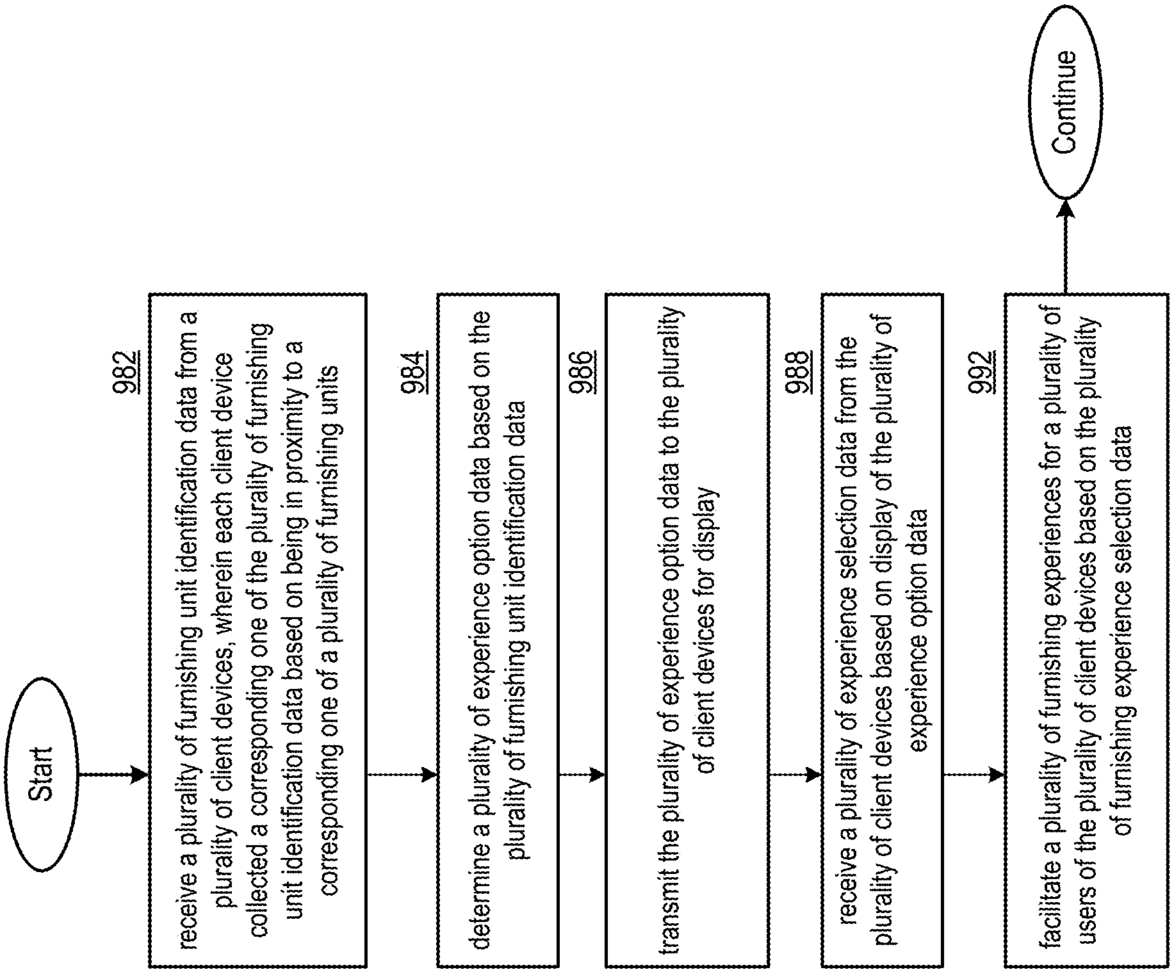

FIG. 11D illustrates a method for execution by a furnishing experience system 100. For example, some or all steps of FIG. 11D are executed by a client device 130 in conjunction with performing some or all functionality of furnishing experience system 100 discussed in accordance with one or more of the various embodiments of furnishing experience system 100 described herein. Some or all steps of FIG. 11D can be performed in conjunction with performing steps illustrated of one or more other Figures in conjunction with performing other corresponding methods described herein.

Step 982 includes receiving a plurality of furnishing unit identification data from a plurality of client devices, where each client device collected a corresponding one of the plurality of furnishing unit identification data based on being in proximity to a corresponding one of a plurality of furnishing units. Step 984 includes determining a plurality of experience option data based on the plurality of furnishing unit identification data. Step 986 includes transmitting the plurality of experience option data to the plurality of client devices for display. Step 988 includes receiving a plurality of experience selection data from the plurality of client devices based on display of the plurality of experience option data. Step 992 includes facilitate a plurality of furnishing experiences for a plurality of users of the plurality of client devices based on the plurality of furnishing experience selection data.

In various embodiments, a furnishing experience system includes at least one processor, and at least one memory that that stores operational instructions that, when executed by the at least one processor, cause the furnishing experience system to receive a plurality of furnishing unit identification data from a plurality of client devices, wherein each client device collected a corresponding one of the plurality of furnishing unit identification data based on being in proximity to a corresponding one of a plurality of furnishing units; determine a plurality of furnishing experience option data based on the plurality of furnishing unit identification data; transmit the plurality of furnishing experience option data to the plurality of client devices for display; receive a plurality of furnishing experience selection data from the plurality of client devices; and/or transmit a plurality of furnishing experience data to facilitate a plurality of furnishing experiences for a plurality of users of the plurality of client devices based on the plurality of furnishing experience selection data.

Figure 12:
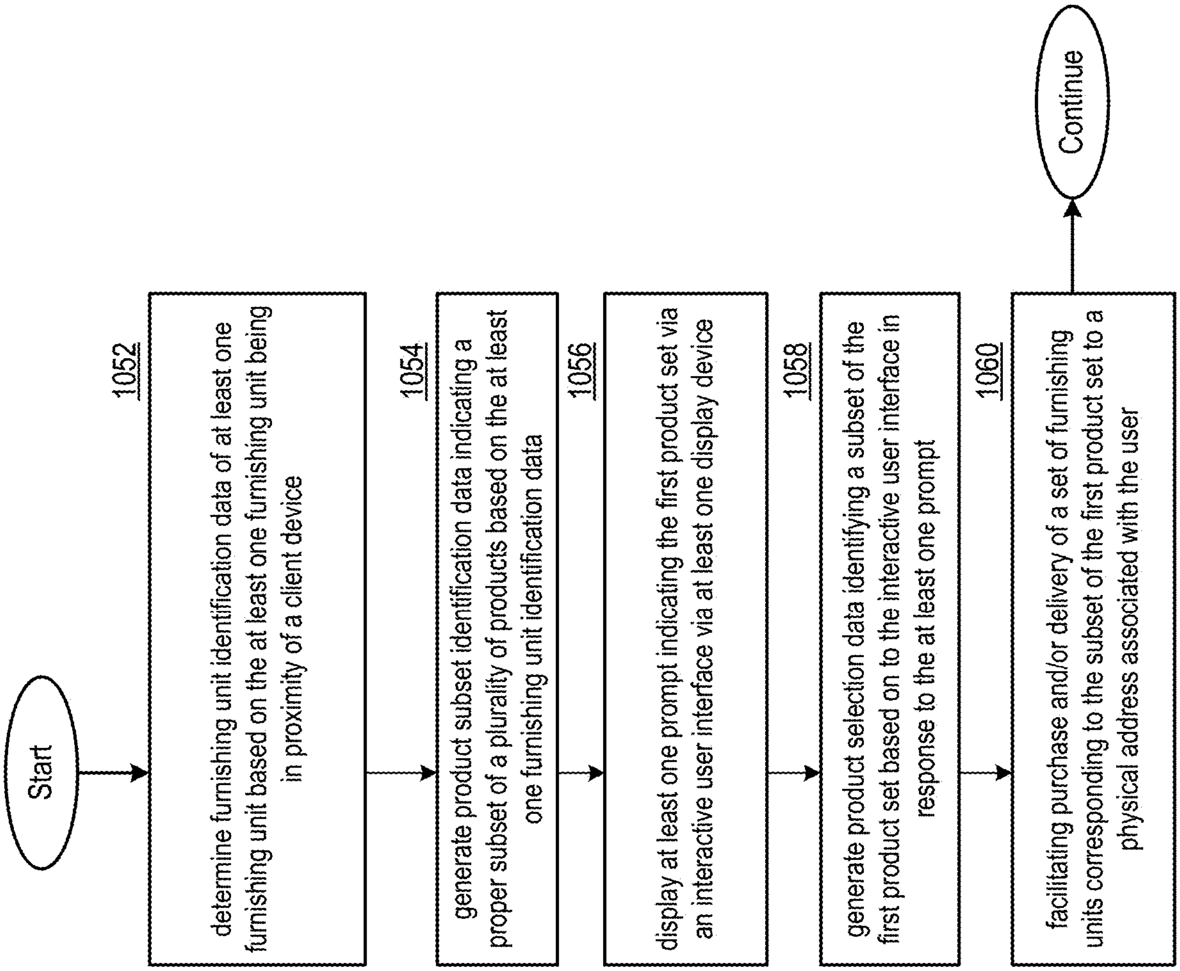

FIG. 12 illustrates a method for execution by a client device and/or a furnishing experience system 100. For example, some or all steps of FIG. 12 are executed by a client device 130 in conjunction with performing some or all functionality of client device 130 discussed in accordance with one or more of the various embodiments of client device 130 described herein. As another example, some or all steps of FIG. 12 are executed by a furnishing experience system 100 in conjunction with performing some or all functionality of furnishing experience system 100 discussed in accordance with one or more of the various embodiments of furnishing experience system 100 described herein. Some or all steps of FIG. 12 can be performed in conjunction with performing steps illustrated of one or more other Figures in conjunction with performing other corresponding methods described herein. Some or all steps of FIG. 12 can be performed in conjunction with facilitating one or more furnishing experiences and/or can be performed in conjunction with one or more proximity-based interactions 111.

Step 1052 includes determining furnishing unit identification data of at least one furnishing unit based on the at least one furnishing unit being in proximity of a client device. Step 1054 includes generating product subset identification data indicating a proper subset of a plurality of products based on the at least one furnishing unit identification data. Step 1056 includes displaying at least one prompt indicating the first product set via an interactive user interface via at least one display device. Step 1058 includes generating product selection data identifying a subset of the first product set based on to the interactive user interface in response to the at least one prompt. Step 1060 includes facilitating purchase and/or delivery of a set of furnishing units corresponding to the subset of the first product set to a physical address associated with the user.

Facilitating purchase and/or delivery of a set of furnishing units corresponding to the subset of the first product set to a physical address associated with the user can include performing a transaction based on payment information provided by the user; sending payment information provided by the user to at least one merchant and/or other entity associated with selling and/or delivering products corresponding to the set of furnishing units; sending payment information provided by the user and/or a notification authorizing the purchase of the set of furnishing units to the furnishing experience system 100, where the furnishing experience system 100 sends the user's payment information to the at least one merchant and/or other entity associated with selling and/or delivering products corresponding to the set of furnishing units.

In various embodiments, a set intersection between the set of furnishing units and the at least one furnishing unit is null.

In various embodiments, the furnishing unit identification data of a first furnishing unit of the at least one furnishing unit indicates a product identifier of the first furnishing unit. In various embodiments, the product subset identification data indicates a set of product identifiers that includes the product identifier of the first furnishing unit, and wherein the subset of the first product set indicates a set of product identifiers that includes the product identifier of the first furnishing unit. In various embodiments, the set of furnishing units includes a second furnishing unit that is distinct from the first furnishing unit, and a product identifier of the second furnishing unit is the product identifier of the first furnishing unit.

In various embodiments, the furnishing unit identification data of the at least one furnishing unit indicates at least one first product identifier of the at least one furnishing unit. In various embodiments, the proper subset indicates at least one product of the plurality of products with at least one second product identifier that is distinct from the at least one first product identifier. In various embodiments, the proper subset indicates the at least one second product identifier based on accessing unit-based contextual data indicating the at least one additional furnishing unit corresponding to the second product identifier is in proximity to the at least one furnishing unit.

In various embodiments, determining the furnishing unit identification data is based on collection of the first image data capturing the furnishing unit identification data via at least one camera of the client device. In various embodiments, the at least one prompt indicating the first product set includes, for each product in the proper subset of the plurality of products, second image data depicting the each product, and wherein the image data depicting the each product is distinct from the first image data.

In various embodiments, a client device includes at least one processor and at least one memory that stores operational instructions that, when executed by the at least one processor, cause the client device to: determine furnishing unit identification data of at least one furnishing unit based on the at least one furnishing unit being in proximity of a client device; generate product subset identification data indicating a proper subset of a plurality of products based on the at least one furniture identifier data; display at least one prompt indicating the first product set via an interactive user interface via at least one display device of the client device; generate product selection data identifying a subset of the first product set based on to the interactive user interface in response to the at least one prompt; and/or facilitate purchase and/or delivery of a set of furnishing units corresponding to the subset of the first product set.

Figure 13A:
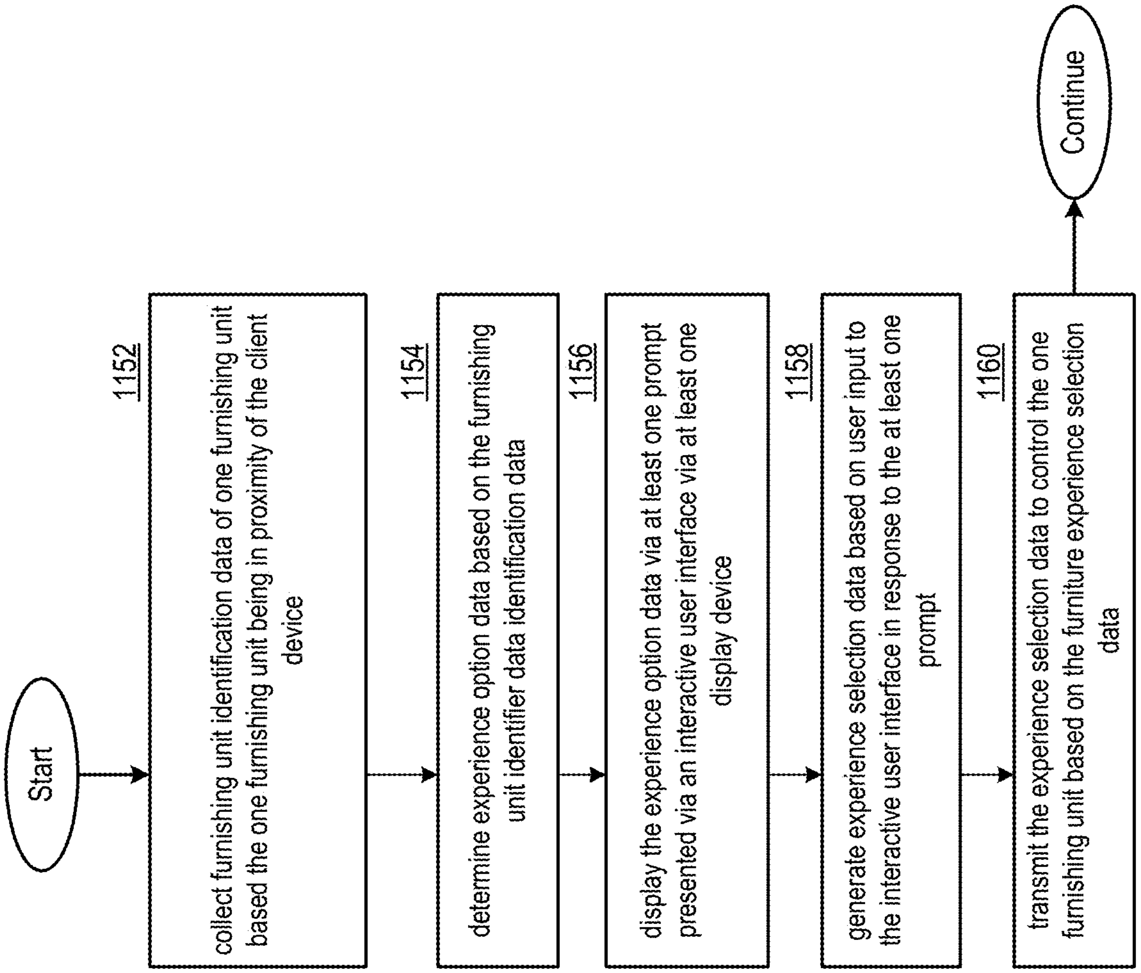

FIG. 13A illustrates a method for execution by a client device. For example, some or all steps of FIG. 13A are executed by a client device 130 in conjunction with performing some or all functionality of client device 130 discussed in accordance with one or more of the various embodiments of client device 130 described herein. Some or all steps of FIG. 13A can be performed in conjunction with performing steps illustrated of one or more other Figures in conjunction with performing other corresponding methods described herein. Some or all steps of FIG. 13A can be performed in conjunction with facilitating one or more furnishing experiences and/or can be performed in conjunction with one or more proximity-based interactions 111.

Step 1152 includes collecting furnishing unit identification data of one furnishing unit based the one furnishing unit being in proximity of the client device. Step 1154 includes determining experience option data based on the furnishing unit identifier data identification data. Step 1156 includes displaying the experience option data via at least one prompt presented via an interactive user interface via at least one display device. Step 1158 includes generating experience selection data based on user input to the interactive user interface in response to the at least one prompt. Step 1160 includes transmitting the experience selection data to control the one furnishing unit based on the furniture experience selection data.

In various embodiments, a client device includes at least one processor and at least one memory that stores operational instructions that, when executed by the at least one processor, cause the client device to: collect furnishing unit identifier data of one furnishing unit based the one furnishing unit being in proximity of the client device; determine experience option data based on the furnishing unit identifier data identification data; facilitate display the experience option data via at least one prompt presented via an interactive user interface via at least one display device; generate experience selection data based on user input to the interactive user interface in response to the at least one prompt; and/or transmit the experience selection data to control the one furnishing unit based on the furniture experience selection data. Experience selection data can be transmitted directly to a furnishing processing system of the furnishing unit and/or can be transmitted to a furnishing processing system for transmission to the furnishing processing system by the furnishing processing system.

Figure 13B:
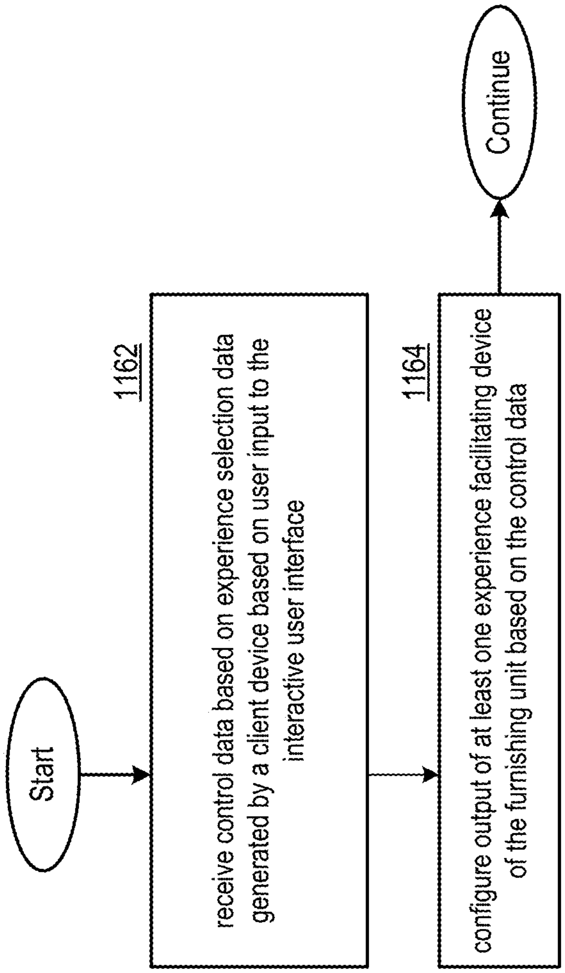

FIG. 13B illustrates a method for execution by a furnishing processing system of a furnishing unit. For example, some or all steps of FIG. 13B are executed by a furnishing processing system 120 in conjunction with performing some or all functionality of furnishing processing system 120 discussed in accordance with one or more of the various embodiments of furnishing units 110 described herein. Some or all steps of FIG. 13B can be performed in conjunction with performing steps illustrated of one or more other Figures in conjunction with performing other corresponding methods described herein. Some or all steps of FIG. 13B can be performed in conjunction with facilitating one or more furnishing experiences and/or can be performed in conjunction with one or more proximity-based interactions 111.

Step 1162 includes receiving control data based on experience selection data generated by a client device based on user input to the interactive user interface. Step 1164 includes configuring output of at least one experience facilitation element of the furnishing unit based on the control data. The experience facilitation element can include any experience facilitation element 515 discussed in conjunction with FIG. 4B and/or any other device and/or element embedded within a furnishing unit 110 and/or in proximity of a furnishing unit 110 configured to generate and/or configure its output based on control data.

In various embodiments, a furnishing processing system of a furnishing unit includes at least one experience facilitation element; at least one receiver configured to receive control data based on experience selection data generated by a client device in proximity of the furnishing unit based on user input to the interactive user interface; and/or at least one processor configured to process the control data to configure output of the at least one experience facilitation element of the furnishing unit based on the control data.

Figure 13C:
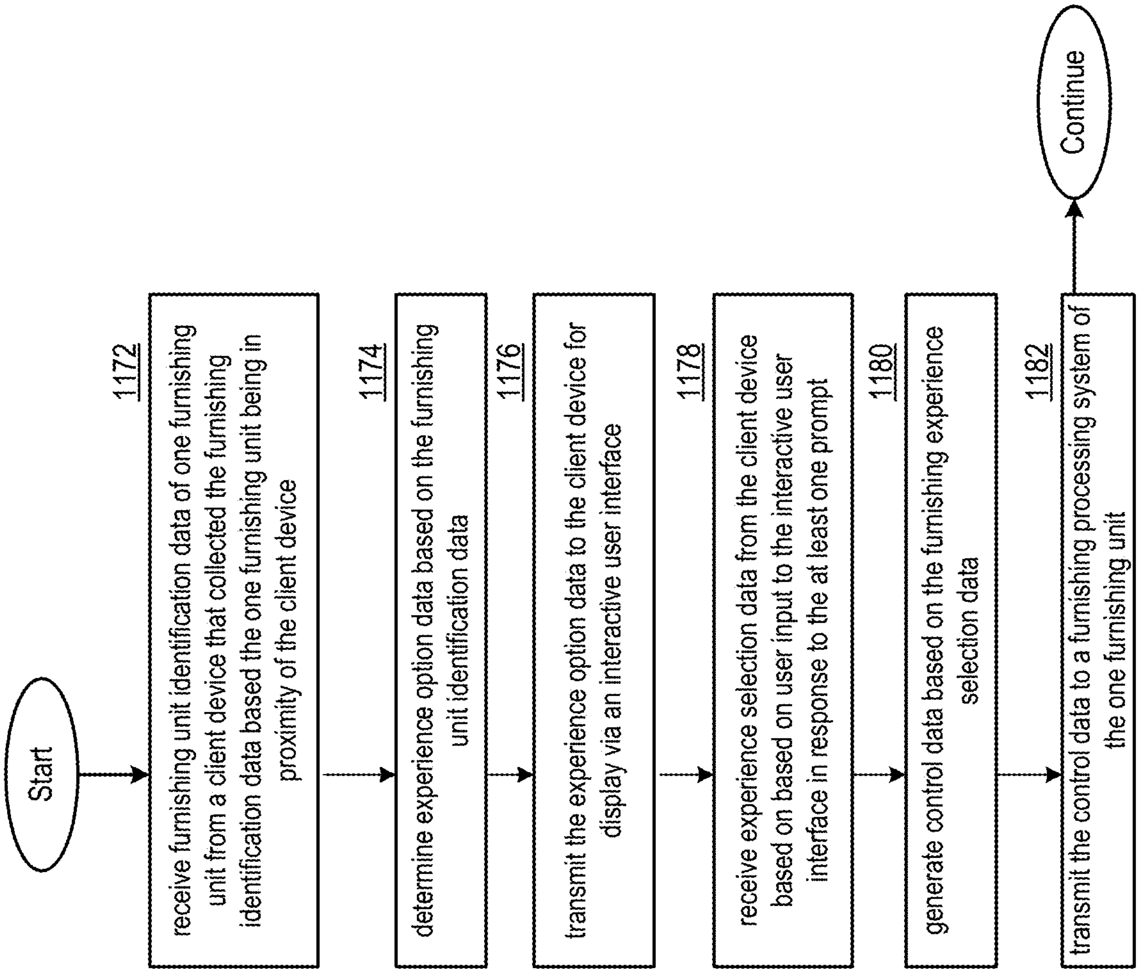

FIG. 13C illustrates a method for execution by a furnishing experience system 100 For example, some or all steps of FIG. 13C are executed by a furnishing experience system 100 in conjunction with performing some or all functionality of furnishing experience system 100 discussed in accordance with one or more of the various embodiments of furnishing experience system 100 described herein. Some or all steps of FIG. 13C can be performed in conjunction with performing steps illustrated of one or more other Figures in conjunction with performing other corresponding methods described herein. Some or all steps of FIG. 13C can be performed in conjunction with facilitating one or more furnishing experiences and/or can be performed in conjunction with one or more proximity-based interactions 111.

Step 1172 includes receiving furnishing unit identification data of one furnishing unit from a client device that collected the furnishing identification data based the one furnishing unit being in proximity of the client device. Step 1174 includes determining experience option data based on the furnishing unit identification data. Step 1176 includes transmitting the experience option data to the client device for display via an interactive user interface. Step 1178 includes receiving experience selection data from the client device based on based on user input to the interactive user interface in response to the at least one prompt. Step 1180 includes generating control data based on the furnishing experience selection data. Step 1182 includes transmitting the control data to a furnishing processing system of the one furnishing unit.

In various embodiments, a furnishing experience system includes at least one processor; and at least one memory that stores operational instructions that, when executed by the at least one processor, cause the furnishing experience system to: receive furnishing unit identification data of one furnishing unit from a client device that collected the furnishing identification data based the one furnishing unit being in proximity of the client device; determine furnishing experience option data based on the furnishing unit identification data; transmit the furnishing experience option data to the client device for display via an interactive user interface; receive furnishing experience selection data from the client device based on based on user input to the interactive user interface in response to the at least one prompt; and/or transmit furnishing experience data to facilitate a furnishing experience for a user of the client device based on the furniture experience selection data.

In various embodiments, a furnishing unit includes at least one surface configured support some or all weight of a user of the furnishing unit; an identifier conveyance unit configured to convey furnishing unit identifier data of the furnishing unit; and/or a furnishing processing system. The furnishing processing system can include at least one processor and/or at least one memory. The furnishing processing system can be operable to receive experience selection data generated by a client device associated with the user based on user input by the user to an interactive user interface. For example, the client device generates the experience selection data based on determining the furnishing unit identifier data for the furnishing unit via an identifier input element when in proximity to the furnishing unit. For example, the client device displays experience option data indicating a set of options, which can correspond to experience options for the furnishing unit based on its furnishing unit identifier data, where the user input indicates selection of one or more options indicated in the experience option data. The furnishing processing system can alternatively or additionally be operable to configure output of at least one experience facilitation element of a set of experience facilitation elements associated with the furnishing unit based on the experience selection data.

The furnishing processing system can be operable to perform some or all of its operations in conjunction with performing some or all steps of the method of FIG. 13B, and/or the furnishing processing system can be operable to perform some or all of its operations in accordance with any other method steps and/or any functionality of furnishing unit 110 and/or furnishing processing unit 112 described herein. The furnishing processing system optionally can be operable to perform some or all of its operations in conjunction with implementing and/or communicating with experience control module 430.

In various embodiments, the at least one surface is configured to partially and/or fully support the weight of at least one body part of a user, such as arms, legs, the head, the back, the rear, and/or other body parts of the user. For example, the at least one surface is leaned upon by the user, sat upon by the user, stood upon by the user, laid upon by the user, walked upon by the user, knelt upon by the user, rested upon by arms, legs, the back, the rear, and/or the head of the user, or is otherwise in contact with at least one body part of the user and supports the weight and/or other force induced by the at least one body part of the user. The at least one surface can be configured to support other objects, such as children and/or other humans associated with a user, animals such as pets associated with a user, and/or inanimate objects such as table settings, decorative items, other furnishing units and/or accessories described herein, and/or other objects. The at least one surface can be flat and/or curved. The at least one surface can be rigid and/or flexible.

In various embodiments, the furnishing unit alternatively or additionally includes at least two furnishing unit legs, such as legs of a chair implementing the furnishing unit, legs of a table implementing the furnishing unit, and/or legs of another type of furniture. In various embodiments, the legs support the at least one surface and/or some or all other portions of the furnishing unit when placed upon a planar surface, such as the ground and/or the floor.

In various embodiments, the furnishing unit is implemented as a seating unit configured for outdoor and/or indoor use. In various embodiment, the at least one surface includes a seat bottom configured to be seated upon by the user and/or a seat back configured to support a back of the user while the user is seated upon the seat bottom. The client device can generate the experience selection data while the user is seated upon the seat bottom. The furnishing unit can configure the output of the at least one experience facilitation element while the user is seated upon the seat bottom.

In various embodiments, the furnishing unit is implemented as a table unit configured for outdoor and/or indoor use. For example, the at least one surface includes a table top configured to support a user's arms, elbows, and/or hands when resting upon and/or leaning upon the table top.

In various embodiments, the furnishing unit is implemented as flooring configured for outdoor and/or indoor use, such as tiles, outdoor stones, stair steps, or other flooring having surfaces configured to be stood upon or walked upon by the user.

In various embodiments, the furnishing unit is implemented as structural elements configured for outdoor and/or indoor use, such as walls, columns, and/or other structural elements configured to support the force induced by a user when leaned upon by a user.

In various embodiments, the furnishing unit is implemented as a bathtub, pool, and/or hot tub configured for outdoor and/or indoor use, where the at least one surface includes the bottom and/or sides of the pool and/or hot tub configured to be sat upon, stood upon, and/or leaned upon by the user while inside and/or next to the bathtub, pool and/or hot tub.

In various embodiments, the furnishing unit is configured for outdoor use. For example, the furnishing unit is located at an outdoor location, where the client device generates the experience selection data while a corresponding user is at the outdoor location, and/or where the at least one experience facilitation element delivers output to counter at least one environmental condition at the outdoor location.

In various embodiments, the at least one environmental condition includes darkness due to the client device generating the experience selection data at a time corresponding to nighttime. In such embodiments, the at least one experience facilitation element can counter the darkness based on delivering lighting to illuminate a portion of the outdoor location in proximity to the user, for example, based on being implemented as at least one lighting element and/or device. For example, the experience selection indicates selection to activate at least one lighting element and/or to further configure a lighting intensity, color, duration, and/or location, and the furnishing processing unit controls the at least one lighting element and/or device to deliver illumination accordingly. The lighting element can be integrated within and/or attached to the at least one surface, can be integrated within and/or attached to a different portion of the furnishing unit, and/or can be in proximity to the furnishing unit to deliver illumination at and/or near the furnishing unit and/or a corresponding user while sitting in, having weight supported by, and/or otherwise using the furnishing unit.

Alternatively or in addition, the at least one environmental condition can include a cold ambient temperature, for example, due to the client device generating the experience selection data during a season corresponding to winter and/or while in a geographic location having cold temperatures during some or all seasons. In such embodiments, the at least one experience facilitation element can counter the cold ambient temperature based on delivering heating to the user, for example, based on being implemented as at least one heating element and/or device. For example, the experience selection indicates selection to activate at least one heating element and/or to further configure a heating intensity, duration, and/or location, and the furnishing processing unit controls the at least one heating element and/or device to deliver heat accordingly. The heating element can be integrated within and/or attached to the at least one surface, can be integrated within and/or attached to a different portion of the furnishing unit, and/or can be in proximity to the furnishing unit to deliver heat at and/or near the furnishing unit and/or a corresponding user while sitting in, having weight supported by, and/or otherwise using the furnishing unit.

Alternatively or in addition, the at least one environmental condition can include a hot ambient temperature, for example, due to the client device generating the experience selection data during a season corresponding to summer and/or while in a geographic location having hot temperatures during some or all seasons. In such embodiments, the at least one experience facilitation element can counter the jot ambient temperature based on delivering cooling to the user, for example, based on being implemented as at least one fan or other cooling element and/or device. For example, the experience selection indicates selection to activate at least one cooling element and/or to further configure a cooling intensity, duration, and/or location, and the furnishing processing unit controls the at least one cooling element and/or device to deliver cooling accordingly. The cooling element can be implemented as the same or different type of device and/or mechanism as the heating element. The cooling element can be integrated within and/or attached to the at least one surface, can be integrated within and/or attached to a different portion of the furnishing unit, and/or can be in proximity to the furnishing unit to deliver cooling at and/or near the furnishing unit and/or a corresponding user while sitting in, having weight supported by, and/or otherwise using the furnishing unit.

In various embodiments, the furnishing unit receives the experience selection data and configures the output of the at least one experience facilitation element during a first temporal period corresponding to use of the furnishing unit by a first user associated with the client device. The furnishing processing system can be further operable to receive second experience selection data during a second temporal period after the first temporal period. For example, the furnishing unit is located at an establishment and is used by one user while visiting the establishment during the first temporal period and is later used by another user while visiting the establishment during the second temporal period. The second experience selection data can correspond to use of the furnishing unit during the second temporal period by a second user associated with a second client device. The second experience selection data can be generated by the second client device based on second user input via the second user to a second interactive user interface displayed by the second client device. The second client device can generate the second experience selection data based on determining the furnishing unit identifier data for the furnishing unit when in proximity to the furnishing unit during the second temporal period. For example, the second client device displays experience option data indicating the set of options, which can correspond to the experience options for the furnishing unit based on its furnishing unit identifier data, where the second user input indicates selection of one or more options indicated in the experience option data, which can be different from the selection by the user. The furnishing processing system can be further operable to configure second output of at least one experience facilitation element of the furnishing unit during the second temporal period based on the second experience selection data. The second output can be from the output based on the second experience selection data being different from the experience selection data.

In various embodiments, the set of experience facilitation elements includes at least one of: at least one heating element, at least one cooling element, at least one speaker, at least one vibration element, at least one display device, or at least one lighting element. In various embodiments, the set of experience facilitation elements includes two or more of these types of experience facilitation elements. The set of experience facilitation elements can alternatively or additionally include any other types of experience facilitation elements described herein.

In various embodiments, the set of experience facilitation elements includes two or more experience facilitation elements. In various embodiments, output of at least two experience facilitation elements of the set of experience facilitation elements is configured based on the experience selection data. The least two experience facilitation elements of the set of experience facilitation elements can be a proper subset of the set of experience facilitation elements or can include all of the set of experience facilitation elements.

In various embodiments, configuring output of the at least one experience facilitation element of the furnishing unit includes controlling output of one experience facilitation element of the set of experience facilitation elements from a set of three or more possible output types. For example, the one experience facilitation element has a plurality of intensities, a plurality of locations, a plurality of durations for output, or other plurality of configurable options for rendering output.

In various embodiments, the furnishing unit includes some or all of the set of experience facilitation elements, for example, where some or all of the set of experience facilitation elements are integrated within and/or attached to the furnishing unit. For example, some or all of the set of experience facilitation elements are integrated within and/or attached to the at least one surface configured to support weight of the user. Alternatively or in addition, some or all of the set of experience facilitation elements are integrated within and/or attached to another portion of the furnishing unit. In some embodiments, some or all of the set of experience facilitation element are not part of the furnishing unit, but are nearby the furnishing unit and/or are operable to deliver corresponding output to be seen by, heard by, felt by, sensed by, and/or otherwise induced upon the user.

In various embodiments, the furnishing processing unit receives, extracts, generates, and/or otherwise determines control data based on the experience selection data, and configures the at least one furnishing facilitation element via the control data. For example, the furnishing unit sends the control data to respective devices implementing the at least one furnishing unit element via a wired and/or wireless connection to control the at least one furnishing unit element. As another example, the furnishing unit processes the control data to deliver current and/or power to a corresponding furnishing facilitation element to activate the corresponding furnishing facilitation element in accordance with the control data, such as delivering current to a heating element to render heating by the heating element and/or delivering power to a furnishing facilitation element to turn on the furnishing facilitation element.

In various embodiments, the identifier conveyance unit is implemented via visual identifier data visibly displayed upon at least one surface of the furnishing unit, where the client device determines the furnishing unit identifier data based on a camera of the client device capturing the visual identifier data. For example, the client device further implements a visual identifier processing module to extract the furnishing unit identifier data from image data captured via the camera.

In various embodiments, the identifier conveyance unit includes a microchip storing the furnishing unit identifier data, and further includes a coil that, when energized via an electromagnetic field generated by the client device while in proximity with the identifier conveyance unit, conveys the furnishing unit identifier data for receipt by the client device as signal identifier data, for example, based on modulating of the electromagnetic field with the furnishing unit identifier data and/or based on electromagnetic induction. In various embodiments, the identifier conveyance unit includes a Near-Field Communications (NFC) tag, and the client device determines the furnishing unit identifier data based on implementing an NFC reader.

In various embodiments, the furnishing unit identifier data is in accordance with a data format corresponding to a quick response (QR) code. For example, the QR code is displayed as the visual identifier data. As another example, the QR code is received in and/or is determined based on signal identifier data emitted by the identifier conveyance unit, for example, in accordance with an NFC communications protocol, and/or where digital data indicating the QR code is stored by a microchip of the identifier conveyance unit for modulation upon an electromagnetic field generated by the client device to enable the client device to determine the QR code.

In various embodiments, the furnishing unit further comprises at least one proximity-based communications transceiver, where the experience selection data is received via the proximity-based communications transceiver from the client device via proximity-based communications with the client device. The at least one proximity-based communications transceiver can be the same as, integrated within, and/or separate from the identifier conveyance unit. In some embodiments, the identifier conveyance unit emits the furnishing unit identifier data in accordance with a first type of proximity-based communications, such as communications in accordance with an NRC protocol, and the experience selection data can be received via the proximity-based communications transceiver from the client device via a second type of proximity-based communications such as communications in accordance with a Bluetooth protocol. In various embodiments, a communications link for communication of the experience selection data, for example, in accordance with the second type of communications, is established based on the client device determining the furnishing unit identifier data, for example, in accordance with the first type of communications.

In various embodiments, the furnishing unit receives the experience selection data and/or corresponding control data from a server system such as the furnishing experience system, for example, where the experience selection data is transmitted by the client device to the furnishing experience system, for example, via a wireless network, a local area network, a cellular network, and/or the Internet, where the furnishing experience system transmits the experience selection data to the furnishing unit.

In various embodiments, a method for execution by a client device comprises determining furnishing unit identifier data conveyed by an identifier conveyance unit of a furnishing unit in proximity to an identifier input element of the client device; displaying experience option data for the furnishing unit via an interactive user interface based on determining the furnishing unit identifier data; generating experience selection data based on user input to the interactive user interface; and/or transmitting the experience selection data to the furnishing unit, wherein the furnishing unit configures output of at least one experience facilitation element based on receiving the experience selection data. This method can be performed in conjunction with method steps of FIG. 13A and/or some or all other methods described herein, and/or can be performed in conjunction with some or all functionality of client device 130 described herein.

In various embodiments, a client device includes an identifier input unit configured to determine furnishing unit identifier data conveyed by an identifier conveyance unit of a furnishing unit in proximity to the client device; at least one memory; and/or at least one processor storing operational instructions that, when executed by the at least one processor, cause the client device to perform operations that include: displaying experience option data for the furnishing unit via an interactive user interface based on determining the furnishing unit identifier data; generating experience selection data based on user input to the interactive user interface; and/or transmitting the experience selection data to the furnishing unit, wherein the furnishing unit configures output of at least one experience facilitation element based on receiving the experience selection data.

The client device can be operable to perform some or all of its operations in conjunction with performing some or all steps of the method of FIG. 13A, and/or the client device can be operable to perform some or all of its operations in accordance with any other method steps and/or any functionality of client device 130. The client device optionally can be operable to perform some or all of its operations in conjunction with implementing and/or communicating with experience control module 430.

In various embodiments, the at least one processor performs some or all of these operations in conjunction with execution of a mobile application associated with the furnishing experience system that is installed upon the client device. In various embodiments, the at least one processor performs some or all of these operations in conjunction with communicating with a web server associated with the furnishing experience system hosting a website opened in a browser application installed upon the client device. of a mobile application installed upon the client device. In various embodiments, the at least one processor performs some or all of these operations in conjunction with downloading and/or executing a partial portion of the mobile application associated with the furnishing experience system without installation of the mobile application upon the client device. As another example, the at least one processor performs some or all of these operations in conjunction with an App Clip and/or an Instant App.

In various embodiments, the experience option data indicates a plurality of options that includes at least one of: at least one option for configuring heating intensity by at least one heating element of the furnishing unit; at least one option for configuring heating location by at least one heating element of the furnishing unit; at least one option for configuring cooling by at least one cooling element of the furnishing unit; at least one option for configuring volume of at least one speaker of the furnishing unit; at least one option for configuring music played by of at least one speaker of the furnishing unit; at least one option for configuring entertainment content displayed by at least one display of the furnishing unit; and/or at least one option for configuring lighting by at least one lighting element of the furnishing unit. The experience selection data can indicate selection of at least one of this plurality of options.

In various embodiments, the experience option data indicates a plurality of options that includes at least one of: at least one option for configuring an intensity of output of the at least one furnishing experience element; at least one option for configuring a location of output of the at least one furnishing experience element; and/or at least one option for configuring a duration of output of the at least one furnishing experience element.

In various embodiments, the experience selection data is generated while the client device is at least one of: held by a user while the user is seated upon a seat bottom of the furnishing unit, or worn by the user while the user is seated upon a seat bottom of the furnishing unit. For example, the client device is a mobile phone, a smart phone, a tablet, a hand held personal device, a wearable device, a smart watch, and/or another mobile device worn by and/or held by the user.

In various embodiments, the identifier input unit is implemented via at least one of: a camera of the client device or an NFC reader of the client device. For example, the furnishing conveyance unit displays visual identifier data such as a QR code and/or the furnishing conveyance unit emits signal identifier data such as signaling emitted by an NFC tag when in close physical proximity to the NFC reader.

In various embodiments, the client device is in proximity to the furnishing unit during a first temporal period, and the client device is in proximity to a second furnishing unit during a second temporal period after the first temporal period. For example, the second furnishing unit is within a same establishment or at a new establishment. The identifier input unit can determine second furnishing unit identifier data conveyed by a second identifier conveyance unit of a second furnishing unit in proximity to the client device during the second temporal period. The operational instructions, when executed by the at least one processor during the second temporal period, can further cause the client device to display second experience option data for the second furnishing unit via the interactive user interface based on determining the second furnishing unit identifier data. The second experience option data can be different from the experience option data based on a first set of furnishing experience facilitation elements of the furnishing unit that includes the at least one experience facilitation elements being different from a second set of furnishing experience facilitation elements of the second furnishing unit. For example, the second furnishing unit offers different furnishing experiences based on being implemented as a different type of furniture, being implemented at a different establishment with different experience offerings, being implemented in a different geographic location with different outdoor conditions to be countered by experience facilitation elements, being outfitted with and/or being in proximity to different types of experience facilitation elements, and/or other reasons. The second experience option data can be automatically determined and distinguished from the first experience option data based on the first furnishing unit identifier data 350 being different from the second furnishing unit identifier data 350.

The operational instructions, when executed by the at least one processor during the second temporal period, can further cause the client device to generate second experience selection data based on second user input to the interactive user interface, and to transmit the second experience selection data to the second furnishing unit. The second furnishing unit configures output of another at least one experience facilitation element of the second set of experience facilitation elements based on receiving the second experience selection data. The another at least one experience facilitation element configured by the second furnishing unit can be the same or different type of experience facilitation element as the at least one experience facilitation element configured by the furnishing unit.

In various embodiments, the client device is in proximity to the furnishing unit during a first temporal period. The operational instructions, when executed by the at least one processor, can further cause the client device to save the experience selection data in a user account associated with a user of the client device during the first temporal period. This can include locally saving the experience selection data, for example, in conjunction with a mobile application installed upon the client device that facilitated generation of the experience selection data when executed. This can alternatively or additionally include transmitting the experience selection data to a server system such as the furnishing experience system for storage in conjunction with a user account of a user database.

The client device can be in proximity to a second furnishing unit during a second temporal period after the first temporal period, and the identifier input unit can determine second furnishing unit identifier data conveyed by a second identifier conveyance unit of a second furnishing unit in proximity to the client device during the second temporal period. The operational instructions, when executed by the at least one processor during the second temporal period, can further cause the client device to generate second experience selection data based on determining the second furnishing unit identifier data. The second experience selection data can be set as the experience selection data based on accessing the experience selection data in the user account. The operational instructions, when executed by the at least one processor during the second temporal period, can further cause the client device to transmit the second experience selection data to the second furnishing unit, where the second furnishing unit configures output of the at least one experience facilitation element of the second furnishing unit based on receiving the second experience selection data.

In some embodiments, the second experience selection data is set as the experience selection data further based on: the second furnishing unit offering same furnishing experiences based on being implemented as a same type of furniture, being implemented at a same establishment with same experience offerings, being implemented in a same geographic location with different outdoor conditions to be countered by experience facilitation elements, being outfitted with and/or being in proximity to same types of experience facilitation elements, or other reasons. In some embodiments, the second experience selection data is set as the experience selection data further based on all of the experience selection data corresponding to selected options that are all options in second experience option data for the second furnishing unit, where the second experience option data as a whole is different from the experience option data of the furnishing unit.

Figure 14:
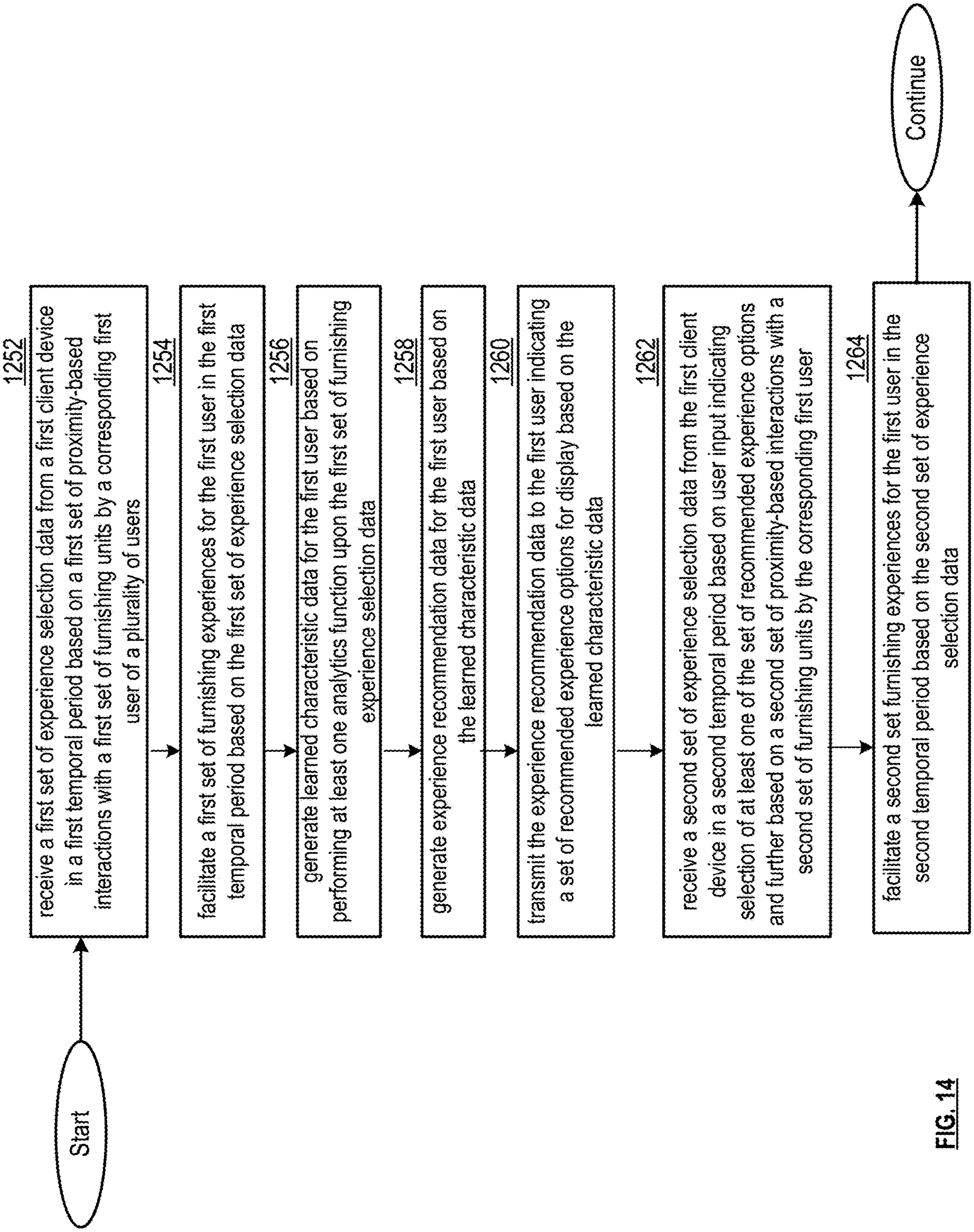

FIG. 14 illustrates a method for execution by a furnishing experience system 100. For example, some or all steps of FIG. 14 are executed by a furnishing experience system 100 in conjunction with performing some or all functionality of furnishing experience system 100 discussed in accordance with one or more of the various embodiments of furnishing experience system 100 described herein. Some or all steps of FIG. 14 can be performed in conjunction with performing steps illustrated of one or more other Figures in conjunction with performing other corresponding methods described herein. Some or all steps of FIG. 14 can be performed in conjunction with facilitating one or more furnishing experiences and/or can be performed in conjunction with one or more proximity-based interactions 111.

Step 1252 includes receiving a first set of experience selection data from a first client device in a first temporal period based on a first set of proximity-based interactions with a first set of furnishing units by a corresponding first user of a plurality of users. Step 1254 includes facilitating a first set of furnishing experiences for the first user in the first temporal period based on the first set of experience selection data. The first temporal period can be within a given hour, day, week, month, year, and/or multiple years. Step 1256 includes generating learned characteristic data for the first user based on performing at least one analytics function upon the first set of furnishing experience selection data. Step 1258 includes generating experience recommendation data for the first user based on the learned characteristic data. Step 1260 includes transmitting the experience recommendation data to the first user indicating a set of recommended experience options for display based on the learned characteristic data. Step 1262 includes receiving a second set of experience selection data from the first client device in a second temporal period based on user input indicating selection of at least one of the set of recommended experience options and further based on a second set of proximity-based interactions with a second set of furnishing units by the corresponding first user. A start of the second temporal period can be strictly after an elapsing of the first temporal period. The second temporal period can be within a given hour, day, week, month, year, and/or multiple years Step 1264 includes facilitating a second set furnishing experiences for the first user in the second temporal period based on the second set of experience selection data.

In various embodiments, a subset of the first set of furnishing experience selection data is based on subset of first proximity-based interactions of the first set of proximity-based interactions with a first furnishing unit of the first set of furnishing units. In various embodiments, the experience recommendation data indicates another experience option that is not indicated in the subset of the first set of furnishing experience selection data. In various embodiments, one experience selection data of the second set of experience selection data indicates the another experience option based on one of the second set of proximity-based interactions with the first furnishing unit.

In various embodiments, a subset of the first set of furnishing experience selection data is based on subset of first proximity-based interactions of the first set of proximity-based interactions with a subset of first set of furnishing units located at a first establishment. In various embodiments, the experience recommendation data indicates another experience option that is not indicated in the subset of the first set of furnishing experience selection data. In various embodiments, one experience selection data of the second set of experience selection data indicates the another experience option based on one of the second set of proximity-based interactions with one of the second set of furnishing units located at the first establishment.

In various embodiments, the first set of furnishing units are located in a first set of establishments, wherein the experience recommendation data indicates another establishment not included in the first set of establishments. In various embodiments, the second set of furnishing units includes at least one furnishing unit located in the another establishment based on the set of recommended experience options indicated the another establishment.

In various embodiments, the method includes generating a plurality of learned characteristic data for the plurality of users. In various embodiments, a first one of the plurality of learned characteristic data corresponds to the learned characteristic data for the first user. In various embodiments, generating the experience recommendation data for the first user includes performing a recommendation function based on the plurality of learned characteristic data.

In various embodiments, the method includes generating a plurality of learned characteristic data for the plurality of users. In various embodiments, a first one of the plurality of learned characteristic data corresponds to the learned characteristic data for the first user. In various embodiments, the method further includes generating characteristic similarity data for the plurality of users based on the plurality of learned characteristic data. In various embodiments, the experience recommendation data indicates a recommended social connection with another one of the plurality of users based on the characteristic similarity data indicating a similarity score computed for the first one of the plurality of learned characteristics and the second one of the plurality of learned characteristics compares favorably to a similarity score threshold.

In various embodiments, a furnishing experience system includes at least one processor, and at least one memory that stores operational instructions that, when executed by the at least one processor, cause the furnishing experience system to: receive a first set of experience selection data from a first client device in a first temporal period based on a first set of proximity-based interactions with a first set of furnishing units by a corresponding first user of a plurality of users; facilitate a first set of furnishing experiences for the first user in the first temporal period based on the first set of experience selection data; generate learned characteristic data for the first user based on performing at least one analytics function upon the first set of furnishing experience selection data; generate experience recommendation data for the first user based on the learned characteristic data; transmit the experience recommendation data to the first user indicating a set of recommended experience options for display based on the learned characteristic data; receive a second set of experience selection data from the first client device in a second temporal period based on user input indicating selection of at least one of the set of recommended experience options and further based on a second set of proximity-based interactions with a second set of furnishing units by the corresponding first user, wherein a start of the second temporal period is after an elapsing of the first temporal period; and/or facilitate a second set furnishing experiences for the first user in the second temporal period based on the second set of experience selection data.

Figure 15:
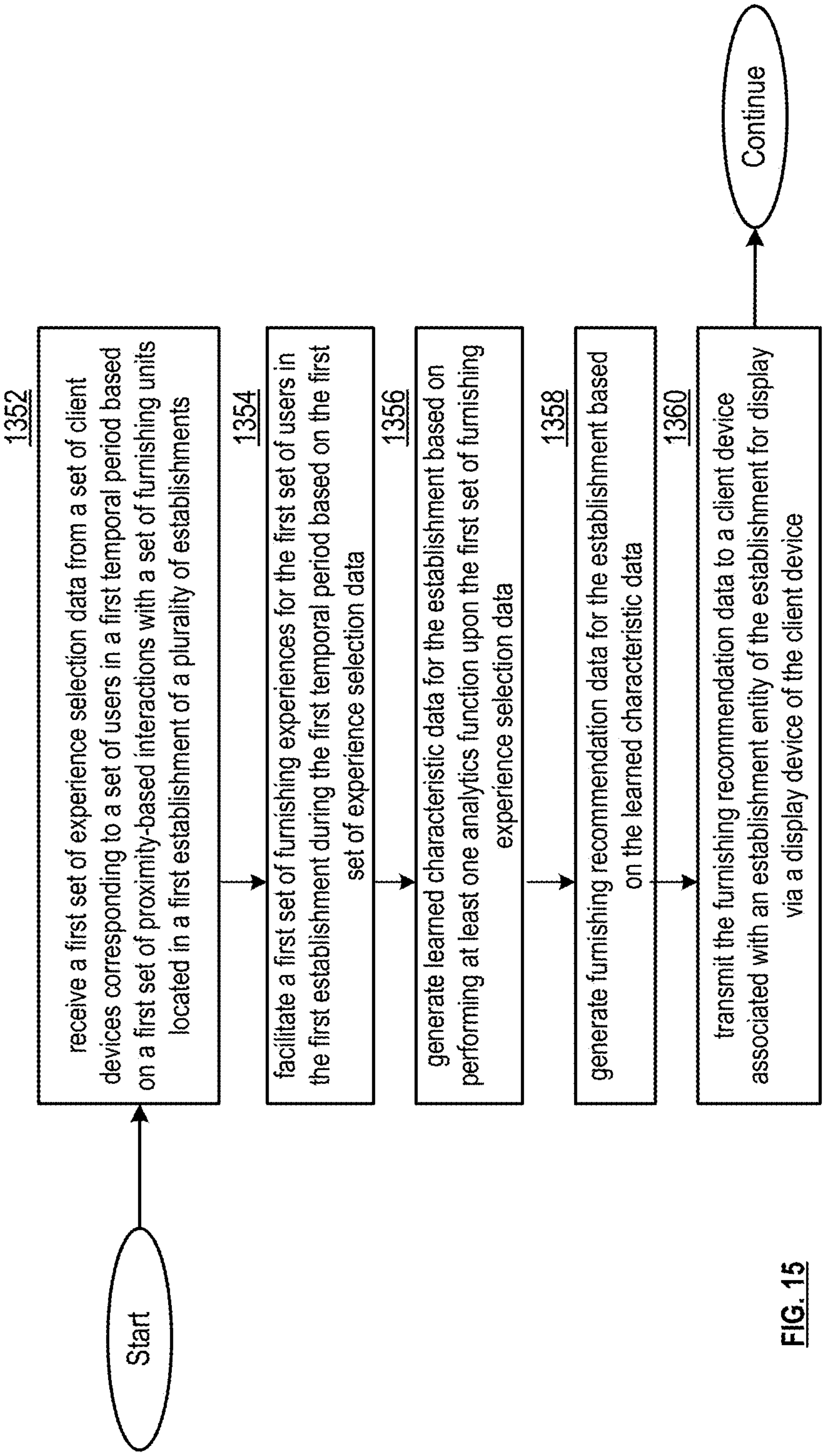

FIG. 15 illustrates a method for execution by a furnishing experience system 100. For example, some or all steps of FIG. 15 are executed by a furnishing experience system 100 in conjunction with performing some or all functionality of furnishing experience system 100 discussed in accordance with one or more of the various embodiments of furnishing experience system 100 described herein. Some or all steps of FIG. 15 can be performed in conjunction with performing steps illustrated of one or more other Figures in conjunction with performing other corresponding methods described herein. Some or all steps of FIG. 15 can be performed in conjunction with facilitating one or more furnishing experiences and/or can be performed in conjunction with one or more proximity-based interactions 111.

Step 1352 includes receiving a first set of experience selection data from a set of client devices corresponding to a set of users in a first temporal period based on a first set of proximity-based interactions with a set of furnishing units located in a first establishment of a plurality of establishments. Step 1354 includes facilitating a first set of furnishing experiences for the first set of users in the first establishment during the first temporal period based on the first set of experience selection data. Step 1356 includes generating learned characteristic data for the establishment based on performing at least one analytics function upon the first set of furnishing experience selection data. Step 1358 includes generating furnishing recommendation data for the establishment based on the learned characteristic data. Step 1360 includes transmitting the furnishing recommendation data to a client device associated with an establishment entity of the establishment for display via a display device of the client device.

In various embodiments, the method further includes determining an updated set of furnishing units, wherein a set difference between the updated set of furnishing units and the set of furnishing units is non-null based on the furnishing recommendation data. In various embodiments, the method further includes receiving additional experience selection data from another client device of another user in the first establishment during a second temporal period that is after the first temporal period based on a proximity-based interactions with one furnishing unit included in the set difference. In various embodiments, the method further includes facilitating a furnishing experience for the another user second in the first establishment during the second temporal period based on the additional experience selection data.

In various embodiments, the updated set of furnishing units includes a new furnishing unit, wherein the one furnishing unit is the new furnishing unit.

In various embodiments, one of the first set of experience selection data is based on selection from experience option data for a corresponding one of the set of furnishing units. In various embodiments, the method further includes the furnishing recommendation data indicates recommended experience option data for the one of the set of furnishing units. In various embodiments, the method further includes updating the experience option data of the one of the set of furnishing units as the recommended experience option data. In various embodiments, a set difference between a first set of options of the experience option data and a second set of option of the recommended experience option data is non-null. In various embodiments, the method further includes receiving additional experience selection data from another client device of another user in the first establishment during a second temporal period that is after the first temporal period based on a proximity-based interactions with the one of the set of furnishing units. In various embodiments, the additional experience selection data indicates selection of one of the second set of options included in the set difference. In various embodiments, the method further includes facilitating a furnishing experience for the another user second in the first establishment during the second temporal period based on the additional experience selection data.

In various embodiments, the method further includes the furnishing recommendation data indicates a recommended change to a physical layout of the set of furnishing units.

In various embodiments, the method further includes generating a plurality of learned characteristic data for the plurality of establishments. In various embodiments, a first one of the plurality of learned characteristic data corresponds to the learned characteristic data for the first establishment. In various embodiments, generating the furnishing recommendation data for the first establishment includes performing a recommendation function based on the plurality of learned characteristic data.

In various embodiments, a furnishing experience system includes at least one processor, and at least one memory that stores operational instructions that, when executed by the at least one processor, cause the furnishing experience system to: receive a first set of experience selection data from a set of client devices corresponding to a set of users in a first temporal period based on a first set of proximity-based interactions with a set of furnishing units located in a first establishment of a plurality of establishments; facilitate a first set of furnishing experiences for the first set of users in the first establishment during the first temporal period based on the first set of experience selection data; generate learned characteristic data for the establishment based on performing at least one analytics function upon the first set of furnishing experience selection data; generate furnishing recommendation data for the establishment based on the learned characteristic data; and/or transmit the furnishing recommendation data to a client device associated with an establishment entity of the establishment for display via a display device of the client device.

Figure 16:
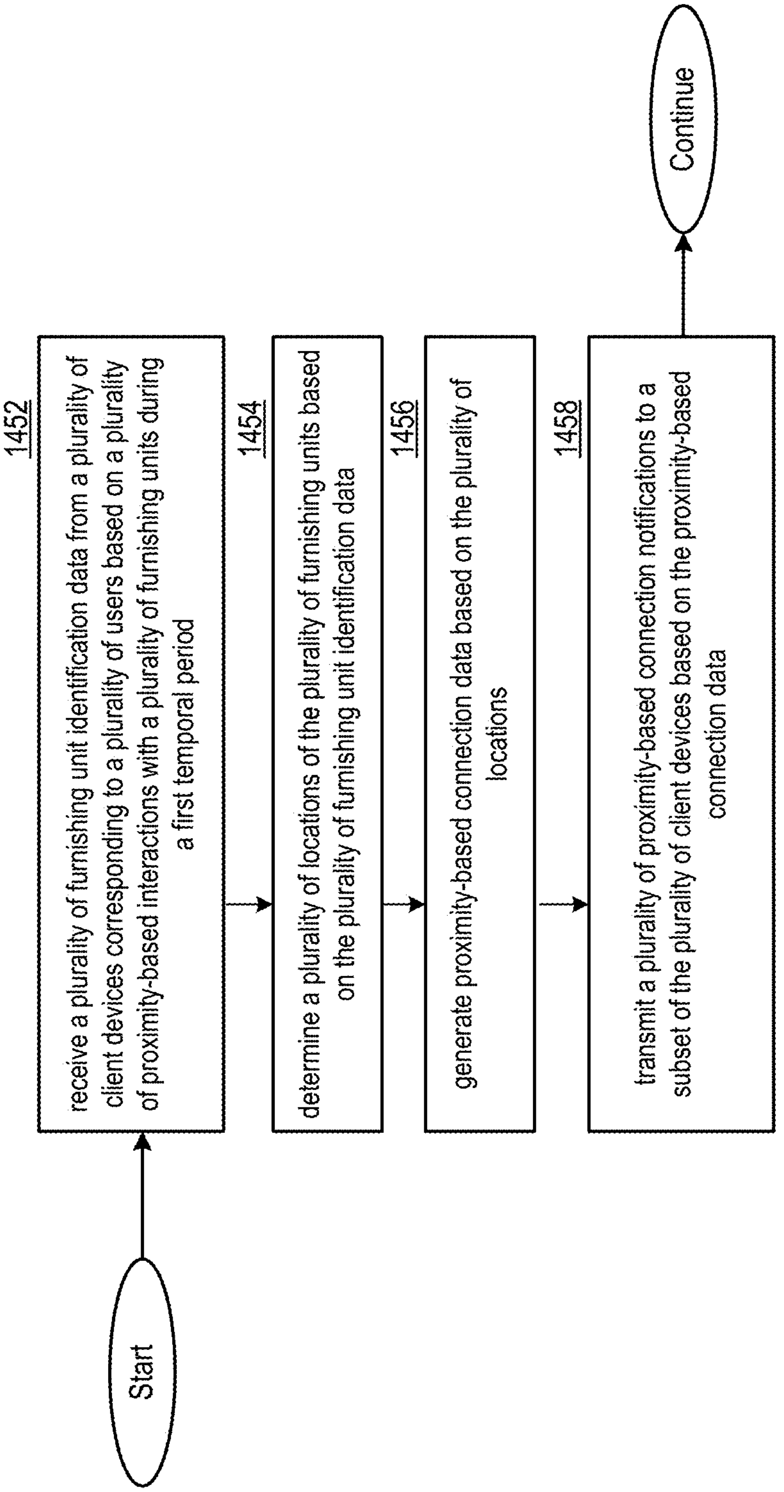

FIG. 16 illustrates a method for execution by a furnishing experience system 100. For example, some or all steps of FIG. 16 are executed by a furnishing experience system 100 in conjunction with performing some or all functionality of furnishing experience system 100 discussed in accordance with one or more of the various embodiments of furnishing experience system 100 described herein. Some or all steps of FIG. 16 can be performed in conjunction with performing steps illustrated of one or more other Figures in conjunction with performing other corresponding methods described herein. Some or all steps of FIG. 16 can be performed in conjunction with facilitating one or more furnishing experiences and/or can be performed in conjunction with one or more proximity-based interactions 111.

Step 1452 includes receiving a plurality of furnishing unit identification data from a plurality of client devices corresponding to a plurality of users based on a plurality of proximity-based interactions with a plurality of furnishing units during a first temporal period. In various embodiments, a first user of the plurality of users has a first one of the plurality of proximity-based interactions with a first furnishing unit of the plurality of furnishing units during the first temporal period, and/or a second user of the plurality of users has a second one of the of the plurality of proximity-based interactions with a second furnishing unit of the plurality of furnishing units during the first temporal period.

Step 1454 includes determining a plurality of locations of the plurality of furnishing units based on the plurality of furnishing unit identification data. In various embodiments, the first furnishing unit of the plurality of furnishing units is at a first location of the plurality of locations, and/or the second furnishing unit of the plurality of furnishing units is at a second location of the plurality of locations.

Step 1456 includes generating proximity-based connection data based on the plurality of locations. In various embodiments, the proximity-based connection data indicates a proximity-based pairing between the first user and the second user based on proximity of the first location relative to the second location comparing favorably to a proximity threshold.

Step 1458 includes transmitting a plurality of proximity-based connection notifications to a subset of the plurality of client devices based on the proximity-based connection data. In various embodiments, the plurality of proximity-based connection notifications includes a first proximity-based connection notification transmitted to a first one of the plurality of client devices corresponding to the first user based on the proximity-based pairing between the first user and the second user. In various embodiments, the first proximity-based connection notification indicates the second user and/or the second location.

In various embodiments, the method further includes receiving a plurality of experience selection data from the plurality of client devices in the first temporal period based on the plurality of proximity-based interactions with a plurality of furnishing units. In various embodiments, generating the proximity-based connection data is further based on the plurality of experience selection data.

In various embodiments, the method further includes generating similarity data based on the plurality of experience selection data. In various embodiments, the proximity-based connection data indicates the proximity-based pairing of the first user and the second user based on the similarity data indicating a similarity score for first one of the plurality of experience selection data corresponding to the first user and a second one of the plurality of experience selection data corresponding to the second user compares favorably to a similarity threshold.

In various embodiments, the method further includes generating a plurality of learned characteristic data for the plurality of users prior to the first temporal period based on a plurality of prior proximity-based interactions by the plurality of users with the plurality of furnishing units. In various embodiments, the method further includes generating similarity data based on the plurality of learned characteristic data. In various embodiments, the proximity-based connection data indicates the proximity-based pairing of the first user and the second user based on the similarity data indicating a similarity score for first one of the plurality of learned characteristic data corresponding to the first user and a second one of the plurality of learned characteristic data corresponding to the second user compares favorably to a similarity threshold.

In various embodiments, the method further includes receiving a plurality of connection feedback data from the subset of the plurality of client devices. In various embodiments, a first one of the plurality of connection feedback data from the first client device indicates a connection feedback data for the proximity-based pairing between the first user and the second user. In various embodiments, the method further includes receiving first subsequent furnishing unit identification data from the first one of the plurality of client devices indicating a first subsequent proximity-based interactions by the first user with a third furnishing unit of the plurality of furnishing units at a third location during a second temporal period that is after the first temporal period. In various embodiments, the method further includes receiving second subsequent furnishing unit identification data from a second one of the plurality of client devices indicating a second subsequent proximity-based interactions by the second user with a fourth furnishing unit of the plurality of furnishing units at a fourth location during the second temporal period. In various embodiments, the method further includes generating subsequent proximity-based connection data based on the plurality of locations. In various embodiments, the proximity-based connection data indicates a proximity-based pairing between the first user and the second user based on proximity of the first location relative to the second location comparing favorably to a proximity threshold. In various embodiments, the method further includes transmitting the subsequent proximity-based connection notifications to the first one of the plurality of client devices.

In various embodiments, the method further includes accessing social connection data indicated in a user account of the first user. In various embodiments, the proximity-based connection data indicates the proximity-based pairing between the first user and the second user further based on the social connection data of the first user indicating the second user.

In various embodiments, the proximity of the first location relative to the second location compares favorably to a proximity threshold based on the first location and the second location indicating a same establishment of a plurality of establishments.

In various embodiments, the proximity threshold is configured by the first user via user input to an interactive user interface displayed via a display device of the first one of the plurality of client devices.

In various embodiments, a furnishing experience system includes at least one processor, and at least one memory that stores operational instructions that, when executed by the at least one processor, cause the furnishing experience system to: receive a plurality of furnishing unit identification data from a plurality of client devices corresponding to a plurality of users based on a plurality of proximity-based interactions with a plurality of furnishing units during a first temporal period, where a first user of the plurality of users has a first one of the plurality of proximity-based interactions with a first furnishing unit of the plurality of furnishing units during the first temporal period, and where a second user of the plurality of users has a second one of the of the plurality of proximity-based interactions with a second furnishing unit of the plurality of furnishing units during the first temporal period; determine a plurality of locations of the plurality of furnishing units based on the plurality of furnishing unit identification data, wherein the first furnishing unit of the plurality of furnishing units is at a first location of the plurality of locations, and wherein the second furnishing unit of the plurality of furnishing units is at a second location of the plurality of locations; generate proximity-based connection data based on the plurality of locations, where the proximity-based connection data indicates a proximity-based pairing between the first user and the second user based on proximity of the first location relative to the second location comparing favorably to a proximity threshold; and/or transmit a plurality of proximity-based connection notifications to a subset of the plurality of client devices based on the proximity-based connection data, where the plurality of proximity-based connection notifications includes a first proximity-based connection notification transmitted to a first one of the plurality of client devices corresponding to the first user based on the proximity-based pairing between the first user and the second user, and/or where the first proximity-based connection notification indicates at least one of: the second user, or the second location.

Figure 17:
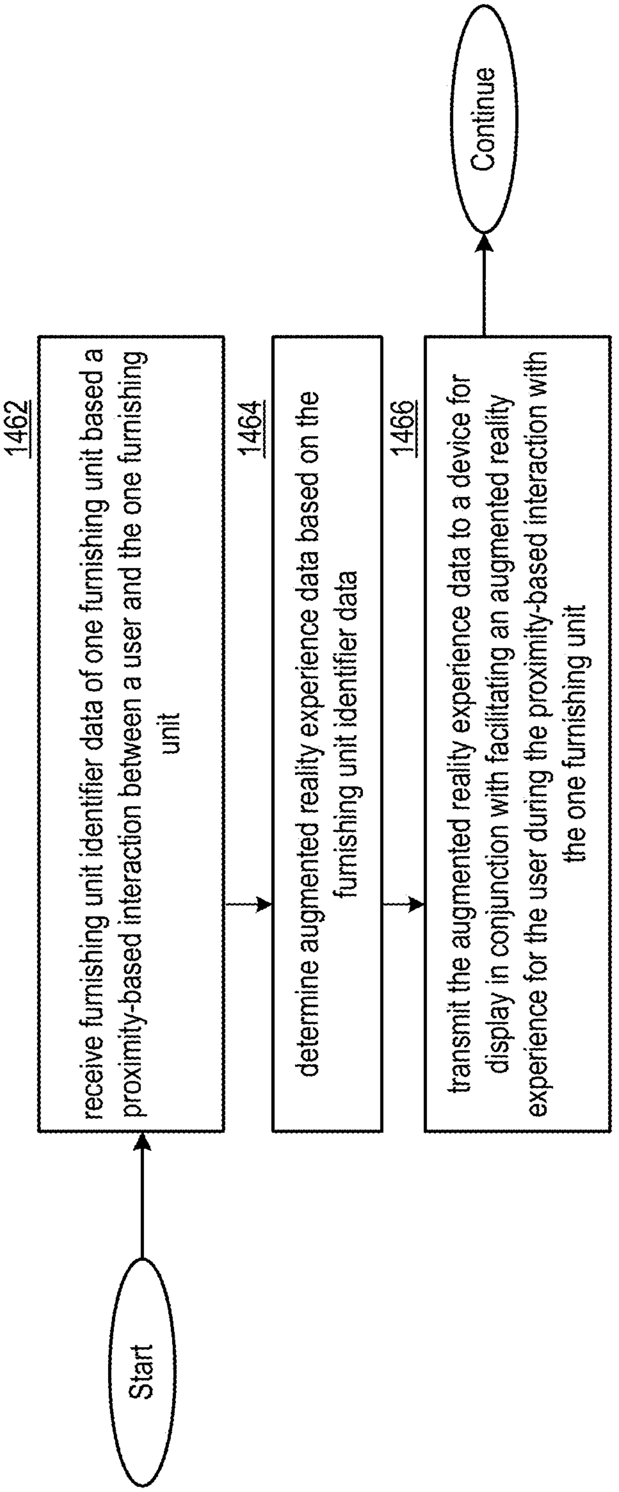

FIG. 17 illustrates a method for execution by a client device and/or a furnishing experience system 100. For example, some or all steps of FIG. 17 are executed by a client device 130 in conjunction with performing some or all functionality of client device 130 discussed in accordance with one or more of the various embodiments of client device 130 described herein. As another example, some or all steps of FIG. 17 are executed by a furnishing experience system 100 in conjunction with performing some or all functionality of furnishing experience system 100 discussed in accordance with one or more of the various embodiments of furnishing experience system 100 described herein. Some or all steps of FIG. 17 can be performed in conjunction with performing steps illustrated of one or more other Figures in conjunction with performing other corresponding methods described herein. Some or all steps of FIG. 17 can be performed in conjunction with facilitating one or more furnishing experiences and/or can be performed in conjunction with one or more proximity-based interactions 111.

Step 1462 includes receiving furnishing unit identifier data of one furnishing unit based a proximity-based interaction between a user and the one furnishing unit. Step 1464 includes determining augmented reality experience data based on the furnishing unit identifier data. Step 1466 includes transmitting the augmented reality experience data to a device for display in conjunction with facilitating an augmented reality experience for the user during the proximity-based interaction with the one furnishing unit. In various embodiments, the augmented reality experience data is based on an establishment identifier indicated by the furnishing unit identifier data. In various embodiments, the augmented reality experience data is selected from a plurality of augmented reality experience data based on the furnishing unit identifier data. In various embodiments, the method further includes receiving experience selection data, wherein the augmented reality experience data is selected from a plurality of augmented reality experience data further based on the experience selection data.

In various embodiments, a furnishing experience system includes at least one processor, and at least one memory that stores operational instructions that, when executed by the at least one processor, cause the furnishing experience system to: receive furnishing unit identifier data of one furnishing unit based a proximity-based interaction between a user and the one furnishing unit; determine augmented reality experience data based on the furnishing unit identifier data; and/or transmitting the augmented reality experience data to a device for display in conjunction with facilitating an augmented reality experience for the user during the proximity-based interaction with the one furnishing unit.

As described previously, any of the functions performed by furnishing experience system 100, client device 130, furnishing processing system 120, and/or any of the functions with corresponding function entries 175 of the function library 172 such as functions that correspond to and/or utilize image processing functions, computer vision model training function 709, object recognition function 710, analytics function 815, similarity function 817, experience recommendation function 832, furnishing recommendation function 833, and/or recommendation model generator function 818 and/or any other functions described herein can utilize, correspond to, and/or be based on artificial intelligence algorithms and/or techniques, and/or machine learning algorithms and/or techniques.

Some or all of these functions discussed herein cannot practically be trained by the human mind. Instead, such functions and/or corresponding models can be trained based on applying artificial intelligence algorithms and/or techniques, and/or machine learning algorithms and/or techniques, to a training set of feature vectors and/or image data. Alternatively or in addition, training some or all medical scan analysis functions cannot practically be trained by the human mind based upon: a great complexity of the resulting function and/or corresponding model; a large size of the training set utilized to train the function and/or model; the model taking an infeasibly long amount of time to train utilizing only pen and paper; and/or other reasons.

Some or all of these functions discussed herein cannot practically be performed by the human mind. Instead, such functions can be performed utilizing artificial intelligence algorithms and/or techniques, and/or machine learning algorithms and/or techniques. Alternatively or in addition, such functions can be performed utilizing a model trained utilizing artificial intelligence algorithms and/or techniques, and/or machine learning algorithms and/or techniques. Alternatively or in addition, performing some or all functions cannot practically be performed by the human mind based upon: a great complexity of these function; an accuracy rate and/or consistency of generating output being more favorable than that of a human; a speed of generating output being more favorable than that of a human; these functions taking an infeasibly long amount of time to perform utilizing only pen and paper; and/or other reasons.

As described previously, the furnishing experience system 100, client device 130, and/or furnishing processing system 120 is operable to generate various data for a given user in conjunction with performing various functionality, such as: generating learned characteristic data for the given user; generating experience recommendation data for the given user, generating furnishing recommendation data for a given establishment, tracking current status data for a given client device, tracking furnishing experience data over time for given users, furnishing units, products, and/or establishments, generating augmented reality data for given users, determining experience option data for given users, determining experience selection data for given users, generating furnishing facilitation data for given users, generating control data for furnishing units, and/or generating other data given users, furnishing units, products, and/or establishments as described herein.

Some or all of this data can be generated for a given user, furnishing unit, product, and/or establishments, and/or some or all functions of function library can be performed, within a short time frame, such as within a single minute, single second, single millisecond, and/or single microsecond. For example, the furnishing experience system 100 generates one or more of the various data described herein for a given user within the short time. As another example, the furnishing experience system 100 performs one or more given functions of function library 172 within the short time frame.

Generating one or more of the various types of data described herein for a given user, furnishing unit, product, and/or establishment within a short time frame, and/or performing one or more of the various functions of function library within the short time frame, cannot feasibly be performed by the human mind, for example based upon: the human mind not being able to feasibly perform one or more given functions of function library within the short time frame with an accuracy of output and/or consistency of output attained by the furnishing experience system 100; the human mind not being able to feasibly perform one or more given functions of function library within the short time frame due to the computational complexity of performing these functions; the human mind not being able to feasibly perform one or more given functions of function library within the short time frame due to processing complexity of processing a large required amount of input data to each function, such as a large number image data and/or a large number of selections in experience selection data; the human mind not being able to feasibly perform one or more given functions of function library within the short time frame due to searching for and/or retrieval of the appropriate input data from a large amount data, such as hundreds, thousands, and/or millions of different user accounts, different furnishing data, different product data, and/or different establishment data; the human mind not being able one or more given functions within the short time frame utilizing only pen and paper; the human mind not being able to feasibly generate one or more of the various data described herein within the same short time frame utilizing only pen and paper; and/or other reasons.

Furthermore, as described previously, the furnishing experience system 100 is operable to generate some or all of this various data for multiple different users, multiple different furnishing units 110, multiple different products, and/or multiple different establishments. In some cases, the furnishing experience system 100 receives data from and/or determines to generate data for multiple different users, such as dozens, hundreds, and/or thousands of users within a same, short time frame, such as a same second, a same minute, or other short time frame. In some cases, the furnishing experience system 100 receives data from and/or determines to generate data for multiple different furnishing units, such as dozens, hundreds, and/or thousands of furnishing units within a same, short time frame, such as a same second, a same minute, or other short time frame. In some cases, the furnishing experience system 100 determines to generate data for multiple different products, such as dozens, hundreds, and/or thousands of products within a same, short time frame, such as a same second, a same minute, or other short time frame. In some cases, the furnishing experience system 100 determines to generate data for multiple different products, such as dozens, hundreds, and/or thousands of establishments within a same, short time frame, such as a same second, a same minute, or other short time frame.

The furnishing experience system 100 can optionally implement its various processing resources of processing module 180 to generate data for multiple different users, furnishing units, products, and/or establishments within the same time frame in a parallelized fashion, and/or to perform other functionality described herein for multiple different users, furnishing units, products, and/or establishments within the same time frame in a parallelized fashion. For example, the furnishing experience system 100 generates data for multiple different users within the same time frame as multiple processes being performed in parallel via distinct and/or shared processing resources within the same time frame. As another example, the furnishing experience system 100 performs functions of function library 172 for multiple different users, furnishing units, products, and/or establishments within the same time frame as multiple processes being performed in parallel via distinct and/or shared processing resources within the same time frame. As a particular example, within a given microsecond, millisecond, second, minute or other short time frame, the furnishing experience system 100 can perform multiple different functions of function library and/or can generate multiple different data for multiple different users, furnishing units, products, and/or establishments in parallel as dozens, hundreds, and/or thousands of parallel processes.

The furnishing experience system 100 can alternatively or additionally implement processing resources of one or more processing modules 220, one or more processing module 520, and/or one or more furnishing processing system 120, to generate data for multiple different users, furnishing units, products, and/or establishments within the short time frame in a serialized fashion, and/or to perform other functionality described herein for multiple different users within the short time frame in a serialized fashion. For example, the furnishing experience system 100 generates data for multiple different users, furnishing units, products, and/or establishments within the short time frame as multiple processes being performed in serially within a short time frame. As another example, the furnishing experience system 100 performs functions of function library 172 for multiple different users, furnishing units, products, and/or establishments within the short time frame as multiple processes being performed serially within the short time frame. As a particular example, within a given microsecond, millisecond, second, minute, or other short time frame, the furnishing experience system 100 can perform multiple different functions of function library and/or can generate multiple different data for multiple different users, furnishing units, products, and/or establishments serially as dozens, hundreds, and/or thousands of processes performed one at a time.

Generating data for multiple different users, furnishing units, products, and/or establishments within the same time frame in a parallelized fashion or a serialized fashion, and/or performing functions for multiple different users, furnishing units, products, and/or establishments within the same time frame as multiple processes being performed in parallel and/or serially, cannot feasibly be performed by the human mind, for example based upon: the human mind not being able to feasibly perform multiple functions of function library in parallel and/or within the short time frame with an accuracy of output and/or consistency of output attained by the furnishing experience system 100; the human mind not being able to feasibly perform multiple functions of function library in parallel due to the computational complexity of performing these functions; the human mind not being able to feasibly perform multiple functions of function library in parallel due to processing complexity of processing a large required amount of input data to each function, such as a large number of selections and/or image data; the human mind not being able to feasibly perform dozens, hundreds, and/or thousands of the functions of function library in parallel; the human mind not being able to feasibly generate dozens, hundreds, and/or thousands of one or more types of the various data described herein in parallel; the human mind not being able to feasibly perform dozens, hundreds, and/or thousands of these functions within a same micro-second, same millisecond, same second, same minute, or other short time frame; the human mind not being able to feasibly generate dozens, hundreds, and/or thousands of the one or more types of the various data described herein within a same microsecond, same millisecond, same second, a same minute, or other short time frame; the human mind not being able to feasibly perform dozens, hundreds, and/or thousands of these functions within the same short time frame utilizing only pen and paper; the human mind not being able to feasibly generate dozens, hundreds, and/or thousands of the various data described herein within the same short time frame utilizing only pen and paper; and/or other reasons.

In various embodiments, one or more furnishing units 110 described herein are implemented via heating-capable furniture, such as chairs. In various embodiments, the one or more furnishing units 110 is deployed in an outside environment where people gather and where the air temperature may become uncomfortably cold. In various embodiments, the one or more furnishing units 110 includes cooling-capable furniture for outside situations where the air temperature may become uncomfortably warm.

In various embodiments, a furnishing unit 110 can include a resistive heating element. For example, one or more embodiments of the resistive heating element described below implement one or more experience facilitation elements 515 of furnishing processing system 120 integrated within and/or implemented in conjunction with furnishing units 110.

In various embodiments of furnishing units 110, this resistive heating element is formed by printing a heating-capable thick- or thin-film resistive material onto a substrate. In one example, a graphite- or graphene-based paste is printed onto a mica or like substrate. Other suitable thick- or thin-film materials having resistive heating capability are known such as those disclosed in U.S. Pat. No. 6,037,572 which is incorporated herein by reference. In one implementation, the film of resistive material is printed as a grid of fine lines. The lines can be printed as parallel lines, as a single meandering maze-like line, as a generally square or generally circular pattern, or the like. The deposited film material can have uniform or variable thickness with line widths and line spacing also being uniform or variable. The resistive material can be of uniform composition throughout or different regions of the deposited film can have different composition; for example, to provide relatively low and high resistivity regions. In one implementation, differences in resistivity of different parts of a thick- or thin-film heating element are used to direct applied current as required to establish a particular heating pattern. For example, an outer zone of a heating area is heated to a higher temperature than an inner central zone. Such an arrangement is adapted for chair backs where the spine marks a position of higher pressure compared to other parts of the sitter's back. Similarly, for a chair seat where the buttocks have higher pressure areas than surrounding areas. In one implementation, local thermostats are used to switch in and switch out parts of the pattern as limit temperatures are reached.

In various embodiments of the furnishing unit 110, the material of the resistive heating element, whether a film or a discrete wire or filament, has a positive temperature coefficient and so experiences an increase in electrical resistance when its temperature is raised. Depending on desired heating characteristics, in an alternative embodiment, the material has a linear or negative temperature coefficient.

In various embodiments of the furnishing unit 110, an associated film of conducting material can also be printed as a grid of input and output conducting material lines to connect the resistive lines to input and output terminals. If the heating element is a meandering resistive element, whether embodied as a wire or deposited film, an input terminal is electrically connected to one end of the element and an output terminal is electrically connected to the other end of the element. In an implementation specifically for a pattern of separate resistive lines, a conducting strip is printed to be integral with input ends of resistive element lines and another conducting strip is printed to be integral with output ends of resistive element lines. In one implementation, the conducting layer is overprinted on the resistive layer and connections between respective resistive and conducting lines are made vertically. The input and output conductive strips are connected to input and output terminals of a standard or tailored power receptacle or, via an electrical lead, to a plug.

In various embodiments of the furnishing unit 110, printing of resistive and conductive leads can be by any of screen printing, ink drop printing, etc., tailored to the film material being used and the substrate to which the print material is being applied. For added integrity deposited conducting and resistive lines can be baked. The input and output terminals are in one implementation riveted to the adjacent rigid substrate.

In various embodiments of the furnishing unit 110, the heating element is mated to a surface part of an article of heating-capable furniture. In one implementation, the article is a piece of stock construction material such as wood, metal, ceramic, glass, fiberglass, carbon, MDF board, clay, Formica™, Corian™, Solid surface, laminates or the like for use in the manufacture of an article of heating-capable furniture. In an alternative implementation, the article is a surface part of the finished article itself, such as a piece of furniture, a vehicle, a boat, a floor, a pool or the like, with the resistive heating material and input and output conductors printed, coated or otherwise applied directly to the surface part itself and with a protective layer applied over the heating element.

In various embodiments of the furnishing unit 110, an intermediate layer of thermal transfer material is located on the heating 'side' between the heating element and an overlying substrate. The transfer material is made flowable during manufacturing to enable adaptation to low level surface formations or roughness in either or both of the heating element and the substrate. The transfer material has high thermal conductivity to minimize heat lost during transfer from the heating element to the substrate. As an alternative to a flowable material, the transfer layer can be made pliable both to adapt to surface irregularities of a substrate and heating element and to adapt to the overall curvature of a substrate such as a chair part. In one implementation, the thermal transfer layer is itself deposited, as by vapor deposition or other suitable deposition method, or printed, as by screen printing, or other suitable printing method, directly onto the surface of the thick or thin film heating layer.

In various embodiments of the furnishing unit 110, an intermediate thermally insulating layer is located on the non-heating 'side' between the heating element and an underlying substrate. The insulating material acts a heat shield to minimize heat loss from the back or non-heating side of piece of furniture such as a chair and can be supplemented by a reflecting layer of material to reflect heat back the heating side. The heat shield also prevents generated heat from inadvertently and/or undesirably heating another person or item in the locality of furniture that is being deliberately heated.

In various embodiments of the furnishing unit 110, a robust resistive heating element is formed as a winding resistive heating wire or filament. In an implementation, the wire or filament is contained within a facing or housing material such as silicone rubber. The silicone rubber acts to protect the element from outside conditions; also, to provide flexibility allowing the heating element to be bent around an article to be heated; and particularly in the case of use of facing material, to act to concentrate the projection of generated heat towards the object being heated while acting as a shield to limit heat from being directed away from the object being heated. The housed heating element can, in one embodiment, be secured to an underlying body by anchors such as screw-mounted brackets.

In various embodiments of the furnishing unit 110, the heating element, as supplemented by any heat transfer layer and/or insulating layer has a thermoformed acrylic or Solid surface covering to render the structure resistant to deterioration from weather effects.

In various embodiments of the furnishing unit 110, dielectric material such as an epoxy is coated on a surface of a base material such as stock building material or an article of furniture. A resistive heating element such as any of a winding resistive wire, a lattice of resistive wires, or a printed lattice of resistive lines is then laid over or applied to the dielectric layer and a second layer of dielectric such as epoxy covers the resistive element. The stock material so produced is used to construct an item such as furniture, vehicles, boats, floors, pools, etc. As an alternative to a flowable epoxy, the heating element is sandwiched between layers of Corian™, Solid surface or like laminar material.

In various embodiments of the furnishing unit 110, a power receptacle is mounted at a suitable position on the item to be heated; for example, underneath a chair seat. An extension lead can be taken from the chair to a central power unit for servicing a group of heating-capable chairs or one of a group of chairs can have a central heating power source for heating the other chairs in the group.

In various embodiments of the furnishing unit 110, as an alternative to a mechanical plug and receptacle arrangement, a power transfer unit includes input and output members that are attached to each other through an easy-release mechanism. In one embodiment, the eliminate conventional male to female connectors by using a combination of friction and/or magnetism to hold one member to the other. The level of friction and/or magnetic attraction are set sufficiently high so as to avoid light collisions from disconnecting the power transfer members from one other, while supporting safety by enabling disconnection if tension within the lead exceeds a pre-set safety level. The power system can use standard 120 volts or may, through a step-down transformer mounted on the chair or at another near location, enable use of lower voltage, especially if warranted or mandated for safety and/or certification reasons. Engagement of the power transfer members, whether of standard or dedicated design, can be such that upon deliberate or accidental disengagement of members at the power transfer unit, an associated electrical lead is spring-returned to a storage position. This reduces the chance of accident or damage occurring in the event that a chair is inadvertently moved past the limit position set by the extension lead tethering.

In various embodiments of the furnishing unit 110, a sheet of substrate material bearing a heating element is embedded inside a cast material such as concrete. In one implementation, the embedded structure is first encased in an inert material to protect it from reaction with damaging chemicals used or produced in the course of the casting process. In another embodiment, heating elements are embedded in an injection molded material such as plastics.

In various embodiments of the furnishing unit 110, heating power to an article of furniture such as a chair offers the opportunity to implement electrically powered ancillary devices at or near the location of the article of furniture. In one implementation, a wireless charging station has a charging coil mounted on the article of furniture to be heated and shares the same supply, typically through a step-down transformer, as the heating element. The charging coil is, for example, suitably mounted or located under a chair seat, on or under the arm of a chair, near the lip of a table, etc., to permit charging of cell phones, laptop computers and similar devices.

In various embodiments of the furnishing unit 110, an item such as a chair is 3D printed. At an intermediate stage in the course of printing, heating element material is put in place on, or applied to, the partially printed item. The printing process is then continued so that the heating elements are embedded in the completed printed item. In one implementation, the heating element is deposited as a thick film resistive layer. In another implementation, wires, filaments, or rods of resistive material are placed on the surface of the partially printed object or are placed within containing housings forming part of the partial print. In a further implementation, both conductive and resistive elements are formed in the partial print so as to provide elements of a heating circuit. In a variation, the heating element itself is printed into the object during the printing process by switching from the flowable base material, such as a plastic, to a flowable resistive metal component, switching back to base material, etc., until the resistive metal heating element is completed. Conducting leads to the heating element are also printed 'on the fly'.

In various embodiments of the furnishing unit 110, a heat storage medium such as a clay brick, or ceramic or feolite is lodged into stock manufacturing material, or into an article of furniture at a position adjacent a resistive heating element.

In use, the heat storage medium is heated up during a heat storage cycle. At other times, even if there is no active heating of the heat storage medium, the previously heated medium releases its stored heat to warm a sitter or like user of the article of furniture. In one implementation, the heat storage medium is embedded in a 3D printed article of furniture during manufacture together with the associated heating element. In another implementation, the heat storage medium is added as part of the 3D material to be printed. In another implementation, the heating element comprises a mix of chemicals that exothermically react when electric current is passed through the mix, with the chemical returning to their initial state upon cooling when current flow ceases.

In various embodiments of the furnishing unit 110, a phase change material (PCM), such as an organic or salt hydrate PCM, is lodged into stock manufacturing material, or into an article of furniture at a position adjacent a resistive heating element. In use, the PCM is heated up during a heating cycle to precipitate a first direction phase change and then is allowed to cool to precipitate a reverse direction phase change. Controlled power is applied to the heating element in a cycle that releases latent heat from the PCM to warm a sitter in a warming period and absorbs latent heat in a cooling period either deliberately to cool a sitter or like user or to cool the article of furniture when no warming effect is required. In one implementation, the PCM is embedded in a 3D printed article of furniture during manufacture together with the associated heating element. In another implementation, the PCM is added as part of the 3D material to be printed.

In various embodiments of the furnishing unit 110, particularly in the case of 3D printing of a heating-capable article of furniture, in one implementation, optical fibers, optical sources and related control devices are embedded in the 3D printed object during manufacture. In use optical circuits and effects therefrom are used to indicate, for example, active heating level and/or current temperature. In one example, optical display technology is used in the structure of a heating-capable chair or like item so that it glows in response to the item changing temperature. In a related implementation, the item glows with a shade that depends on the actual temperature of the item or part of it.

In various embodiments of the furnishing unit 110, whether with or without heating capability, embedded optical fibers, optical sources and related control devices are used to provide lighting to an article of furniture for any of a number of possible purposes: to render the object visible in the dark for safety purposes; to present corporate logos; and to present a display which changes dynamically in response to music or other stimulus.

In various embodiments of the furnishing unit 110. items with heating capability of the sort described previously are in communication with each other and with a controller so that, for example, heating-capable chairs, foot rests, table surfaces and under-the-table units communicate to establish and automatically adjust heat in a shared zone. In an embodiment of the invention, Wi-Fi control is used in conjunction with resistive heating elements and controller mounted at or incorporated in a heating-capable item to provide remote control and energy tracking of the item. In another embodiment, direct control is exercised through a local controller by a person located at and using the item. The control of resistive heating elements can be based on and/or can implement the control of a corresponding experience facilitation element in conjunction with facilitating one or more furnishing experience as described herein. The control data for resistive heating elements can be transmitted by client device 130 and/or furnishing experience system 100.

In various embodiments of the furnishing unit 110, the items of furniture include floor materials such as heating-capable patio stones. These may be individually heating-controlled using an accompanying or integrated smart interconnecting system. In one implementation, power moves from stone to stone making them an expandable system to suit any sized space and currently prevailing human foot traffic. Such stones, bricks or like externally deployed materials are, in one implementation, manufactured with a heating element mated to a reverse side or are manufactured with a phase change substance in an internal cavity, the phase change material providing heat when powered electrically.

In various embodiments of the furnishing unit 110, a communications link, such as network 150, the internet, terminates at a heating-capable item of furniture with a remote information resource such as a web-based weather channel being periodically accessed over the link. In response, heating is turned on, or off, or adjusted, for example, to compensate for ambient or forecast temperature and wind chill. As an alternative to periodic operation, a weather link furnishes storm indications and the heating circuit is turned on, for example, for a period of time linked to an expected snowfall. A local communication link can use Bluetooth, Bluetooth Low Energy, Wi-Fi, LTE-M, NFC or a similar communications protocol. In one implementation, a heating-capable chair or like item has a controller to energize the heating circuit on a periodic basis for melting snow or ice, for example, implemented via furnishing processing system 120 of the chair.

In various embodiments of the furnishing unit 110, for a heating-capable item such as a chair connected to a communications link such as network 150 the internet, a QR or like code, and/or other visual identifier data 355 mounted on or embedded in the chair or other item, allows a user to buy heating time. Such a chair is, in one implementation, for example, located in a public place, where heating funds can go to local coffers much as parking fees do.

In various embodiments of the furnishing unit 110, the heating circuit of a heating-capable item such as a chair is battery operated. In one battery implementation, the item has a solar rechargeable battery connected to a solar panel mounted in, on or near the item for optical exposure to ambient charging light.

In various embodiments of the furnishing unit 110, through an internet or like communication link to a heating-capable chair or like item, the heating control circuit is connected to a restaurant, bar, establishment 140, or other hospitality provider's point of sale (POS) system, which can be implemented via furnishing experience system 100 and/or can communicate with furnishing experience system 100. A chair heating circuit can be activated when a customer sits down and de-activated when they leave, either triggered by the POS system when seating is assigned or by chair sensors detecting when a person sits in the chair or gets up. The system link is in one implementation used also to see what the customer purchased, how long they were at the table, and what temperature the chair is set to if there is local adjustment capability, for example, to populate furnishing experience history for the furnishing unit, for corresponding users, for a corresponding product, and/or for corresponding establishments as described herein. This enables data analytics to see which meals are most commonly eaten, how long people sit while eating a specific meal or drinking a specific drink, which table placement gets the most seating traffic, etc., for example, to generate some or all of learned characteristics data for users, products, furnishing units, and/or establishments as described herein.

In various embodiments of the furnishing unit 110, parts of a heating-capable structure such as a chair are, through articulation or material flexibility, moved relative to one another and relative to the main body of the structure. In the case of a chair, such articulation or flexibility is between a body part of the chair and any of the chair seat, chair back, chair sides, chair arms, etc. Relative movement of chair parts is used to tailor heat transfer and distribution to people of different stature and physique. Tailored movement in another case permits the addition of more warmth to one part of a person's body—for example, a sitter's hands—that feel subjectively cold to the sitter.

Other variations and modifications will be apparent to those skilled in the art and the embodiments of the invention described and illustrated are not intended to be limiting. The principles of the invention contemplate many alternatives having advantages and properties evident in the exemplary embodiments.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal $X>5$ is equivalent to determining if $-X<-5$, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c".

In either phrasing, the phrases are to be interpreted identically. In particular, “at least one of a, b, and c” is equivalent to “at least one of a, b, or c” and shall mean a, b, and/or c. As an example, it means: “a” only, “b” only, “c” only, “a” and “b”, “a” and “c”, “b” and “c”, and/or “a”, “b”, and “c”.

As may also be used herein, the terms “processing module”, “processing circuit”, “processor”, “processing circuitry”, and/or “processing unit” may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a “start” and/or “continue” indication. The “start” and “continue” indications reflect that the steps presented can optionally be incorporated in or otherwise used in conjunction with one or more other routines. In addition, a flow diagram may include an “end” and/or “continue” indication. The “end” and/or “continue” indications reflect that the steps presented can end as described and shown or optionally be incorporated in or otherwise used in conjunction with one or more other routines. In this context, “start” indicates the beginning of the first step presented and may be preceded by other activities not specifically shown. Further, the “continue” indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term “module” is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A client device comprising:

an identifier input unit configured to determine furnishing unit identifier data conveyed by an identifier conveyance unit of a furnishing unit in proximity to the client device based on the furnishing unit identifier data being visibly displayed upon at least one surface of the furnishing unit to indicate a furnishing unit identifier for the furnishing unit distinguishing the furnishing unit from a plurality of other furnishing units based on the furnishing unit identifier being mapped to the furnishing unit in an entry stored in memory of a furnishing experience system;

at least one memory; and at least one processor storing operational instructions that, when executed by the at least one processor, cause the client device to:

display experience option data for the furnishing unit via an interactive user interface based on determining the furnishing unit identifier data and based on distinguishing the furnishing unit from the plurality of other furnishing units via the furnishing unit identifier data;

generate experience selection data based on user input to the interactive user interface; and transmit the experience selection data to the furnishing unit, wherein the furnishing unit configures output of at least one experience facilitation element based on receiving the experience selection data.

2. The client device of claim 1, wherein the experience option data indicates a plurality of options that includes at least one of:

at least one option for configuring heating intensity by at least one heating element of the furnishing unit;

at least one option for configuring heating location by at least one heating element of the furnishing unit;

at least one option for configuring cooling by at least one cooling element of the furnishing unit;

at least one option for configuring volume of at least one speaker of the furnishing unit;

at least one option for configuring music played by of at least one speaker of the furnishing unit;

at least one option for configuring entertainment content displayed by at least one display of the furnishing unit;

at least one option for configuring lighting by at least one lighting element of the furnishing unit;

and wherein the experience selection data indicates selection of at least one of the plurality of options.

3. The client device of claim 1, wherein the experience selection data is generated while the client device is at least one of: held by a user while the user is seated upon a seat bottom of the furnishing unit, or worn by the user while the user is seated upon a seat bottom of the furnishing unit.

4. The client device of claim 1, wherein the identifier input unit is implemented via at least one of: a camera of the client device or a near field communications (NFC) reader of the client device.

5. The client device of claim 1, wherein the client device is in proximity to the furnishing unit during a first temporal period, wherein the client device is in proximity to a second furnishing unit during a second temporal period after the first temporal period, wherein the identifier input unit determines second furnishing unit identifier data conveyed by a second identifier conveyance unit of a second furnishing unit in proximity to the client device during the second temporal period, and wherein the operational instructions, when executed by the at least one processor during the second temporal period, further cause the client device to:

display second experience option data for the second furnishing unit via the interactive user interface based on determining the second furnishing unit identifier data, wherein the second experience option data is different from the experience option data based on a first set of furnishing experience facilitation elements of the furnishing unit that includes the at least one experience facilitation element being different from a second set of furnishing experience facilitation elements of the second furnishing unit;

generate second experience selection data based on second user input to the interactive user interface; and transmitting the second experience selection data to the second furnishing unit, wherein the second furnishing unit configures output of another at least one experience facilitation element of the second set of experience facilitation elements based on receiving the second experience selection data.

6. The client device of claim 1, wherein the client device is in proximity to the furnishing unit during a first temporal period, wherein the operational instructions, when executed by the at least one processor, further cause the client device to:

saving the experience selection data in a user account associated with a user of the client device during the first temporal period;

wherein the client device is in proximity to a second furnishing unit during a second temporal period after the first temporal period, wherein the identifier input unit determines second furnishing unit identifier data conveyed by a second identifier conveyance unit of a second furnishing unit in proximity to the client device during the second temporal period, and wherein the operational instructions, when executed by the at least one processor during the second temporal period, further cause the client device to:

generate second experience selection data based on determining the second furnishing unit identifier data, wherein the second experience selection data is set as the experience selection data based on accessing the experience selection data in the user account; and transmit the second experience selection data to the second furnishing unit, wherein the second furnishing unit configures output of the at least one experience facilitation element of the second furnishing unit based on receiving the second experience selection data.

7. The client device of claim 1, wherein the furnishing unit is implemented as a seating unit that includes at least one of:

a seat bottom configured to be seated upon by a user; or a seat back configured to support a back of the user while the user is seated upon the seat bottom;

wherein the client device generates the experience selection data while the user is seated upon the seat bottom, and wherein the furnishing unit configures the output of the at least one experience facilitation element while the user is seated upon the seat bottom.

8. The client device of claim 1, wherein the furnishing unit is configured for outdoor use, wherein the furnishing unit is located at an outdoor location, wherein the client device generates the experience selection data while a corresponding user is at the outdoor location, and wherein the at least one experience facilitation element delivers output to counter at least one environmental condition at the outdoor location.

9. The client device of claim 8, wherein at least one of:

the at least one environmental condition includes darkness due to the client device generating the experience selection data at a time corresponding to nighttime, and wherein the at least one experience facilitation element delivers lighting to illuminate a portion of the outdoor location in proximity to the corresponding user;

the at least one environmental condition includes a cold ambient temperature, and wherein the at least one experience facilitation element delivers heating to the corresponding user; or the at least one environmental condition includes a hot ambient temperature, and wherein the at least one experience facilitation element delivers cooling to the corresponding user.

10. The client device of claim 1, wherein the furnishing unit receives the experience selection data and configures the output of the at least one experience facilitation element during a first temporal period corresponding to use of the furnishing unit by a first user associated with the client device, and wherein the furnishing unit is operable to, during a second temporal period corresponding to use of the furnishing unit by a second user associated with a second client device:

receive second experience selection data generated by the second client device based on second user input to a second interactive user interface displayed by the second client device, wherein the second client device generates the second experience selection data based on determining the furnishing unit identifier data for the furnishing unit when in proximity to the furnishing unit during the second temporal period; and configuring second output of at least one experience facilitation element of the furnishing unit based on the second experience selection data, wherein the second output is different from the output based on the second experience selection data being different from the experience selection data.

11. The client device of claim 1, wherein the at least one experience facilitation element includes at least one of: at least one heating element, at least one cooling element, at least one speaker, at least one vibration element, at least one display device, or at least one lighting element.

12. The client device of claim 1, wherein the furnishing unit includes the at least one experience facilitation element.

13. The client device of claim 1, wherein at least one of:

the at least one experience facilitation element includes at least two experience facilitation elements having output configured based on the experience selection data; or configuring output of the at least one experience facilitation element of the furnishing unit includes controlling output of one experience facilitation element of the at least one experience facilitation element from a set of three or more possible output types.

14. The client device of claim 1, wherein the client device determines the furnishing unit identifier data based on a camera of the client device capturing the identifier data identifier data.

15. The client device of claim 1, wherein the furnishing unit identifier data is in accordance with a data format corresponding to a quick response (QR) code.

16. The client device of claim 1, wherein the identifier conveyance unit includes:

a microchip storing the furnishing unit identifier data; and a coil that, when energized via an electromagnetic field generated by the client device while in proximity with the identifier conveyance unit, conveys the furnishing unit identifier data for receipt by the client device based on modulating of the electromagnetic field with the furnishing unit identifier data.

17. The client device of claim 1, wherein the identifier conveyance unit includes a Near-Field Communications (NFC) tag, and wherein the client device determines the furnishing unit identifier data based on implementing an NFC reader.

18. The client device of claim 1, wherein the furnishing unit includes at least one proximity-based communications transceiver, and wherein the experience selection data is received via the proximity-based communications transceiver from the client device via proximity-based communications with the client device.

19. A method for use with a client device, the method comprising:

determining furnishing unit identifier data conveyed by an identifier conveyance unit of a furnishing unit in proximity to the client device based on the furnishing unit identifier data being visibly displayed upon at least one surface of the furnishing unit to indicate a furnishing unit identifier for the furnishing unit distinguishing the furnishing unit from a plurality of other furnishing units based on the furnishing unit identifier being mapped to the furnishing unit in an entry stored in memory of a furnishing experience system;

displaying experience option data for the furnishing unit via an interactive user interface based on determining the furnishing unit identifier data and based on distinguishing the furnishing unit from the plurality of other furnishing units via the furnishing unit identifier data;

generating experience selection data based on user input to the interactive user interface; and transmitting the experience selection data to the furnishing unit, wherein the furnishing unit configures output of at least one experience facilitation element based on receiving the experience selection data.

20. The method of claim 19, wherein the experience option data indicates a plurality of options that includes one or more of:

at least one option for configuring heating intensity by at least one heating element of the furnishing unit;

at least one option for configuring heating location by at least one heating element of the furnishing unit;

at least one option for configuring cooling by at least one cooling element of the furnishing unit;

at least one option for configuring volume of at least one speaker of the furnishing unit;

at least one option for configuring music played by of at least one speaker of the furnishing unit;

at least one option for configuring entertainment content displayed by at least one display of the furnishing unit; and at least one option for configuring lighting by at least one lighting element of the furnishing unit;

and wherein the experience selection data indicates selection of at least one of the plurality of options.

* * * * *